US012798802B2

(12) United States Patent
Fukuda et al.

(10) Patent No.: US 12,798,802 B2
(45) Date of Patent: Nov. 17, 2026

(54) ENGINE AND FLYING APPARATUS

(71) Applicants: Kubota Corporation, Osaka (JP); ISHIKAWA ENERGY RESEARCH CO., LTD., Ota (JP)

(72) Inventors: Taro Fukuda, Ota (JP); Rio Matsumoto, Ota (JP)

(73) Assignees: KUBOTA CORPORATION, Osaka (JP); ISHIKAWA ENERGY RESEARCH CO., LTD., Gunma (JP)

( * ) Notice: Subject to any disclaimer, the term of this patent is extended or adjusted under 35 U.S.C. 154(b) by 0 days.

(21) Appl. No.: 19/250,360

(22) Filed: Jun. 26, 2025

(65) Prior Publication Data

US 2025/0320005 A1 Oct. 16, 2025

Related U.S. Application Data

(63) Continuation of application No. PCT/JP2022/048093, filed on Dec. 27, 2022.

(51) Int. Cl.

| | |
|---|---|
| ***B64U 50/11*** | (2023.01) |
| ***B64U 10/16*** | (2023.01) |
| ***B64U 50/19*** | (2023.01) |
| ***F02B 73/00*** | (2006.01) |
| ***F02B 75/28*** | (2006.01) |
| *B64U 30/24* | (2023.01) |

(52) U.S. Cl.

CPC .............. *B64U 50/11* (2023.01); *B64U 10/16* (2023.01); *B64U 50/19* (2023.01); *F02B 75/28* (2013.01); *B64U 30/24* (2023.01); *F02B 73/00* (2013.01)

(58) Field of Classification Search

CPC .......... B64U 50/11; F02B 75/28; F02B 73/00; F01M 11/0004

See application file for complete search history.

(56) References Cited

U.S. PATENT DOCUMENTS

| | | | | |
|---|---|---|---|---|
| 2,081,139 A | | 5/1937 | Beals et al. | |
| 2,410,477 A | * | 11/1946 | Blumberg | F02B 75/28 123/55.7 |
| 4,337,623 A | * | 7/1982 | Kronogard | F02B 73/00 74/606 R |
| 4,915,070 A | | 4/1990 | Okui | |
| 4,993,374 A | | 2/1991 | Okui | |

(Continued)

FOREIGN PATENT DOCUMENTS

| | | |
|---|---|---|
| JP | S6229457 U | 2/1987 |
| JP | H01285624 A | 11/1989 |

(Continued)

OTHER PUBLICATIONS

International Search Report in PCT/JP2022/048093, mailed Feb. 21, 2023, 3 pages.

(Continued)

*Primary Examiner* — Brian M O'Hara
(74) *Attorney, Agent, or Firm* — Keating & Bennett, LLP

(57) ABSTRACT

An engine includes pistons, crank shafts to rotate according to reciprocating motions of the pistons, an engine block that accommodates the pistons and the crank shafts, and an oil pan provided below the engine block. Between one-side portion and another-side portion in the width direction of the engine block, the oil pan is provided only at the one-side portion.

8 Claims, 54 Drawing Sheets

(56) References Cited

U.S. PATENT DOCUMENTS

| | | | | |
|---|---|---|---|---|
| 5,231,894 | A | 8/1993 | Okita et al. | |
| 6,568,509 | B1 * | 5/2003 | Sugiura .............. | F01M 11/0004 184/106 |
| 6,830,535 | B2 * | 12/2004 | Wylin ..................... | F02B 73/00 477/110 |
| 8,807,098 | B1 * | 8/2014 | Louis .................. | F02D 41/0025 123/59.6 |
| 10,190,492 | B2 * | 1/2019 | Fuqua ....................... | F01B 7/14 |
| 2007/0107691 | A1 | 5/2007 | Yoshinaga et al. | |
| 2019/0338679 | A1 | 11/2019 | Kano | |
| 2021/0016880 | A1 | 1/2021 | Ishikawa et al. | |
| 2023/0042223 | A1 | 2/2023 | Ishikawa et al. | |
| 2023/0374934 | A1 | 11/2023 | Matsuda | |

FOREIGN PATENT DOCUMENTS

| | | | |
|---|---|---|---|
| JP | H055462 | A | 1/1993 |
| JP | 2005248797 | A | 9/2005 |
| JP | 2007138732 | A | 6/2007 |
| JP | 2007138792 | A | 6/2007 |
| JP | 2019059362 | A | 4/2019 |
| JP | 2022143952 | A | 10/2022 |
| WO | 2018138947 | A1 | 8/2018 |
| WO | 2022172315 | A1 | 8/2022 |

OTHER PUBLICATIONS

Official Communication issued in corresponding European Patent Application No. 22970002.6, mailed on Sep. 14, 2026, 8 pages.

* cited by examiner 4
4b
4c
4d
56A(56)
56B(56)
400A(400)
400B(400)
400C(400)
BL5
BL5
BL5
BL6
BL6
BL6
BL6
F
R
U
D
L
B

ENGINE AND FLYING APPARATUS

CROSS REFERENCE TO RELATED APPLICATIONS

This application is a continuation application of International Application No. PCT/JP2022/048093, filed on Dec. 27, 2022. The entire contents of this application are hereby incorporated herein by reference.

BACKGROUND OF THE INVENTION

1. Field of the Invention

The present invention relates to flying apparatuses such as multicopters.

2. Description of the Related Art

An engine is known as disclosed in Japanese Unexamined Patent Application Publication No. 2022-143952. The engine disclosed in Japanese Unexamined Patent Application Publication No. 2022-143952 includes an oil pan provided below a cylinder block of an engine main body.

SUMMARY OF THE INVENTION

The engine disclosed in Japanese Unexamined Patent Application Publication No. 2022-143952 includes the oil pan extending across an entire lower portion of the cylinder block. That is, the oil pan is provided across an entire lower portion of the engine. For this reason, it is difficult to make effective use of a space below the engine in an apparatus with the engine mounted thereon or therein.

Example embodiments of the present invention provide engines that each can make effective use of a space below an engine, and provide flying apparatuses including such engines.

Example embodiments of the present invention may include the following feature(s).

According to an example embodiment of the present invention, an engine includes one or more pistons, one or more crank shafts configured to rotate according to reciprocating motions of the one or more pistons, an engine block to accommodate the one or more pistons and the one or more crank shafts, and an oil pan provided below the engine block. The engine block includes a width-directional first-side portion and a width-directional second-side portion opposite each other in a width direction thereof, and the oil pan is provided only on the width-directional first-side portion between the width-directional first-side portion and the width-directional second-side portion of the engine block.

The one or more pistons may include a first piston and a second piston opposite each other. The one or more crank shafts may include a first crank shaft configured to rotate according to reciprocating motion of the first piston and a second crank shaft configured to rotate according to reciprocating motion of the second piston.

The first crank shaft and the second crank shaft may be parallel or substantially parallel to each other and spaced from each other in the width direction. The oil pan may be provided at or adjacent to the first crank shaft.

The engine block may include an oblique portion in which an inner lower surface is lowered in the width direction from the width-directional second-side portion to the width-directional first-side portion.

The engine block may include a plurality of blocks. The oil pan may be provided below one of the plurality of blocks. The oblique portion may be provided at a lower portion of another of the plurality of blocks adjacent to the one of the plurality of blocks.

The oblique portion may be provided at one of opposite-side portions of the engine block in a longitudinal direction which is perpendicular or substantially perpendicular to the width direction of the engine block.

The oblique portion may have a cross-sectional U-shape.

According to an example embodiment of the present invention, a flying apparatus includes a main body assembly, an arm extending from the main body assembly, a rotor attached to the arm, and an engine to supply a driving force to the rotor. The engine is included in the engine including the above-described configuration.

The flying apparatus may include an electrical component mounted on or in the main body assembly. The electrical component may be provided below the engine and may be located at or adjacent to the width-directional second-side portion of the engine block and overlap the oil pan when viewed in an up-down direction.

The flying apparatus may include a motor to supply a driving force to the rotor, and a battery to store electric power to be supplied to the motor. The electrical component may include a battery controller configured or programmed to the battery.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 7 is a top view of a flying apparatus according to the first example embodiment of the present invention illustrating rotation paths of main rotors and sub-rotors and the like.

FIG. 12 illustrates an arm of a flying apparatus according to the first example embodiment in which a first section and a second section of the arm are separated from each other in.

FIG. 44 is a top view of a flying apparatus according to the second example embodiment illustrating rotation paths of main rotors and sub-rotors and the like.

DETAILED DESCRIPTION OF THE EXAMPLE EMBODIMENTS

Figure 1:
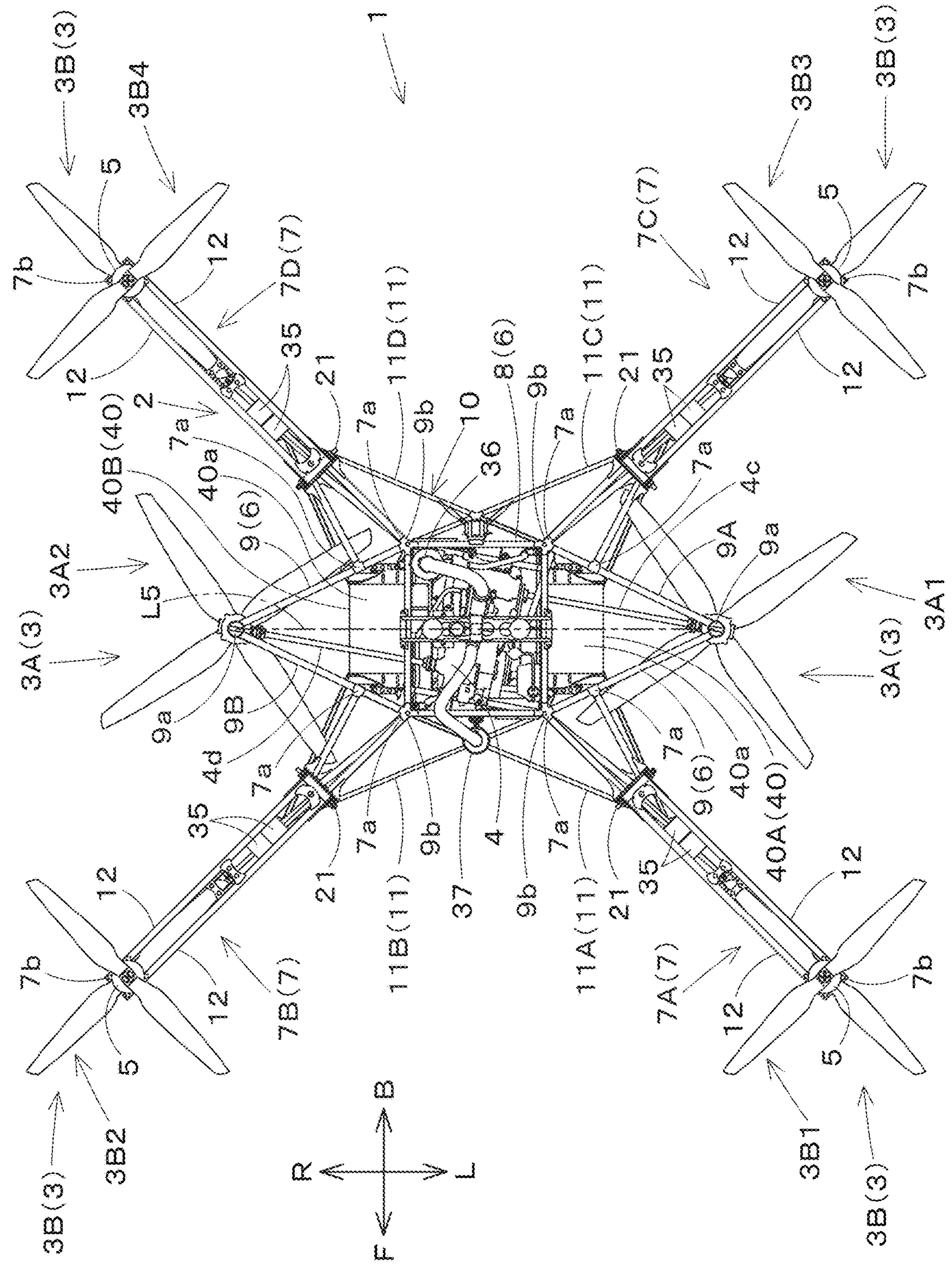
FIG. 1 is a top view of a flying apparatus according to a first example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of flying apparatuses 1 will be described. The flying apparatuses 1 according to the example embodiments of the present invention are flying apparatuses which can fly unmanned. Specifically, the flying apparatus 1 is a multicopter called "drone". The flying apparatus 1 may fly via remote control by wireless communication or cabled communication, or may fly by self-operating without relying on a remote controller.

FIGS. 1 to 23 illustrate a flying apparatus 1 according to a first example embodiment. FIGS. 1 to 6 illustrate an entire configuration of the flying apparatus 1 of the first example embodiment. For convenience, the following description refers to a direction indicated by an arrow F as "front", a direction indicated by an arrow B as "rear", a direction indicated by an arrow L as "left", and a direction indicated by an arrow R as "right" on illustrations of FIGS. 1 to 23. A direction indicated by an arrow U is referred to as "up", and a direction indicated by an arrow D as "down".

The flying apparatus 1 includes an airframe 2, and a plurality of rotors 3 attached to the airframe 2. The plurality of rotors 3 include main rotors 3A and sub-rotors 3B. The main rotors 3A are configured to generate lifting power to float the airframe 2. The sub-rotors 3B are configured to control a posture of the airframe 2. The main rotors 3A are rotated via a driving force supplied from an engine 4. The sub-rotors 3B are rotated via a driving force supplied from one or more motors 5.

The airframe 2 includes a main body assembly 6, and a plurality of arms 7 extending from the main body assembly 6. The main rotors 3A are attached to the main body assembly 6. The sub-rotors 3B are attached to the arms 7. The main body assembly 6 includes a framed main body 8 and projecting frames 9. A driver 4 to drive the main rotors 3A is provided on the framed main body 8. The driver 4 is an engine, a motor, and/or the like. In the present example embodiment, the driver 4 is an engine. Thus, the following description refers to the driver 4 as engine 4.

In a planar view, the framed main body 8 is rectangular or substantially rectangular, for example. In a planar view, the framed main body 8 surrounds the engine 4 (see FIG. 7 and/or the like). In a planar view, the projecting frames 9 project in directions away from the framed main body 8. The projecting frames 9 project in horizontal directions. The main rotors 3A are attached to the projecting frames 9. That is, the main rotors 3A are not attached to the arm 7 but are attached to the main body assembly 6 (projecting frame 9).

As shown in FIG. 1 and the like, each of the projecting frames 9 includes a corner 9*a* at a distal end thereof in a projecting direction thereof. The main rotor 3A is attached to the corner 9*a* of the projecting frame 9. The projecting frame 9 includes a plurality of frame members (see frame members 119 to 126 in FIG. 15) extending in directions away from the framed main body 8 and defining the corner 9*a* therebetween by approaching each other in the projecting direction thereof. The corner 9*a* of the projecting frame 9 is located between corresponding ones of the arms 7 which are adjacent to each other (see FIG. 1).

The projecting frames 9 include a first projecting frame 9A and a second projecting frame 9B. In a planar view, the first projecting frame 9A and the second projecting frame 9B project in opposite directions from the framed main body 8. The first projecting frame 9A extends leftward from the framed main body 8. The second projecting frame 9B extends rightward from the framed main body 8.

The following describes a configuration of the projecting frames (first projecting frame 9A, second projecting frame 9B) more specifically while mentioning members defining the framed main body 8. Note that the members mentioned here are only component members of the framed main body 8 related to the projecting frames 9 among all component members of the framed main body 8. The other component members of the framed main body 8 will be described later in more detail.

Figure 15:
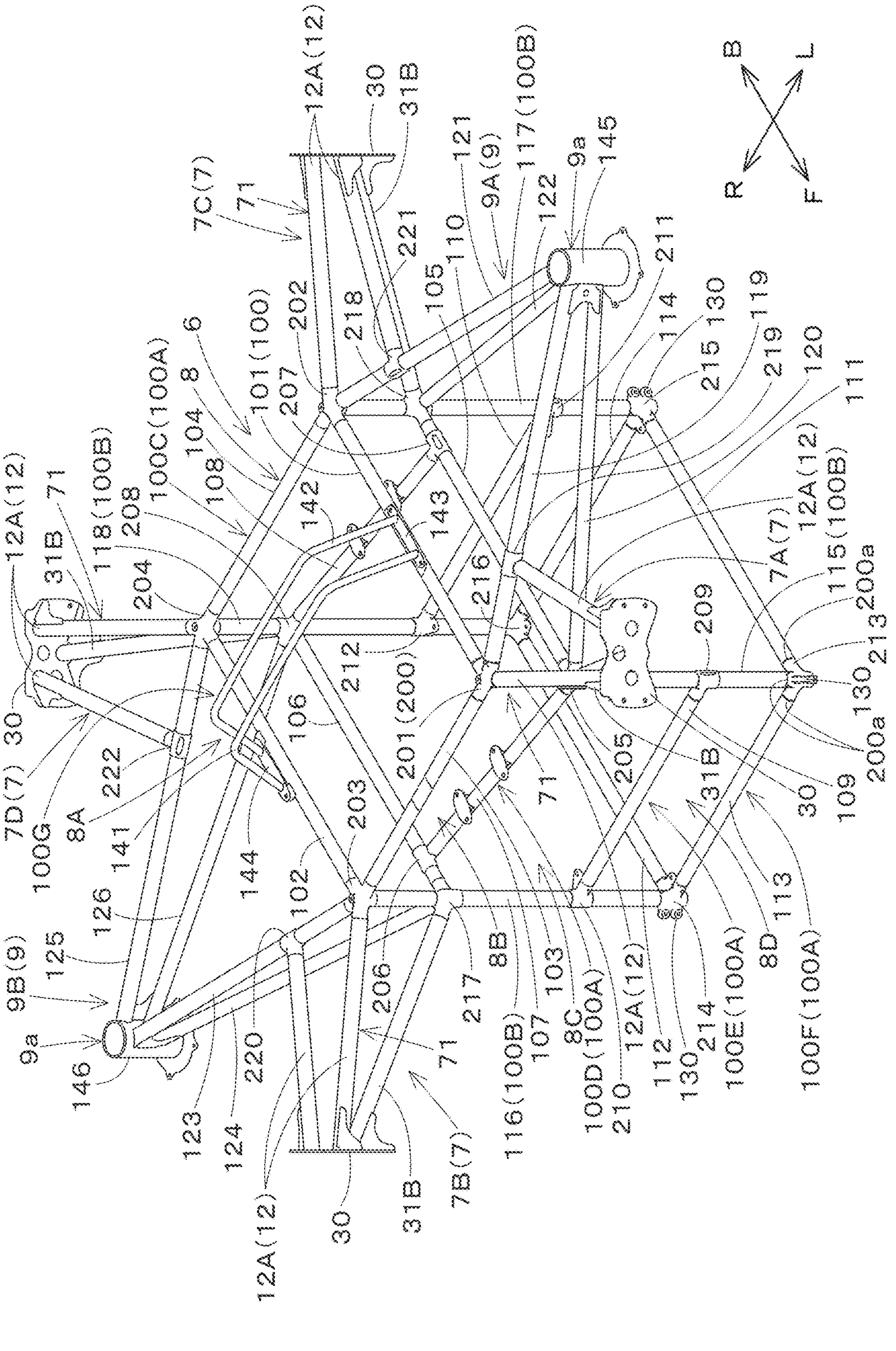
FIG. 15 is a perspective view of a flying apparatus according to the first example embodiment illustrating a main body assembly and first sections of arms.

As shown in FIG. 15, the first projecting frame 9A includes upper frame members (frame members 119 and 121) and lower frame members (frame members 120 and 122). The upper frame members and the lower frame members are connected to each other via corresponding component members (frame members 115 and 117) of the framed main body 8 and via a first connector 145 described later. The first projecting frame 9A has a triangular or substantially triangular shape in a planar view, for example, by being assembled with corresponding component members (frame members 101 and 105) of the framed main body 8.

The second projecting frame 9B includes upper frame members (frame members 123 and 125) and lower frame members (frame members 124 and 126). The upper frame members and the lower frame members are connected to each other via corresponding component members (frame members 116 and 118) of the framed main body 8 and via a second connector 146 described later. The second projecting frame 9B has a triangular or substantially triangular shape, for example, in a planar view by being assembled with corresponding component members (frame members 102 and 106) of the framed main body 8.

Thus, each of the projecting frames 9 (first projecting frame 9A and second project frame 9B) on which the respective main rotors 3A are attached includes the upper frame members and the lower frame members connected to each other. Accordingly, a strength of the projecting frame 9 against an external force in the up-down direction is enhanced, and it is possible to prevent or reduce pitching motion of the projecting frame 9. Each of the projecting frames 9 (first projecting frame 9A and second projecting frame 9B) has a triangular or substantially triangular shape, for example, in a planar view by being assembled with the corresponding component members of the framed main body 8. Accordingly, the strength of the projecting frame 9 against a force in a substantially horizontal direction acting thereon because of rotations of the main rotor 3A and/or the like is enhanced, and it is possible to prevent or reduce pitching motion of the projecting frame 9.

As shown in FIG. 1 and/or the like, the arm 7 extends in a direction away from the main body assembly 6 in a planar view. The plurality of arms 7 extend radially away from the main body assembly 6. As shown in FIGS. 3 to 6, the arm 7 extends in a horizontal direction. In the present example embodiment, four arms 7 are provided, but five or more arms 7, or three or less arms 7 may be provided.

The flying apparatus 1 of the present example embodiment includes a first arm 7A, a second arm 7B, a third arm 7C, and a fourth arm 7D. The first arm 7A extends leftwardly forward from the main body assembly 6. The second arm 7B extends rightwardly forward from the main body assembly 6. The third arm 7C extends leftwardly rearward from the main body assembly 6. The fourth arm 7D extends rightwardly rearward from the main body assembly 6.

The sub-rotor 3B is attached to each of the plurality of arms 7. The sub-rotor 3B is attached to the distal end of the arm 7. The proximal end of the arm 7 is attached to the main body assembly 6. The main rotor 3A is provided between corresponding ones of the arms 7 which are adjacent to each other.

As previously described, the main rotors 3A are attached to the projecting frames 9 of the main body assembly 6, and the sub-rotors 3B are attached to the arms 7. In other words, the rotors (sub-rotors 3B) attached to the arms 7 are different from the rotors (main rotors 3A) attached to the projecting frames 9.

As shown in FIG. 1 and like, a proximal end 7*a* of the arm 7 is attached (connected) to the projecting frame 9 of the main body assembly 6. Specifically, the arm 7 is connected to a portion of the projecting frame 9 between the corner 9*a* and a proximal end (proximal end 9*b*) thereof in the projecting direction of the projecting frame 9. More specifically, the arm 7 is connected to a portion of the projecting frame 9 between the proximal end 9*b* and the corner 9*a*, at a position closer to the proximal end 9*b* than to the corner 9*a*. Specifically, each arm 7 includes two proximal ends 7*a* such that one proximal end 7*a* is connected to the proximal end 9*b* of the projecting frame 9, and another proximal end 7*a* is connected to the projecting frame 9 at the position closer to the proximal end 9*b* than to the corner 9*a* between the corner 9*a* and the proximal end 9*b*.

A plurality (two) of the arms 7 include respective proximal ends 7*a* connected to one of the projecting frames 9. Specifically, the proximal end 7*a* of the first arm 7A and the proximal end 7*a* of the third arm 7C are connected to the first projecting frame 9A. The proximal end 7*a* of the second arm 7B and the proximal end 7*a* of the fourth arm 7D are connected to the second projecting frame 9B.

As previously described, the airframe 2 includes the projecting frame 9 with the main rotor 3A attached to the distal end thereof, and the arm 7 with the sub-rotor 3B attached to the distal end thereof. The projecting frame 9 is a first support to support the main rotor 3A on the airframe 2. The arm 7 is a second support to support the sub-rotor 3B on the airframe 2.

Figure 7:
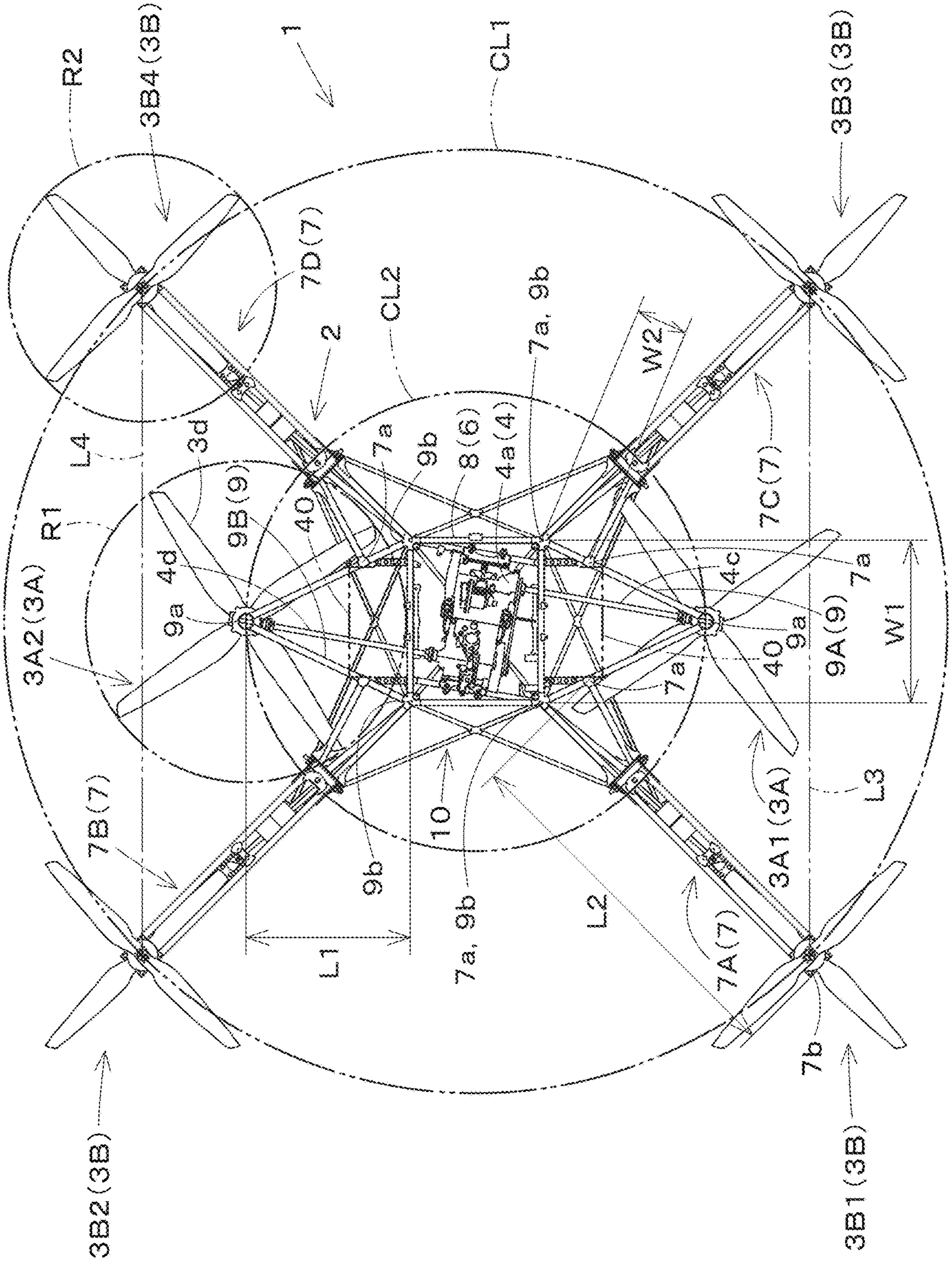

As shown in FIG. 7, a length L1 from the proximal end 9*b* to the distal end (corner 9*a*) of the projecting frame 9 which is the first support is shorter than a length L2 from the proximal end 7*a* to the distal end 7*b* of the arm 7 which is the second support. The length L1 is a distance from a straight line connecting the two proximal ends 9*b* of the projecting frame 9 to the distal end (corner 9*a*) of the projecting frame 9. The length L2 is a distance from the proximal end 7*a* which is the closest to the distal end 7*b* between the two proximal ends 7*a* of the arm 7, to the distal end 7*b* of the arm 7.

As shown in FIG. 7, a width W1 of the proximal end 9*b* of the projecting frame 9 which is the first support is larger than a width W2 of the proximal end 7*a* of the arm 7 which is the second support. The width W1 is a distance between two proximal ends 9*b* of the projecting frame 9. The width W2 is a distance between the two proximal ends 7*a* of the arm 7.

As shown in FIGS. 2, 3, 4, 5 and 6, a skid 10 is attached to a lower portion of the main body assembly 6. The skid 10 includes a plurality of legs 11 extending downward from the main body assembly 6. The plurality of legs 11 are in contact with the ground when the flying apparatus 1 lands, and support the airframe 2 so that the airframe 2 floats above a landing surface such as a ground. The number of legs 11 is not particularly limited, but it is four in the present example embodiment. Hereinafter, the four legs 11 are respectively referred to as a first leg 11A, a second leg 11B, a third leg 11C, and a fourth leg 11D.

As shown in FIG. 1, the legs 11 extend in directions away from the framed main body 8 to overlap the respective arms 7 in a planar view. Specifically, the first leg 11A extends in a direction to overlap the first arm 7A in a planar view. The second leg 11B extends in a direction to overlap the second arm 7B in a planar view. The third leg 11C extends in a direction to overlap the third arm 7C in a planar view. The fourth leg 11D extends in a direction to overlap the fourth arm 7D in a planar view.

As shown in FIG. 1 and/or the like, in a planar view, the plurality of main rotors 3A are provided along a periphery of the airframe 2. Specifically, in a planar view, the plurality of main rotors 3A are spaced equidistantly from a center of the airframe 2. Two main rotors 3A are provided in the present example embodiment, but three or more may be provided. Hereinafter, the two main rotors 3A are respectively referred to as a first main rotor 3A1 and a second main rotor 3A2.

The first main rotor 3A1 and the second main rotor 3A2 are located symmetrically with respect to the center of the airframe 2. The first main rotor 3A1 is located at a left portion of the airframe 2. The second main rotor 3A2 is located at a right portion of the airframe 2. The first main rotor 3A1 is attached to the corner 9*a* of the first projecting frame 9A. The second main rotor 3A2 is attached to the corner 9*a* of the second projecting frame 9B. The first main rotor 3A1 and the second main rotor 3A2 rotate in opposite directions.

As shown in FIG. 1 and the like, in a planar view, a plurality of the sub-rotors 3B are located equidistantly from the center of the airframe 2. There are four sub-rotors 3B in the present example embodiment, but there may be two, three, five or more sub-rotors 3B. Hereinafter, the four sub-rotors 3B are referred to as a first sub-rotor 3B1, a second sub-rotor 3B2, a third sub-rotor 3B3, and a fourth sub-rotor 3B4. The first sub-rotor 3B1 is attached to the first arm 7A. The second sub-rotor 3B2 is attached to the second arm 7B. The third sub-rotor 3B3 is attached to the third arm 7C. The fourth sub-rotor 3B4 is attached to the fourth arm 7D.

In a planar view, a distance between a center of the first sub-rotor 3B1 and a center of the second sub-rotor 3B2, a distance between the center of the second sub-rotor 3B2 and a center of the third sub-rotor 3B3, a distance between a center of the third sub-rotor 3B3 and a center of the fourth sub-rotor 3B4, and a distance between the center of the fourth sub-rotor 3B4 and the center of the first sub-rotor 3B1 are equal to each other.

The first sub-rotor 3B1 is attached to a distal end of the first arm 7A and provided on a front-left portion of the airframe 2. The second sub-rotor 3B2 is attached to a distal end of the second arm 7B and provided on a front-right portion of the airframe 2. The third sub-rotor 3B3 is attached to a distal end of the third arm 7C and provided on a rear-left portion of the airframe 2. The fourth sub-rotor 3B4 is attached to a distal end of the fourth arm 7D and provided on a rear-right portion of the airframe 2.

The first sub-rotor 3B1 and the third sub-rotor 3B3 are located to have the first main rotor 3A1 therebetween in a planar view. The second sub-rotor 3B2 and the fourth sub-rotor 3B4 are located to have the second main rotor 3A2 therebetween in a planar view. In other words, the first main rotor 3A1 is located between the first arm 7A and the third arm 7C. The second main rotor 3A2 is located between the second arm 7B and the fourth arm 7D.

As shown in FIG. 7, the center of the first main rotor 3A1 is located closer to the center of the airframe 2 than a line (straight line) L3 connecting the center of the first sub-rotor 3B1 and the center of the third sub-rotor 3B3. The center of the second main rotor 3A2 is located closer to the center of the airframe 2 than a line L4 (straight line) connecting the center of the second sub-rotor 3B2 and the center of the fourth sub-rotor 3B4. In the following, a direction toward the center of the airframe 2 is referred to as airframe-inward direction, and a direction away from the center of the airframe 2 is referred to as airframe-outward direction.

As shown in FIG. 1, the main rotors 3A are located closer to the center of the airframe 2 than the sub-rotors 3B in a planar view. As shown in FIG. 7, the main rotors 3A are provided on an inner side (airframe-inward) of a circle CL1 connecting centers of the plurality of sub-rotors 3B. The sub-rotors 3B are provided on an outer side (airframe-outward) of a circle CL2 connecting the centers of the plurality of main rotors 3A. As shown in FIGS. 3 to 6, the main rotors 3A are located lower than the sub-rotors 3B. Blades 3*d* of the main rotors 3A described later are located lower than blades of the sub-rotors 3B (first blades 3*f* and second blades 3*h*) described later.

Figure 3:
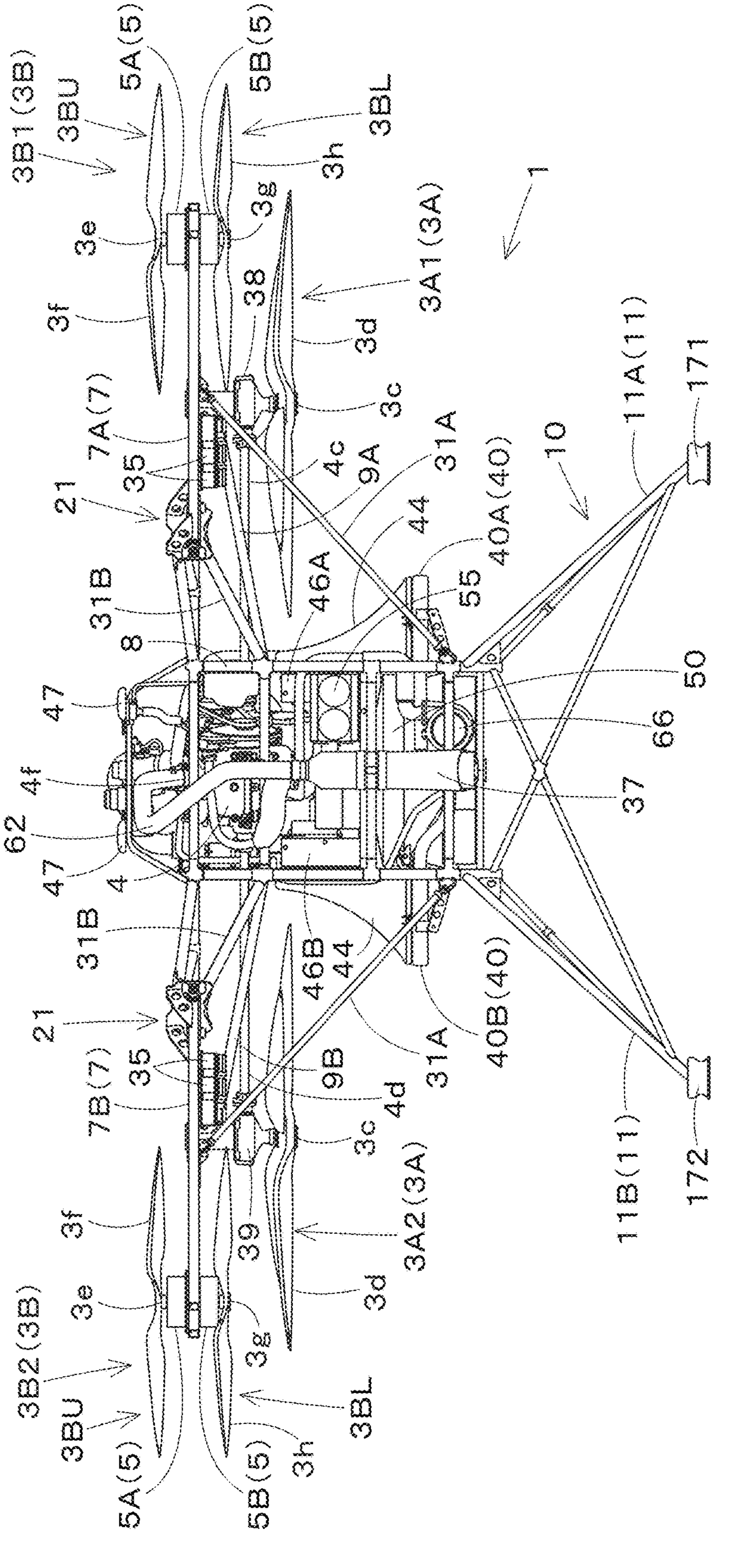
FIG. 3 is a front view of a flying apparatus according to the first example embodiment of the present invention.
Figure 4:
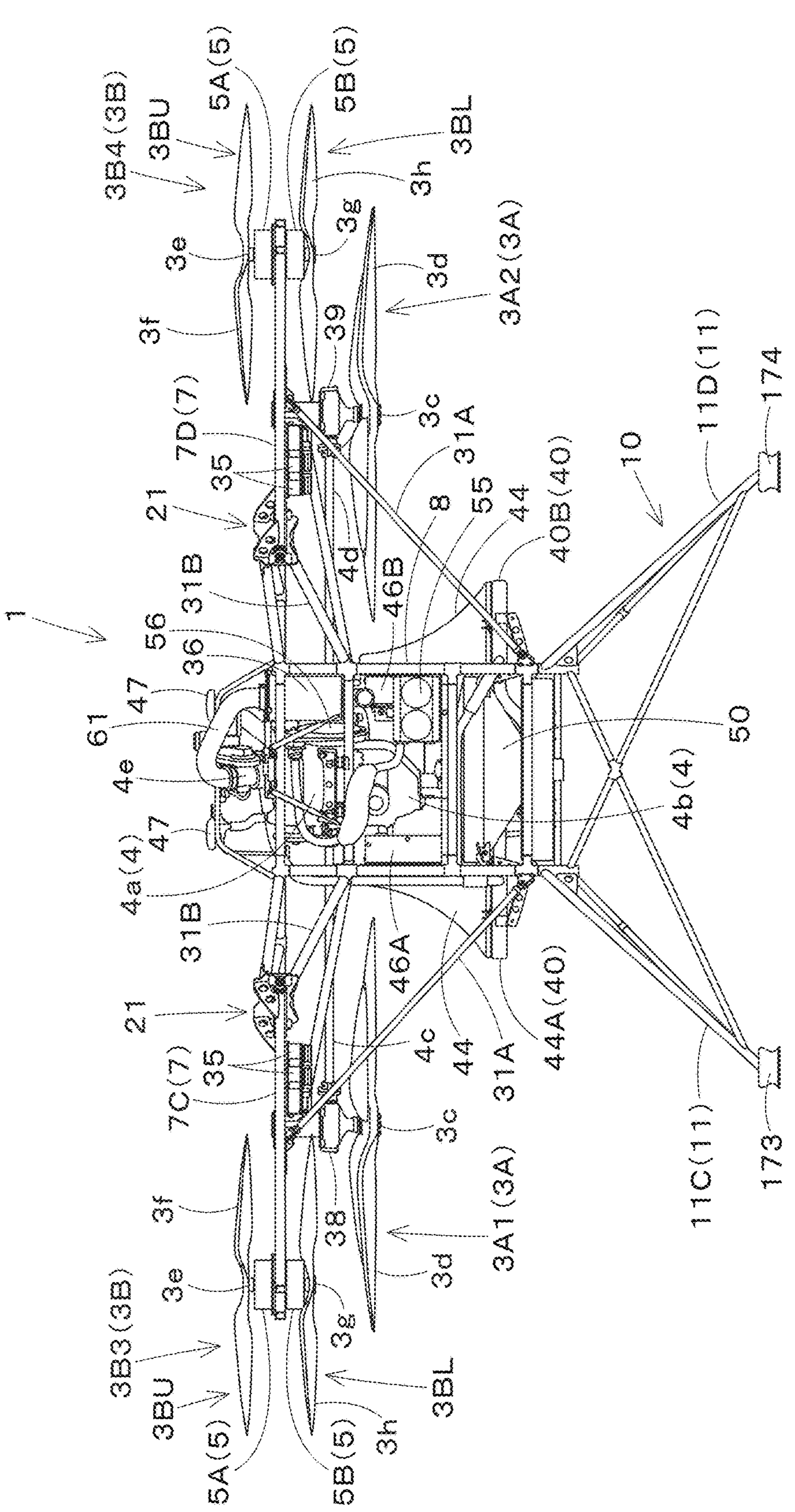
FIG. 4 is a rear view of a flying apparatus according to the first example embodiment of the present invention.

As shown in FIGS. 3, 4 and the like, the main rotors 3A each include a rotating shaft 3*c*, and a set of blades 3*d* attached to the rotating shaft 3*c*. The rotating shaft 3*c* is to be rotated via a driving force of the engine 4, and extends downward. The set of blades 3*d* is attached to a lower portion of the rotating shaft 3*c*. It is not particularly limited how many blades the set of blades 3*d* includes, but it includes four blades in the present example embodiment.

As shown in FIG. 7, a rotation path R1 of the blades 3*d* of the main rotor 3A overlaps the main body assembly 6 when viewed in the up-down direction. Specifically, the rotation path R1 of the blades 3*d* of the main rotor 3A overlaps the projecting frame 9 of the main body assembly 6 when viewed in the up-down direction. The rotation path R1 does not overlap the framed main body 8 of the main body assembly 6 when viewed in the up-down direction. The rotation path R1 of the blades 3*d* of the main rotor 3A overlaps corresponding ones of the arms 7 when viewed in the up-down direction. Specifically, the rotation path R1 of the blades 3*d* of the main rotor 3A overlaps portions of the arms 7 close to the proximal ends 7*a* (a first section 71 described later (see FIG. 9 and/or the like)) when viewed in the up-down direction. In the present description, the rotation path of blades is the rotation path of tips of the blades. That is, the path traced by the tips of the blades when rotating is referred to as "rotation path of blades". Also, "overlap when viewed in the up-down direction" is synonymous with "overlap in a planar view".

As shown in FIGS. 3, 4, 5 and 6, the sub-rotor 3B includes a first rotor 3BU and a second rotor 3BL. The first rotor 3BU and the second rotor 3BL overlap each other when viewed in the up-down direction. The first rotor 3BU is attached to the arm 7 to be located above the arm 7. The second rotor 3BL is attached to the arm 7 to be located below the arm 7. Thus, the first rotor 3BU is located above the second rotor 3BL. For convenience, the following may refer to the first rotor 3BU as an upper rotor 3BU, and to the second rotor 3BL as a lower rotor 3BL.

The first sub-rotor 3B1, the second sub-rotor 3B2, the third sub-rotor 3B3 and the fourth sub-rotor 3B4 each include the upper rotor (first rotor) 3BU and the lower rotor (second rotor) 3BL. Accordingly, the flying apparatus 1 includes eight sub-rotors 3B in total, for example. The center of the upper rotor 3BU and the center of the lower rotor 3BL are provided on a common straight line extending in the up-down direction. The rotation path of the upper rotor 3BU and the rotation path of the lower rotor 3BL have the same diameter.

The upper rotor 3BU and the lower rotor 3BL can rotate in the same direction, and can rotate in opposite directions. The upper rotor 3BU and the lower rotor 3BL can both rotate in the same direction as the first main rotor 3A1, and can both rotate in the same direction as the second main rotor 3A2. Also, it is possible that one of the upper rotor 3BU and the lower rotor 3BL rotates in the same direction as the first main rotor 3A1 while the other rotates in the same direction as the second main rotor 3A2.

Motors 5 to supply a driving force to the sub-rotors 3B are electric motors to be driven via electric power supplied from one or more batteries 46 described later. The motors 5 include a first motor 5A and a second motor 5B. The first motor 5A supplies a driving force to the first rotor (upper rotor) 3BU. The second motor 5B supplies a driving force to the second rotor (lower rotor) 3BL. The first motor 5A and the second motor 5B overlap each other when viewed in the up-down direction. The first motor 5A is located above the arm 7 and attached to the arm 7. The second motor 5B is located below the arm 7 and attached to the arm 7.

Figure 5:
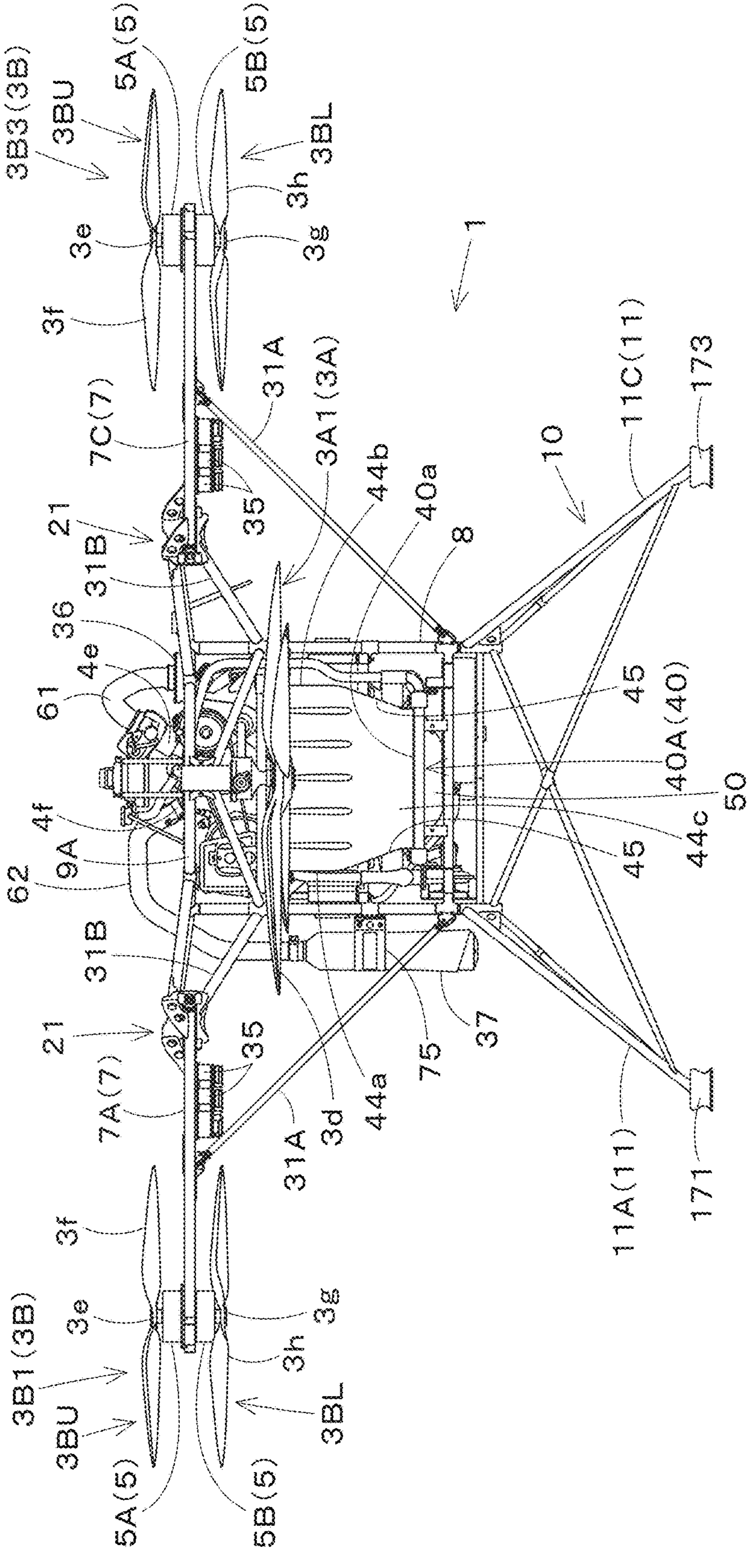
FIG. 5 is a left side view of a flying apparatus according to the first example embodiment of the present invention.

As shown in FIG. 5 and the like, the first rotor (upper rotor) 3BU includes a first rotating shaft 3*e* and a set of first blades 3*f* attached to the first rotating shaft 3*e*. The first rotating shaft 3*e* is to be rotated via a driving force of the first motor 5A, and extends upward. The set of first blades 3*f* is attached to an upper portion of the first rotating shaft 3*e*. The second rotor (lower rotor) 3BL includes a second rotating shaft 3*g* and a set of second blades 3*h* attached to the second rotating shaft 3*g*. The second rotating shaft 3*g* is to be rotated via a driving force of the second motor 5B, and extends downward. The set of second blades 3*h* is attached to a lower portion of the second rotating shaft 3*g*. The first rotating shaft 3*e* and the second rotating shaft 3*g* are provided on a common straight line extending in the up-down direction. It is not particularly limited how many blades the set of first blades 3*f* and the set of second blades 3*h* each include, but each set includes two blades in the present example embodiment.

As shown in FIGS. 3, 4 and the like, the main rotors 3A are located to be lower than the first rotors (upper rotors) 3BU and the second rotors (lower rotors) 3BL. That is, the main rotors 3A are located below both the first rotors (upper rotors) 3BU and the second rotors (lower rotors) 3BL. A distance in the up-down direction between the main rotors 3A and the second rotors (lower rotors) 3BL is shorter than a distance in the up-down direction between the first rotors (upper rotors) 3BU and the second rotors (lower rotors) 3BL.

As shown in FIG. 7, a diameter of the rotation path R1 of the main rotor 3A is larger than a diameter of a rotation path R2 of the sub-rotor 3B. A thrust per one rotation of the blades 3*d* of the main rotor 3A is stronger than a thrust per one rotation of the blades (first blades 3*f* or second blades 3*h*) of the sub-rotor 3B. A thrust per one rotation of the first blades 3*f* of the first rotor (upper rotor) 3BU is the same as a thrust per one rotation of the second blades 3*h* of the second rotor (lower rotor) 3BL. It is preferable for a thrust per one rotation of the blades 3*d* of the main rotor 3A to be stronger than a combination of the thrust per one rotation of the first blades 3*f* of the first rotor (upper rotor) 3BU and the thrust per one rotation of the second blades 3*h* of the second rotor (lower rotor) 3BL. However, the thrust per one rotation of the blades 3*d* of the main rotor 3A may be equal to or weaker than the combination of the thrust per one rotation of the first blades 3*f* of the first rotor (upper rotor) 3BU and the thrust per one rotation of the second blades 3*h* of the second rotor (lower rotor) 3BL.

As shown in FIG. 1 and the like, the arm 7 includes a plurality of rods 12 extending in juxtaposition with each other. The rods 12 extend linearly. The rods 12 include cylindrical pipes. In the present example embodiment, the arm 7 includes two rods 12 extending in juxtaposition with each other. The plurality of rods 12 are juxtaposed in a horizontal direction. The sub-rotor 3B is supported by the plurality of rods 12. With the plurality of rods 12 extending in juxtaposition with each other in a horizontal direction and supporting the sub-rotor 3B, it is possible to enhance a strength of the arm 7 against the force generated by rotations of the sub-rotor 3B in a substantially horizontal direction, and to prevent or reduce yaw motion of the arm 7.

Figure 8:
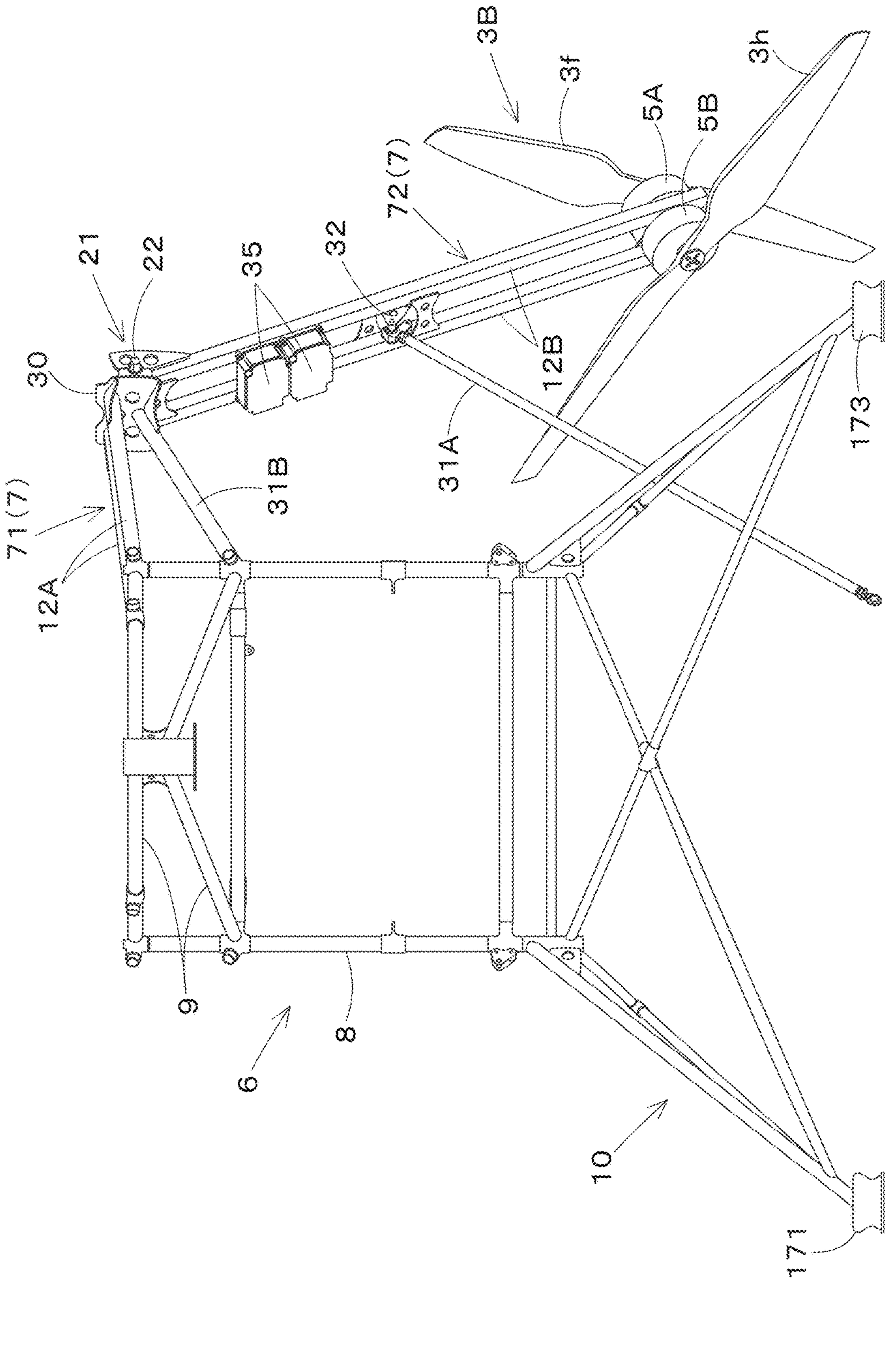
FIG. 8 illustrates an arm when rotated downward in a flying apparatus according to the first example embodiment.

The arm 7 is rotatable between a first position in which the arm 7 extends in a horizontal direction (see FIGS. 3 to 6 and/or the like) and a second position in which the arm 7 extends upward or downward. In the present example embodiment, the arm 7 extends downward (including obliquely downward) when in the second position. FIG. 8 illustrates the arm 7 in the second position. That is, in the present example embodiment, the arm 7 is rotatable downward from a predetermined position (first position) in which the arm 7 is to be located when the flying apparatus 1 flies. The predetermined position (first position) in which the arm 7 is to be when the flying apparatus 1 flies defines a position in which the arm 7 extends horizontally from the main body assembly 6 (see FIGS. 3 to 6 and the like).

As shown in FIG. 8, when the arm 7 is rotated downward (when the arm 7 is in the second position), the distal end of the arm 7 is located higher than a lower end of the skid 10. Thus, it is possible to prevent the arm 7, when rotated downward, from contacting the ground and being damaged. Preferably, the sub-rotor 3B attached to the distal end of the arm 7 is located higher than the lower end of the skid 10 when the arm 7 is rotated downward (when in the second position). Thus, it is possible to prevent the sub-rotor 3B with the arm 7, when rotated downward, from contacting the ground and being damaged.

Figure 2:
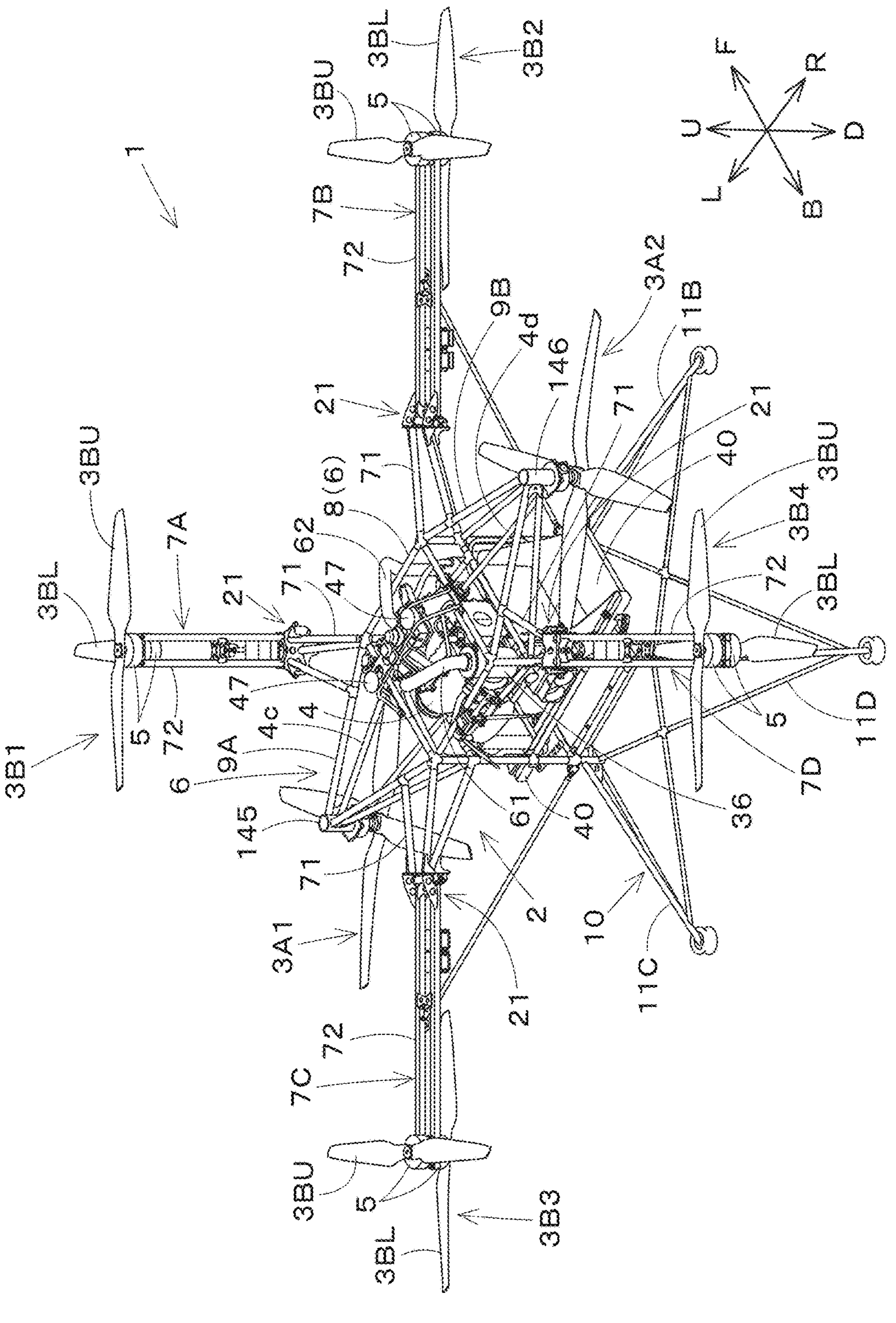
FIG. 2 is a perspective view of a flying apparatus according to the first example embodiment of the present invention.
Figure 9:
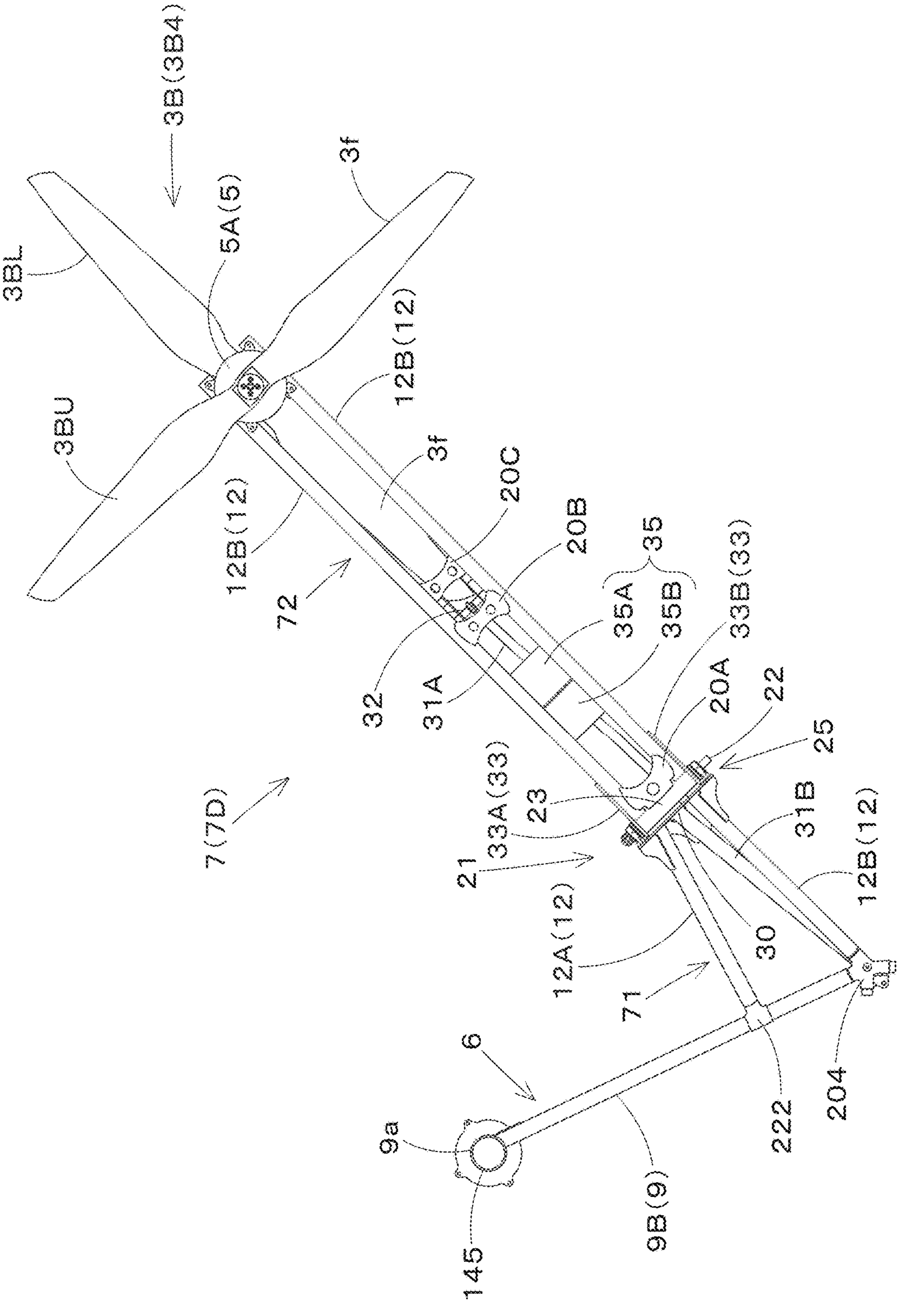
FIG. 9 illustrates an arm, sub-rotors and the like of a flying apparatus according to the first example embodiment when viewed from above.
Figure 10:
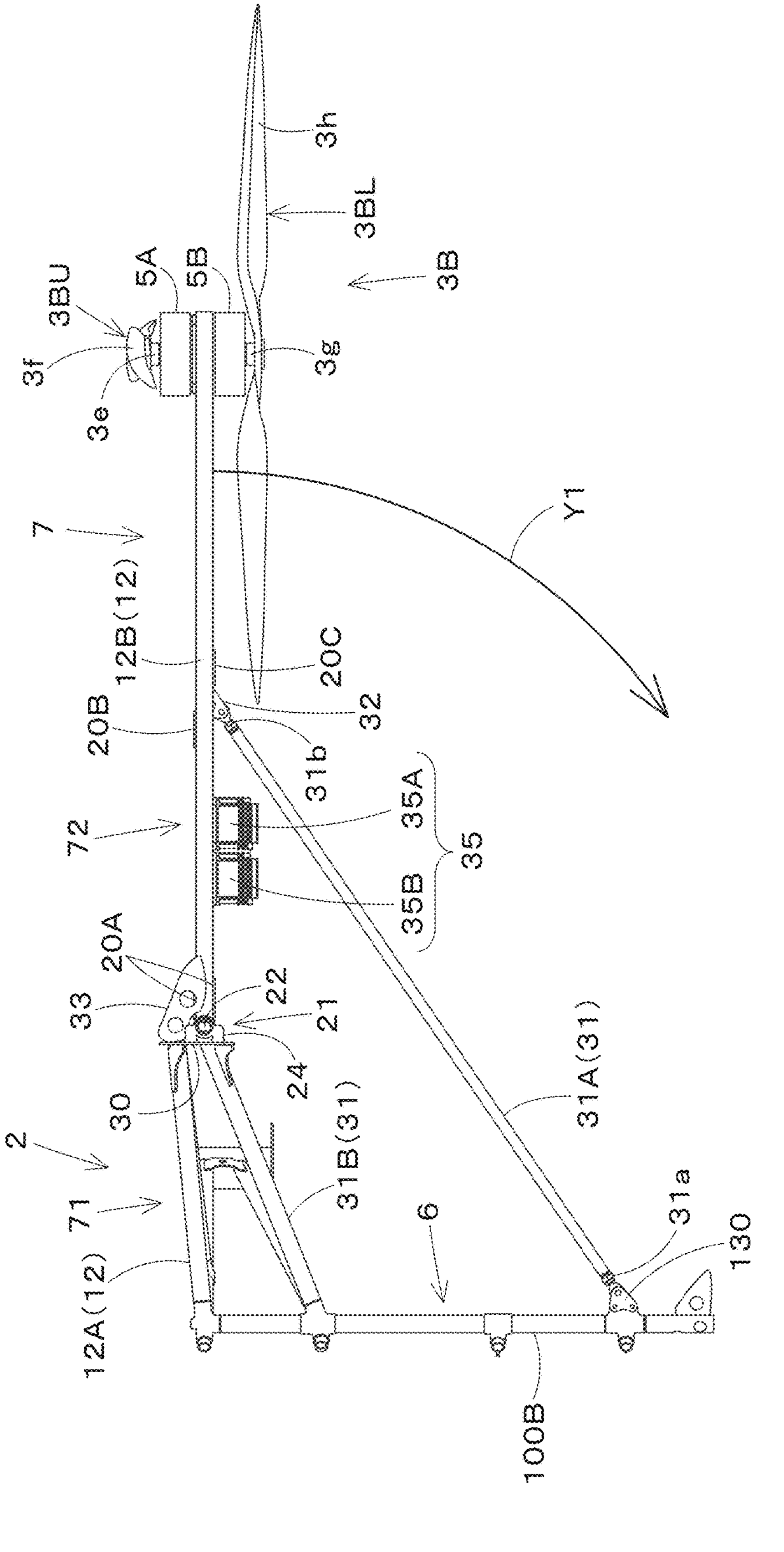
FIG. 10 illustrates an arm, sub-rotors and the like of a flying apparatus according to the first example embodiment when viewed in a horizontal direction.

As shown in FIGS. 2, 9, 10 and the like, the arm 7 includes a first section 71 and a second section 72. The first section 71 is fixed to the main body assembly 6. The second section 72 extends in the airframe-outward direction from a distal end of the first section 71. The sub-rotor 3B is attached to a distal end of the second section 72. The second section 72 is rotatable relative to the first section 71. Specifically, as indicated by an arrow Y1 in FIG. 10, the second section 72 is rotatable downward about a horizontal shaft (a pivot shaft 22 described later) relative to the first section 71. With the second section 72 rotating downward relative to the first section 71, a position of the arm 7 changes from the first position (see FIGS. 3 to 6 and the like) to the second position (see FIG. 8).

As shown in FIGS. 9, 10 and the like, the second section 72 is longer than the first section 71. Specifically, the second section 72 is twice as long as or more than the first section 71. A maximum width of the first section 71 (width of a proximal end thereof) is larger than a maximum width of the second section 72.

As shown in FIG. 9, the first section 71 and the second section 72 each include a plurality of rods 12 juxtaposed in a horizontal direction. The plurality of rods 12 include two rods in the present example embodiment, but may include three or more rods. The following refers to the rods 12 included in the first section 71 as first rods 12A, and to the rods 12 included in the second section 72 as second rods 12B.

As shown in FIG. 9, two first rods 12A extend in the direction away from the main body assembly 6 to approach each other. Two second rods 12B extend parallel or substantially parallel to each other. The two second rods 12B are connected to each other via connecting plates 20. The connecting plates 20 include first connecting plates 20A, a second connecting plate 20B, and a third connecting plate 20C. The first connecting plates 20A connect proximal ends of upper surfaces of the two second rods 12B to each other, and proximal ends of bottom surfaces of the two second rods 12B to each other. The second connecting plate 20B connects longitudinally intermediate portions of upper surfaces of the two second rods 12B to each other. The third connecting plate 20C connects longitudinally intermediate portions of bottom surfaces of the two second rods 12B together. Distal ends of the two second rods 12B are connected via the motors 5 to drive the sub-rotors 3B. Thus, a plurality of (two) second rods 12B included in the second section 72 are connected to each other at their upper surfaces and bottom surfaces, and at their proximal ends, middle portions and distal ends.

As shown in FIGS. 9 and 10, the airframe 2 includes a pivoting portion 21 to support the arm 7 to be rotatable relative to the main body assembly 6. The pivoting portion 21 includes a pivot shaft 22 and a holding tube 23. The pivot shaft 22 is a columnar shaft which is a rotation axis for the arm 7, and extends in a horizontal direction. The pivot shaft 22 extends perpendicular or substantially perpendicular to a longitudinal direction of the arm 7.

The holding tube 23 has a cylindrical form, and covers an outer periphery of the pivot shaft 22. In other words, the pivot shaft 22 is passed through the inside of the holding tube 23. The holding tube 23 is rotatable relative to the pivot shaft 22 about an axial center of the pivot shaft 22. The proximal ends of the two rods 12 (second rods 12B) are connected to the holding tube 23. The sub-rotor 3B is attached to the distal ends of the rods 12 (second rods 12B).

As shown in FIG. 9, the pivoting portion 21 is provided with a switching mechanism 25 switchable between a first state in which the arm 7 is allowed to rotate relative to the main body assembly 6, and a second state in which the arm 7 is not allowed to rotate relative to the main body assembly 6.

Figure 11:
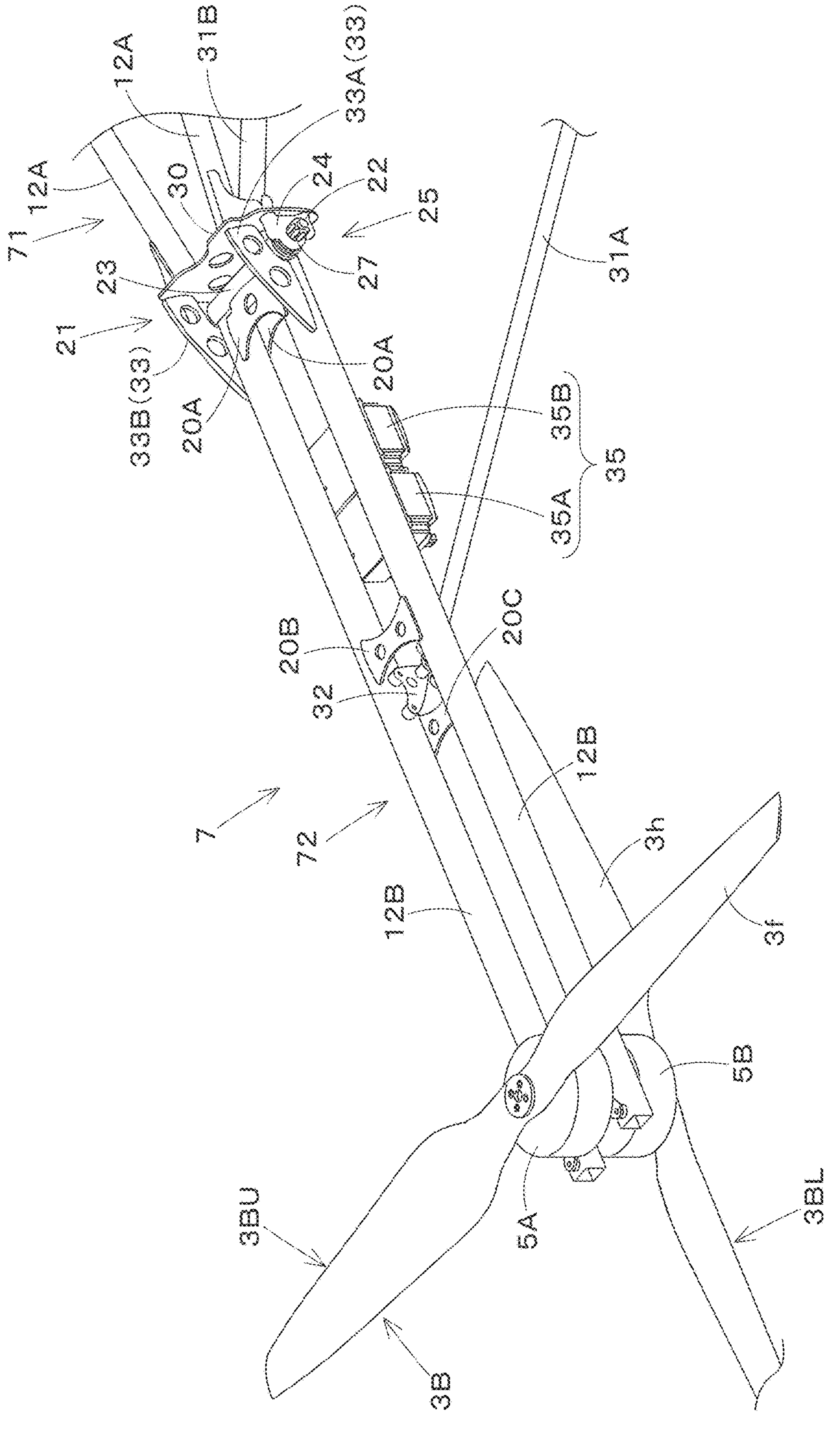
FIG. 11 is a perspective view illustrating a pivoting portion and the like of a flying apparatus according to the first example embodiment.
Figure 12:
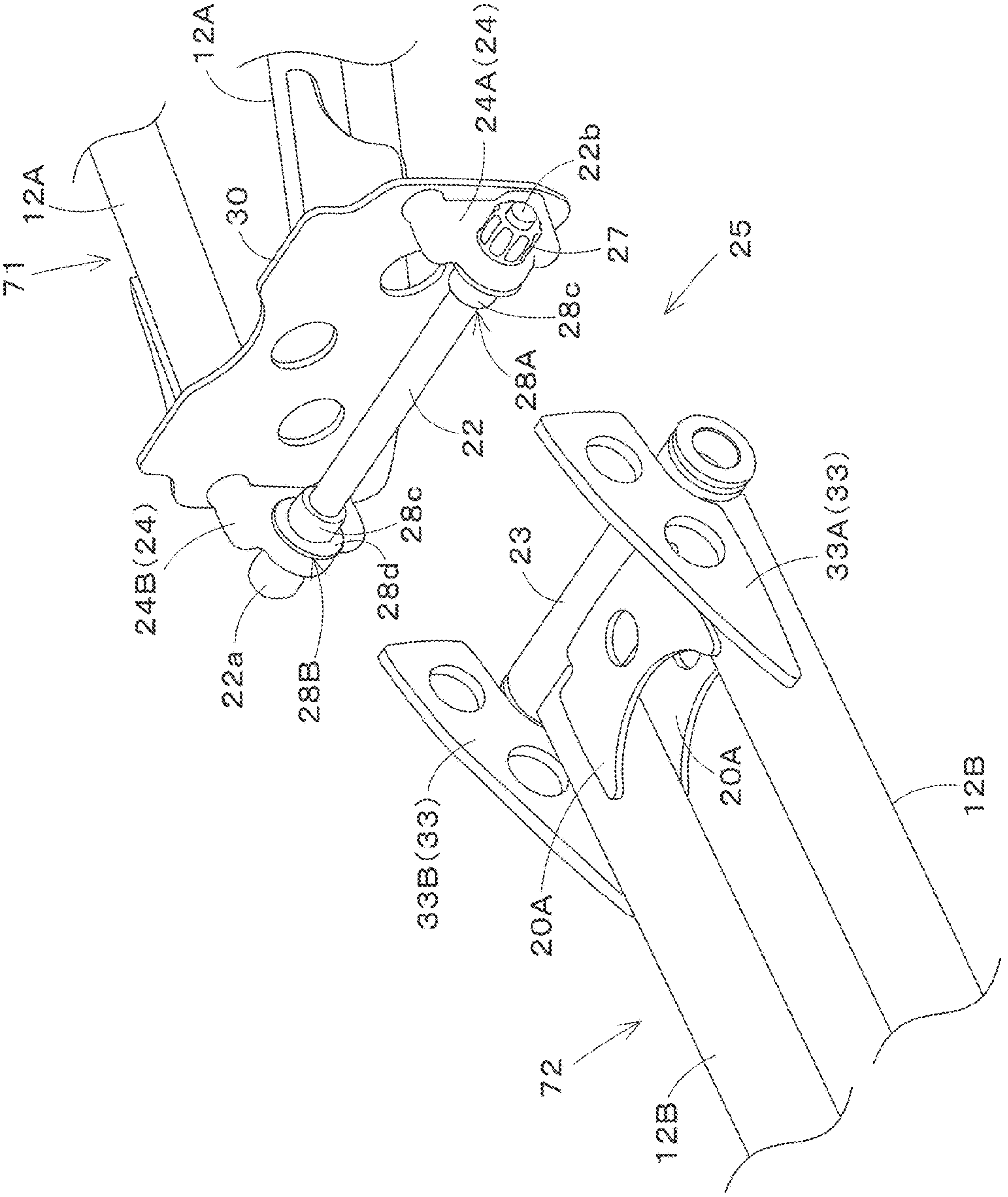
Figure 13:
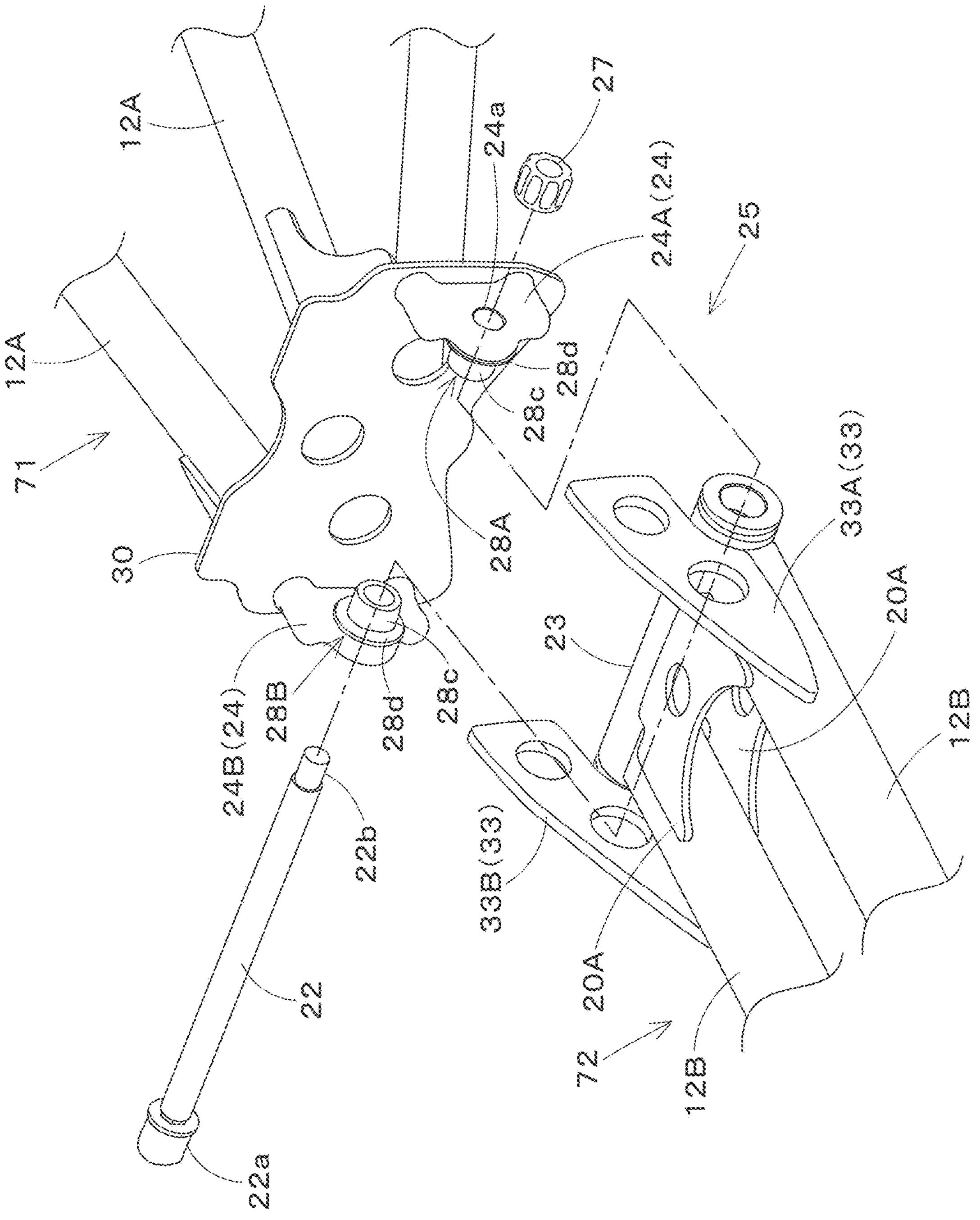
FIG. 13 is an exploded perspective view of a switching mechanism and the like of a flying apparatus according to the first example embodiment.

As shown in FIGS. 11, 12, 13 and the like, the switching mechanism 25 includes the holding tube 23, shaft support portions 24 and the pivot shaft 22. The holding tube 23 extends perpendicular or substantially perpendicular to the direction in which the two second rods 12B are juxtaposed to link the two second rods 12B to each other. The two second rods 12B and the holding tube 23 are connected via the two upper and lower first connecting plates 20A. The upper first connecting plate 20A connects the upper portions of the two second rods 12B to the upper portion of the holding tube 23. The lower first connecting plate 20A connects the lower portions of the two second rods 12B to a lower portion of the holding tube 23.

The shaft support portions 24 are attached to a plate defining a stopper 30 described later. The shaft support portions 24 can be entirely or partially made of a flexibly deformable material (rubber, flexible resin, and/or the like). The shaft support portions 24 include a first shaft support portion 24A and a second shaft support portion 24B. The first shaft support portion 24A and the second shaft support portion 24B include respective holes 24*a* through which the pivot shaft 22 can be passed. The first shaft support portion 24A is provided on one axial side of the holding tube 23. The second shaft support portion 24B is provided on another axial side of the holding tube 23. The first shaft support portion 24A supports one axial-side portion of the pivot shaft 22. The second shaft support portion 24B supports another axial-side portion of the pivot shaft 22.

A first spacer 28A is provided on an inner side of the first shaft support portion 24A (a side toward the second shaft support portion 24B). A second spacer 28B is provided on an inner side of the second shaft support portion 24B (a side toward the first shaft support portion 24A). The first spacer 28A and the second spacer 28B can be made of a flexibly deformable material (rubber, flexible resin, and/or the like). The first spacer 28A and the second spacer 28B each include a collar 28*c* and a flange 28*d*. The collar 28*c* is inserted into the holding tube 23. The flange 28*d* abuts an end surface of the holding tube 23 at one side surface thereof, and abuts an inner side surface of the shaft support portion 24 at another side surface thereof.

The pivot shaft 22 is inserted through the first shaft support portion 24A, the second shaft support portion 24B, the holding tube 23, the first spacer 28A and the second spacer 28B. The pivot shaft 22 passes through the second shaft support portion 24B, the second spacer 28B, the holding tube 23, the first spacer 28A and the first shaft support portion 24A in this order. One end portion of the pivot shaft 22 is provided with a head portion 22*a* capable of being held via a tool. Another end portion of the pivot shaft 22 is provided with a threaded portion 22*b*. When the pivot shaft 22 is passed through the shaft support portions 24 and the holding tube 23, the head portion 22*a* is located on an outer side of the second shaft support portion 24B (on a side opposite the first shaft support portion 24A), and the threaded portion 22*b* is located on an outer side of the first shaft support portion 24A (on a side opposite the second shaft support portion 24B).

A nut 27 is screwed onto the threaded portion 22*b*. The nut 27 is screwed onto the threaded portion 22*b* projecting from the first shaft support portion 24A. With the nut 27 screwed onto the threaded portion 22*b*, the holding tube 23 and the shaft support portions 24 are connected via the pivot shaft 22. The holding tube 23 is rotatable about the axial center of the pivot shaft 22. Thus, the second section 72 of the arm 7 is rotatable relative to the first section 71. By fastening the nut 27, the flange 28*d* is tightened to the end surface of the holding tube 23 by a strong force from the nut 27, so that the holding tube 23 is stopped from rotating and the second section 72 of the arm 7 is not allowed to rotate. Loosening the nut 27 allows the second section 72 of the arm 7 to rotate. Thus, the switching mechanism 25 is switchable between a first state in which the arm 7 is allowed to rotate relative to the main body assembly 6, and a second state in which the arm 7 is not allowed to rotate relative to the main body assembly 6. However, the switching mechanism 25 is not limited to the previously described configuration.

As shown in FIG. 10 and the like, the airframe 2 includes at least one connector 31 to connect the main body assembly 6 to a corresponding one of the arms 7. The connector 31 is a linear member. The connector 31 extends obliquely upward from the main body assembly 6 and is connected to an intermediate portion of the arm 7. The connector 31 is connected to the main body assembly 6 to support the arm 7 from below. With the connector 31 supporting the arm 7 from below, it is possible to prevent or reduce pitching motion of the arm 7.

In the following, the connector 31 may be referred to as supports 31. The supports 31 include a first support 31A and a second support 31B. A junction of the second support 31B and the main body assembly 6 is located higher than a junction of the first support 31A and the main body assembly 6. The first support 31A supports the arm 7 (distal end-side portion of the arm 7) at a position the same side of the pivoting portion 21 as the sub-rotor 3B. The second support 31B supports the arm 7 (proximal end-side portion of the arm 7) at a position on the same side of the pivoting portion 21 as the main body assembly 6.

Thus, the arm 7 is supported by the supports 31 at the two positions with the pivoting portion 21 therebetween. In other words, the arm 7 is connected to the main body assembly 6 via the supports 31 at the two positions with the pivoting portion 21 therebetween. Accordingly, the arm 7 is supported from below at the two positions with the pivoting portion 21 therebetween, such that it is possible to effectively prevent or reduce pitching motion of the arm 7.

As shown in FIG. 9, in a planar view, the first support 31A of the connector 31 extends between the plurality of (two) rods 12. As shown in FIG. 10, the first support 31A of the connector 31 includes a first end 31*a* and a second end 31*b*. The first end 31*a* is connected to the main body assembly 6. Specifically, the first end 31*a* is connected to a lower portion of the main body assembly 6. The second end 31*b* is connected to an intermediate portion of the arm 7. The second end 31*b* is connected to the arm 7 via a bracket 32. The bracket 32 overlaps the sub-rotor 3B when viewed in the up-down direction. Specifically, the blades (first blades 3*f*, second blades 3*h*) of the sub-rotor 3B and the bracket 32 overlap each other when viewed in the up-down direction (overlap each other when the blades rotate).

The second end 31*b* of the first support 31A of the connector 31 is detachable from the bracket 32. By detaching the second end 31*b* of the first support 31A from the bracket 32, the arm 7 is allowed to rotate from the first position to the second position (see arrow Y1 in FIG. 10). FIG. 8 illustrates the arm 7 when rotated from the first position to the second position after the second end 31*b* of the first support 31A has been detached from the bracket 32.

As shown in FIGS. 9, 10, 11 and the like, the flying apparatus 1 includes a stopper 30 to stop the arm 7 from rotating upward higher than the previously described predetermined position (first position). The stopper 30 is a plate provided between the first section 71 and the second section 72 of the arm 7. In the following, the stopper 30 is referred to as a plate 30. One side surface of the plate 30 faces in a direction toward the main body assembly 6, and another opposite side surface of the plate 30 faces in another direction opposite the main body assembly 6 (toward the sub-rotor 3B).

The plurality of (two) first rods 12A defining the first section 71 of the arm 7 are connected to the plate 30. The plurality of (two) first rods 12A connect the plate 30 and the main body assembly 6 to each other. The second support 31B included in the connector 31 that connects the main body assembly 6 to the arm 7 is connected to the plate 30. Thus, the plate 30 is connected to the main body assembly 6 (projecting frame 9) via the second support 31B and the plurality of (two) first rods 12A.

The plurality of first rods 12A are separated away from each other in a horizontal direction, and the first rods 12A and the second support 31B are separated away from each other in the up-down direction. Thus, the plate 30 is supported by the main body assembly 6 (projecting frame 9) with high strengths in both the horizontal direction and the up-down direction. Accordingly, it is possible to prevent or reduce both pitching motion and yaw motion of the plate 30, such that it is possible to prevent or reduce both pitching motion and yaw motion of the arm 7.

At least one contacting plate 33 to abut the stopper 30 when the arm 7 is in the first position is attached to the proximal end of the arm 7. The at least contacting plate 33 abuts the stopper 30 when the arm 7 is in the first position, and moves away from the stopper 30 when the arm 7 rotates downward from the first position. The at least one contacting plate 33 includes a first contacting plate 33A and the second contacting plate 33B.

As shown in FIG. 9, the plurality of (two) second rods 12B defining the second section 72 of the arm 7 are spaced from each other in a width direction of the arm 7 and extended in parallel. The first contacting plate 33A is fixed to one of the two rods 12 defining the second section 72 of the arm 7. The second contacting plate 33B is fixed to another of the two rods 12 defining the second section 72 of the arm 7. When the arm 7 is in the first position (the position shown in FIG. 10), the first contacting plate 33A abuts the left portion of the plate 30. When the arm 7 is in the first position, the second contacting plate 33B abuts the right portion of the plate 30. Thus, when the arm 7 is in the first position, the first contacting plate 33A and the second contacting plate 33B abut the plate 30, such that it is possible to stop the arm 7 from rotating upward higher than the first position.

As shown in FIGS. 9, 10, 11 and the like, the flying apparatus 1 includes one or more electrical components 35 to be used to drive the corresponding sub-rotor 3B. The electrical components 35 are inverters to control the electric power supplied to the motors 5. The following may refer to the electrical components 35 as inverters 35. The electrical components (inverters) 35 are attached to the arm 7. The electrical components (inverters) 35 are located on the same side of the bracket 32 as the main body assembly 6 in the longitudinal direction of the arm 7. The electrical components (inverters) 35 are located between the pivoting portion 21 and the bracket 32 in the longitudinal direction of the arm 7.

The inverters 35 include a first inverter 35A and a second inverter 35B. The first inverter 35A controls electric power supplied to the first motor 5A. The second inverter 35B controls electric power supplied to the second motor 5B. The electrical components (inverters) 35 are located on the same side of the rotation axis of the arm 7 (pivot shaft 22) as the distal end of the arm 7. The first inverter 35A and the second inverter 35B are juxtaposed in the longitudinal direction of the arm 7. The first inverter 35A and the second inverter 35B are attached to a lower portion of the arm 7.

The first inverter 35A and the second inverter 35B span between the two rods 12 (second rods 12B) defining the arm 7. In other words, the inverters 35 connect the two rods 12 (second rods 12B) defining the arm 7 to each other. Thus, it is possible to cool the inverters 35 via the air flow passing through a space between the two rods 12 (second rods 12B) defining the arm 7.

Figure 22:
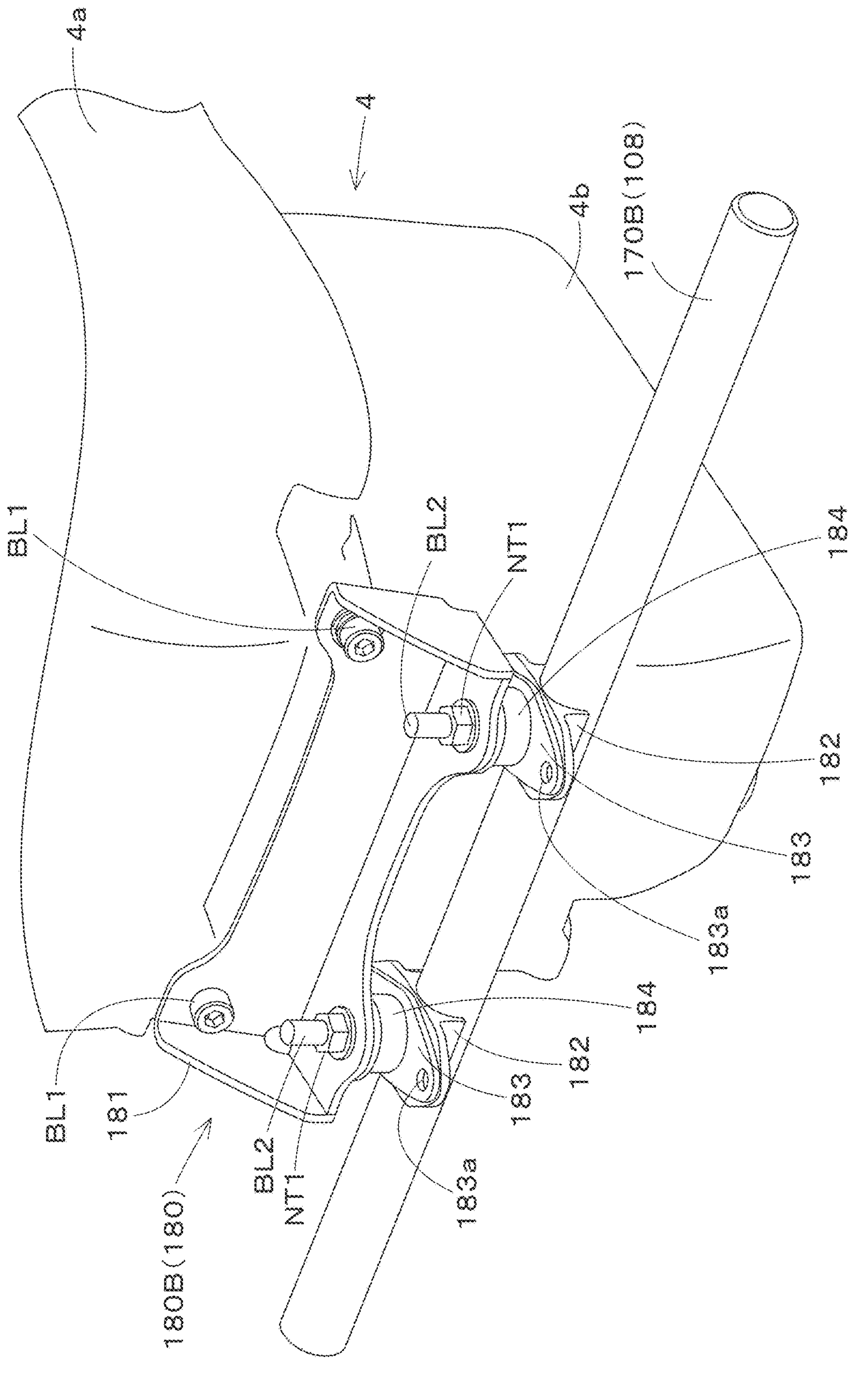
FIG. 22 is a perspective view of an engine-support structure of a flying apparatus according to the first example embodiment.
Figure 23:
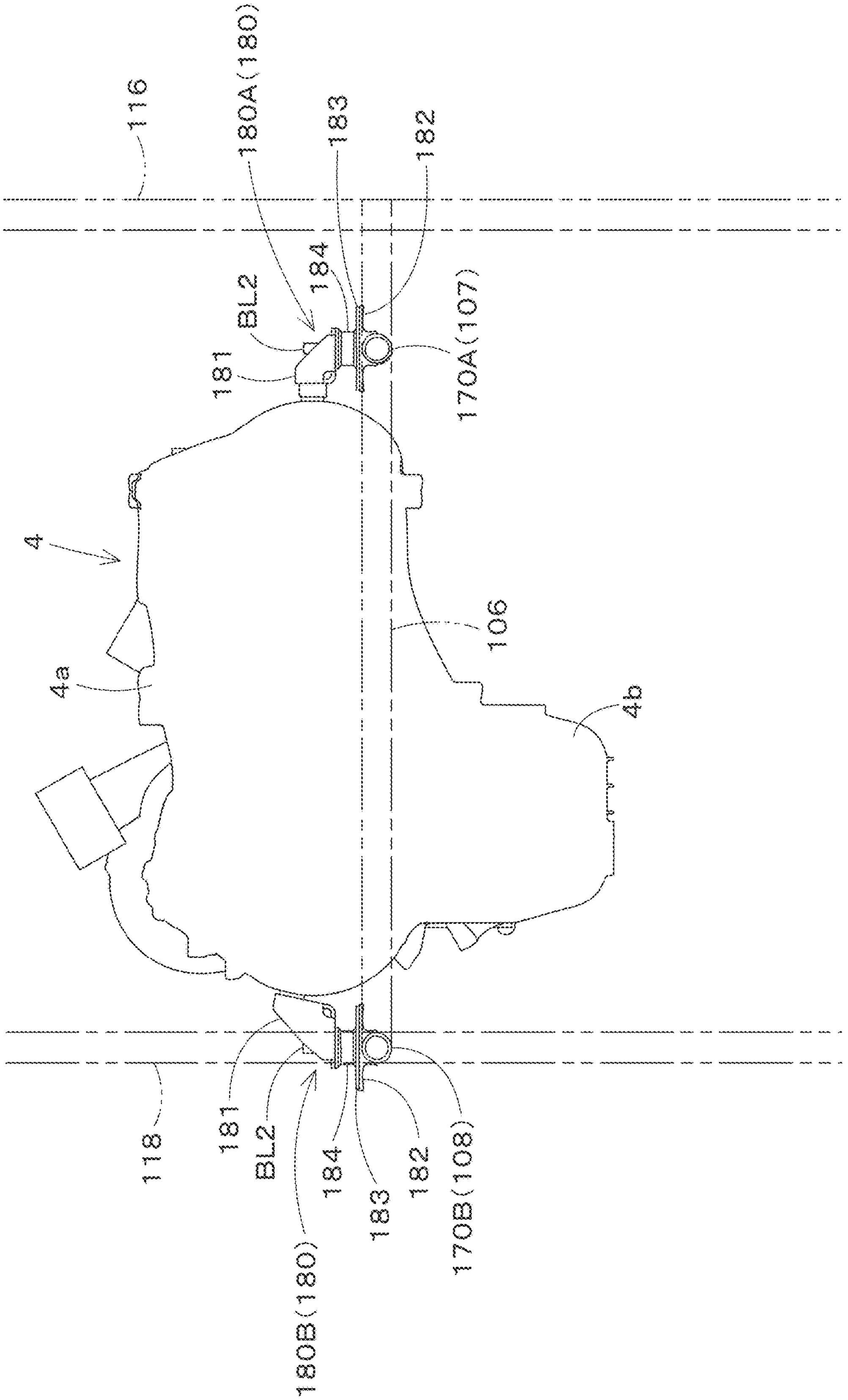
FIG. 23 is a side view of an engine-support structure of a flying apparatus according to the first example embodiment.

As shown in FIGS. 4, 22 and 23, the engine 4 includes an engine main body 4*a* and an oil pan 4*b*. The engine main body 4*a* defines an upper portion of the engine 4. The oil pan 4*b* defines a lower portion of the engine 4. That is, the oil pan 4*b* is provided below the engine main body 4*a*. The oil pan 4*b* can store engine oil to lubricate metallic parts included in the engine main body 4*a*. The engine main body 4*a* includes all portions of the engine 4 (a crank case and/or the like) except the oil pan 4*b*, and is configured to allow rotations of a first output shaft 4*c* and a second output shaft 4*d* described later.

Figure 6:
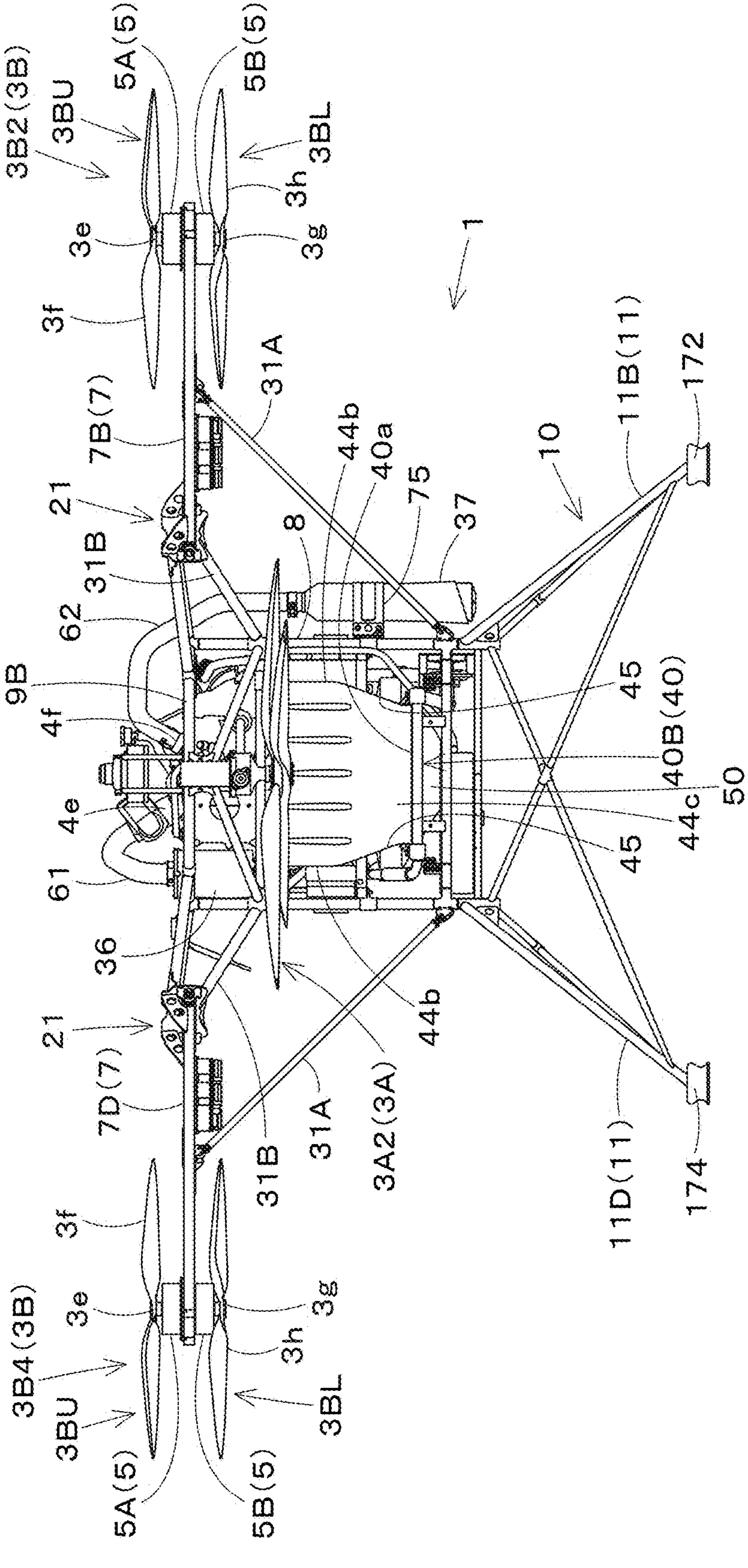
FIG. 6 is a right side view of a flying apparatus according to the first example embodiment of the present invention.

As shown in FIGS. 3, 4, 5 and 6, the engine main body 4*a* includes an air intake 4*e* and an exhaust port 4*f*. In the engine 4, the air intake 4*e* and the exhaust port 4*f* face upward. An air cleaner 36 is connected to the air intake 4*e* via a first connecting pipe 61. The exhaust port 4*f* is connected to a muffler 37 via a second connecting pipe 62. As shown in FIGS. 1, 4, 6 and the like, the air cleaner 36 is provided vertically in (inside) the framed main body 8 (lengthwise in the up-down direction).

As shown in FIGS. 1, 5, 6 and the like, the muffler 37 is provided vertically (lengthwise in the up-down direction) at an exterior of the framed main body 8. As shown in FIGS. 5 and 6, the muffler 37 is attached to the framed main body 8 via an attaching member 75. The attaching member 75 is attached to a tenth frame member 110 of a second middle-section frame 100E (see FIG. 15) described later. The attaching member 75 holds the muffler 37 at a position separated away from the framed main body 8. Thus, by locating the muffler 37 at the exterior of the framed main body 8, it is possible to prevent heat of exhaust gas ejected from the muffler 37 from negatively influencing on pieces of equipment provided inside the framed main body 8.

As shown in FIGS. 1, 3, 7, 13, 14 and the like, the engine 4 includes the first output shaft 4*c* and the second output shaft 4*d*. Such an engine 4 can be, for example, an opposed-piston engine. An opposed-piston engine is provided with two pistons facing each other inside each of one or more cylinders. An advantage of such an engine is that symmetrical reciprocating motions of the two pistons reduce vibrations. However, the engine 4 is not limited to an opposite-piston engine.

Figure 25:
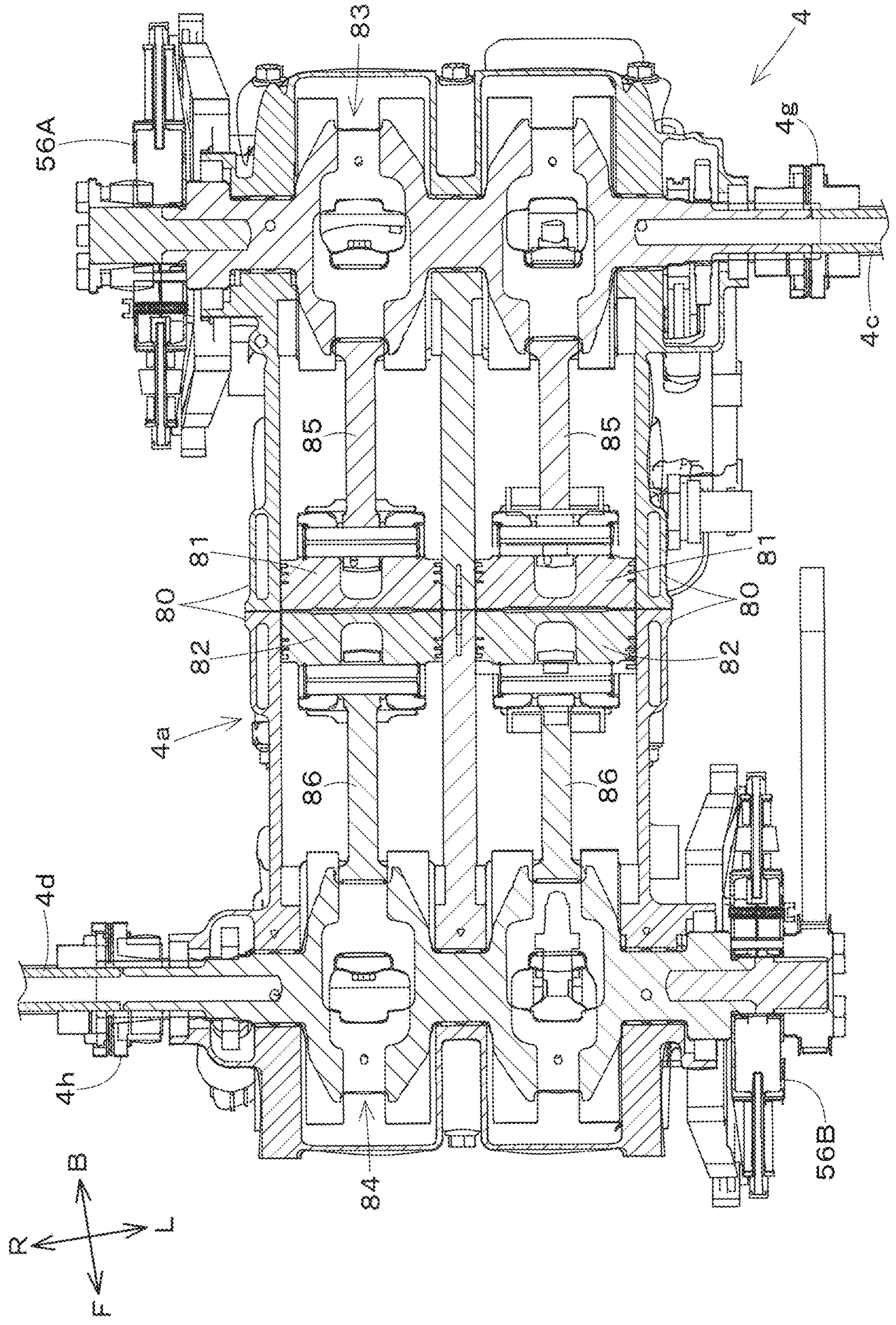
FIG. 25 is a top section view of an engine according to an example embodiment (first example embodiment and second example embodiment) of the present invention.

FIG. 25 is a sectional planar view of an exemplary opposite-piston engine used as the engine 4 illustrating an internal structure thereof. The opposite-piston engine includes one or more cylinders 80, pistons (one or more first pistons 81 and one or more second pistons 82), and crank shafts (first crank shaft 83 and second crank shaft 84).

In the following, combination of the one or more first pistons 81 and the one or more second pistons 82 may be referred to as "pistons". The first crank shaft 83 and the second crank shaft 84 may sometimes be referred to as "crank shafts". That is, the pistons include the one or more first pistons 81 and the one or more second pistons 82, and the crank shafts include the first crank shaft 83 and the second crank shaft 84.

FIG. 25 illustrates, of configurations of the opposed-piston engine, only a focused configuration related to the present example embodiment of the present invention and does not illustrate components such as intake valves, exhaust valves, ignition plugs, injection nozzles and/or the like.

One of the one or more first pistons 81 and a corresponding one of the one or more second pistons 82 are opposed to each other inside each of the one or more cylinders 80. The first crank shaft 83 is connected to the one or more first pistons 81 via one or more first connecting rods 85, respectively. The second crank shaft 84 is connected to the one or more second pistons 82 via one or more second connecting rods 86, respectively.

The first piston 81 and the second piston 82 perform reciprocating motions inside each of the one or more cylinders 80. Specifically, the first piston 81 and the second piston 82 move inside each of the one or more cylinders 80 in directions away from each other and in directions approaching each other. The crank shafts rotate according to the reciprocating motions of the pistons. Specifically, the first crank shaft 83 rotates according to the reciprocating motions of the one or more first pistons 81. The second crank shaft 84 rotates according to the reciprocating motions of the one or more second pistons 82. The first crank shaft 83 and the second crank shaft 84 rotate in opposite directions.

Figure 14:
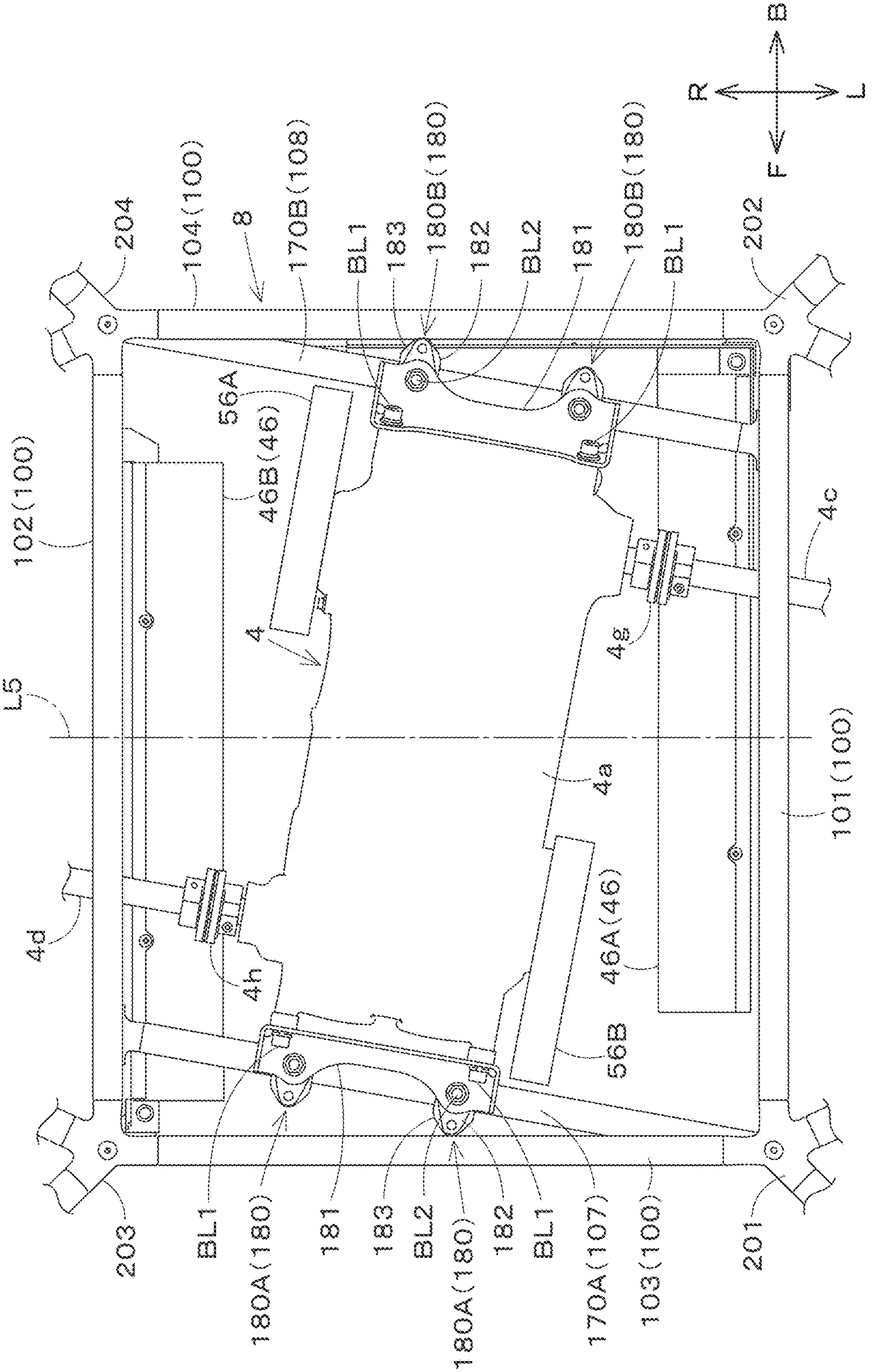
FIG. 14 is a top view of a flying apparatus according to the first example embodiment illustrating a layout of an engine therein.

The engine main body 4*a* incorporates the previously described one or more cylinders 80, one or more first pistons 81, one or more second pistons 82, first crank shaft 83, and second crank shaft 84. As shown in FIG. 14, the first output shaft 4*c* and the second output shaft 4*d* extend outward from the engine main body 4*a*. The first output shaft 4*c* is connected to one end of the first crank shaft 83 via a first coupling 4*g*. The second output shaft 4*d* is connected to one end of the second crank shaft 84 via a second coupling 4*h*. A first generator 56A is connected to another end of the first crank shaft 83. A second generator 56B is connected to another end of the second crank shaft 84. The first generator 56A generates electric power via rotation of the first crank shaft 83. The second generator 56B generates electric power via rotation of the second crank shaft 84.

The first output shaft 4*c* and the second output shaft 4*d* are juxtaposed with a space therebetween in a front-rear direction, and separately project to a left side and to a right side of the engine main body 4*a*. A direction in which the first output shaft 4*c* extends, and a direction in which the second output shaft 4*d* extends are not on the same straight line and are parallel or substantially parallel to each other. In a planar view, the first output shaft 4*c* and the second output shaft 4*d* extend in the respective directions point-symmetric with respect to the center of the airframe 2. As shown in FIG. 14, the engine main body 4*a* is provided inside the framed main body 8, and the first output shaft 4*c* and the second output shaft 4*d* project from the inside of the framed main body 8 to the outside thereof.

As shown in FIG. 1, in a planar view, the first output shaft 4*c* extends between front and rear frame members (a nineteenth frame member 119 and a twenty-first frame member 121 described later (see FIG. 15)) defining the first projecting frame 9A. The second output shaft 4*d* extends between front and rear frame members (a twenty-third frame member 123 and a twenty-fifth frame member 125 described later (see FIG. 15)) defining the second projecting frame 9B. Accordingly, the first projecting frame 9A and the second projecting frame 9B make it difficult to approach the first output shaft 4*c* and the second output shaft 4*d* from above. Thus, in situations such as before takeoff or after landing, anyone is safely prevented from contacting the rotating first output shaft 4*c* and/or second output shaft 4*d* by his/her hand, clothing which he/she wears, and/or the like.

As shown in FIGS. 7 and 14, in a planar view, the engine main body 4*a* is oriented obliquely relative to the framed main body 8. In a planar view, the framed main body 8 is rectangular. A longitudinal direction of the engine main body 4*a* in a planar view is neither parallel nor perpendicular to rectangular sides of the framed main body 8.

As shown in FIG. 14, the framed main body 8 includes a first frame member 101 provided on a first side (left side) of the engine 4, and a second frame member 102 provided on a second side (right side) of the engine 4 opposite the first side. As shown in FIG. 15, the framed main body 8 includes a multitude of frame members assembled together. Frame members other than the first frame member 101 and the second frame member 102 will be described in detail later.

As shown in FIGS. 14 and 15, the first frame member 101 and the second frame member 102 are parallel or substantially parallel to each other. In a planar view, the first output shaft 4*c* extends obliquely relative to the first frame member 101. In a planar view, the second output shaft 4*d* extends obliquely relative to the second frame member 102. The first output shaft 4*c* and the first frame member 101 intersect each other at a non-right angle. The second output shaft 4*d* and the second frame member 102 intersect each other at a non-right angle.

As shown in FIGS. 1, 7 and the like, in a planar view, the plurality of main rotors 3A include a first-side rotor 3A1 provided on the first side (left side) of the engine 4, and a second-side rotor 3A2 provided on the second side (right side) of the engine 4. In the present example embodiment, the first-side rotor 3A1 is the first main rotor 3A1, and the second-side rotor 3A2 is the second main rotor 3A2. In a planar view, the first output shaft 4*c* and the second output shaft 4*d* extend obliquely relative to a line L5 connecting a center of the first-side rotor 3A1 to a center of the second-side rotor 3A2 (see FIG. 1).

The first output shaft 4*c* supplies a driving force to the first-side rotor 3A1. The second output shaft 4*d* supplies a driving force to the second-side rotor 3A2. A rotation of the first output shaft 4*c* is transmitted to a rotating shaft 3*c* of the first-side rotor 3A1 via a first power transmission 38 (see FIGS. 3 and 4) including a gear mechanism and/or the like. Accordingly, the blades 3*d* of the first-side rotor 3A1 rotate. A rotation of the second output shaft 4*d* is transmitted to a rotating shaft 3*c* of the second-side rotor 3A2 via a second power transmission 39 (see FIGS. 3 and 4). Accordingly, the blades 3*d* of the second-side rotor 3A2 rotate. Thus, two main rotors (the first-side rotor 3A1 and the second-side rotor 3A2) are driven via two output shafts (first output shaft 4*c* and second output shaft 4*d*) included in one engine 4.

As shown in FIGS. 3 and 4, the rotors 3 overlap the engine 4 when viewed in the up-down direction. In other words, the rotors 3 and the engine 4 are located at respective positions in the up-down direction so as to overlap each other. Specifically, the main rotors 3A overlap the engine 4 when viewed in the up-down direction. The sub-rotors 3B also overlap the engine 4 when viewed in the up-down direction. Thus, the center of gravity of the main body assembly 6 with the heavyweight engine 4 mounted thereon or therein is substantially as high as the rotors 3, such that it is possible to stabilize a posture of the flying apparatus 1 during flight.

As shown in FIG. 1 and/or the like, the flying apparatus 1 includes a cooler 40 to water-cool a driver (engine 4) to drive the main rotors 3A. Preferably, the cooler 40 includes a radiator. In the present example embodiment, the cooler 40 is a radiator 40. However, the cooler 40 is not limited to a radiator. In the present example embodiment, the radiator 40 is provided for water-cooling the engine 4, but may water-cool one or more batteries 46, or may water-cool the engine 4 and the one or more batteries 46. The following describes the cooler 40 as a radiator 40 to water-cool the engine 4 (cool a coolant to cool the engine 4).

As shown in FIGS. 3, 4, 5 and 6, the radiators 40 are provided below the blades 3*d* of the main rotors 3A, respectively. The radiators 40 are provided on sides (left side and right side) of the main body assembly 6. The radiators 40 are provided on the outsides of the main body assembly 6 and project in directions away from the main body assembly 6. Specifically, the radiators 40 are located outside of the framed main body 8 and projects in directions (horizontal directions) away from the framed main body 8. In this way, the radiators 40 are located outside of the framed main body 8, thus reducing propagation of heat from the engine 4 and/or the like inside the framed main body 8 to the radiators 40. It is possible to cool the radiators 40 in flight with wind. Thus, it is possible to improve the effect to cool the radiators 40.

Figure 17:
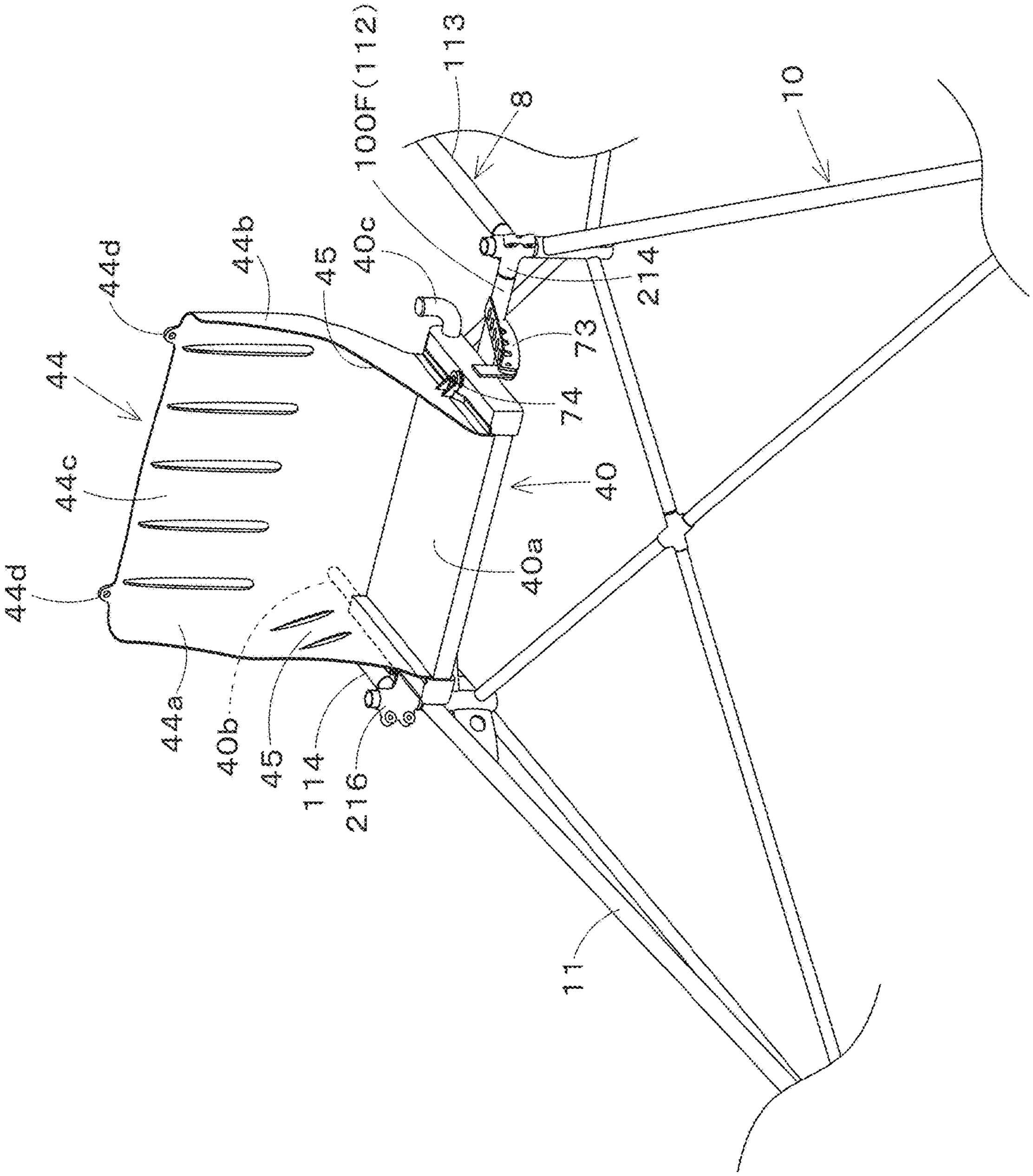
FIG. 17 is a perspective view of a cooler (radiator) and a baffle of a flying apparatus according to the first example embodiment.
Figure 18:
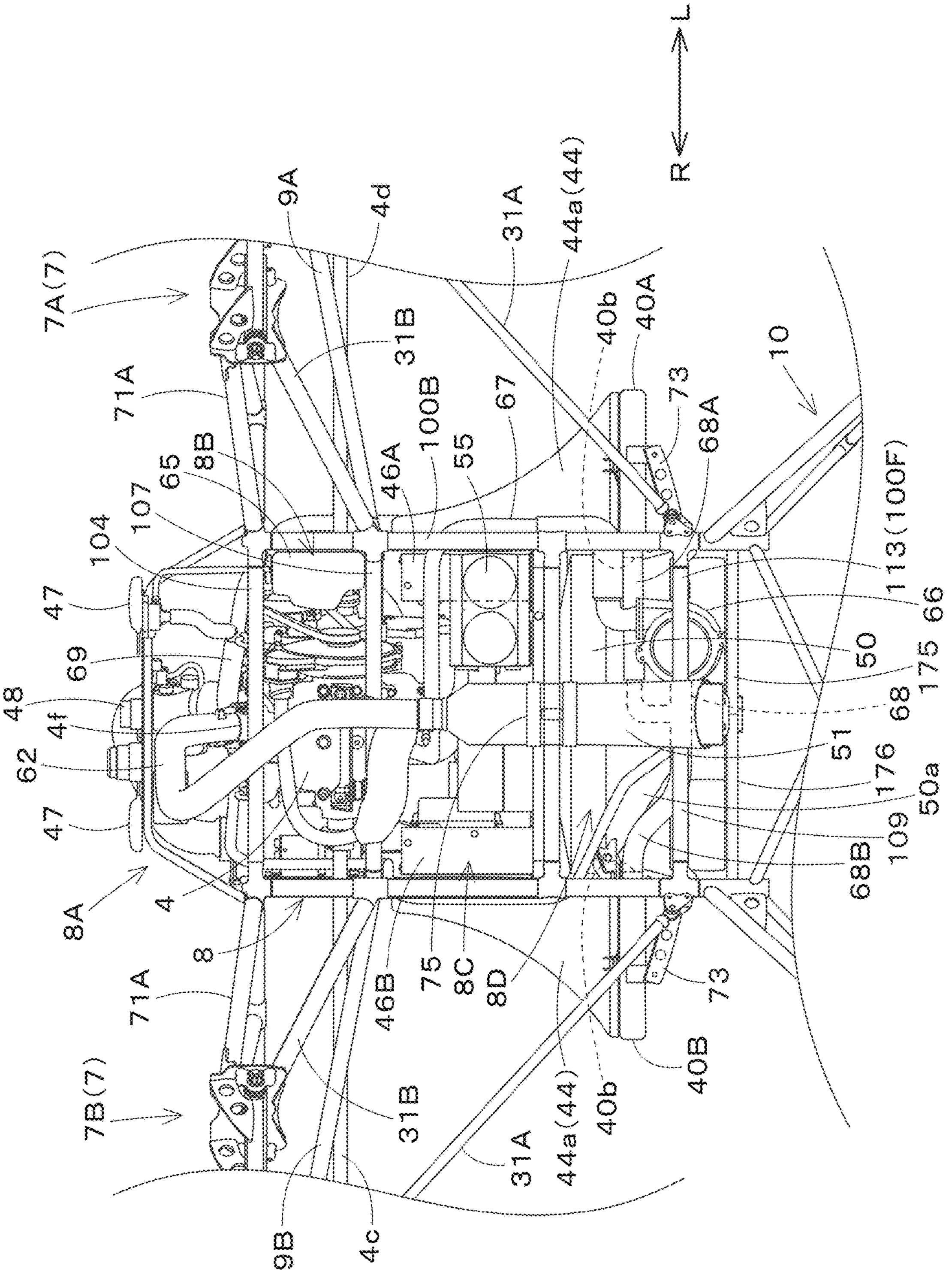
FIG. 18 is an enlarged front view of a flying apparatus according to the first example embodiment.
Figure 19:
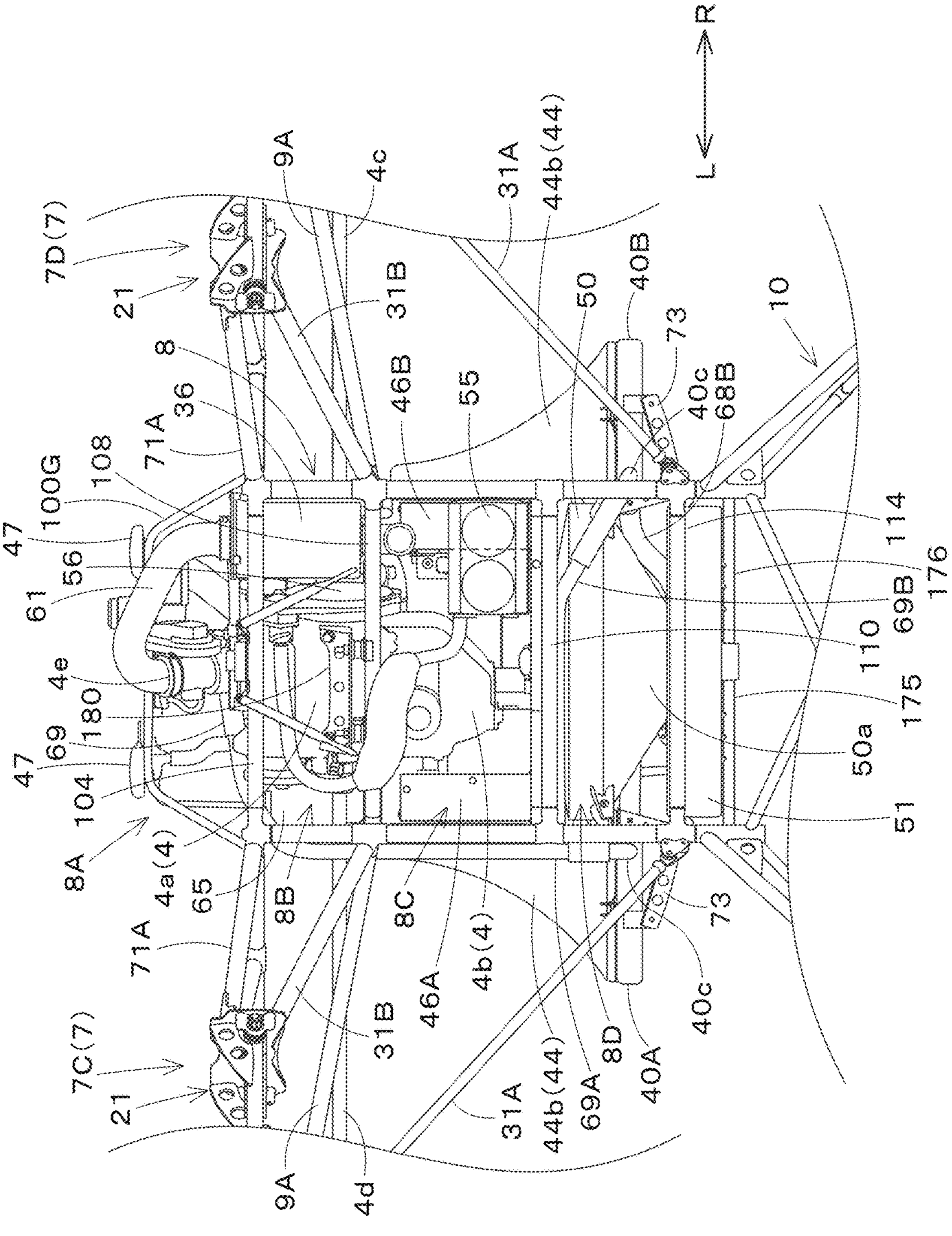
FIG. 19 is an enlarged rear view of a flying apparatus according to the first example embodiment.

The radiators 40 each have a substantially rectangular parallelepiped form. Each of the radiators 40 is oriented in such a direction (horizontal direction) as to have a length in the up-down direction thereof that is shorter than a length in the front-rear direction thereof and a length in a left-right direction thereof. As shown in FIGS. 17 to 19, the radiators 40 are attached to the lower portion of the main body assembly 6 by fixtures 73. The fixtures 73 are respectively fixed to an eleventh frame member 111 and a twelfth frame member 112 of a lower-section frame 100F described later (see FIG. 15). Accordingly, the radiators 40 are supported by the lower-section frame 100F of the main body assembly 6.

Figure 16:
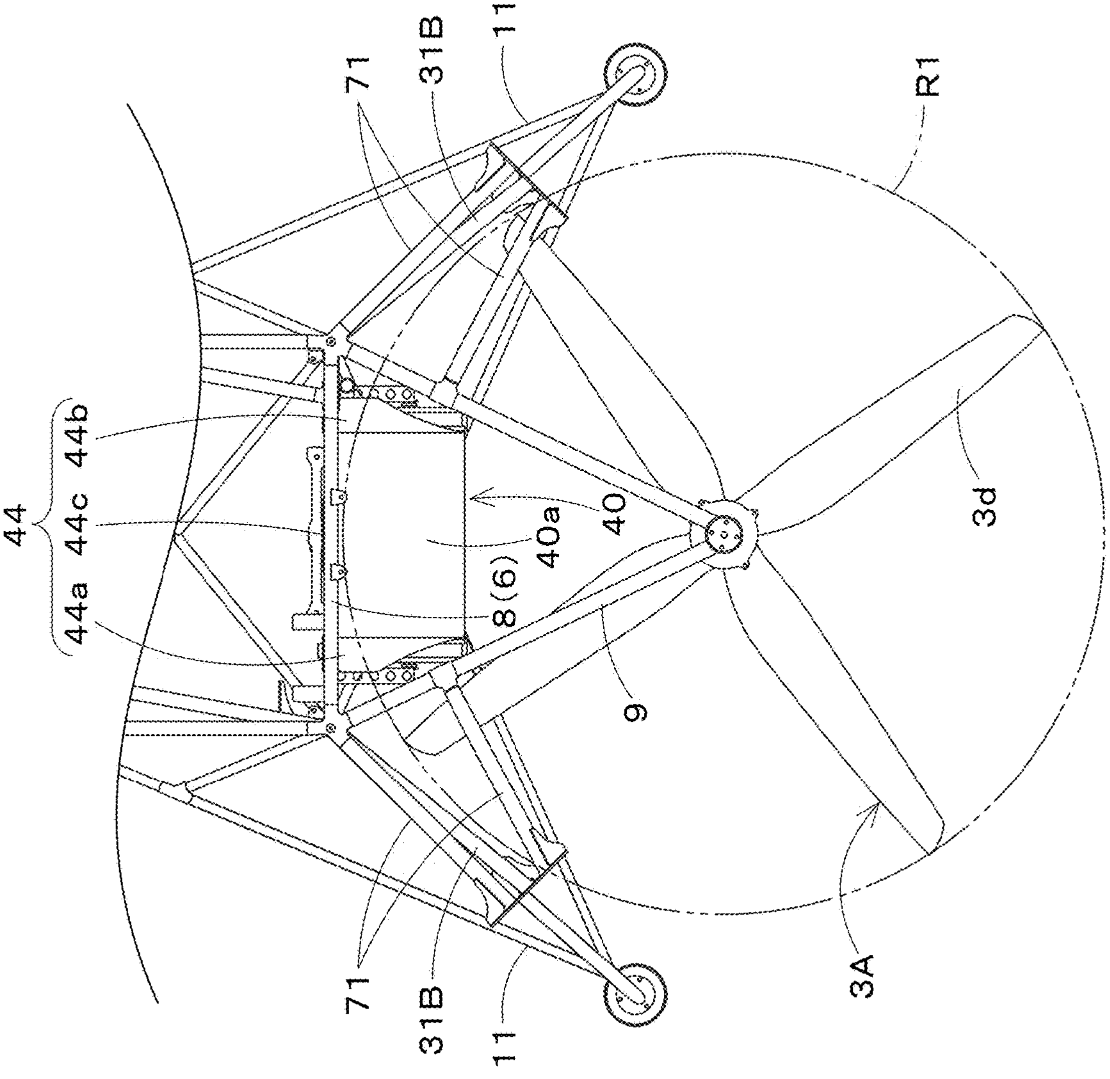
FIG. 16 is a top view of a main rotor and a cooler (radiator) of a flying apparatus according to the first example embodiment illustrating a positional relationship between the main rotor and the cooler.

As shown in FIGS. 1, 5, 6, 16, 17 and the like, radiating surfaces 40*a* of the radiators 40 face upward. As shown in FIG. 16, in a planar view, the radiators 40 overlap the rotation paths R1 of the blades 3*d* of the main rotor 3A. In a planar view, the radiating surfaces 40*a* of the radiators 40 overlap the rotation paths R1 of the blades 3*d* of the main rotors 3A, respectively.

The radiators 40 include a first radiator 40A and a second radiator 40B. The first radiator 40A and the second radiator 40B are located symmetrically on opposite sides of the main body assembly 6 placed therebetween.

As shown in FIG. 1, in a planar view, the first radiator 40A overlaps a triangle defined by the first projecting frame 9A and the frame members 101 and 105 of the framed main body 8 (see FIG. 15). In a planar view, the second radiator 40B overlaps a triangle defined by the second projecting frame 9B and the frame members 102 and 106 of the framed main body 8 (see FIG. 15). Accordingly, it is possible to effectively prevent collisions of foreign objects with the radiators (the first radiator 40A and the second radiator 40B) projecting from the framed main body 8.

In a planar view, the first radiator 40A overlaps the rotation path of the blades 3*d* of the first main rotor 3A1. In a planar view, the second radiator 40B overlaps the rotation path of the blades 3*d* of the second main rotor 3A2.

As shown in FIGS. 3, 4, 5, 6 and the like, the flying apparatus 1 includes baffles 44 to guide downward flows of air generated by rotations of the blades 3*d* of the respective main rotors 3A to flow toward the respective radiators 40. The baffles 44 project to the outside of the framed main body 8. As shown in FIG. 16, in a planar view, the baffles 44 overlap the rotation paths R1 of the blades 3*d*, respectively. As shown in FIG. 17 and the like, the baffles 44 are located above the radiating surfaces 40*a* of the radiators 40, respectively. Lower ends of the baffles 44 abut or are contiguous with the radiating surfaces 40*a* of the radiators 40. The baffles 44 are attached to upper portions of the radiators 40 by respective fixtures 74 such as screws (see FIG. 17).

As shown in FIGS. 16 and 17, the baffles 44 each include a first plate 44*a*, a second plate 44*b*, and a third plate 44*c*. The first plate 44*a* and the second plate 44*b* are facing each other and are spaced from each other in the front-rear direction. The third plate 44*c* connects the first plate 44*a* and the second plate 44*b* to each other.

As shown in FIGS. 5, 6 and 17, the baffles 44 each include expansion portions 45 that gradually increase a width of a space between the first plate 44*a* and the second plate 44*b* in an upward direction. A space between an upper end of the first plate 44*a* and an upper end of the second plate 44*b* is larger than a width (distance in the front-rear direction) of the radiator 40. Accordingly, it is possible to surely take in downward flows of air generated by the rotations of the blades 3*d* of the main rotor 3A from upper end of the baffle 44 to the space between the first plate 44*a* and the second plate 44*b* and to guide the flow of air toward the corresponding radiator 40.

As shown in FIGS. 18 and 19, a width (length in a left-right direction) of the first plate 44*a* of the baffle 44 gradually increases in a downward direction. A width (length in the left-right direction) of the second plate 44*b* also gradually increases in a downward direction. Lower ends of the first plate 44*a* and the second plate 44*b* are portions with the largest width (length in the left-right direction) thereof, which is substantially the same as the width (length in the left-right direction) of the radiator 40. Accordingly, the downward flows of air generated by the rotations of the blades 3*d* of the main rotor 3A can be easily taken into the space between the first plate 44*a* and the second plate 44*b*, and it is possible to guide the flow of air taken into the substantially whole radiating surface 40*a* of the radiator 40.

As shown in FIG. 16, in a planar view, the radiators 40 are each located between the center of the main rotor 3A and the third plate 44*c*. In a planar view, the baffles 44 are each located between the center of the main rotor 3A and the main body assembly 6 (framed main body 8). As shown in FIGS. 3 and 4, an upper end of the baffle 44 is located above the blades 3*d* of the main rotor 3A. Thus, it is possible to efficiently direct most of the downward flows of air generated by the rotations of the blades 3*d* of the main rotor 3A downward via the baffle 44.

As shown in FIG. 17, the upper portion of the baffle 44 (upper portion of the third plate 44*c*) is provided with attachment portions 44*d*. The upper portion of the baffle 44 is attached to the framed main body 8 via the attachment portions 44*d*. As described later, the framed main body 8 includes frame members (fifth frame member 105, sixth frame member 106, seventh frame member 107, and eighth frame member 108) defining a first middle-section frame 100D (see FIG. 15). The upper portions of the baffles 44 are attached to the frame members (fifth frame member 105 and sixth frame member 106) included in the first middle-section frame 100D. Plates (not illustrated) including through-holes are fixed to the fifth frame member 105 and to the sixth frame member 106, bolts are inserted through the through-holes of the plates and the through-holes of the attachment portions 44*d*, and nuts are screwed on the bolts. Thus, the upper portions of the baffles 44 are attached to the first middle-section frame 100D of the framed main body 8 via the attachment portions 44*d*.

Thus, with the upper portions of the baffles 44 attached to the first middle-section frame 100D of the framed main body 8, the lower-section frame 100F and the first middle-section frame 100D of the framed main body 8 that are arranged in the up-down direction are connected to each other via the radiators 40 and the baffles 44. Since the radiators 40 and the baffles 44 are provided on the left side and the right side of the framed main body 8, the lower-section frame 100F and the first middle-section frame 100D that are arranged in the up-down direction are connected to each other at the left portion and the right portion of the framed main body 8. Accordingly, it is possible to improve a rigidity of the framed main body 8.

As shown in FIG. 18, the flying apparatus 1 includes a pump 66. The pump 66 is provided at a lower portion of the main body assembly 6. Specifically, the pump 66 is provided inside the framed main body 8. The framed main body 8 includes a top-section 8A, an upper section 8B, a middle section 8C, and a lower section 8D arranged in this order from top to bottom. The pump 66 is provided at the lower section 8D of the framed main body 8. Similar to the radiators 40, the pump 66 is attached to the lower-section frame 100F (described later, see FIG. 15) defining the lower portion of the lower section 8D. That is, the pump 66 and the radiators 40 are both attached to the lower-section frame 100F. The pump 66 is attached to fixtures 77 (see FIG. 21) which are fixed to the lower-section frame 100F.

Figure 26:
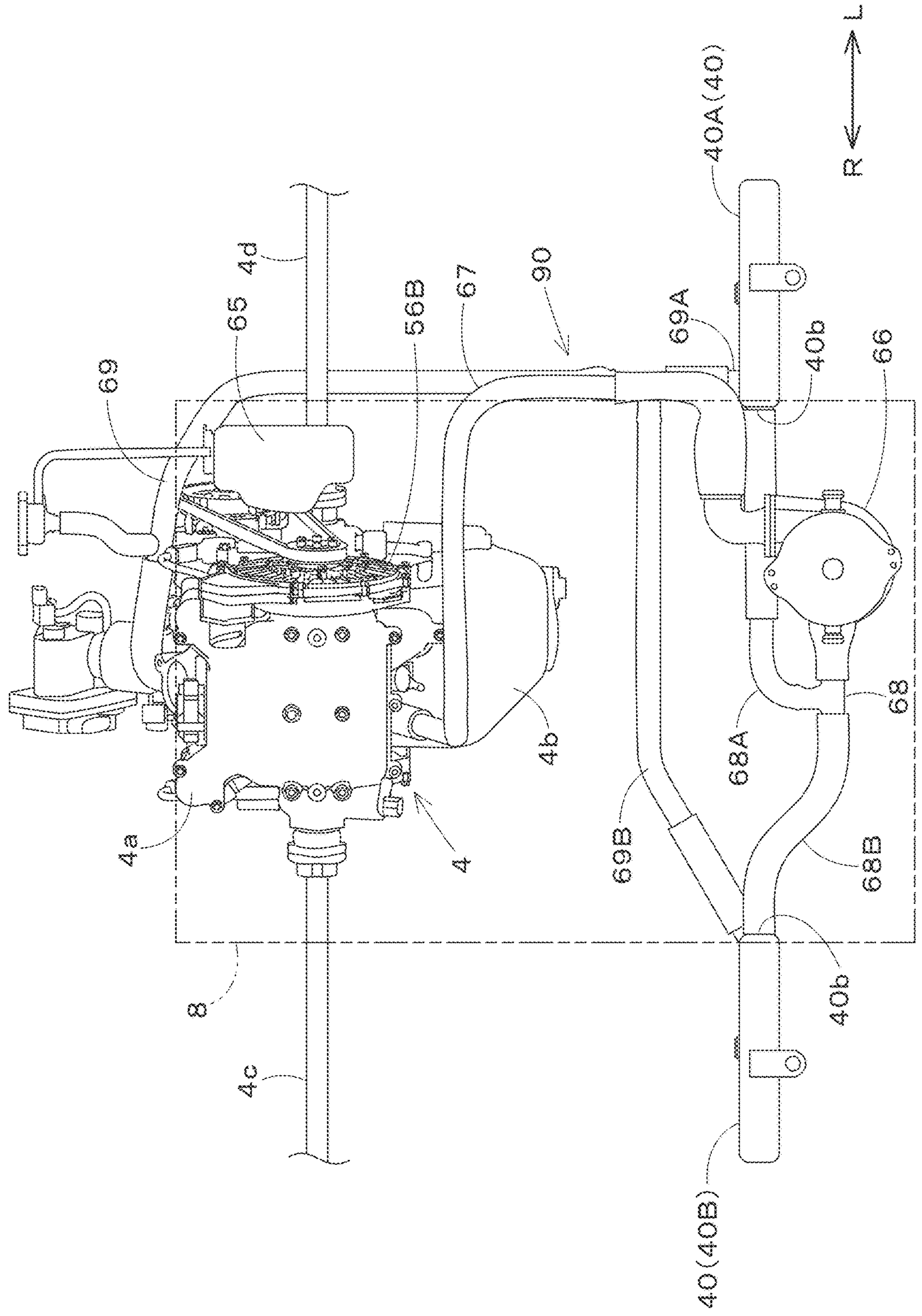
FIG. 26 is a front view of a cooling system of a flying apparatus according to the first example embodiment.
Figure 27:
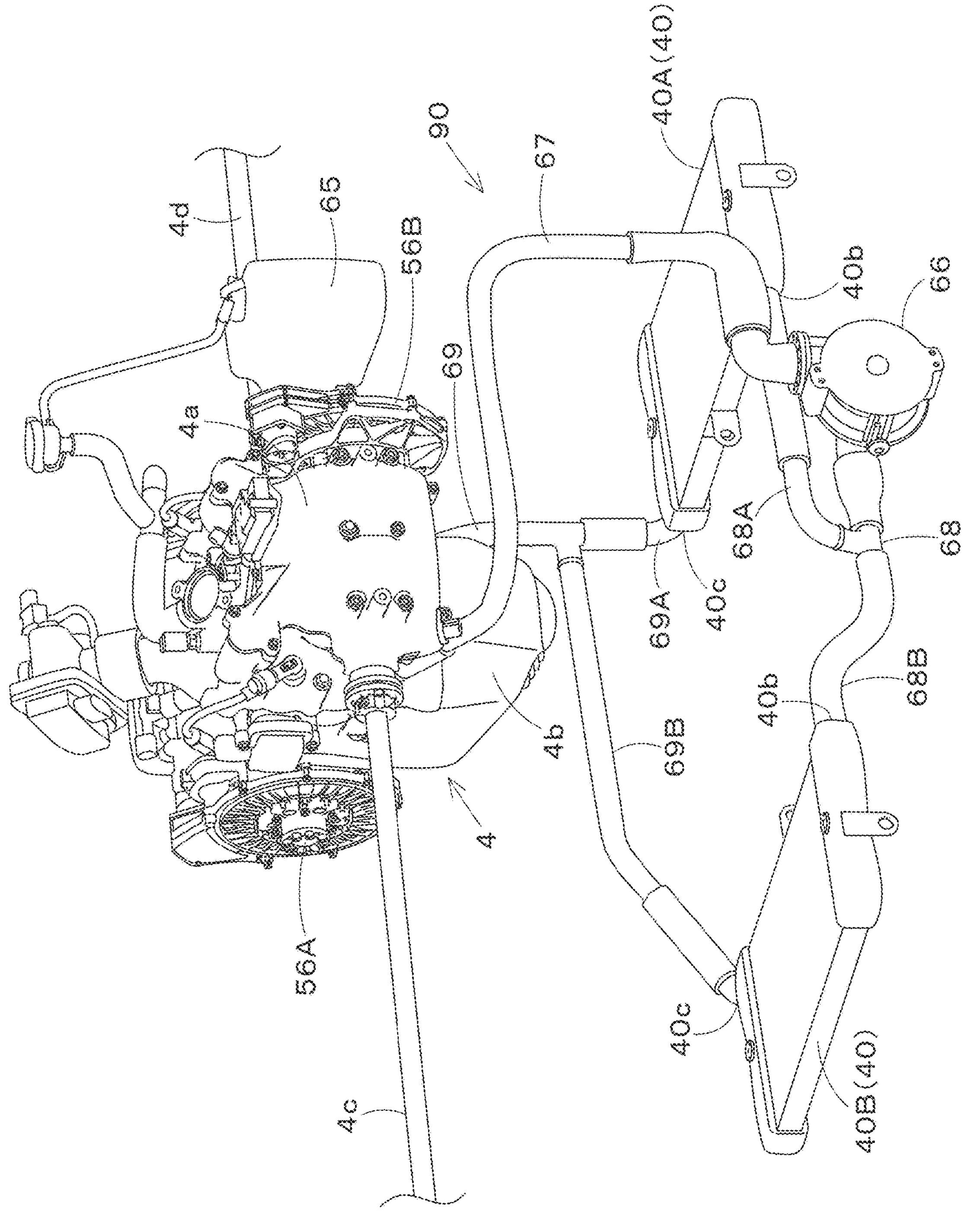
FIG. 27 is a perspective view of a cooling system of a flying apparatus according to the first example embodiment.

FIGS. 26 and 27 illustrate a cooling system 90 including the coolers (radiators) 40 and the pump 66. The cooling system 90 is configured to water-cool the driver (engine) 4. The cooling system 90 includes, in addition to the cooler (radiator) 40 and the pump 66, connecting pipes including a first pipe 67, a second pipe 68 and a third pipe 69 described later.

The pump 66 is configured to circulate coolant between the engine 4 and the radiators 40. The first pipe 67 is connected at one end thereof to a delivery port of the pump 66. The first pipe 67 is connected at another end thereof to a lower portion of the engine 4. Specifically, the first pipe 67 is connected at the other end thereof to a lower portion of a cooling jacket (not illustrated) of the engine 4. The second pipe 68 is connected at one end thereof to a suction port of the pump 66. The second pipe 68 is connected at the other end thereof to coolant outlets 40*b* of the radiators 40. Specifically, the second pipe 68 diverges at an intermediate portion thereof into a branch pipe 68A and a branch pipe 68B, the branch pipe 68A is connected to the coolant outlet 40*b* of the first radiator 40A, and the branch pipe 68B is connected to the coolant outlet 40*b* of the second radiator 40B.

As shown in FIGS. 18, 19 and 26, the third pipe 69 is connected at one end thereof to the upper portion of the engine 4. Specifically, the third pipe 69 is connected at the one end thereof to the upper portion of the cooling jacket (not illustrated) of the engine 4. The third pipe 69 are connected at another end thereof to coolant inlets 40*c* of the radiator 40. Specifically, the third pipe 69 diverges at an intermediate portion thereof into a branch pipe 69A and a branch pipe 69B, the branch pipe 69A is connected to the coolant inlet 40*c* of the first radiator 40A, and the branch pipe 69B is connected to coolant inlet 40*c* of the second radiator 40B.

As shown in FIGS. 18 and 19, the radiators 40 each include the coolant inlet 40*c* and the coolant outlet 40*b* on the side thereof facing the framed main body 8 (airframe-inward). The coolant inlet 40*c* and the coolant outlet 40*b* are located at substantially the same heights. The radiators 40 each include the coolant inlet 40*c* and the coolant outlet 40*b* at opposite ends (front-end and rear-end) thereof with the radiating surface 40*a* therebetween (see FIG. 17).

As shown in FIGS. 18, 26 and 27, the pump 66 is located below the driver (engine) 4 in the cooling system 90. The pump 66 is located below the coolers (radiators) 40. A lower end of the pump 66 is located to be lower than the driver (engine) 4, the coolers (radiators) 40 and the connecting pipes (first pipe 67, second pipe 68 and third pipe 69). That is, the pump 66 is the component located at the lowest position among components of the cooling system 90. Thus, it is possible to smoothly perform circulation of the coolant via driving of the pump 66 even when the flying apparatus 1 tilts during flight. Especially, it is possible to smoothly perform the recovery circulation of the coolant to the pump 66.

As shown in FIGS. 18 and 26, the first radiator 40A and the second radiator 40B are juxtaposed in a horizontal direction. In other words, the first radiator 40A and the second radiator 40B are located at the same height. The pump 66 is located between the first radiator 40A and the second radiator 40B in the horizontal direction. In other words, the pump 66 is located between the first radiator 40A and the second radiator 40B in the direction (left-right direction) in which the first radiator 40A and the second radiator 40B are juxtaposed.

As shown in FIGS. 26 and 27, among the connecting pipes, a portion of the first pipe 67 and a portion of the third pipe 69 (branch pipe 69A) extend in the up-down direction. Then, as shown in FIG. 18, the portion of the first pipe 67 of the connecting pipes extends in the up-down direction along the first plate 44*a* of the baffle 44 and vertical frame members 100B described later. The portion of the third pipe 69 (branch pipe 69) extends in the up-down direction along the second plate 44*b* of the baffles 44 and the vertical frame members 100B (see FIG. 15).

The flying apparatus 1 includes batteries 46 to store electric power to be supplied to the motors 5. As shown in FIG. 14, in a planar view, the batteries 46 are respectively provided on a first side (left side) of the engine 4 and on a second side (right side) of the engine 4 opposite to the first side. In other words, in a planar view, two batteries 46 sandwich the engine 4 therebetween. As shown in FIG. 19, the batteries 46 overlap the oil pan 4*b* when viewed in the up-down direction. Thus, the battery 46 is located on a side of the oil pan 4*b*. The two batteries 46 are respectively located on the first side (left side) and on the second side (right side) of the oil pan 4*b*. Upper ends of the batteries 46 are substantially as high as a lower end of the engine main body 4*a*. In other words, the batteries 46 do not or rarely overlap the engine main body 4*a* when viewed in the up-down direction. Thus, heat from the engine main body 4*a* does not easily propagate to the batteries 46.

The following refers to a battery provided on the first side of the engine 4 as a first battery 46A, and refers to a battery provided on the second side of the engine 4 as a second battery 46B. The first battery 46A supplies electric power to the motors 5 to drive the first sub-rotor 3B1 and the third sub-rotor 3B3. The second battery 46B supplies electric power to the motors 5 to drive the second sub-rotor 3B2 and the fourth sub-rotor 3B4. The first battery 46A and the second battery 46B are substantially rectangular. As shown in FIGS. 18 and 19, the first battery 46A and the second battery 46B are provided at positions with the same height in the airframe 2.

As shown in FIG. 14, in a planar view, one of the generators (the second generator 56B) is provided between the first battery 46A and the engine 4. In a planar view, another of the generators (the first generator 56A) is provided between the second battery 46B and the engine 4. In a planar view, the engine 4 and the generators (the first generator 56A and the second generator 56B) are located between the first battery 46A and the second battery 46B.

The batteries 46 are located on sides (airframe-outward) of the radiators 40. As shown in FIGS. 18 and 19, the radiators 40 are offset from the batteries 46 in the up-down direction. Specifically, the batteries 46 are located above the radiators 40. Thus, it is possible to prevent heat emitted from the batteries 46 from propagating to the radiators 40. The batteries 46 and the baffles 44 are aligned in the horizontal direction. Airframe-outward surfaces of the batteries 46 abut or are contiguous with the third plates 44*c* of the baffles 44. Thus, it is possible to take the heat of the batteries 46 away and to cool the batteries 46 via the flow of air downward guided along the baffles 44. The airframe-outward surfaces of the batteries 46 are protected by the baffles 44 because the baffles 44 face on the airframe-outward side of the batteries 46. Thus, it is possible to prevent collisions of foreign objects with the batteries 46 in a case where the flying apparatus 1 is in-flight and/or because of another reason.

As shown in FIGS. 3 and 4, the main rotors 3A, the batteries 46 and the engine 4 are aligned in the horizontal direction. The main rotors 3A, the batteries 46 overlap the engine 4 when viewed in the up-down direction. The first-side rotor 3A1, the first battery 46A, the engine 4, the second battery 6B and the second-side rotor 3A2 are aligned in this order in the horizontal direction (left-right direction). The main rotors 3A and the sub-rotors 3B overlap the engine 4 when viewed in the up-down direction.

As shown in FIGS. 2, 3, 4 and/or the like, the flying apparatus 1 includes position detectors 47 to measure a position of the airframe 2. As shown in FIGS. 18 and 19, the position detectors 47 are provided at the top-section 8A of the framed main body 8. A flight controller 48 is provided at the top-section 8A of the framed main body 8. The engine 4 is provided at an upper section 8B of the framed main body 8 below the position detectors 47. Specifically, the engine 4 is provided in a portion of the framed main body 8 between the upper section 8B and the middle section 8C. The batteries 46 are provided at the middle section 8C of the framed main body 8. Thus, it is possible to stabilize a posture of the airframe 2 during flight by locating the heavyweight engine 4 and batteries 46 below the lightweight position detectors 47 and flight controller 48.

Figure 20:
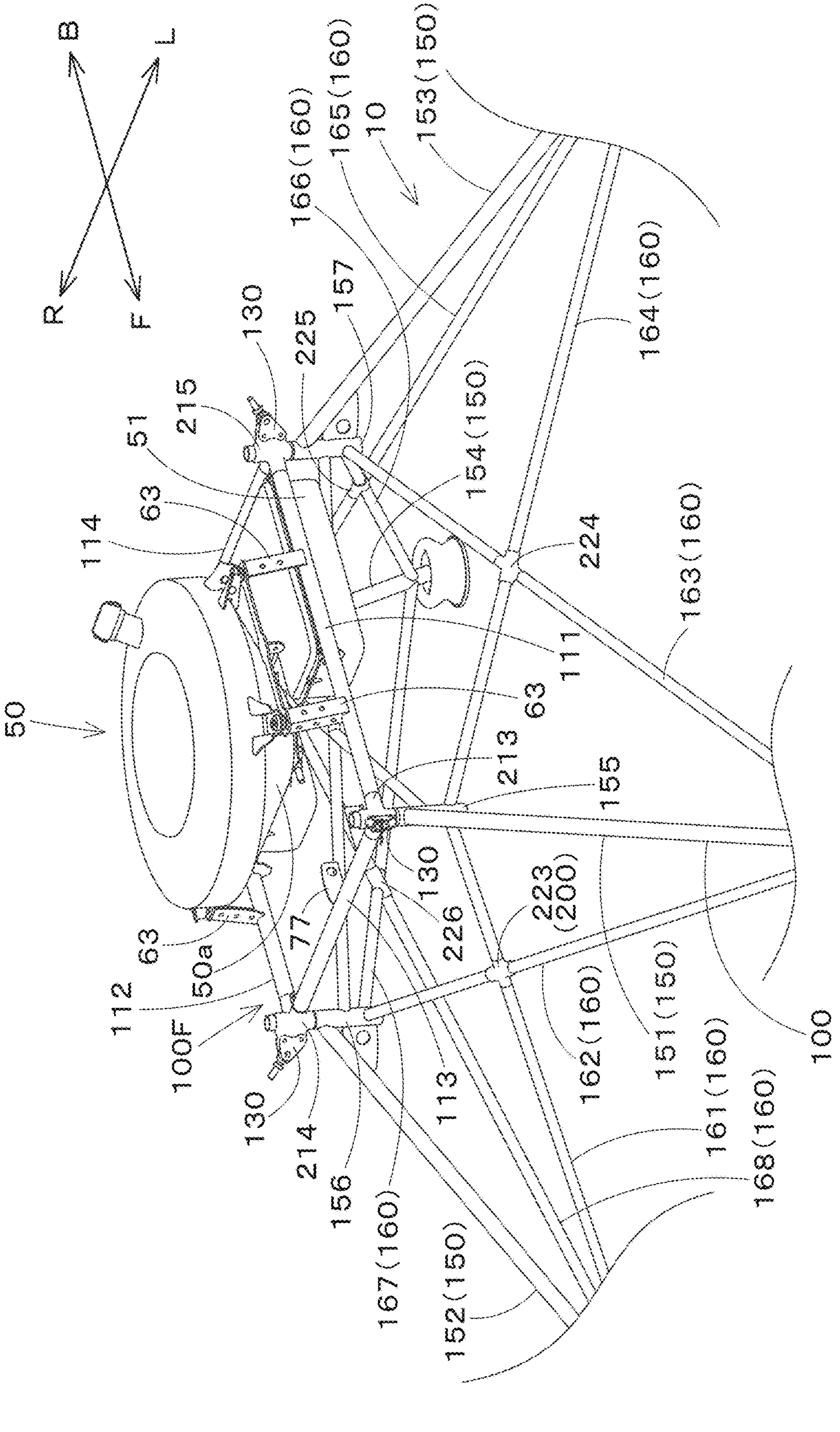
FIG. 20 is a perspective view of a fuel tank, a casing, a skid and the like of a flying apparatus according to the first example embodiment.

As shown in FIGS. 3, 4, 5 and 6, the flying apparatus 1 includes a fuel tank 50 to store fuel to be supplied to the engine 4. As shown in FIG. 19, the fuel tank 50 is provided at the lower section 8D of the framed main body 8. Specifically, as shown in FIG. 20, the fuel tank 50 is supported by a support 63 attached to the lower-section frame 100F (described later) defining the lower portion of the lower section 8D of the framed main body 8. By locating the fuel tank 50 at the lower section 8D of the framed main body 8, it is possible to reduce fluctuation in a weight balance of the airframe 2 because of fluctuations of the quantity of fuel inside of the fuel tank 50.

As shown in FIG. 20, the fuel tank 50 is spanned between two frame members (the eleventh frame member 111 and the twelfth frame member 112) parallel or substantially parallel to each other. As described later, the eleventh frame member 111 and the twelfth frame member 112 define the lower-section frame 100F. Thus, since the two frame members (the eleventh frame member 111 and the twelfth frame member 112) defining the lower-section frame 100F are connected to each other via the fuel tank 50, it is possible to increase a rigidity of the lower-section frame 100F, thus enhancing the rigidity of the framed main body 8.

As shown in FIG. 20, the fuel tank 50 includes a lower portion 50*a* which has a form of a truncated cone with a diameter decreasing downward. Fuel stored in the fuel tank 50 is sucked out from the lower end thereof (bottom of the lower portion 50*a*) and supplied to the engine 4. Since the lower portion 50*a* of the fuel tank 50 has the form of a truncated cone, it is possible to smoothly suck fuel from the fuel tank 50 even when the airframe 2 tilts during flight of the flying apparatus 1.

Figure 21:
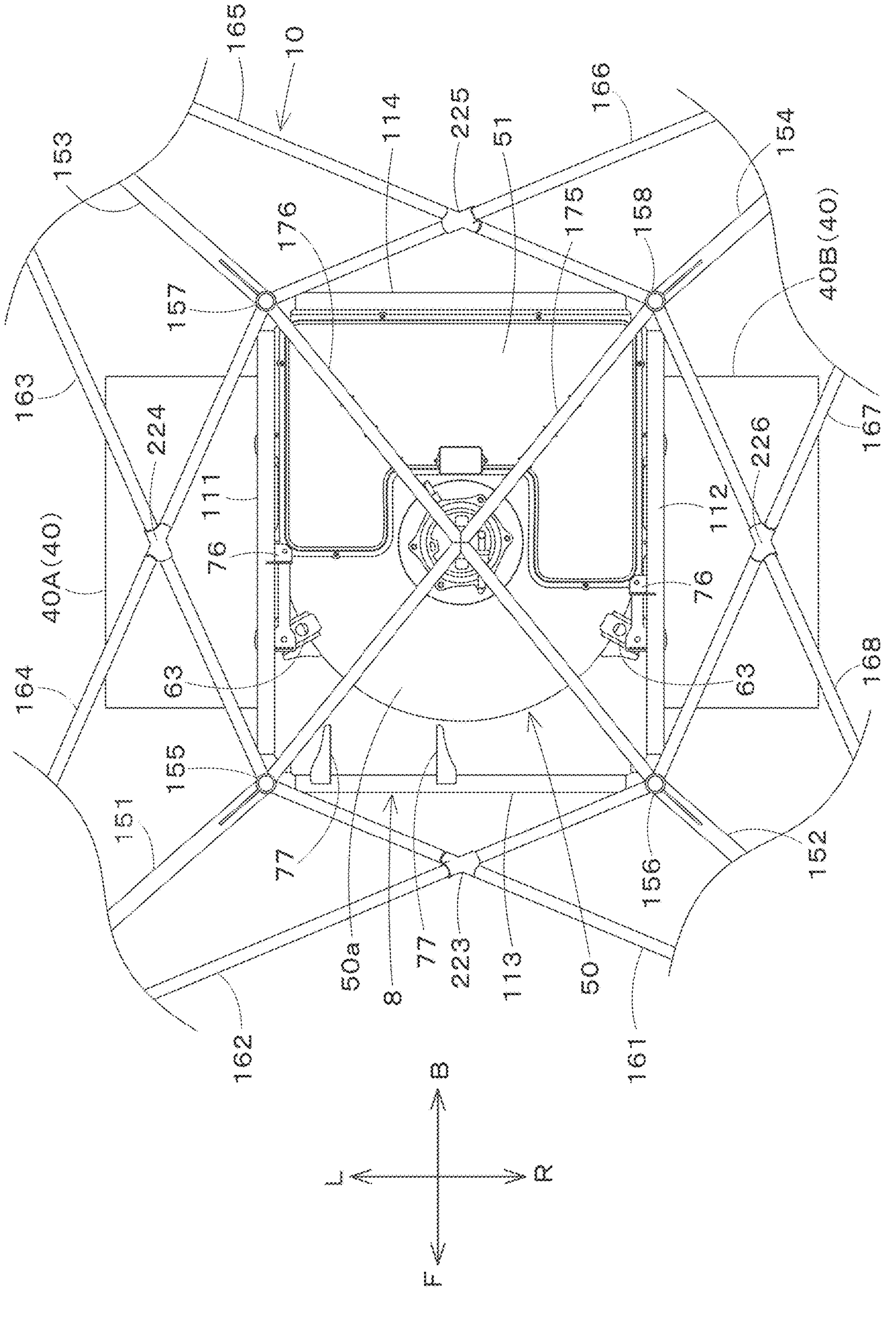
FIG. 21 is a bottom view of a fuel tank, a casing, a skid and the like of a flying apparatus according to the first example embodiment.

At least a portion of the fuel tank 50 is peripherally enclosed with a casing 51. Specifically, as shown in FIG. 21, the lower portion 50*a* of the fuel tank 50 is peripherally enclosed on three sides (left side, right side, and rear side) by the casing 51. That is, the casing 51 surrounds the lower portion 50*a* of the fuel tank 50 (on three sides). The casing 51 covers a portion of the bottom of the lower portion 50*a* of the fuel tank 50. Thus, the casing 51 protects the fuel tank 50 from external forces. In the present example embodiment, the casing 51 is a fuse box to contain one or more fuses. The one or more fuses prevent overcurrent from flowing into electrical devices provided in the airframe 2. Note that the casing 51 is not limited to a fuse box.

As shown in FIG. 21, outer edges (left edge, right edge and rear edge) of the casing 51 are provided alongside three frame members (the eleventh frame member 111, the twelfth frame member 112 and a fourteenth frame member 114)) defining the lower-section frame 100F. The casing 51 is attached to the lower-section frame 100F. Specifically, the casing 51 is attached to the lower-section frame 100F by fixtures 76 (see FIG. 21) and by a fifteenth coupling 215 and a sixteenth coupling 216 described later (see FIG. 15).

Thus, the casing 51 is attached to the lower-section frame 100F while a plurality of outer edges thereof are provided alongside the frame members included in the lower-section frame 100F. Accordingly, the rigidity of the lower-section frame 100F increases, such that it is possible to improve the rigidity of the framed main body 8.

Figure 28:
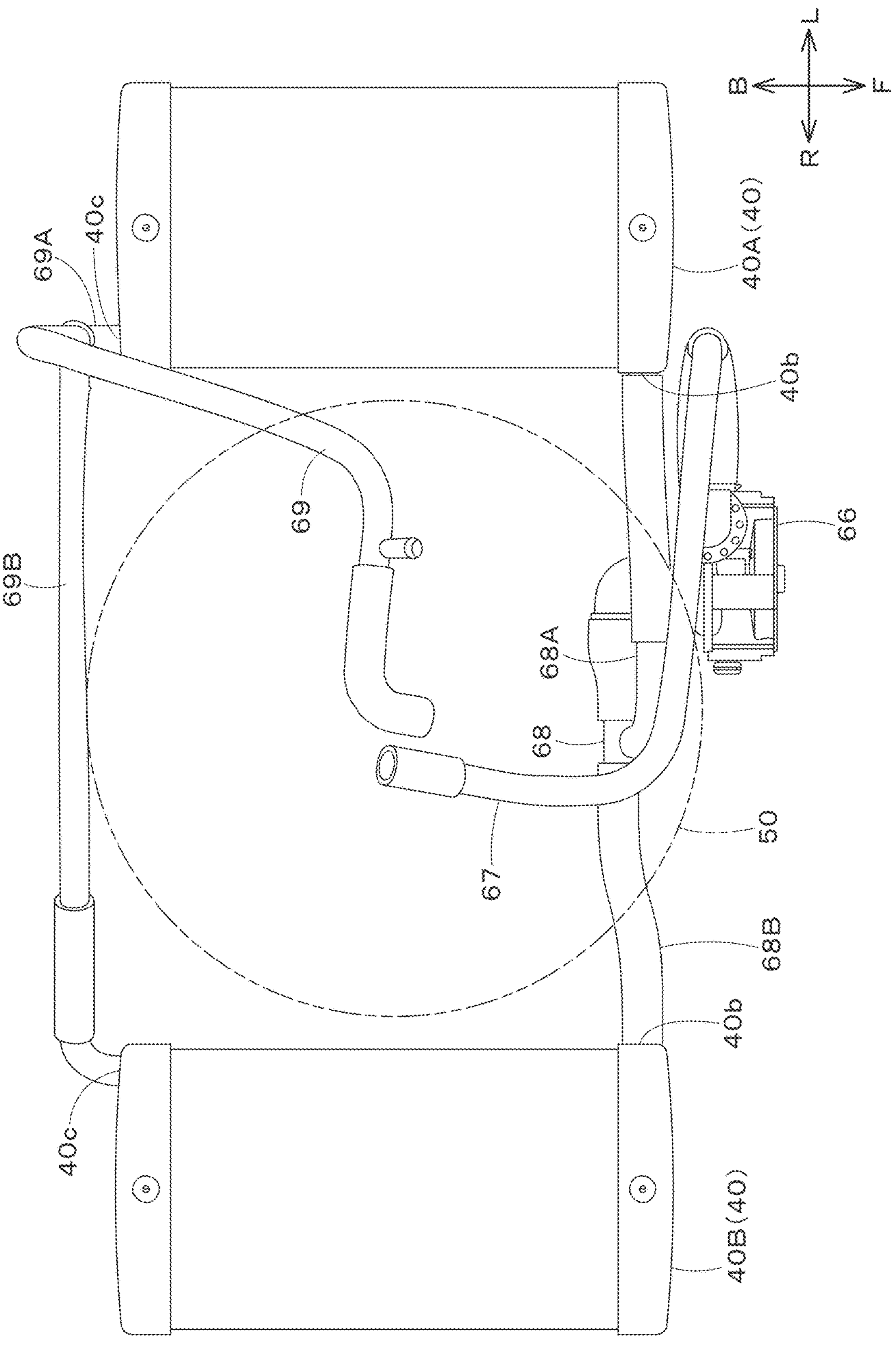
FIG. 28 is a top view of a fuel tank and a cooling system of a flying apparatus according to the first example embodiment illustrating a positional relationship between the fuel tank and the cooling system.

As shown in FIG. 28, the pump 66 is provided at the front of the fuel tank 50. That is, the pump 66 is provided on a side (front side) of the lower portion 50*a* of the fuel tank 50 where the casing 51 is absent (see FIG. 21), of the surrounding sides of the lower portion 50*a* of the fuel tank 50. In other words, the pump 66 is provided opposite to the casing 51 in the front-rear direction.

In a planar view, at least a portion of the cooling system 90 overlaps the fuel tank 50. Specifically, as shown in FIG. 28, in a planar view, the connecting pipes (the first pipe 67, the second pipe 68 and the third pipe 69) of the cooling system 90 overlap the fuel tank 50. In a planar view, the fuel tank 50 is located between the first radiator 40A and the second radiator 40B.

At least a portion of the cooling system 90 overlaps the lower portion 50*a* of the fuel tank 50 when viewed in the up-down direction. Specifically, as shown in FIGS. 18 and 19, the pump 66 and the connecting pipes (the first pipe 67, the second pipe 68 and the third pipe 69) of the cooling system 90 overlap the lower portion 50*a* of the fuel tank 50 when viewed in the up-down direction.

As previously described, the lower portion 50*a* of the fuel tank 50 is formed in a truncated cone shape with a diameter decreasing downward. Thus, the cooling system 90 can be located such that, in a planar view and when viewed in the up-down direction, a portion of the cooling system 90 overlap the lower portion 50*a* of the fuel tank 50. In the present example embodiment, in a planar view and when viewed in the up-down direction, the branch pipe 68A of the cooling system 90 overlaps the lower portion 50*a* of the fuel tank 50. Such a configuration reduces the space necessary for the fuel tank 50 and the cooling system 90.

Figure 29:
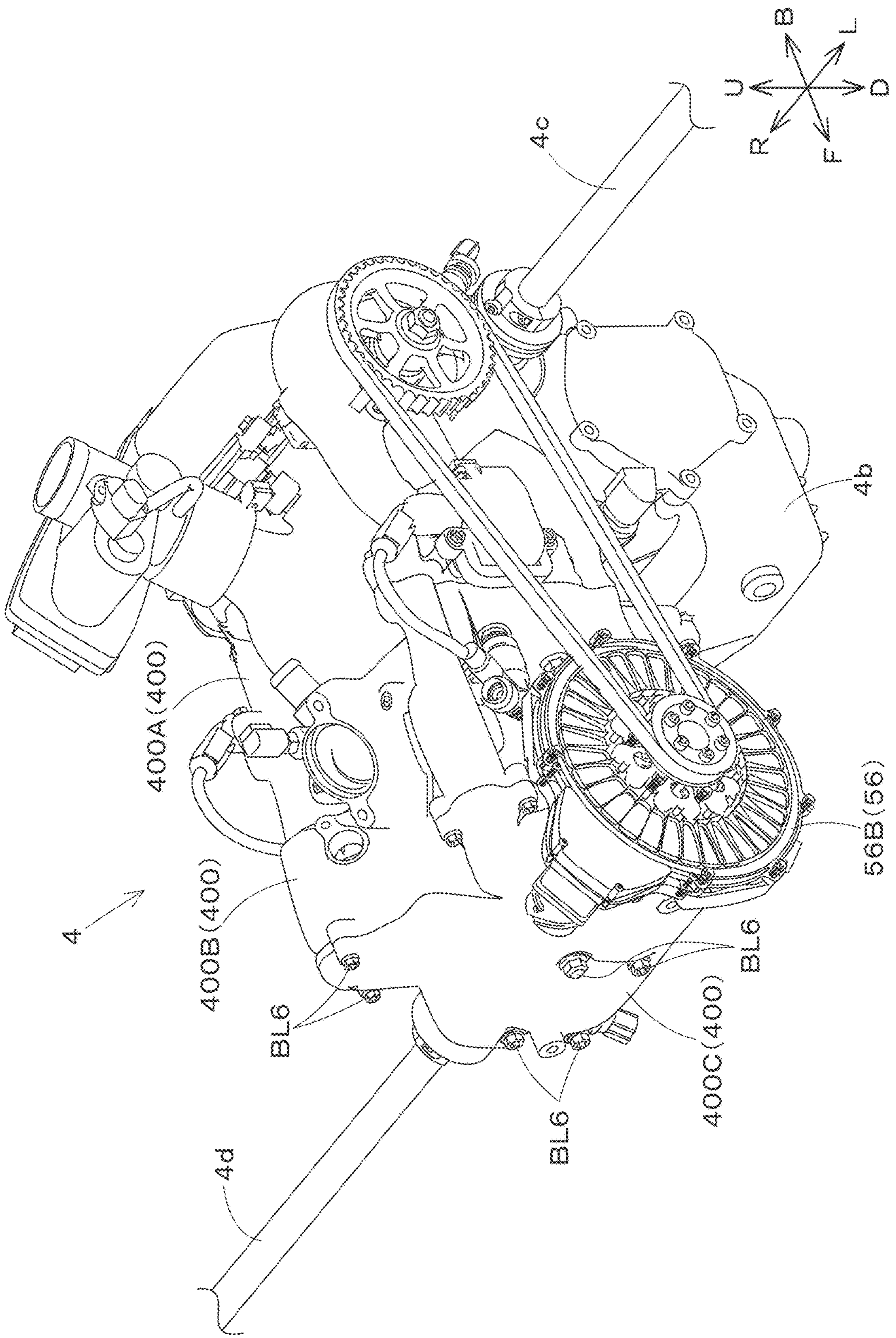
FIG. 29 is a perspective view of an engine when viewed from the front-left side thereof.
Figure 30:
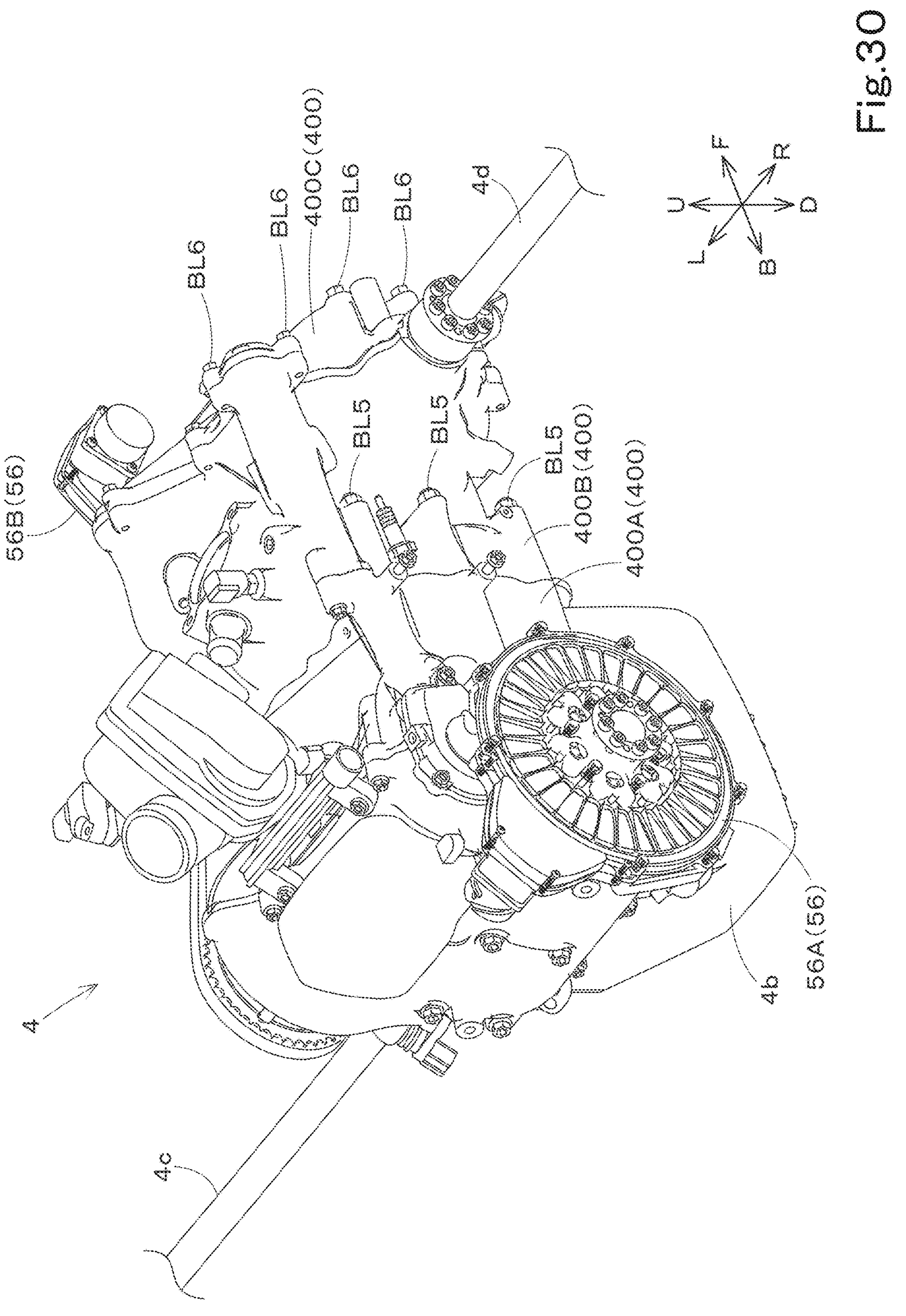
FIG. 30 is a perspective view of an engine when viewed from the rear-right side thereof.
Figure 31:
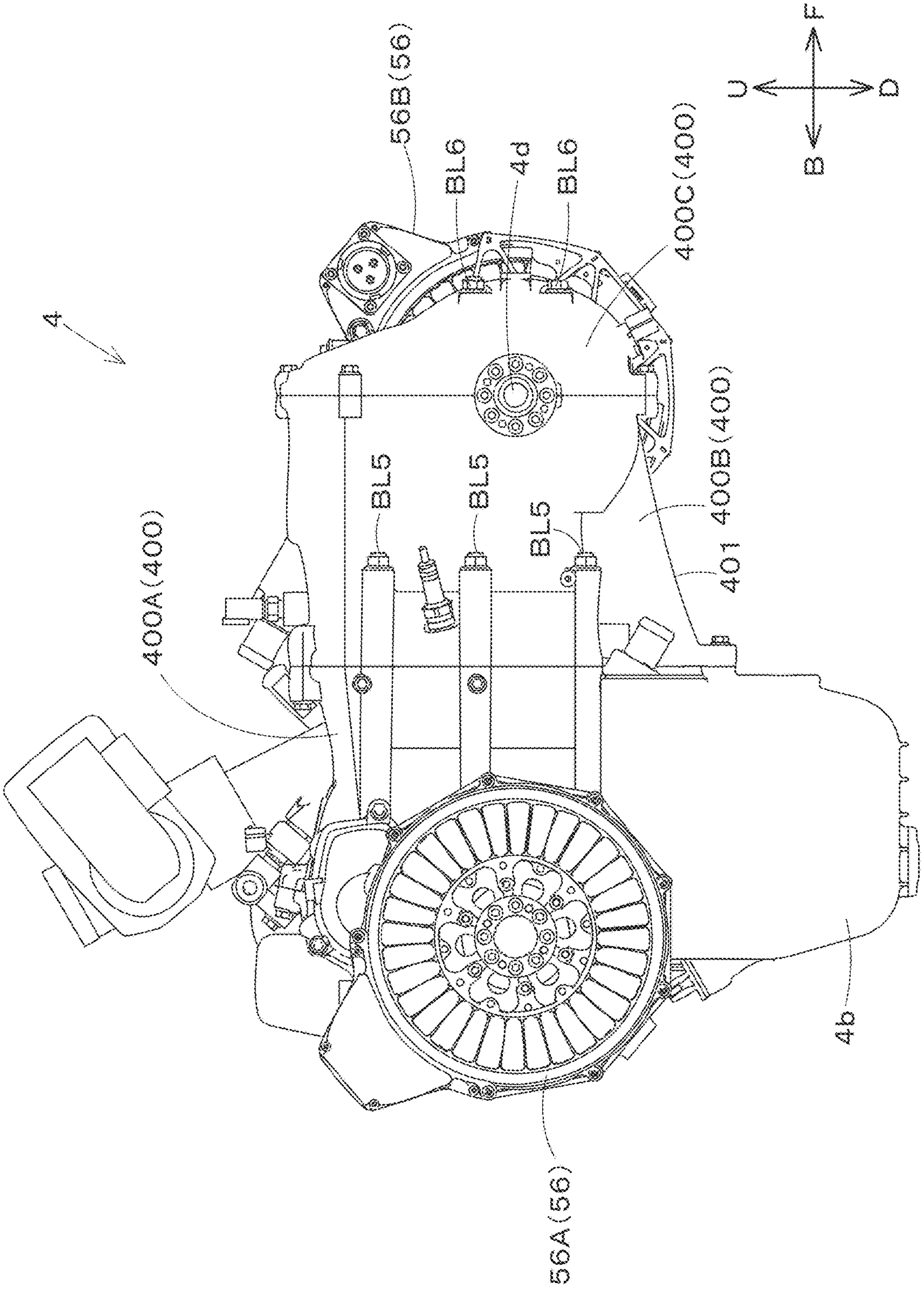
FIG. 31 is a right side view of an engine.

As shown in FIGS. 29 to 31, the engine 4 includes an engine block 400. The engine block 400 is a block defining an outer shell of the previously mentioned engine main body 4*a*. The first output shaft 4*c* and the second output shaft 4*d* project from the engine block 400. The engine block 400 contains the previously described pistons (the first pistons 81 and the second pistons 82) and the previously described crank shafts (first crank shaft 83 and second crank shaft 84) inside thereof.

The engine block 400 includes a plurality of blocks combined together. In the present example embodiment, the engine block 400 includes a first block 400A, a second block 400B and a third block 400C. The first block 400A is provided at a rear portion of the engine block 400. The third block 400C is provided at a front portion of the engine block 400. The second block 400B is provided between the third block 400C and the first block 400A. The first block 400A and the second block 400B are connected by bolts BL5. The second block 400B and the third block 400C are connected by bolts BL6. Thus, the engine block 400 can be divided into the plurality of blocks (the first block 400A, the second block 400B and the third block 400C) by removing the bolts BL5 and BL6.

As shown in FIGS. 29 to 35, an oil pan 4*b* is provided below the engine block 400. The engine block 400 has first and second sides in a width direction thereof (front-rear direction) opposite each other and includes a width-directional first-side portion close to the first side in the width direction thereof and a width-directional second-side portion close to the second side in the width direction thereof, and the oil pan **4*b* is provided only on the width-directional first-side portion (leftward in FIG. 31) of the engine block 400. Accordingly, a portion of the engine 4 on which the oil pan 4*b* is provided (leftward in FIG. 31) projects further downward than another portion of the engine 4 on which the oil pan 4*b* is absent (rightward in FIG. 31). In other words, a lower end (bottom surface) of the portion of the engine 4 with the oil pan 4*b* provided thereon is located further downward compared to a lower end of the portion of the engine 4 with no oil pan 4*b*** provided thereon.

In the present example embodiment, the "width direction of the engine block 400" is an alignment direction of the first pistons 81 and the second pistons 82 (front-rear direction) in which the first pistons 81 and the second pistons 82 align. The "first side in the width direction of the engine block 400" is a rear side of the engine block 400. The "second side in the width direction of the engine block 400" is a front side of the engine block 400. That is, the oil pan **4*b* is provided only at the rear portion of the engine block 400** and not at the front portion thereof.

However, the "first side in the width direction of the engine block 400" may be a front side of the engine block 400. In such a case, the oil pan **4*b* is provided only at the front portion of the engine block 400 and not at the rear portion thereof. The "width direction of the engine block 400" is not limited to the alignment direction of the first pistons 81 and the second pistons 82, and may be, for example, a direction (left-right direction) perpendicular to the alignment direction of the first pistons 81 and the second pistons 82. In such a case, the oil pan 4*b* is provided only on a left portion or on a right portion of the engine block 400**.

Figure 33:
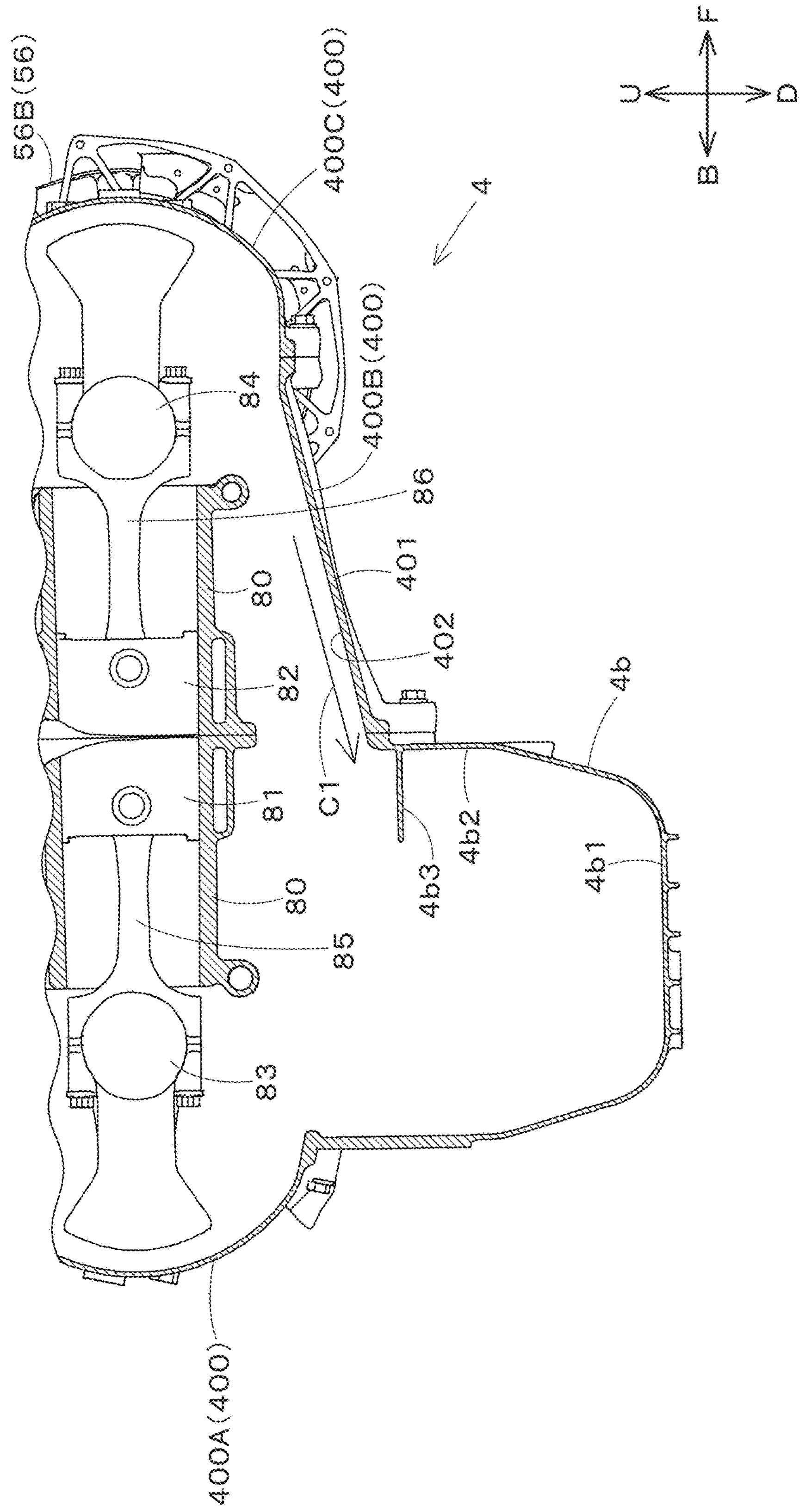
FIG. 33 is a longitudinal section view of an engine with a vertically sectioned intake passage (an upper portion of the engine is omitted).
Figure 34:
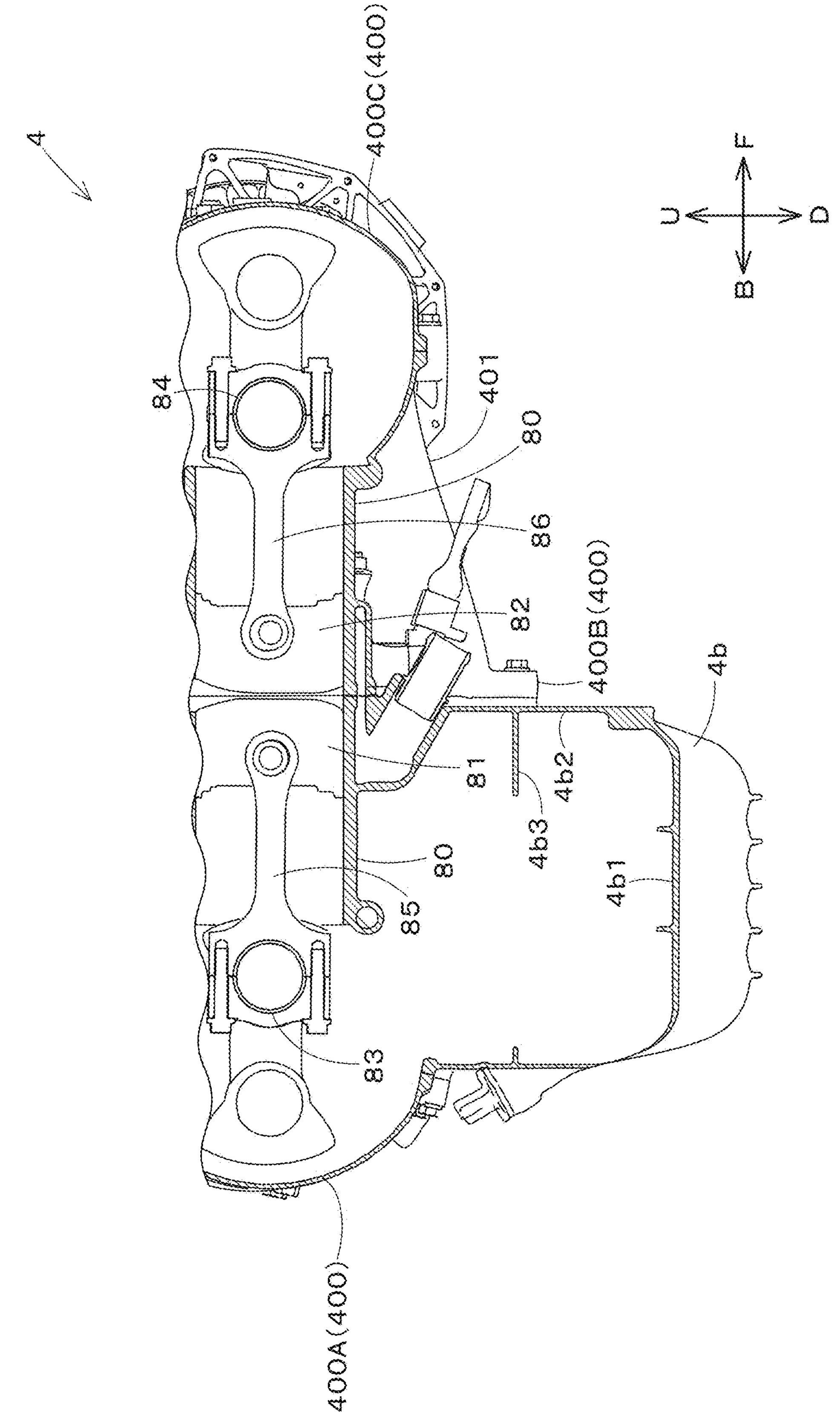
FIG. 34 is a longitudinal section view of an engine with a vertically sectioned exhaust passage (an upper portion of the engine is omitted).

As shown in FIGS. 33 and 34, the first crank shaft 83 and the second crank shaft 84 are parallel or substantially parallel to each other to be spaced from each other in the alignment direction of the first pistons 81 and the second pistons 82. In FIGS. 33 and 34, an upper portion of the engine 4 (above a wavy line) is omitted.

In the present example embodiment, the alignment direction of the first pistons 81 and the second pistons 82 is the width direction of the engine block 400. Thus, the first crank shaft 83 and the second crank shaft 84 are located parallel or substantially parallel to each other to be spaced from each other in the width direction of the engine block 400. The first crank shaft 83 is provided in the width-directional first-side portion of the engine block 400. The second crank shaft 84 is provided in the width-directional second-side portion of the engine block 400. Thus, the engine block 400 is provided with the oil pan **4*b* only on the portion thereof with the first crank shaft 83 therein and not on the portion thereof with the second crank shaft 84** therein.

In the present example embodiment, the oil pan **4*b* is integrated with the engine block 400. In other words, the oil pan 4*b* and the engine block 400 are formed of a single component. The single component integrally includes a portion (upper portion) defining the engine block 400 and a portion (lower portion) defining the oil pan 4*b*. However, the oil pan 4*b* and the engine block 400 may be formed of respective components separated from each other, and the component defining the oil pan 4*b* may be connected to a lower portion of the component defining the engine block 400**.

In the present example embodiment, the oil pan **4*b* is integrated with the first block 400A of the engine block 400. In other words, the oil pan 4*b* is formed of the same component (single component) with the first block 400A. The oil pan 4*b* is only provided below the first block 400A of the three blocks (first block 400A, second block 400B and third block 400C) included in the engine block 400**.

Figure 35:
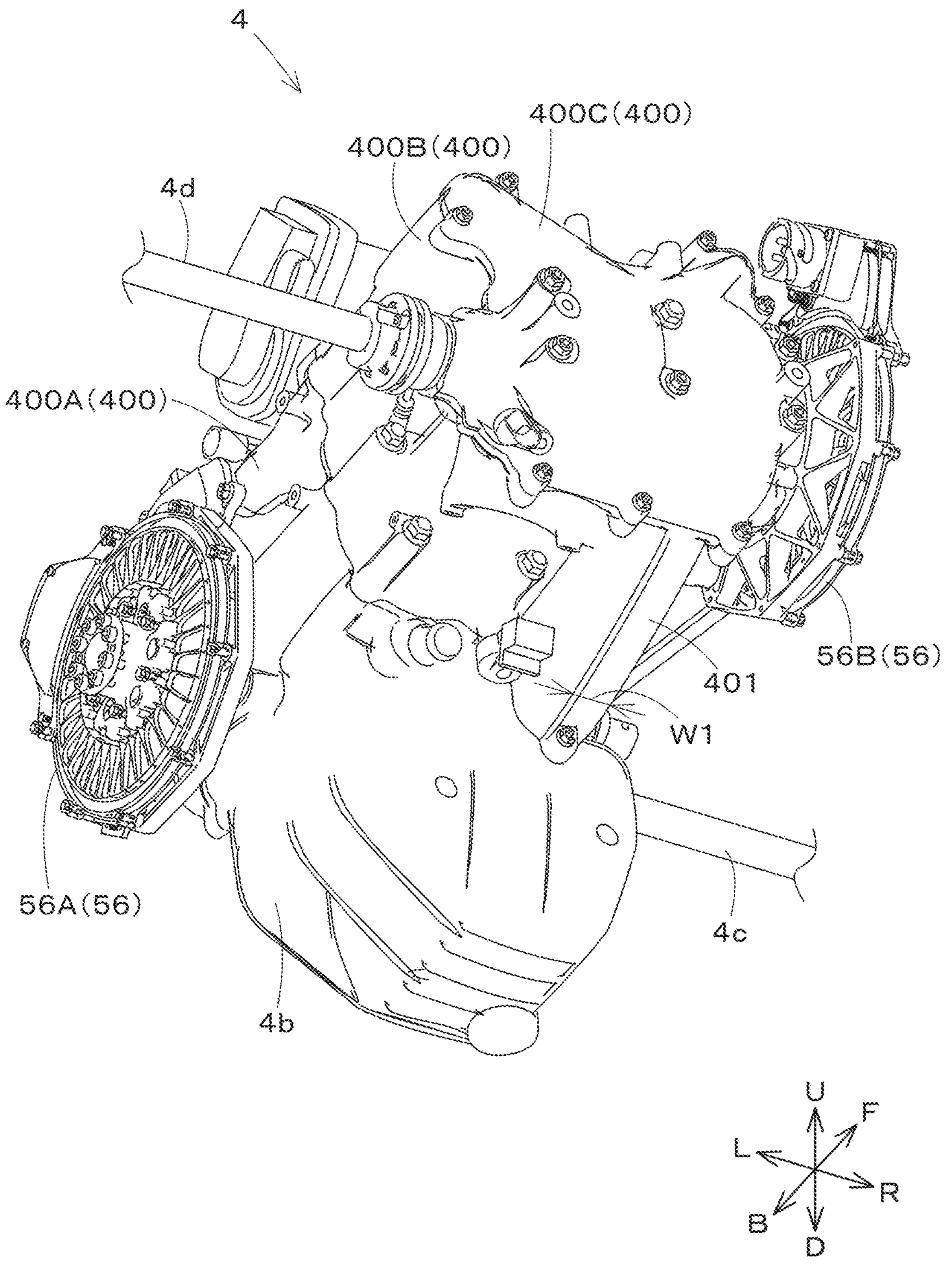
FIG. 35 illustrates an engine when viewed from the front-lower side thereof.

As shown in FIGS. 31, 35 and the like, the engine block 400 includes an oblique portion 401. The oblique portion 401 is formed at a lower portion of the engine block 400. The oblique portion 401 is formed with a block of the plurality of blocks included in the engine block 400, the block formed with the oblique portion 401 being different from the block (first block 400A) below which the oil pan **4*b* is provided (integrated at the lower portion thereof). Specifically, the oblique portion 401 is formed with a block different from and adjacent to the block (first block 400A) below which the oil pan 4*b* is provided (integrated at the lower portion thereof). Specifically, the oblique portion 401 is formed at a lower portion of the second block 400B among the first block 400A, the second block 400B and the third block 400**C.

As described above, the oil pan **4*b* is provided below one block (first block 400A) of the plurality of blocks. The oblique portion 401 is provided at a lower portion of another block (second block 400B) of the plurality of blocks adjacent to the one block (first block 400**A).

As shown in FIG. 33, an inner lower surface 402 of the oblique portion 401 is inclined downward from the second side (front side) to the first side (rear side) in the width direction of the engine block 400. The inner lower surface 402 of the oblique portion 401 is connected to an inner wall surface **4*b*2 rising from an inner lower surface 4*b*1 of the oil pan 4*b*. Accordingly, oil (lubrication oil) falling on a lower surface of the width-directional second-side portion of the engine block 400 flows along the inner lower surface 402 of the oblique portion 401 to the width-directional first-side portion of the engine block 400 (see arrow C1 of FIG. 33), flows down to the inner portion of the oil pan 4*b*, and is collected in the inner portion of the engine block 400**.

As previously described, the oblique portion 401 is provided at the second block 400B of the engine block 400. As shown in FIG. 33, the inner lower surface of the third block 400C of the engine block 400 is provided above the inner lower surface of the second block 400B. The inner lower surface 402 of the oblique portion 401 is inclined downward from the side of the second block 400B facing the third block 400C to the side of the second block 400B facing the first block 400A. An upper end of the inner lower surface 402 of the oblique portion 401 is as high as the inner lower surface of the third block 400C. A lower end of the inner lower surface 402 of the oblique portion 401 is as high as an upper end of a side (front side) of the oil pan **4*b* facing the oblique portion 401. Thus, oil accumulated on the inner lower surface of the second block 400B and the inner lower surface of the third block 400C flows down to the inner portion of the oil pan 4*b***.

Figure 36:
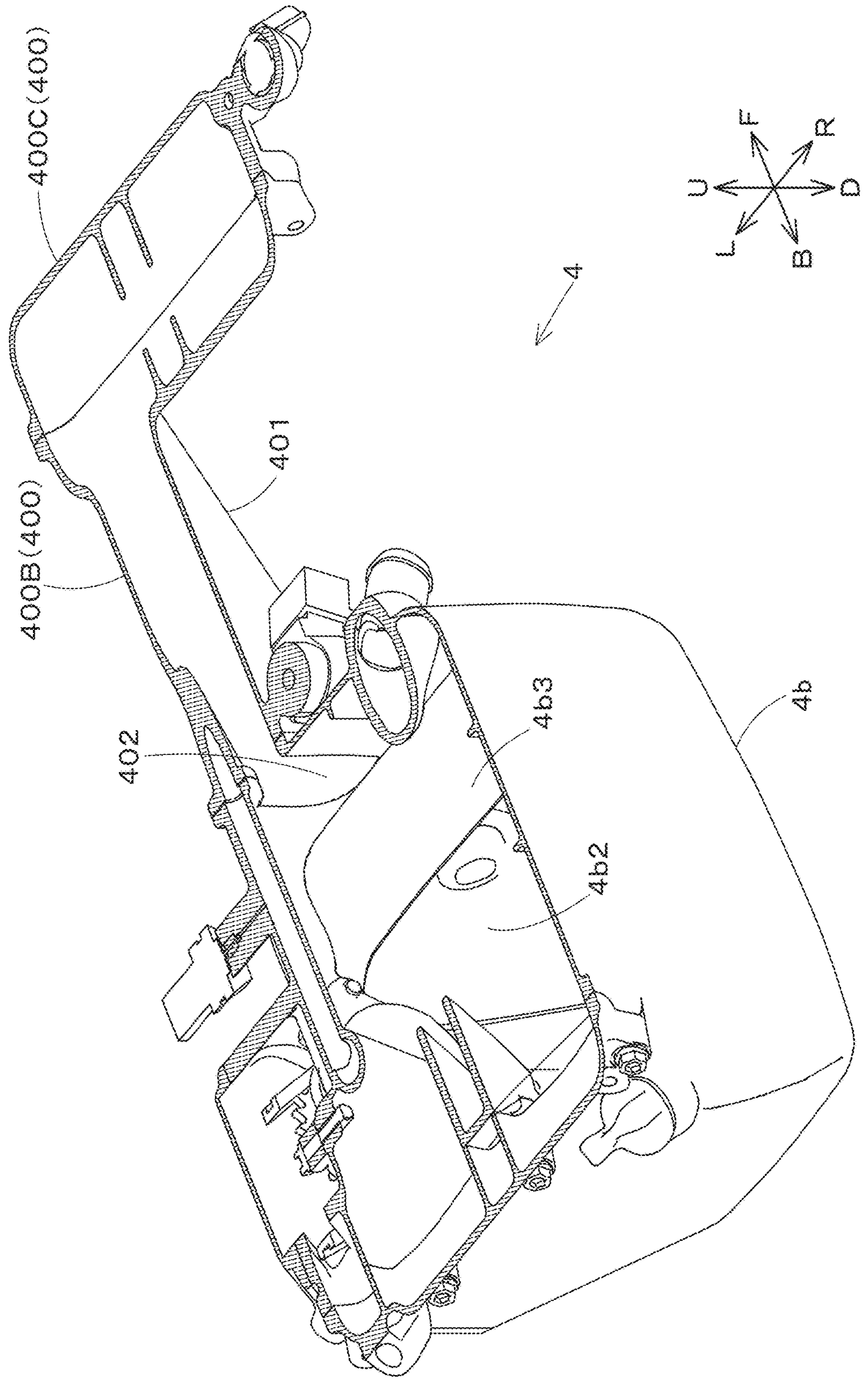
FIG. 36 is a sectional perspective view of an engine with an oil pan and an oblique portion horizontally sectioned.

As shown in FIGS. 33 and 36, a knockout plate **4*b*3 is provided on the inner wall surface 4*b*2 rising from the inner lower surface 4*b*1 of the oil pan 4*b*. Specifically, the knockout plate 4*b*3 is provided on the inner wall surface 4*b*2 of a front side (the second side in the width direction of the engine block 400) of the oil pan 4*b*. The knockout plate 4*b*3 projects from the inner wall surface 4*b*2 of the oil pan 4*b***.

As shown in FIG. 33, the knockout plate **4*b*3 extends away (rearward) from the inner wall surface 4*b*2. In the present example embodiment, the knockout plate 4*b*3 extends in a horizontal direction, but may gradually incline downward from the inner wall surface 4*b*2. As shown in FIG. 36, the knockout plate 4*b*3 is provided across an entire length of a depth direction perpendicular to the width direction of the engine block 400. Thus, it is possible to enhance a strength of the oil pan 4***b*.

As shown in FIG. 33, the knockout plate 4*b*3 is provided at an upper portion of the inner wall surface 4*b*2 of the oil pan 4*b*. An upper surface of the knockout plate 4*b*3 is located to be lower (slightly lower) than a lower end of the inner lower surface 402 of the oblique portion 401. The oil having flown along the inner lower surface 402 of the oblique portion 401 temporarily flows down onto the upper surface of the knockout plate 4*b*3, and then flows down from the knockout plate 4*b*3 toward the inner lower surface 4*b*1 of the oil pan 4*b*. Thus, it is possible to reduce, via the knockout plate 4*b*3, a force (speed) of the oil flowing down along the oblique portion 401 toward the oil pan 4*b*. It is possible to cause the oil flowing down along the oblique portion 401 toward the oil pan 4*b* to flow down after dispersing the oil in the depth direction of the engine block 400.

Figure 32:
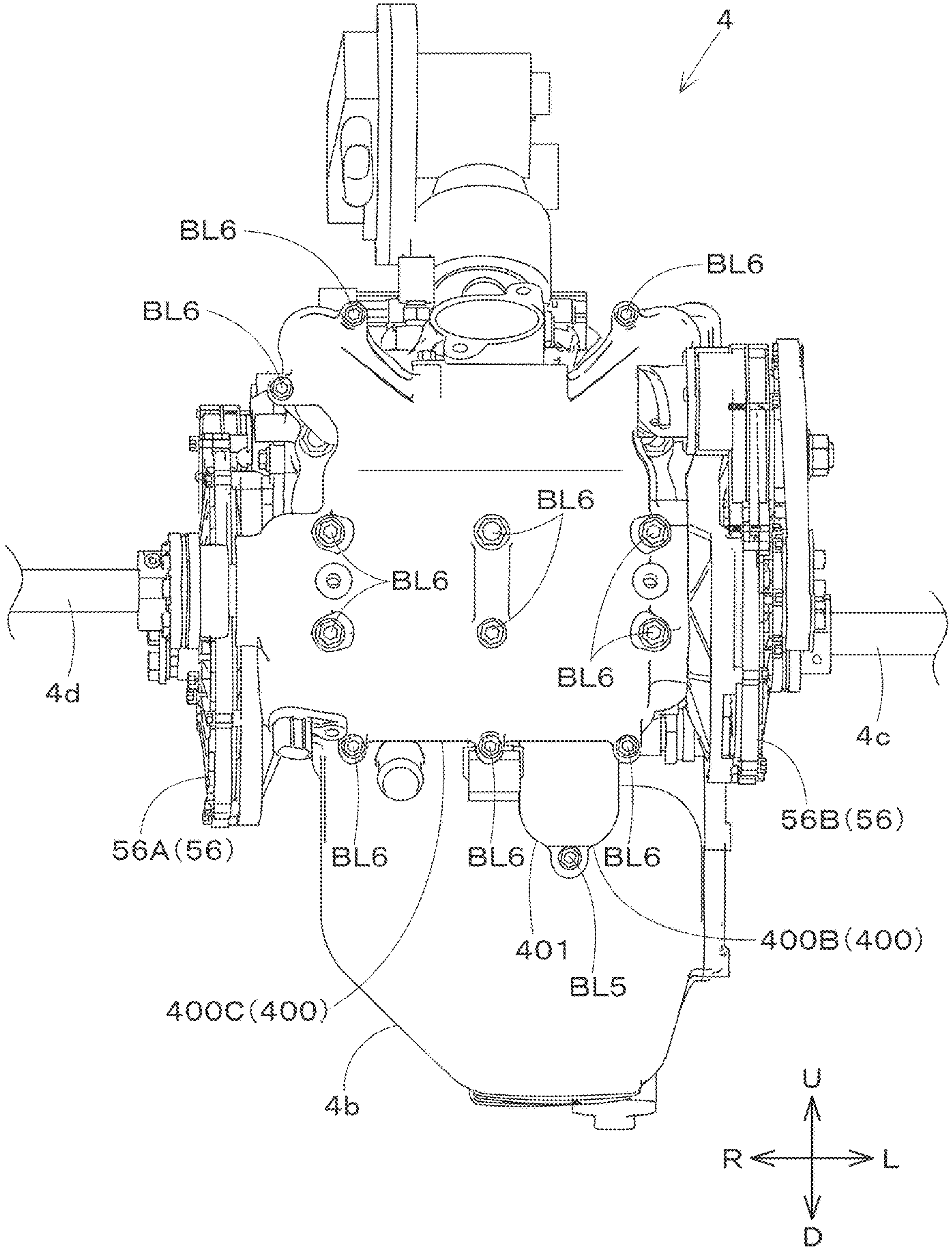
FIG. 32 is a front view of an engine.

As shown in FIGS. 32, 35 and 36, the oblique portion 401 is provided only at a portion in the depth direction (left-right direction) of the engine block 400. Specifically, the oblique portion 401 is provided at one-side (left side) portion of the engine block 400 in the depth direction thereof which is perpendicular to the width direction thereof. That is, in the present example embodiment, the oblique portion 401 is provided at a left portion of the engine block 400.

In the depth (left-right) direction of the engine block 400, a width W1 (see FIG. 35) of the oblique portion 401 is less than an entire width of the engine block 400. As shown in FIGS. 32 and 36, the oblique portion 401 has a cross-sectional U-shape. Thus, the inner lower surface 402 of the oblique portion 401 is lower than the inner lower surface of a portion of the second block 400B which does not include the oblique portion 401.

Thus, since the oblique portion 401 has a cross-sectional U-shape in a narrow width, it is possible to cause the oil accumulated in the inner portion of the oblique portion 401 to flow rapidly and surely toward the oil pan 4*b*. It is also possible to reduce a size of the engine block 400 compared to a case where the oblique portion 401 is provided across an entire length in the depth direction of the engine block 400.

The previous example embodiment describes a case where an opposed-piston engine includes the configuration of the engine block 400 with an oil pan 4*b* provided only on one-side portion thereof between one-side and another-side portions mutually opposite in the width direction thereof. However, it is possible to use an engine other than an opposed-piston engine as an engine including the configuration of the engine block 400 with an oil pan 4*b* provided only on one-side portion thereof between one-side and another-side portions mutually opposite in the width direction thereof.

Figure 37:
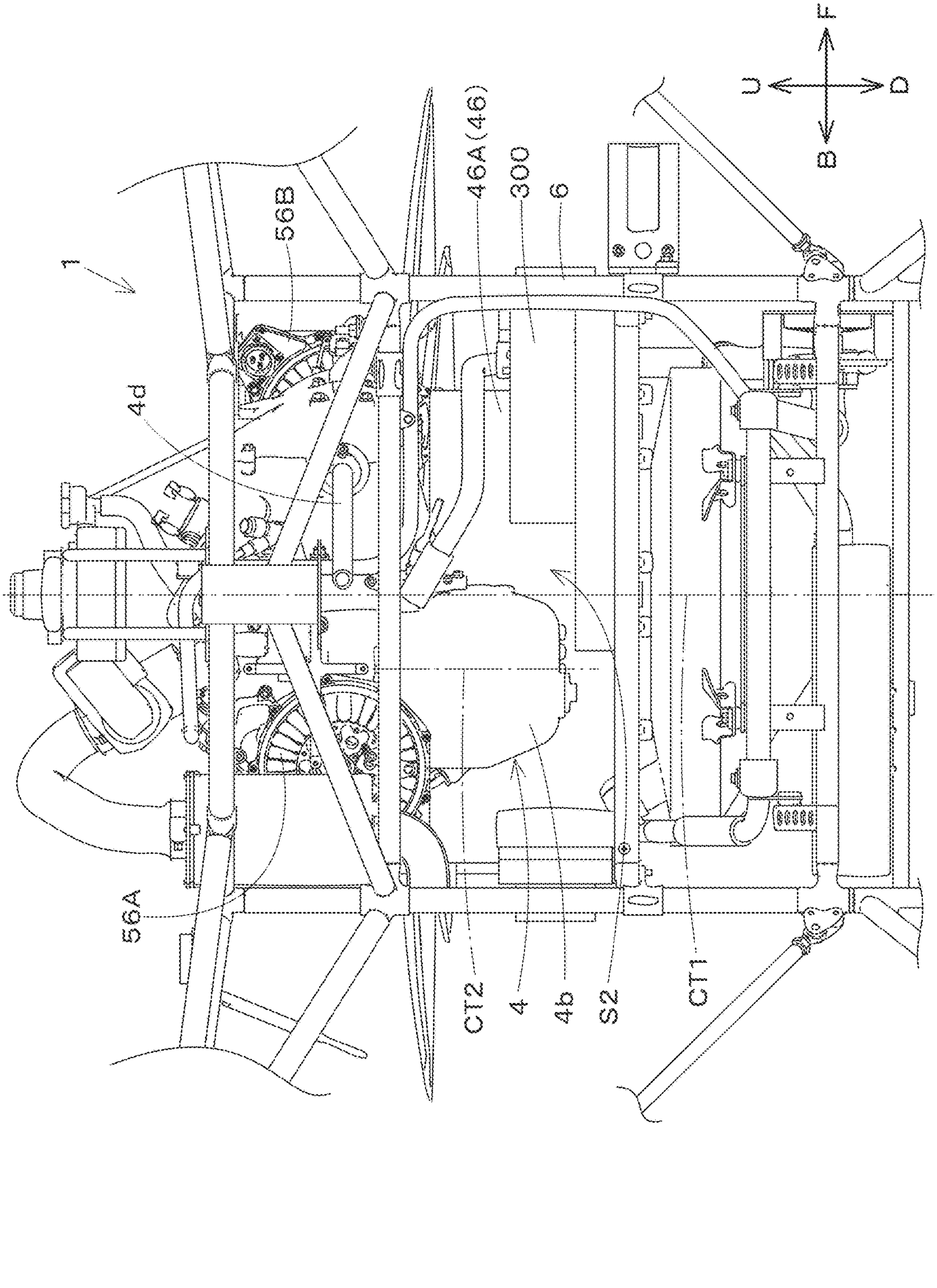
FIG. 37 is a right side view of an enlarged portion of a flying apparatus according to the first example embodiment.

As shown in FIGS. 19 and 37, at least one of the batteries 46 (the first battery 46A and the second battery 46B) is located on at least one side of the oil pan 4*b*. The two batteries 46 are respectively provided on one side (left side) and on another side (right side) of the oil pan 4*b*. In FIG. 37, only the battery (first battery 46A) provided on the one side (left side) of the oil pan 4*b* is illustrated. In FIG. 37, the radiators 40 and the baffles 44 are omitted.

As shown in FIGS. 19 and 37, the batteries 46 overlap the oil pan 4*b* when viewed in the up-down direction. That is, a lower end of the oil pan 4*b* is lower than upper ends of the batteries 46 and higher than lower ends of the batteries 46.

As shown in FIG. 37, an electrical component 300 different from the electrical components 35 previously described is located in the main body assembly 6 of the flying apparatus 1. In the present example embodiment, the electrical component 300 is a battery controller configured or programmed to control the batteries 46. The battery controller performs, for example, control of electrical current and voltage during charge of the batteries 46. However, the electrical component 300 is not limited to a battery controller and may be, for example, a controller configured or programmed to control a driving of the engine 4, or a controller configured or programmed to control a driving of the motor 5. The electrical component 300 may also be one or more pieces of electrical equipment other than a controller.

As shown in FIG. 37, the electrical component (battery controller) 300 is provided below the engine 4 and on the second side in the width direction (front side) of the engine block 400 (below a front portion of the engine 4). The electrical component 300 overlaps the oil pan 4*b* when viewed in the up-down direction. That is, an upper end of the electrical component 300 is higher than the lower end of the oil pan 4*b*, and lower than an upper end of the oil pan 4*b*.

As previously described, the engine 4 includes the oil pan 4*b* only on the width-directional first-side portion of the engine block 400 between the width-directional first-side and second-side portions thereof. Thus, a space S2 is created below the width-directional second-side portion of the engine block 400 (on which the oil pan 4*b* is not provided), and the electrical component 300 is located in the space S2. Accordingly, since the engine 4 includes the oil pan 4*b* that is only provided on the width-directional first-side portion of the engine block 400, it is possible to ensure a space below the width-directional second-side portion of the engine block 400 to provide the electrical component 300 therein.

As shown in FIG. 37, the oil pan 4*b* of the engine 4 offset to one side (rear side) in a horizontal direction from an up-down directed central axis CT1 of the main body assembly 6 with the engine 4 mounted thereon or therein. That is, in the engine 4, an up-down directed central axis CT2 of the oil pan 4*b* is decentered relative to the up-down directed central axis CT1 of the main body assembly 6. Thus, it is possible to ensure, in an internal space of the main body assembly 6 below the width-directional second-side portion of the engine block 400, a space S2 that is wide in a horizontal direction, and it becomes possible to easily provide piece(s) of equipment including the electrical component 300 in the space S2.

Figure 24:
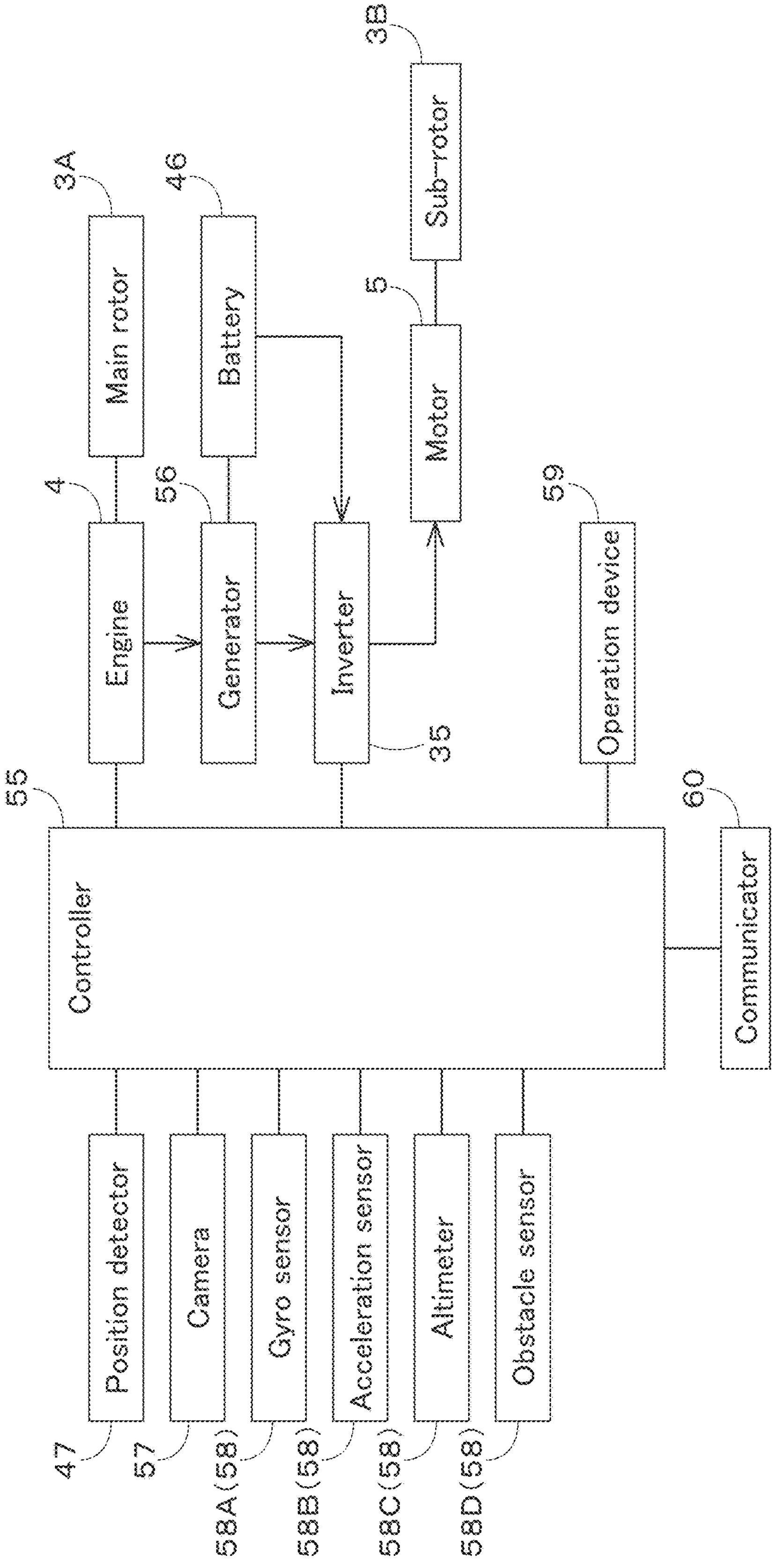
FIG. 24 is a block diagram illustrating a configuration of a flying apparatus according to an example embodiment (first example embodiment and second example embodiment) of the present invention.

FIG. 24 is a block diagram illustrating a configuration of the flying apparatus 1. As shown in FIG. 24, the flying apparatus 1 includes a controller 55. The controller 55 is configured or programmed to control driving of the engine 4 and of the motors 5. The controller 55 is provided at the middle section 8C of the framed main body 8 (see FIGS. 18 and 19). The controller 55 includes a computer including CPU(s) and/or the like, and a storage including RAM(s), ROM(s) and/or the like. The driving of the engine 4 is controlled by a control signal transmitted from the controller 55. Generators 56 are driven via a driving force from the engine 4 to generate electric power. The generators 56 include the previously-described first generator 56A and second generator 56B. Electric power generated from the first generator 56A is stored into one of the first battery 46A and the second battery 46B. Electric power generated from the second generator 56B is stored into the other of the first battery 46A and the second battery 46B.

The inverters 35 convert the electric power supplied from the generators 56 or the batteries 46 into a predetermined frequency, and supply the converted electric power to a driver of the motors 5. The driver of the motors 5 uses the electric power supplied from the inverters 35, and controls the motors 5 based on the control signal sent from the controller 55.

The flying apparatus 1 includes position detectors 47, a camera 57 and sensors 58. The position detectors 47 each include a GNSS sensor such as a GPS sensor, a compass and/or the like. The camera 57 acquires image information of surroundings of the flying apparatus 1. The sensors 58 include a gyro sensor 58A, an acceleration sensor 58B, an altimeter 58C, an obstacle sensor 58D and/or the like. The controller 55 is configured or programmed to control the driving of the engine 4 and the driving of the motors 5 based on information inputted via the position detector 47, the camera 57, the sensors 58 and an operation device 59.

The operation device 59 transmits, via wireless or wired communication, pieces of information (instructions) related to control of the flying apparatus 1. The controller 55 receives, via a communicator 60, the pieces of information transmitted from the operation device 59. A user of the flying apparatus 1 can control a position, a height, a movement speed, a movement direction, a posture and/or the like of the flying apparatus 1 by operating the operation device 59 from a remote location.

The flying apparatus 1 can float in the air via the lifting power generated by the rotations of the main rotors 3A. The flying apparatus 1 can change a posture thereof via the rotations of the sub-rotors 3B. The flying apparatus 1 can change the posture thereof by individually controlling respective numbers of rotations of the plurality of sub-rotors 3B. For example, when the numbers of rotations of the third sub-rotor 3B3 and the fourth sub-rotor 3B4 are made higher than the numbers of rotations of the first sub-rotors 3B1 and the second sub-rotors 3B2, the flying apparatus 1 has an inclined posture with a front portion thereof lower than a rear portion thereof. By rotating the main rotors 3A and the sub-rotors 3B in this state, the flying apparatus 1 move forward.

The motors 5 are respectively provided correspondingly to the plurality of sub-rotors 3B. That is, one motor 5 is provided correspondingly to one sub-rotor 3B. Specifically, the motors 5 (first motor 5A and second motor 5B) are respectively provided correspondingly to two rotors (upper rotor 3BU and lower rotor 3BL) defining the first sub-rotor 3B1. The motors 5 (first motor 5A and second motor 5B) are respectively provided correspondingly to two rotors (upper rotor 3BU and lower rotor 3BL) defining the second sub-rotor 3B2. The motors 5 (first motor 5A and second motor 5B) are respectively provided correspondingly to two rotors (upper rotor 3BU and lower rotor 3BL) defining the third sub-rotor 3B3. The motors 5 (first motor 5A and second motor 5B) are respectively provided correspondingly to two rotors (upper rotor 3BU and lower rotor 3BL) defining the fourth sub-rotor 3B4.

The controller 55 can individually control the respective motors 5. The controller 55 can individually change the number of rotations (rotation speed) of the first motor 5A and the number of rotations (rotation speed) of the second motor 5B. By causing the number of rotations of the first motor 5A and the number of rotations of the second motor 5B to be different from each other, a difference in the number of rotations between the first rotor (upper rotor) 3BU and the second rotor (lower rotor) 3BL can be created to control the posture of the flying apparatus 1. With the posture of the flying apparatus 1 controllable, it is possible to improve a straight-flying stability thereof.

The controller 55 may be configured or programmed to individually change a rotation direction of the first motor 5A and a rotation direction of the second motor 5B. By individually changing the rotation direction of the first motor 5A and the rotation direction of the second motor 5B, it is possible to set the rotation direction of the first rotor (upper rotor) 3BU and of the second rotor (lower rotor) 3BL to be the same, or to be different.

The following describes a concrete configuration of the main body assembly 6 with reference to FIG. 15. The main body assembly 6 includes a plurality of linear frame members 100, and couplings 200 to connect the frame members 100 together. The frame members 100 include first to twenty-sixth frame members 101 to 126. The couplings 200 include first to twenty-sixth couplings 201 to 226. For convenience in the illustration, in FIG. 15, "100" is only indicated for the first frame member 101 and "200" is only indicated for the first coupling 201.

The framed main body 8 of the main body assembly 6 includes a plurality of frame members 100 assembled together by the couplings 200 into a three-dimensional shape (rectangular parallelepiped shape). The frame members 100 include cylindrical pipes. Thus, since it is possible to reduce a weight of the frame members 100 while ensuring a strength thereof, it is possible to define a high-strength and light-weight framed main body 8.

The frame members 100 can be made of metal or resin, for example. In the case where the frame members 100 are made of metal, the frame members 100 can be made of an aluminum alloy, a titanium alloy, and/or the like, for example. In the present example embodiment, the frame members 100 are made of a magnesium alloy. Thus, it is possible to improve a strength of the frame members 100 while reducing the weight of the frame members 100.

The frame members 100 defining the framed main body 8 include horizontal frame members 100A each extending in a horizontal direction, and vertical frame members 100B each extending in an up-down direction. The horizontal frame members 100A include an upper-section frame 100C, a first middle-section frame 100D, a second middle-section frame 100E, and a lower-section frame 100F. The upper-section frame 100C, first middle-section frame 100D, second middle-section frame 100E, and lower-section frame 100F are aligned in this order from the upper portion of the framed main body 8 to the lower portion of the framed main body 8.

The upper section 8B of the framed main body 8 is provided between the upper-section frame 100C and the first middle-section frame 100D. The engine 4 and the like are provided in the upper section 8B. The middle section 8C of the framed main body 8 is provided between the first middle-section frame 100D and the second middle-section frame 100E. The batteries 46, the controller 55 and the like are provided in the middle section 8C. The lower section 8D of the framed main body 8 is provided between the second middle-section frame 100E and the lower-section frame 100F. The fuel tank 50 and the like are provided in the lower section 8D.

The engine main body 4*a* of the engine 4 is provided in the upper section 8B. The oil pan 4*b* of the engine 4 is provided in the middle section 8C. That is, the engine 4 is provided across the upper section 8B and the middle section 8C. The pump 66 is provided in the lower section 8D. Specifically, the upper portion of the pump 66 is provided in the lower section 8D, and the lower portion of the pump 66 is provided below the lower section 8D.

The radiators 40 are provided at a height corresponding to the lower section 8D (see FIGS. 18 and 19). However, the radiators 40 are provided at the exterior of the framed main body 8 and not inside the framed main body 8. A sub-tank (reservoir tank) 65 of the radiators 40 is provided in the upper section 8B of the framed main body 8 (see FIGS. 18 and 19).

The projecting frames 9 (the first projecting frame 9A and the second projecting frame 9B) are provided at a height corresponding to the upper section 8B. The arms 7 (first arm 7A, second arm 7B, third arm 7C and fourth arm 7D) are provided at a height corresponding to the upper section 8B. Thus, components supporting the rotors 3 (main rotors 3A and sub rotors 3B) are provided at a height corresponding to the upper section 8B.

The first output shaft 4*c* and the second output shaft 4*d* to supply power to the main rotors 3A are also provided at a height corresponding to the upper section 8B. The second motor 5B of the motors 5 to supply power to the sub-rotor 3B is provided at a height corresponding to the upper section 8B. The first motor 5A is located at a position higher than the height corresponding to the upper section 8B. Thus, components transmitting (supplying) power to the rotors 3 (the main rotors 3A and the sub rotors 3B) are located at positions higher than the height corresponding to the upper section 8B.

The horizontal frame members 100A include first to fourteenth frame members 101 to 114. The upper-section frame 100C includes the first frame member 101, the second frame member 102, the third frame member 103 and the fourth frame member 104. The first frame member 101 extends in the front-rear direction at a left portion of the framed main body 8. The second frame member 102 extends in the front-rear direction at a right portion of the framed main body 8. The third frame member 103 extends in the left-right direction at a front portion of the framed main body 8. The fourth frame member 104 extends in the left-right direction at a rear portion of the framed main body 8.

The first frame member 101 and the third frame member 103 are connected via the first coupling 201. The first frame member 101 and the fourth frame member 104 are connected via a second coupling 202. The second frame member 102 and the third frame 103 are connected via a third coupling 203. The second frame member 102 and the fourth frame member 104 are connected via a fourth coupling 204. Thus, the first frame member 101, the second frame member 102, the third frame member 103 and the fourth frame member 104 are assembled to form a parallelepiped shape in a planar view.

The first coupling 201 is located at the proximal end (proximal end 9*b*) in the projecting direction of the first projecting frame 9A and at one of the proximal ends 7*a* of the first arm 7A, see FIG. 1. The second coupling 202 is located at the proximal end (proximal end 9*b*) in the projecting direction of the first projecting frame 9A and at one of the proximal ends 7*a* of the third arm 7C. The third coupling 203 is located at the proximal end (proximal end 9*b*) in the projecting direction of the second projecting frame 9B and at one of the proximal ends 7*a* of the second arm 7B, see FIG. 1. The fourth coupling 204 is located at the proximal end (proximal end 9*b*) in the projecting direction of the second projecting frame 9B and at one of the proximal ends 7*a* of the fourth arm 7D.

The first middle-section frame 100D includes a fifth frame member 105, a sixth frame member 106, a seventh frame member 107 and an eighth frame member 108. The fifth frame member extends in the front-rear direction below the first frame member 101. The sixth frame member 106 extends in the front-rear direction below the second frame member 102. The seventh frame member 107 extends in a left-to-right rearward oblique direction at the front portion of the framed main body 8. The eighth frame member 108 extends in a left-to-right rearward oblique direction at the rear portion of the framed main body 8. The seventh frame member 107 and the eighth frame member 108 are parallel or substantially parallel to each other.

A left end of the seventh frame member 107 is connected to the fifth frame member 105 via a fifth coupling 205. A right end of the seventh frame member 107 is connected to the sixth frame member 106 via a sixth coupling 206. A left end of the eighth frame member 108 is connected to the fifth frame member 105 via a seventh coupling 207. A right end of the eighth frame member 108 is connected to the sixth frame member 106 via an eighth coupling 208. Thus, the fifth frame member 105, the sixth frame member 106, the seventh frame member 107 and the eighth frame member 108 are assembled to substantially form a parallelogram in a planar view.

The second middle-section frame 100E includes a ninth frame member 109 and a tenth frame member 110. The ninth frame member 109 extends in the left-right direction below the third frame member 103. The tenth frame member 110 extends in the left-right direction below the fourth frame member 104.

The lower-section frame 100F includes an eleventh frame member 111, a twelfth frame member 112, a thirteenth frame member 113 and a fourteenth frame member 114. The eleventh frame member 111 extends in the front-rear direction below the fifth frame member 105. The twelfth frame member 112 extends in the front-rear direction below the sixth frame member 106. The thirteenth frame member 113 extends in the left-right direction below the ninth frame member 109. The fourteenth frame member 114 extends in the left-right direction below the tenth frame member 110.

The vertical frame members 100B include frame members from a fifteenth frame member 115 to an eighteenth frame member 118. The fifteenth frame member 115 extends in the up-down direction at a front-left portion of the framed main body 8. The sixteenth frame member 116 extends in the up-down direction at a front-right portion of the framed main body 8. The seventeenth frame member 117 extends in the up-down direction at a rear-left portion of the framed main body 8. The eighteenth frame member 118 extends in the up-down direction at a rear-right portion of the framed main body 8.

An upper end of the fifteenth frame member 115 is connected to the first frame member 101 and the third frame member 103 via the first coupling 201. A lower end of the fifteenth frame member 115 is connected to the eleventh frame member 111 and the thirteenth frame member 113 via a thirteenth coupling 213. An upper end of the sixteenth frame member 116 is connected to the second frame member 102 and the third frame member 103 via the third coupling 203. A lower end of the sixteenth frame member 116 is connected to the twelfth frame member 112 and the thirteenth frame member 113 via a fourteenth coupling 214.

An upper end of the seventeenth frame member 117 is connected to the first frame member 101 and the fourth frame member 104 via the second coupling 202. A lower end of the seventeenth frame member 117 is connected to the eleventh frame member 111 and the fourteenth frame member 114 via a fifteenth coupling 215. An upper end of the eighteenth frame member 118 is connected to the second frame member 102 and the fourth frame member 104 via a fourth coupling 204. A lower portion of the eighteenth frame member 118 is connected to the twelfth frame member 112 and the fourteenth frame member 114 via a sixteenth coupling 216.

The thirteenth coupling 213, the fourteenth coupling 214, the fifteenth coupling 215 and the sixteenth coupling 216 each include a joint 130 to which the first end 31*a* (see FIG. 10) of the connector 31 (first support 31A) to connect the arm 7 to the main body assembly 6 is connected. The joint 130 is provided on each of four lower corners of the framed main body 8. Thus, the first end 31*a* of the connector 31 (first support 31A) is connected to the four lower corners of the framed main body 8.

A left end of the ninth frame member 109 is connected to a vertically intermediate portion of the fifteenth frame member 115 via a ninth coupling 209. A right-end of the ninth frame member 109 is connected to a vertically intermediate portion of the sixteenth frame member 116 via a tenth coupling 210. A left end of the tenth frame member 110 is connected to a vertically intermediate portion of the seventeenth frame member 117 via an eleventh coupling 211. A right end of the tenth frame member 110 is connected to a vertically intermediate portion of the eighteenth frame member 118 via a twelfth coupling 212.

A front end of the fifth frame member 105 is connected to a vertically intermediate portion of the fifteenth frame member 115 via a fifth coupling 205. A rear end of the fifth frame member 105 is connected to a vertically intermediate portion of the seventeenth frame member 117 via an eighteenth coupling 218. A front end of the sixth frame member 106 is connected to a vertically intermediate portion of the sixteenth frame member 116 via a seventeenth coupling 217. A rear end of the sixth frame member 106 is connected to a vertically intermediate portion of the eighteenth frame member 18 via the eighth coupling 208. A left end of the seventh frame member 107 is connected to a vertically intermediate portion of the fifteenth frame member 15 via the fifth coupling 205. A right end of the eighth frame member 108 is connected to a vertically intermediate portion of the eighteenth frame member 118 via the eighth coupling 208.

A proximal end of the second support 31B to support the first arm 7A is also connected to the fifth coupling 205. That is, the second support 31B to support the first arm 7A is connected to the framed main body 8 via the fifth coupling 205. A proximal end of the second support 31B to support the fourth arm 7D is also connected to the eighth coupling 208. That is, the second support 31B to support the fourth arm 7D is connected to the framed main body 8 via the eighth coupling 208.

A proximal end of the second support 31B to support the second arm 7B is also connected to the seventeenth coupling 217. That is, the support 31B to support the second arm 7B is connected to the framed main body 8 via the seventeenth coupling 217. A proximal end of the second support 31B to support the third arm 7C is also connected to the eighteenth coupling 218. That is, the second support 31B to support the third arm 7C is connected to the framed main body 8 via the eighteenth coupling 218.

A top portion frame 100G is provided at a top portion of the framed main body 8. The top portion frame 100G projects upward from the upper-section frame 100C. The top portion frame 100G includes a first cross member 141 and a second cross member 142. The first cross member 141 and the second cross member 142 are parallel or substantially parallel to each other. The first cross member 141 and the second cross member 142 extend in the left-right direction.

A left end of the first cross member 141 and a left end of the second cross member 142 are connected via a first connection member 143. The first connection member 143 is attached to the first frame member 101. A right end of the first cross member 141 and a right end of the second cross member 142 are connected via a second connection member 144. The second connection member 144 is attached to the second frame member 102. Thus, the top portion frame 100G is attached to the top portion of the framed main body 8. The top-section 8A of the framed main body 8 with the position detector 47 thereon is provided at an upper portion of the top portion frame 100G.

The projecting frames 9 each include a plurality of linear frame members 100. The frame members 100 of the projecting frames 9 (nineteenth frame member 119 to twenty-sixth frame member 126) are connected to frame members 100 (first to eighth frame members 101 to 108, and fifteenth frame member 115 to eighteenth frame member 118) defining the framed main body 8 via couplings 200 (first to fourth couplings 201 to 204).

The first projecting frame 9A includes frame members of a nineteenth frame member 119 to a twenty-second frame member 122. The nineteenth frame member 119 is connected to the first coupling 201, and extends leftwardly rearward from the first coupling 201. A twentieth frame member 120 is connected to the fifth coupling 205, and extends leftwardly rearward from the fifth coupling 205. The nineteenth frame member 119 and the twentieth frame member 120 are spaced from each other in the up-down direction. The nineteenth frame member 119 extends in the horizontal direction. The twentieth frame member 120 extends to gradually incline upward in a direction away from the framed main body 8. Thus, the space in the up-down direction between the nineteenth frame member 119 and the twentieth frame member 120 decreases in the direction away from the framed main body 8.

A twenty-first frame member 121 is connected to the second coupling 202, and extends leftwardly forward from the second coupling 202. The twenty-second frame member 122 is connected to the eighteenth coupling 218, and extends leftwardly forward from the eighteenth coupling 218. The twenty-first frame member 121 and the twenty-second frame member 122 are spaced from each other in the up-down direction. The twenty-first frame member 121 extends in the horizontal direction. The twenty-second frame member 122 extends to gradually incline upward in a direction away from the framed main body 8. Thus, the space in the up-down direction between the twenty-first frame member 121 and the twenty-second frame member 122 decreases in the direction away from the framed main body 8.

The nineteenth frame member 119 and the twenty-first frame member 121 approach each other in a direction away from the framed main body 8. The twentieth frame member 120 and the twenty-second frame member 122 approach each other in a direction away from the framed main body 8. A left end of the nineteenth frame member 119 and a left end of the twenty-first frame member 121 are connected to an upper portion of the first connector 145. A left end of the twentieth frame member 120 and a left end of a twenty-second frame member 122 are connected to a lower portion of the first connector 145. The first connector 145 is a tubular member extending in the up-down direction. The first connector 145 is provided at the corner 9*a* of the first projecting frame 9A (see FIG. 1). The first main rotor 3A1 is attached to the first connector 145 (see FIG. 2).

In a planar view, the first frame member 101, the nineteenth frame member 119 and the twenty-first frame member 121 form a triangle. In a planar view, the fifth frame member 105, the twentieth frame member 120 and the twenty-second frame member 122 form a triangle. The triangle formed by the first frame member 101, the nineteenth frame member 119 and the twenty-first frame member 121, and the triangle formed by the fifth frame member 105, the twentieth frame member 120 and the twenty-second frame member 122 overlap each other in the up-down direction, and are connected to each other via the fifteenth frame member 115 and the seventeenth frame member 117.

The second projecting frame 9B includes frame members of a twenty-third frame member 123 to a twenty-sixth frame member 126. The twenty-third frame member 123 is connected to the third coupling 203, and extends rightwardly rearward from the third coupling to a rear-right side. A twenty-fourth frame member 124 is connected to the seventeenth coupling 217, and extends rightwardly rearward from the seventeenth coupling 217. The twenty-third frame member 123 and the twenty-fourth frame member 124 are spaced from each other in the up-down direction. The twenty-third frame member 123 extends in the horizontal direction. The twenty-fourth frame member 124 extends to gradually incline upward in a direction away from the framed main body 8. Thus, the space in the up-down direction between the twenty-third frame member 123 and the twenty-fourth frame member 124 decreases in the direction away from the framed main body 8.

The twenty-fifth frame member 125 is connected to the fourth coupling 204, and extends rightwardly-forward from the fourth coupling 204. The twenty-sixth frame member 126 is connected to the eighth coupling 208, and extends rightwardly-forward from the eighth coupling 208. The twenty-fifth frame member 125 and the twenty-sixth frame member 126 are spaced from each other in the up-down direction. The twenty-fifth frame member 125 extends in the horizontal direction. The twenty-sixth frame member 126 extends to gradually incline upward in a direction away from the framed main body 8. Thus, the space in the up-down direction between the twenty-fifth frame member 125 and the twenty-sixth frame member 126 decreases in the direction away from the framed main body 8.

The twenty-third frame member 123 and the twenty-fifth frame member 125 approach each other in the direction away from the framed main body 8. The twenty-fourth frame member 124 and the twenty-sixth frame member 126 approach each other in the direction away from the framed main body 8. A left end of the twenty-third frame member 123 and a left end of the twenty-fifth frame member 125 are connected to an upper portion of a second connector 146. A left end of the twenty-fourth frame member 124 and a left end of the twenty-sixth frame member 126 are connected to a lower portion of the second connector 146. The second connector 146 is a tubular member extending in the up-down direction. The second connector 146 is provided at the corner 9*a* of the second projecting frame 9B (see FIG. 1). The second main rotor 3A2 is attached to the second connector 146 (see FIG. 2).

In a planar view, the second frame member 102, the twenty-third frame member 123 and the twenty-fifth frame member 125 form a triangle. In a planar view the sixth frame member 106, the twenty-fourth frame member 124 and the twenty-sixth frame member 126 form a triangle. The triangle formed by the second frame member 102, the twenty-third frame member 123 and the twenty-fifth frame member 125, and the triangle formed by the sixth frame member 106, the twenty-fourth frame member 124 and the twenty-sixth frame member 126 overlap each other when viewed in the up-down direction, and are connected to each other via the sixteenth frame member 116 and the eighteenth frame member 118.

As shown in FIG. 15, a plurality (two) of linear rods 12 defining the arm 7 are connected to the frame members 100 via couplings 200. Specifically, the plurality of rods (first rods 12A) defining the arm 7 are connected to the frame members 100 defining the projecting frame 9 via couplings 200. Each of the plurality of rods (first rods 12A) arranged in the horizontal direction is connected to the one or more frame members 100 via the corresponding coupling 200.

The first rods 12A defining the first section 71 of the first arm 7A are connected, via the first coupling 201 and the nineteenth coupling 219, to the nineteenth frame member 119 defining the first projecting frame 9A. One of the two first rods 12A is also connected, via the first coupling 201, to the first frame member 101 and the seventh frame member 107 defining the framed main body 8.

The first rods 12A defining the first section 71 of the second arm 7B are connected, via the third coupling 203 and the twentieth coupling 220, to the twenty-third frame member 123 defining the second projecting frame 9B. One of the two first rods 12A is also connected, via the third coupling 203, to the second frame member 102 and the seventh frame member 107 defining the framed main body 8.

The first rods 12A defining the first section 71 of the third arm 7C are connected, via the second coupling 202 and the twenty-first coupling 221, to the twenty-first frame member 121 defining the first projecting frame 9A. One of the two first rods 12A is also connected, via the second coupling 202, to the first frame member 101 and the fourth frame member 104 defining the framed main body 8.

The first rods 12A defining the first section 71 of the fourth arm 7D are connected, via the fourth coupling 204 and the twenty-second coupling 222, to the twenty-fifth frame member 125 defining the second projecting frame 9B. One of the two first rods 12A is also connected, via the fourth coupling 204, to the second frame member 102 and the fourth frame member 104 defining the framed main body 8.

As shown in FIGS. 20 and 21, the skid 10 include a plurality of linear frame members 100 and couplings 200 to connect the frame members 100 together. For convenience in the illustration, in FIG. 20, "100" is only indicated for a first main frame member 151 of the plurality of frame members 100 defining the skid 10, and "200" is only indicated for the twenty-third coupling 223 of the couplings 200 defining the skid 10.

The frame members 100 include main frame members 150 and sub-frame members 160. The main frame members 150 include a first main frame member 151, a second main frame member 152, a third main frame member 153 and a fourth main frame member 154. An upper end of the first main frame member 151 is connected to the thirteenth coupling 213 via a first junction member 155. A first grounding member 171 (see FIGS. 3 and 5) for grounding is attached to a lower end of the first main frame member 151. An upper end of the second main frame member 152 is connected to the fourteenth coupling 214 via a second junction member 156. A second grounding member 172 (see FIGS. 3 and 6) for grounding is attached to a lower end of the second main frame member 152.

An upper end of the third main frame member 153 is connected to the fifteenth coupling 215 via third junction member 157. A third grounding member 173 (see FIGS. 4 and 5) for grounding is attached to a lower end of the third main frame member 153. An upper end of the fourth main frame member 154 is connected to the sixteenth coupling 216 (see FIG. 15) via a fourth junction member 158 (see FIG. 21). A fourth grounding member 174 (see FIGS. 4 and 6) for grounding is attached to a lower end of the fourth main frame member 154.

The sub-frame members 160 include first to eight sub-frame members 161 to 168. The first sub-frame member 161 and the second sub-frame member 162 intersect at intermediate portions thereof, and are connected to each other at an intersection therebetween via the twenty-third coupling 223. The third sub-frame member 163 and the fourth sub-frame member 164 intersect at intermediate portions thereof, and are connected to each other at an intersection formed thereon via the twenty-fourth coupling 224. The fifth sub-frame member 165 and the sixth sub-frame member intersect at intermediate portions thereof, and are connected to each other at an intersection formed thereon via the twenty-fifth coupling 225. The seventh sub-frame member 167 and the eighth sub-frame member intersect at intermediate portions thereof, and are connected to each other at an intersection therebetween via the twenty-sixth coupling 226.

As shown in FIG. 21, the third sub-frame member 163 and the fourth sub-frame member 164 intersect below the first radiator 40A. In other words, in a bottom view, the third sub-frame member and the fourth sub-frame member 164 overlap the first radiator 40A. Thus, it is possible to prevent collisions of foreign objects from below with the first radiator 40A.

The seventh sub-frame member 167 and the eighth sub-frame member 168 intersect below the second radiator 40B. In other words, in a bottom view, the seventh sub-frame member 167 and the eighth sub-frame member 168 overlap the second radiator 40B. Thus, it is possible to prevent collisions of foreign objects from below with the second radiator 40B.

The first sub-frame member 161 is connected at an upper end thereof to the first junction member 155, and is connected at a lower end thereof to the second main frame member 152. The second sub-frame member 162 is connected at an upper end thereof to the second junction member 156, and is connected at a lower end thereof to the first main frame member 151. The third sub-frame member 163 is connected at an upper end thereof to the third junction member 157, and is connected at a lower end thereof to the first main frame member 151. The fourth sub-frame member 164 is connected at an upper end thereof to the first junction member 155, and is connected at a lower end thereof to the third main frame member 153.

The fifth sub-frame member 165 is connected at an upper end thereof to the fourth junction member 158 (see FIG. 21), and is connected at a lower end thereof to the third main frame member 153. The sixth sub-frame member 166 is at an upper end thereof connected to the third junction member 157, and is connected at a lower end thereof to the fourth main frame member 154. The seventh sub-frame member 167 is connected at an upper end thereof to the second junction member 156, and is connected at a lower end thereof to the fourth main frame member 154. The eighth sub-frame member 168 is connected at an upper end thereof to the fourth junction member 158 (see FIG. 21), and is connected at a lower end thereof to the second main frame member 152.

As shown in FIG. 21, the first junction member 155 and the fourth junction member 158 are connected to each other via a first connection member 175. The second junction member 156 and the third junction member 157 are connected to each other via a second connection member 176. The first connection member 175 and the second connection member 176 intersect and are joined to each other below the fuel tank 50 and the casing 51. Thus, it is possible to prevent collisions of foreign objects from below with the fuel tank 50 and the casing 51.

As shown in FIG. 15, the couplings 200 include a plurality of connection ports 200*a*. In FIG. 15, "200*a*" is only indicated for the connection ports of the thirteenth coupling 213 of the couplings 200, but other couplings also include a plurality of connection ports 200*a*. The number of connection ports 200*a* varies for each coupling. For example, the number of connection ports 200*a* for each of the couplings from the thirteenth coupling 213 to the sixteenth coupling 216 is three, and the number of connection ports 200*a* for each of the first to fourth couplings 201 to 204 is five.

End portions of the frame members 100 are inserted into the connection ports 200*a* of the couplings 200, respectively. With the ends of the frame members 100 inserted into the respective plurality of connection ports 200*a*, the plurality of frame members 100 are connected to one another via the couplings 200. It is preferable for a relation between an inner diameter D of the connection port 200*a* and an insertion length L into the connection port 200*a* to satisfy a formula: $D/10 \leq L$. Thus, it is possible to surely connect the frame members 100 and the couplings 200. It is preferable for the couplings 200 and the frame members 100 to be fixed together via welding or glueing with the ends of the frame members 100 inserted into the connection ports 200*a* of the couplings 200. However, the couplings 200 and the frame members 100 may be separably connected (connected only via insertion) without being fixed via welding or glueing.

The following describes a mounting structure of the engine 4 in the framed main body 8. As shown in FIG. 14, the engine 4 is supported by engine mounts 180 attached to pipes 170 defining the framed main body 8. The pipes 170 define the frame members 100. In other words, the pipes 170 are used as the frame members 100. The engine mounts 180 are attached to the pipes 170 which are provided on sides of the engine 4.

As shown in FIG. 14, the framed main body 8 includes a first pipe 170A provided on one side (front side) of the engine 4, and a second pipe 170B provided on another opposite side (rear side) of the engine 4. The first pipe 170A is the seventh frame member 107, and the second pipe 170B is the eighth frame member 108. The first pipe 170A and the second pipe 170B extend parallel or substantially parallel to each other. In a planar view, the first pipe 170A and the second pipe 170B extend obliquely relative to the line L5 linking a center of the first-side rotor 3A1 and a center of the second-side rotor 3A2 (see FIGS. 1 and 14). In other words, in a planar view, a direction in which the first pipe 170A and the second pipe 170B extend is neither parallel nor perpendicular to a direction in which the line L5 extends. In a planar view, the first pipe 170A and the second pipe 170B extend in parallel with the first output shaft 4*c* and the second output shaft 4*d*.

As shown in FIG. 14, the engine mounts 180 include first engine mounts 180A and second engine mounts 180B. The first engine mounts 180A are attached to the first pipe 170A. The second engine mounts 180B are attached to the second pipe 170B. The engine 4 is supported by the first engine mounts 180A and the second engine mounts 180B. The first engine mounts 180A support a front portion of the engine 4. The second engine mounts 180B support a rear portion of the engine 4.

Two first engine mounts 180A are arranged along the first pipe 170A. Thus, the front portion of the engine 4 is supported by two first engine mounts 180A. Two second engine mounts 180B are arranged along the second pipe 170B. Thus, the rear portion of the engine 4 is supported by two second engine mounts 180B.

As shown in FIGS. 22 and 23, the engine 4 is supported by the framed main body 8 via the engine mounts 180 while suspended from the pipes (the first pipe 170A and the second pipe 170B) provided on sides thereof. That is, a lower portion of the engine 4 floats without being supported by other members. The oil pan 4*b* of the engine 4 is suspended together with the engine main body 4*a* from the pipes (first pipe 170A and second pipe 170B). A portion of the engine 4 is located below the pipes (first pipe 170A and second pipe 170B). Specifically, at least a portion or an entirety of the oil pan 4*b* of the engine 4 is located below the pipes (the first pipe 170A and the second pipe 170B).

The following describes a configuration of the engine mounts 180 based on FIG. 22. FIG. 22 shows the second engine mounts 180B. A configuration of the first engine mount 180A is the same as that of the second engine mount 180B.

Each of the engine mounts 180 includes a first member 181, second members 182 and third members 183. The first member 181 is attached to the engine 4 via one or more fasteners such as bolts BL1. Each of the second members 182 is attached to the pipe 170 (the first pipe 170A). The second members 182 may be attached to the pipe (the first pipe 170A) via welding, glueing or the like, or may be attached via fasteners such as bolts. That is, the second members 182 and the pipe 170 may be undetachably or detachably attached.

Each of the third members 183 connects the first member 181 and a corresponding one of the second members 182. The third members 183 each have a through-hole 183*a* to coincide to a through-hole provided on each of the second members 182. A bolt (not illustrated) is inserted into the through-holes provided on the second member 182 and the third member 183, and a nut (not illustrated) is screwed on the bolt to separably fasten the second member 182 and the third member 183 together.

Bolts BL2 are fixed to the respective third members 183. A head of the bolt BL2 is fixed to the third member 183, and a threaded portion thereof extends upward to project from the first member 181. An elastic body 184 made of rubber and/or the like is fixed to the third member 183, and the head of the bolt BL2 is fixed to the elastic body 184. The threaded portion of the bolt BL2 is inserted through the through-hole of the first member 181, and a nut NT1 is screwed on the threaded portion projecting from the through-hole of the first member 181. Thus, the third member 183 and the second member 182 are joined to each other.

As described above, the first member 181 connected to the engine 4 and the second members 182 connected to the first pipe 170A are connected via the third members 183. Thus, the engine 4 is supported by the first pipe 170A via the first engine mount 180A, and is supported by the second pipe 170B via the second engine mount 180B.

Positions of the engine mounts 180 are adjustable along axial directions of the corresponding ones of the pipes 170. Specifically, the first engine mount 180A is adjustable along an axial direction of the first pipe 170A, and the second engine mount 180B is adjustable along an axial direction of the second pipe 170B.

Adjustment of the position of each of the engine mounts 180 can be made by adjusting (changing) positions where the second members 182 are attached to the corresponding pipe 170. In the case where the second members 182 are detachably attached to the corresponding one of the pipes 177 via bolts and/or the like, positions of the second members 182 can be adjusted by detaching the second members 182 from the corresponding pipe 177, positionally shifting the second members 182, and reattaching the second members 182 to the corresponding pipe 170. In the case where the second member 182 are undetachably attached to the pipes 170 via welding and/or the like, when the engine 4 is mounted in or on the framed main body 8, the second members 182 can be adjusted at positions along the corresponding pipe 170 before attached to the corresponding pipe 170.

It is possible to adjust a position of the engine 4 along the axial directions of the pipes 170 by adjusting the positions of the engine mounts 180 along the axial directions of the pipes 170. Note that the axial directions of the pipes (the first pipe 170A and the second pipe 170B) mentioned here are parallel or substantially parallel to a direction in which the first output shaft 4*c* and the second output shaft 4*d* of the engine 4 extend. Thus, by adjusting the position of the engine 4 along the axial directions of the pipes 170, it is possible to adjust the position of the engine 4 without changing orientation (extending direction) of the first output shaft 4*c* and the second output shaft 4*d*.

As previously described, the engine 4 is attached to the first pipe 170A and the second pipe 170B via the engine mounts 180. However, in addition to the function as members to mount the engine 4, the first pipe 170A and the second pipe 170B have another function to prevent deformation of the framed main body 8 (improve the strength of the framed main body 8).

As shown in FIG. 15, the seventh frame member 107, which is the first pipe 170A, is provided obliquely relative to a direction (front-rear direction) in which the fifth frame member 105 and the sixth frame member 106 extend. The eighth frame member 108, which is the second pipe 170B, is also provided obliquely relative to a direction (front-rear direction) in which the fifth frame member 105 and the sixth frame member 106 extend. Thus, the framed main body 8 is hardly deformable even if a force is applied thereon from the oblique direction (for example, rightwardly rearward or leftwardly forward direction) relative to the framed main body 8.

As shown in FIG. 14, the engine 4 is provided, via the engine mounts 180, to extend across the first pipe 170A and the second pipe 170B. Thus, since the first pipe 170A and the second pipe 170B are connected to the engine 4 which has a high rigidity, it is possible to improve the rigidity of the framed main body 8.

A flying apparatus according a second example embodiment to the present invention will now be described. FIGS. 38 to 54 illustrate a flying apparatus 1 of the second example embodiment. The following mainly describes points regarding the flying apparatus 1 of the second example embodiment which differ from that of the first example embodiment. With the exception of cases where description is necessary, the same signs will be used in the illustrations and description will be omitted for common configurations between the first example embodiment and the second example embodiment.

FIGS. 38 to 43 illustrate an entire configuration of the flying apparatus 1 of the second example embodiment. For convenience of description, the following description refers to a direction indicated by an arrow F as "front", a direction indicated by an arrow B as "rear", a direction indicated by an arrow L as "left", and a direction indicated by an arrow R as "right".

The flying apparatus 1 of the second example embodiment includes a similar basic configuration as the flying apparatus 1 of the first example embodiment. For ease of comprehension, the basic configuration of the flying apparatus 1 of the second example embodiment will be first described. The basic configuration described below is common between the first example embodiment and the second example embodiment.

The flying apparatus 1 of the second example embodiment includes an airframe 2, and a plurality of rotors 3 attached to the airframe 2. The plurality of rotors 3 include one or more main rotors 3A and one or more sub-rotors 3B. The main rotor 3A is rotated by a driving force supplied from an engine 4. The sub-rotor 3B is rotated by a driving force supplied from a motor 5.

The airframe 2 includes a main body assembly 6, and a plurality of arms 7 extending from the main body assembly 6. The one or more main rotors 3A are attached to the main body assembly 6. The one or more sub-rotor 3B are attached to the arm 7. The one or more main rotors 3A include a first-side rotor 3A1 and a second-side rotor 3A2. The one or more sub-rotors 3B include a first sub-rotor 3B1, a second sub-rotor 3B2, a third sub-rotor 3B3 and a fourth sub-rotor 3B4.

Figure 38:
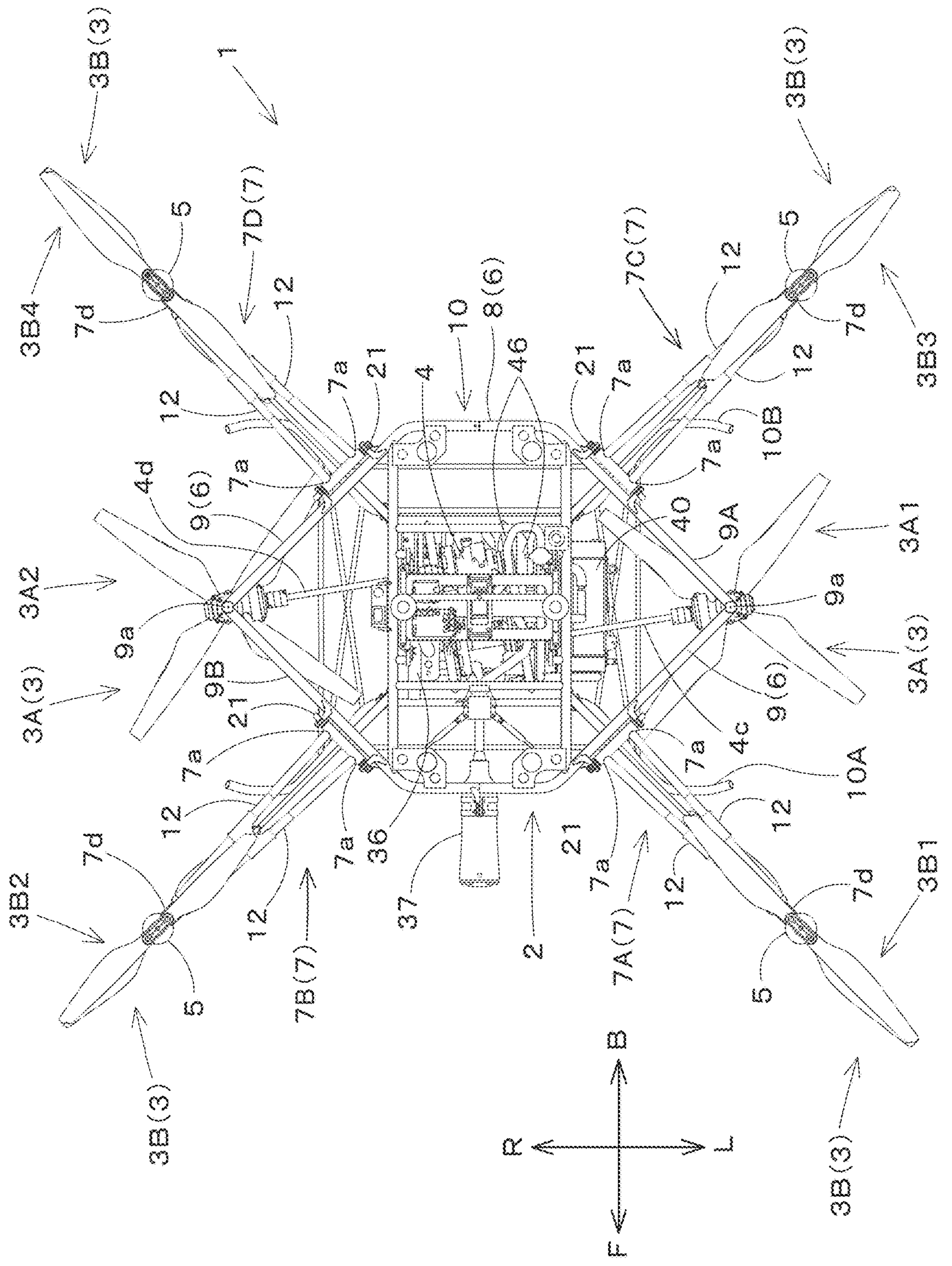
FIG. 38 is a top view of a flying apparatus according to a second example embodiment of the present invention.
Figure 39:
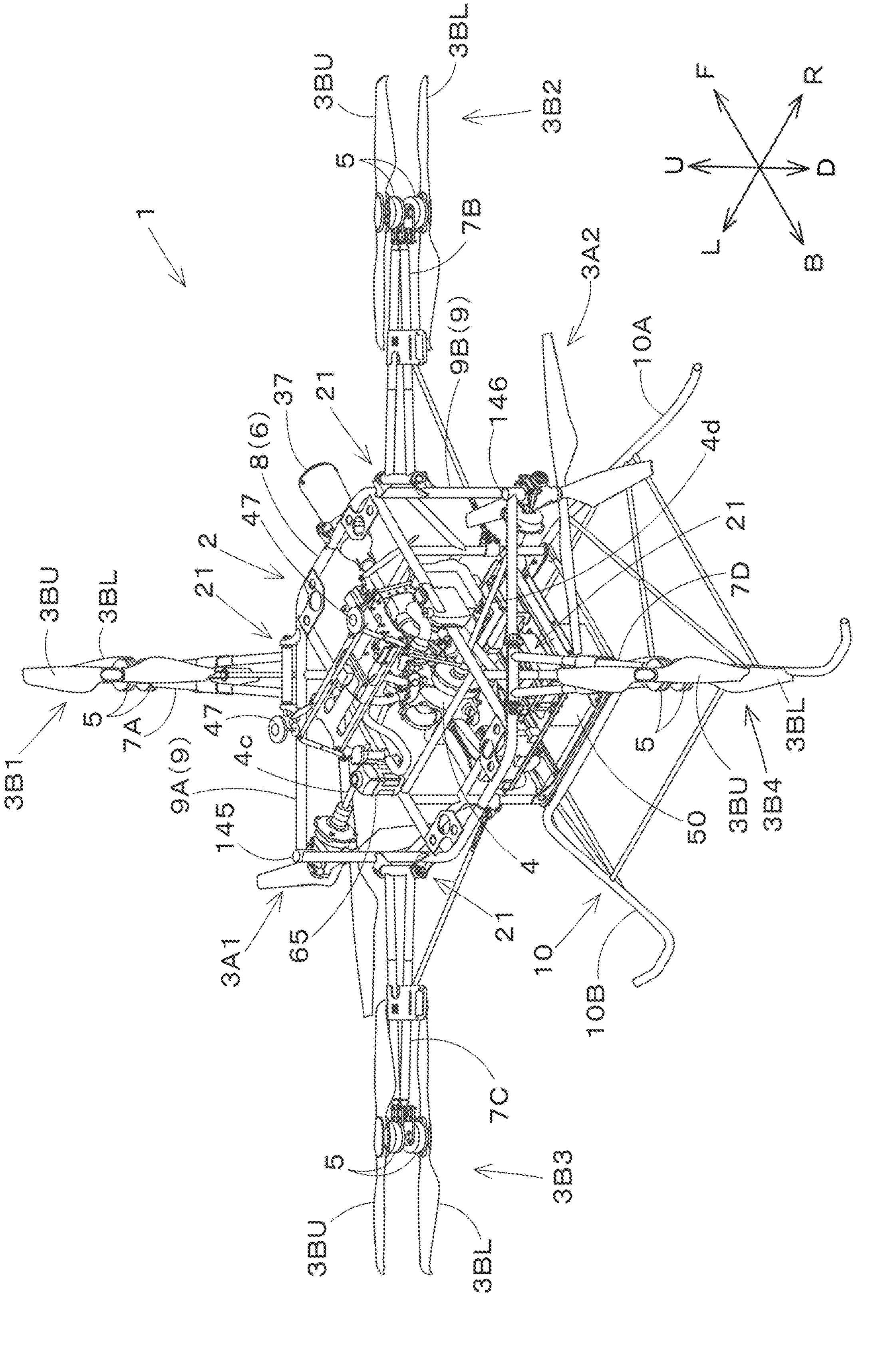
FIG. 39 is a perspective view of a flying apparatus according to the second example embodiment of the present invention.

As shown in FIGS. 38, 39 and/or the like, the main body assembly 6 includes a framed main body 8 and one or more projecting frames 9. A driver 4 to drive the main rotors 3A is provided in or on the framed main body 8. In a planar view, the one or more projecting frames 9 project in directions away from the framed main body 8. The one or more projecting frames 9 project in a horizontal direction. The main rotors 3A are attached to the respective projecting frames 9. The one or more projecting frames 9 include a first projecting frame 9A and a second projecting frame 9B. In a planar view, the first projecting frame 9A and the second projecting frame 9B project in opposite directions from the framed main body 8. The first projecting frame 9A and the second projecting frame 9B extend in opposite directions with the framed main body 8 therebetween.

As shown in FIG. 38, in a planar view, the plurality of arms 7 extend in directions away from the main body assembly 6. The plurality of arms 7 extend radially away from the main body assembly 6. Each of the arms 7 includes a plurality of rods 12 extending juxtaposed. The plurality of rods 12 are juxtaposed in a horizontal direction. At least one of the rotor 3 is supported by the plurality of rods 12. In the present example embodiment, each arm 7 is defined by two rods 12, but may be defined by three or more rods 12.

Figure 44:
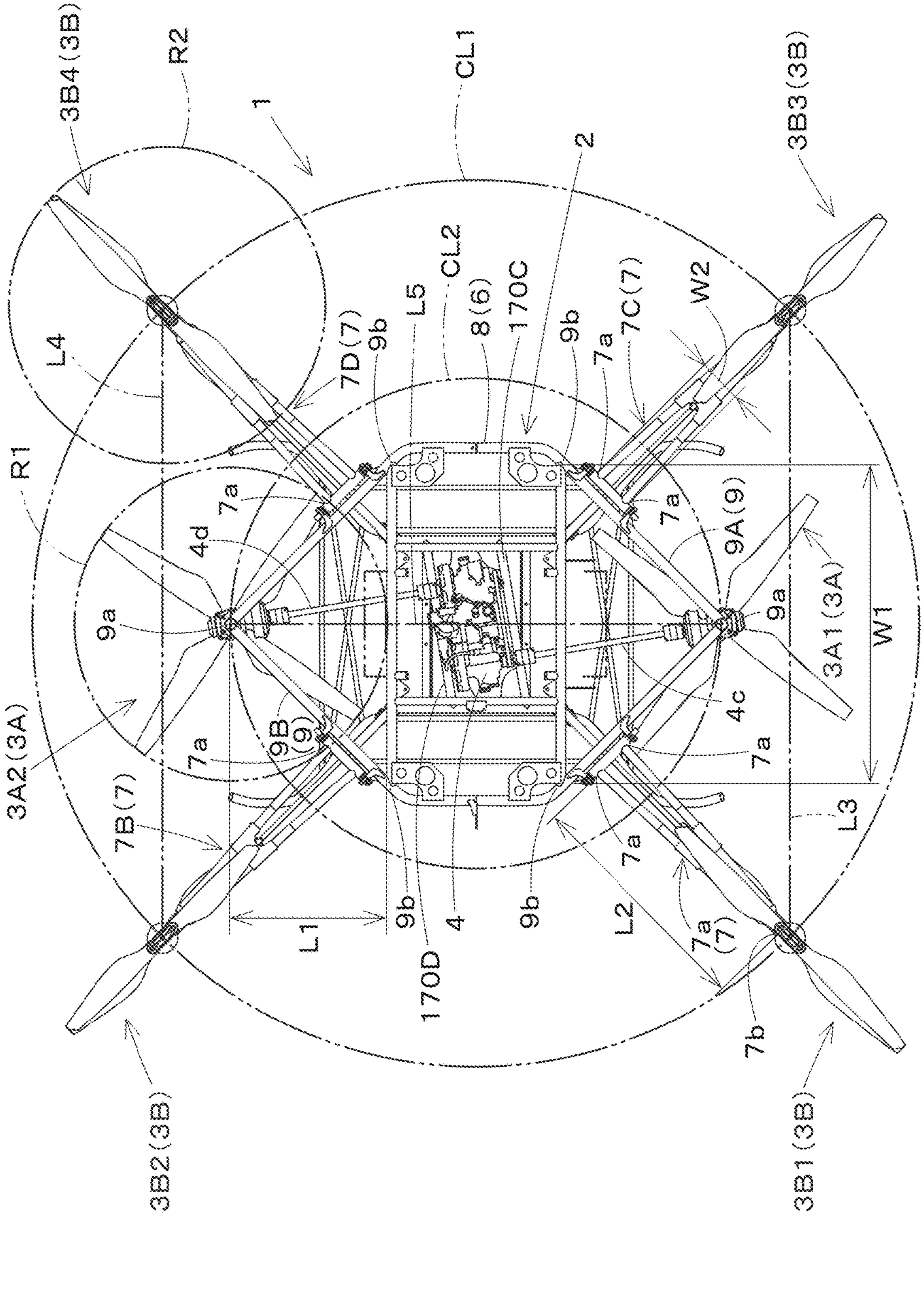

As shown in FIG. 38, in a planar view, the first sub-rotor 3B1 and the third sub-rotor 3B3 sandwich the first main rotor 3A1, and the second sub-rotor 3B2 and the fourth sub-rotor 3B4 sandwich the second main rotor 3A2. As shown in FIG. 44, a center of the first main rotor 3A1 is at a position closer to a center of the airframe 2 than a line L3 (straight line) connecting a center of the first sub-rotor 3B1 and a center of the third sub-rotor 3B3. A center of the second main rotor 3A2 is at a position closer to the center of the airframe 2 than a line L4 (straight line) connecting a center of the second sub-rotor 3B2 and a center of the fourth sub-rotor 3B4.

As shown in FIGS. 38 and 44, in a planar view, the main rotors 3A are located on the same side of the sub-rotors 3B as the center of the airframe 2. As shown in FIG. 44, the main rotors 3A are provided on an inner side (airframe-inward) of a circle CL1 connecting centers of the plurality of sub-rotors 3B. The sub-rotors 3B are provided on an outer side (airframe-outward) of a circle CL2 connecting the centers of the plurality of main rotors 3A. As shown in FIGS. 40, 41, 42 and 43, the main rotors 3A are located lower than the sub-rotors 3B.

As shown in FIG. 44, a rotation path R1 of blades **3*d* of each of the main rotors 3A overlaps the main body assembly 6 when viewed in the up-down direction. Specifically, the rotation path R1 of the blades 3*d* of each of the main rotors 3A overlaps a corresponding one of the projecting frames 9 of the main body assembly 6 when viewed in the up-down direction. The rotation path R1 does not overlap the framed main body 8 of the main body assembly 6 when viewed in the up-down direction. The rotation path R1 of the blades 3*d* of each of the main rotors 3A overlaps at least corresponding one of the arms 7 when viewed in the up-down direction. Specifically, when viewed in the up-down direction, the rotation path R1 of the blades 3*d* of each of the main rotors 3A overlap a portion of the at least corresponding one of the arms 7 close to a proximal end 7*a* of the at least corresponding one of the arms 7**.

As shown in FIG. 44, a length L1 from a proximal end **9*b* to a distal end (corner 9*a*) of the projecting frame 9, which is a first support, is shorter than a length L2 from the proximal end 7*a* to a distal end 7*b* of the arm 7, which is a second support. A width W1 of the proximal end 9*b* of the projecting frame 9, which is the first support, is larger than a width W2 of the proximal end 7*a* of the arm 7**, which is the second support.

The following mainly describes points regarding the flying apparatus 1 of the second example embodiment which differ from the first example embodiment while mentioning common points between the first example embodiment and the second example embodiment.

As previously described, in the first example embodiment, the arm 7 includes a first section 71 fixed to the main body assembly 6 and a second section 72 rotatable relative to the first section 71 (see FIGS. 9 and 10). A pivoting portion 21, which is a rotation axis for the arm 7, is provided between the first section 71 and the second section 72 (see FIG. 10 and/or the like). On the other hand, in the second example embodiment, the entire arm 7 defines a portion rotatable relative to the main body assembly 6 (see FIGS. 48 and 49). The pivoting portion 21 is provided between the proximal end **7*a* of the arm 7 and the main body assembly 6. (see FIG. 38**).

Figure 49:
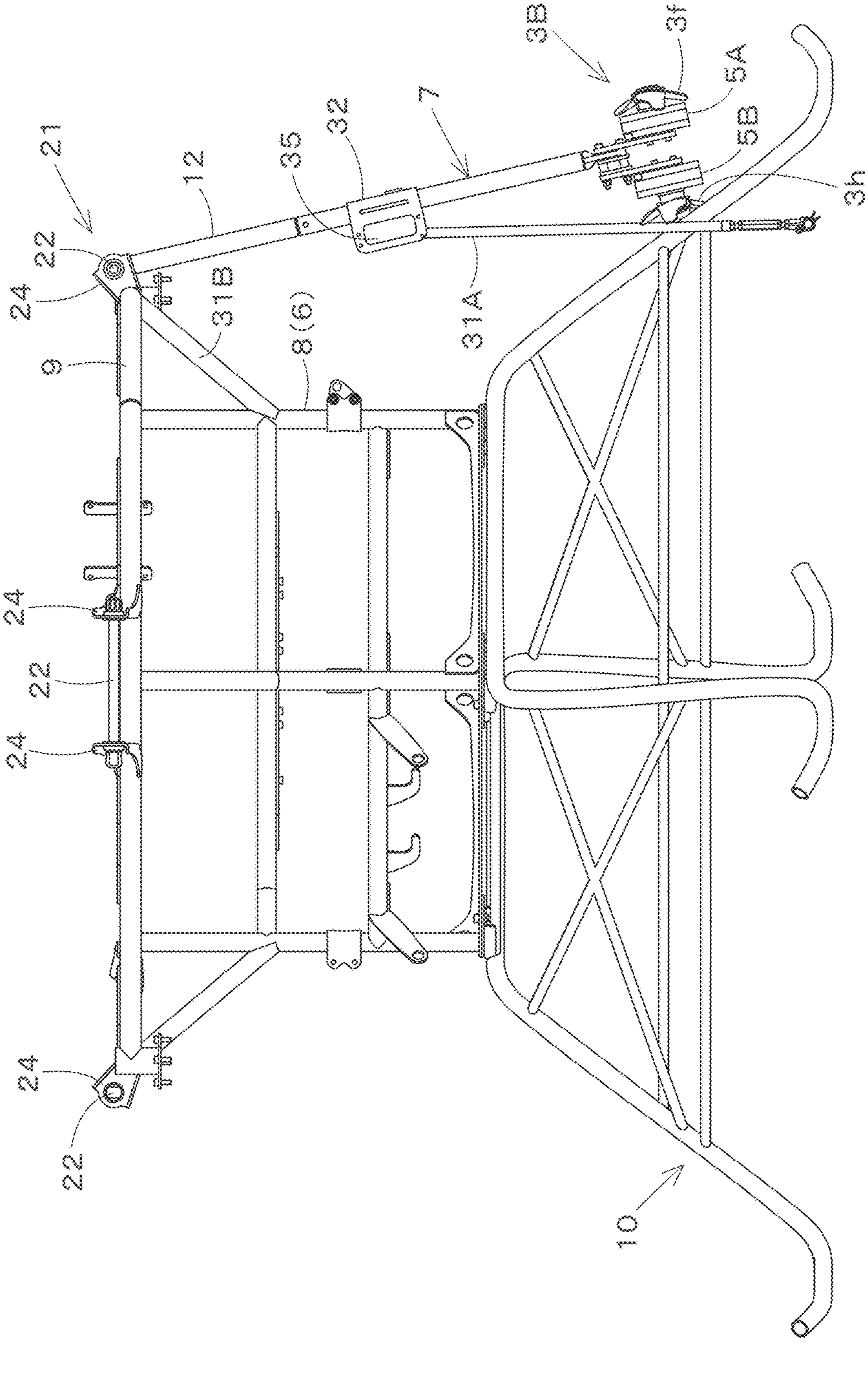
FIG. 49 illustrates an arm when rotated downward in a flying apparatus according to the second example embodiment.

With such differences in the configurations, in comparison with the configuration of the first example embodiment where only a section (second section 72) of the arm 7 is rotatable relative to the main body assembly 6 (see FIG. 8), the second example embodiment has a configuration where the entire arm 7 is rotatable relative to the main body assembly 6 (see FIG. 49). That is, the position of the rotation axis of the arm 7 (pivoting portion 21) differs between the first example embodiment and the second example embodiment.

Figure 45:
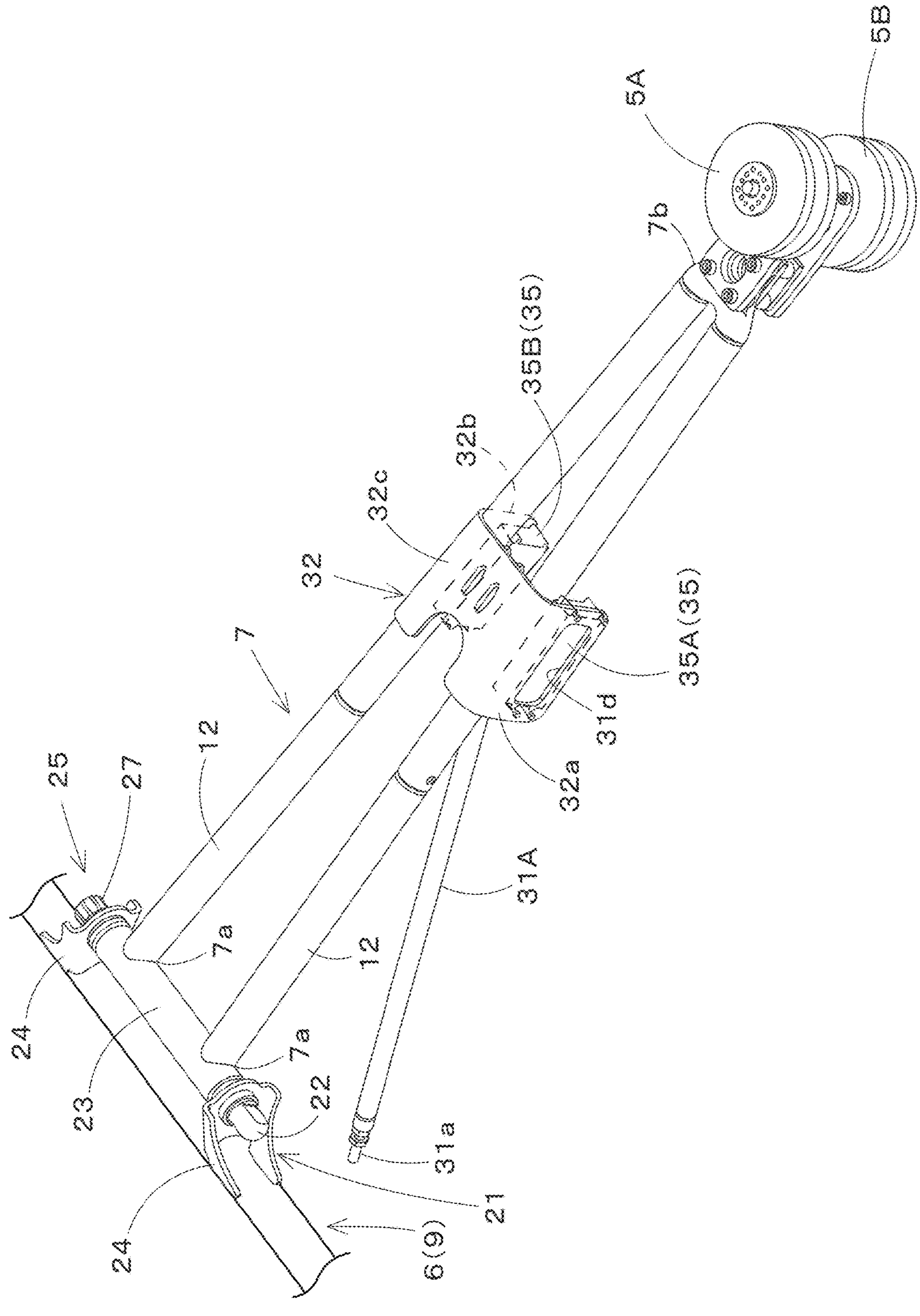
FIG. 45 is a perspective view of an arm, a pivoting portion and the like of a flying apparatus according to the second example embodiment when viewed obliquely from above.
Figure 46:
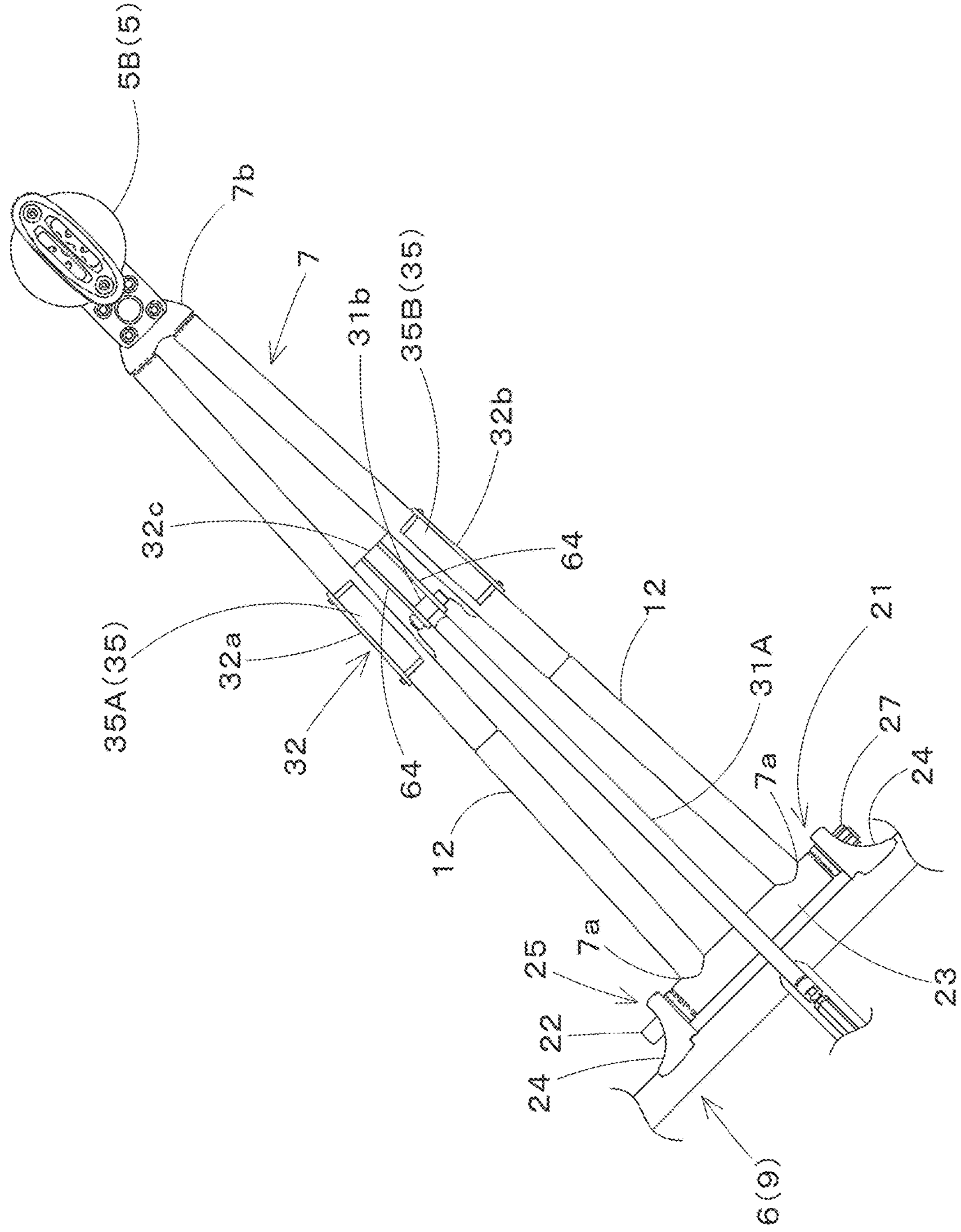
FIG. 46 is a bottom view of an arm, a pivoting portion, a connector (first support) and the like of a flying apparatus according to the second example embodiment.

As shown in FIGS. 38, 45 and 46, the two rods 12 defining the arm 7 approach each other while extending away from the main body assembly 6. In other words, an interval between the two rods 12 reduces in a direction from the proximal end **7*a* to a distal end 7*b* of the arm 7. The sub-rotor 3B and the motor 5 are attached to a portion via which distal ends of the two rods 12** are connected to each other.

By defining the arm 7 with the two rods 12 juxtaposed in the horizontal direction, it is possible to prevent or reduce yaw motion of the arm 7 when the sub-rotor 3B rotates. In addition, the two rods 12 approach each other in a direction away from the main body assembly 6 such that a width of the arm 7 increases in a direction approaching the main body assembly 6 body assembly, yaw motion of the proximal end of the arm 7 is prevented or reduced, and it is possible to effectively prevent or reduce the yaw motion of the entire arm 7.

As shown in FIGS. 45 and 46, a holding tube 23 is joined to the proximal ends 7*a* of the two rods 12. The holding tube 23 connects each proximal end 7*a* of the two rods 12 together. The holding tube 23, as described for the first example embodiment, defines a switching mechanism 25. That is, similar to the first example embodiment, the flying apparatus 1 of the second example embodiment includes the switching mechanism 25 that includes the holding tube 23, the shaft support portions 24 and the pivot shaft 22. Since a configuration of the switching mechanism 25 is the same as that in the first example embodiment, description of the switching mechanism 25 will be omitted.

Figure 47:
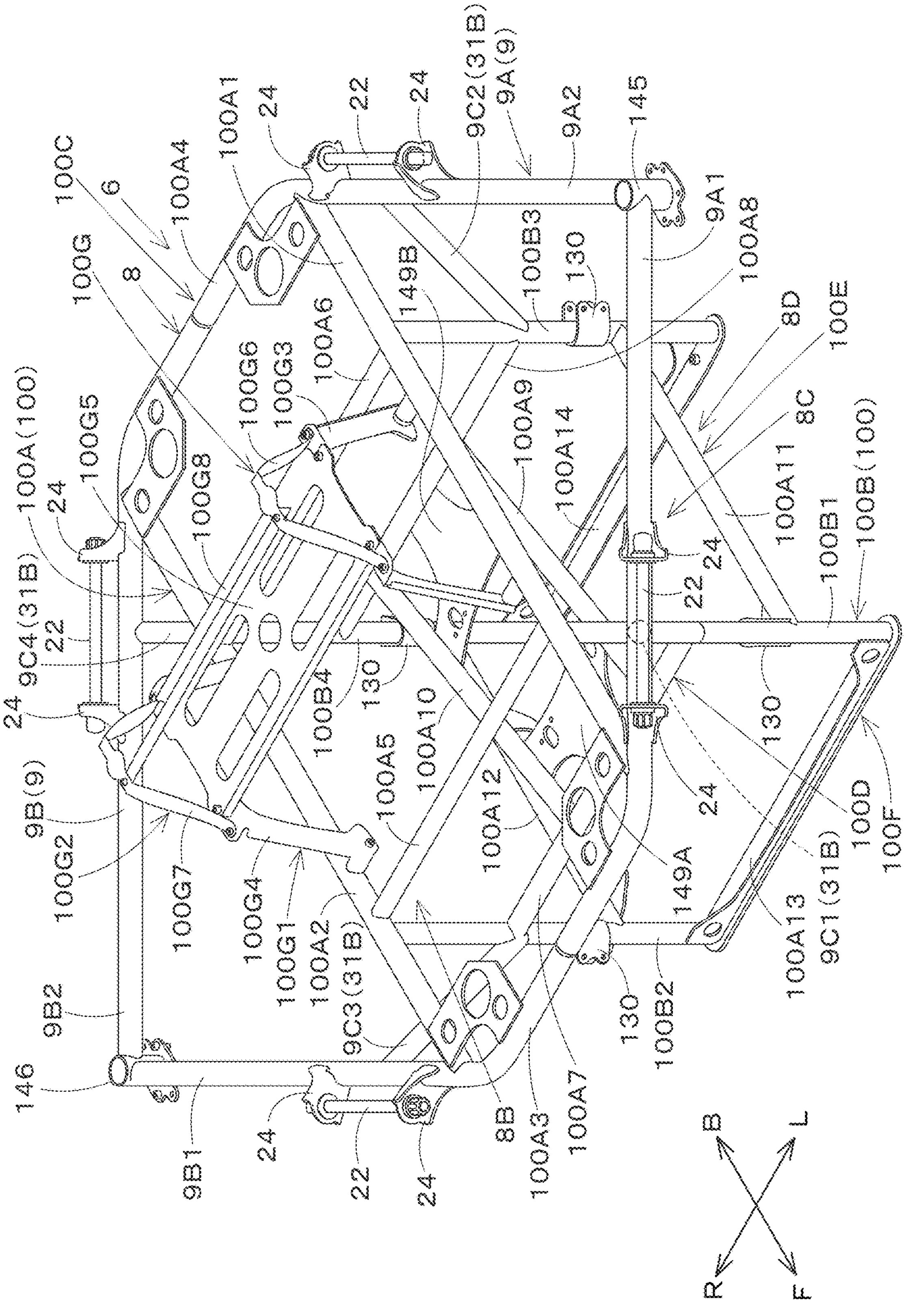
FIG. 47 is a perspective view of a main body assembly and shaft support portions of a flying apparatus according to the second example embodiment.

As shown in FIGS. 45 and 47, the shaft support portions 24 are attached to the main body assembly 6 (projecting frame 9). According to rotating the holding tube 23 about a central axis of the pivot shaft 22, the arm 7 rotates relative to the main body assembly 6 (see arrow Y2 of FIG. 48). Thus, the holding tube 23 and the pivot shaft 22 define the pivoting portion 21 which supports the arm 7 to be rotatable relative to the main body assembly 6.

FIG. 49 illustrates the arm 7 rotated downward about the rotation axis defined by the pivoting portion 21 relative to the main body assembly 6. The arm 7 is rotatable in two different positions including a first position (see FIG. 42 and/or the like) in which the arm 7 extends horizontally, and a second position (see FIG. 49) in which the arm 7 extends upward or downward. In the second example embodiment, similar to the first example embodiment, the arm 7 extends downward (including obliquely downward) when in the second position. That is, in the second example embodiment, similar to the first example embodiment, the arm 7 is rotatable downward from a predetermined position (first position) in which the arm 7 is to be when the flying apparatus 1 flies. That is, as previously explained, in the second example embodiment, not only a portion but the entirety of the arm 7 rotates relative to the main body assembly 6. When the arm 7 is rotated downward (when the arm 7 is in the second position), the distal end of the arm 7 is located higher than a lower end of the skid 10.

Figure 50:
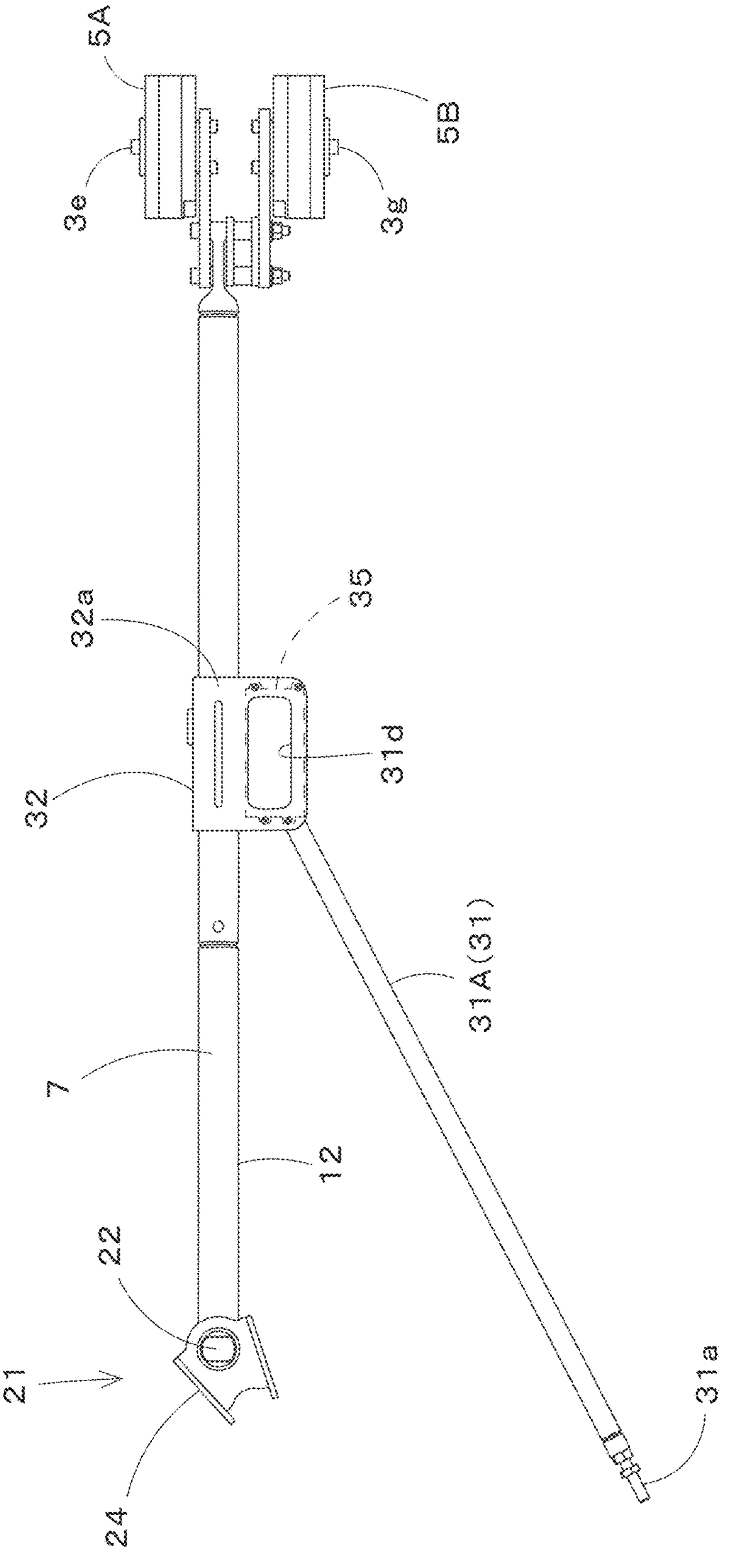
FIG. 50 illustrates an arm, a connecting body (first support) and the like of a flying apparatus according to the second example embodiment when viewed in a horizontal direction.

As shown in FIGS. 45, 46 and 50, a bracket 32 is attached to intermediate portions in the longitudinal direction of the two second rods 12. An end (second end 31*b*) of a connector 31 to connect the main body assembly 6 and the arm 7 is connected to the bracket 32. The bracket 32 includes a first side plate portion 32*a*, a second side plate portion 32*b* and an upper plate portion 32*c*. Each of the first side plate portion 32*a*, the second side plate portion 32*b* and the upper plate portion 32*c* is a single bent plate (metallic plate).

The first side plate portion 32*a* is provided on an outer side of one of the two rods 12 (opposite side of another rod). The second side plate portion 32*b* is provided on an outer side of the other of the two rods 12 (opposite side of the one rod). The first side plate portion 32*a* and the second side plate portion 32*b* opposite each other are parallel or substantially parallel to each other. The upper plate portion 32*c* connects an upper end of the first side plate portion 32*a* and an upper end of the second side plate portion 32*b* to each other. The upper plate portion 32*c* covers upper portions of the two rods 12.

Electrical components 35 (inverters) are respectively provided on an inner surface of the first side plate portion 32*a* and an inner surface of the second side plate portion 32*b*. A first inverter 35A is attached to the inner surface of the first side plate portion 32*a*, and a second inverter 35B is attached to the inner surface of the second side plate portion 32*b*. Thus, as shown in FIG. 50, the electrical components (inverters 35) overlap the bracket 32 when viewed in the longitudinal direction of the arm 7. As shown in FIG. 46, the first inverter 35A and the second inverter 35B are spaced from each other in a width direction of the arm 7.

As shown in FIGS. 45 and 50, the first side plate portion 32*a* includes a first opening 31*d*. The first inverter 35A faces the first opening 31*d*. The second side plate portion 32*b* includes a second opening (not illustrated). The second inverter 35B faces the second opening. Therefore, it is possible to let heat generated from the first inverter 35A and the second inverter 35B escape via the first opening 31*d* and the second opening. Thus, it is possible to prevent the first inverter 35A and the second inverter 35B from overheating.

Figure 48:
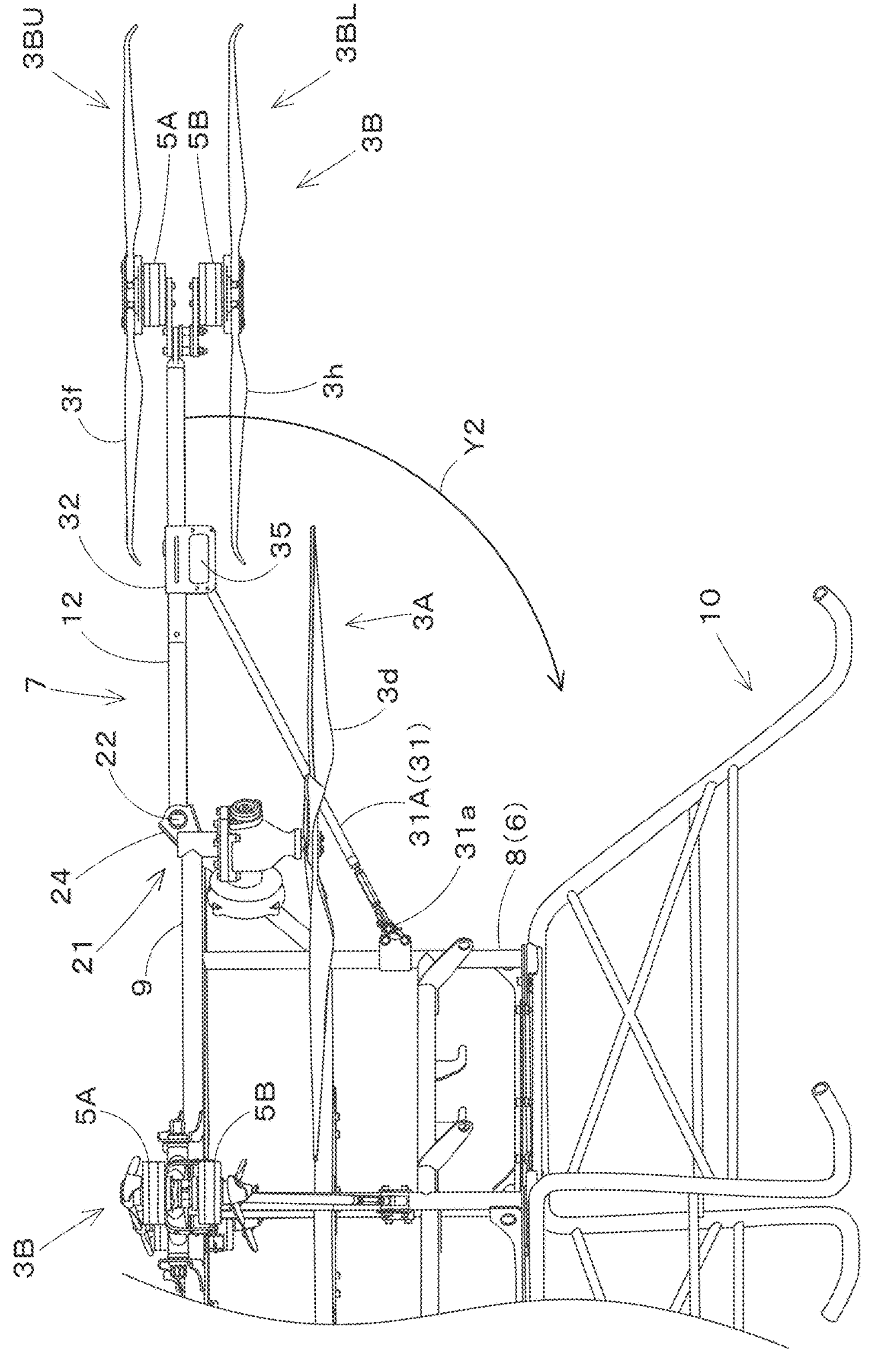
FIG. 48 illustrates an arm, sub-rotors and the like of a flying apparatus according to the second example embodiment when viewed in a horizontal direction.

As understood from in FIG. 46, in a planar view, a first support 31A, which is the connector 31 to connect the main body assembly 6 and an intermediate portion of the arm 7, extends between the two rods 12. In a planar view, the first support 31A extends between the first inverter 35A and the second inverter 35B. The first end 31*a* of the first support 31A is connected to the main body assembly 6 (FIG. 48). The second end 31*b* of the first support 31A is connected to the bracket 32 (see FIG. 46). The second end 31*b* is connected (pivoted) to a connection plate 64 fixed to a reverse surface of the upper plate portion 32*c* of the bracket 32.

As described above, the bracket 32 includes portions on which electrical components (inverters) 35 are attached, and a portion to which the first support 31A is connected. Thus, the portions to attach the electrical components 35 and the portion to connect the first support 31A converge into one member (bracket 32). Accordingly, it is possible to reduce the number of component members and, as a result, it is possible to reduce a weight of the flying apparatus 1.

As shown in FIG. 50, the inverters 35 are provided below the rods 12. As shown in FIG. 46, a width (thickness) of the inverter 35 is equal to or less than a width (diameter) of the rod 12. Thus, upper sides of the inverters 35 are covered by the respective rods 12. Specifically, the upper side of the first inverter 35A is covered by one of the rods 12, and the upper side of the second inverter 35B is covered by the other of the rods 12. Thus, with the upper sides of the inverters 35 covered by the rods 12, it is possible to protect the inverters 35 from external forces.

As shown in FIG. 48, blades (first blades 3*f* and second blades 3*h*) of the sub-rotor 3B and the electrical components (inverters 35) overlap each other when viewed in the up-down direction. Thus, it is possible to cool the electrical components (inverters 35) via downward flow of air generated by rotations of the blades (first blades 3*f* and second blades 3*h*). Accordingly, it is possible to prevent the electrical components (inverters 35) during flight from overheating.

Figure 40:
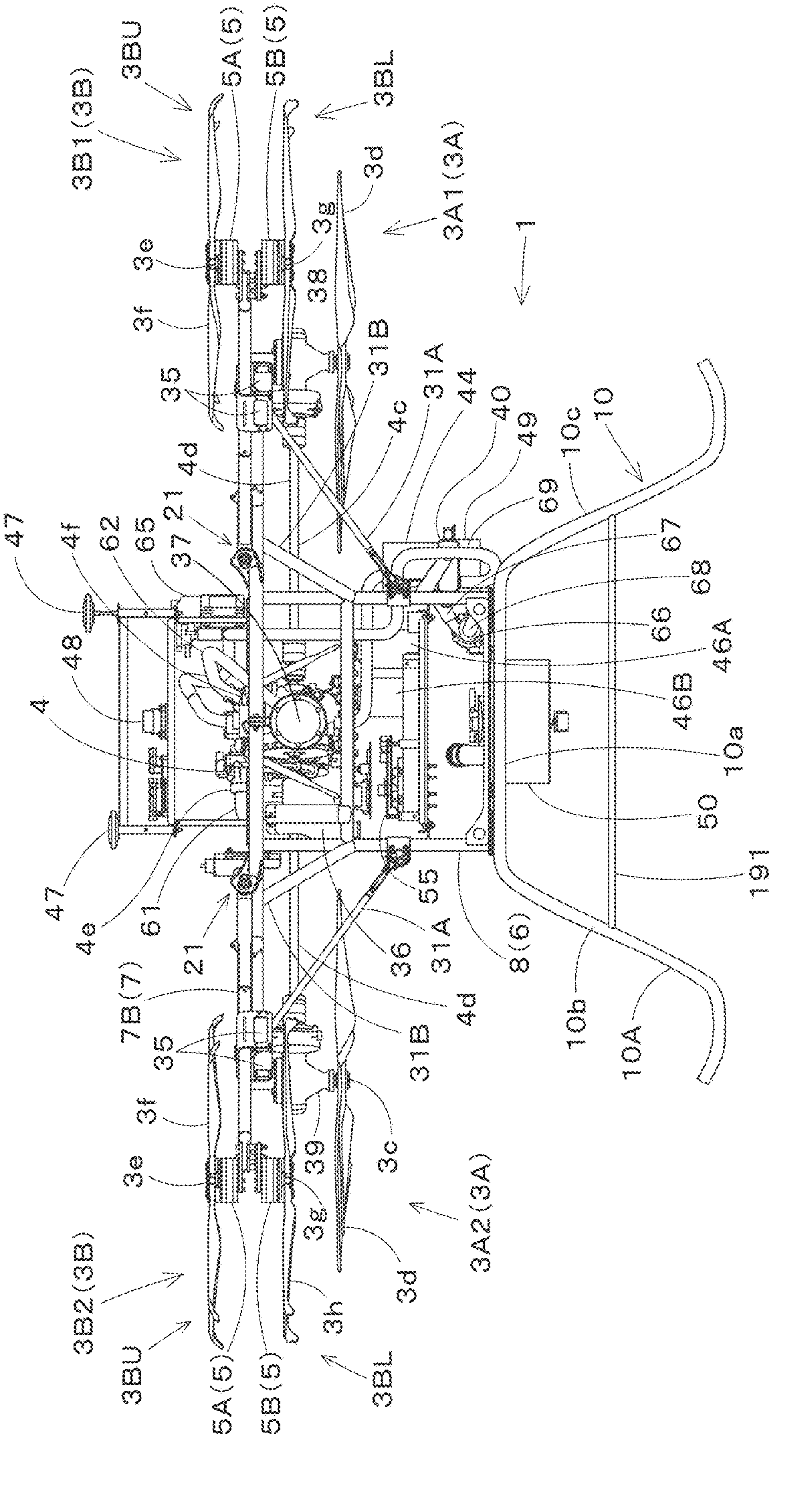
FIG. 40 is a front view of a flying apparatus according to the second example embodiment of the present invention.
Figure 41:
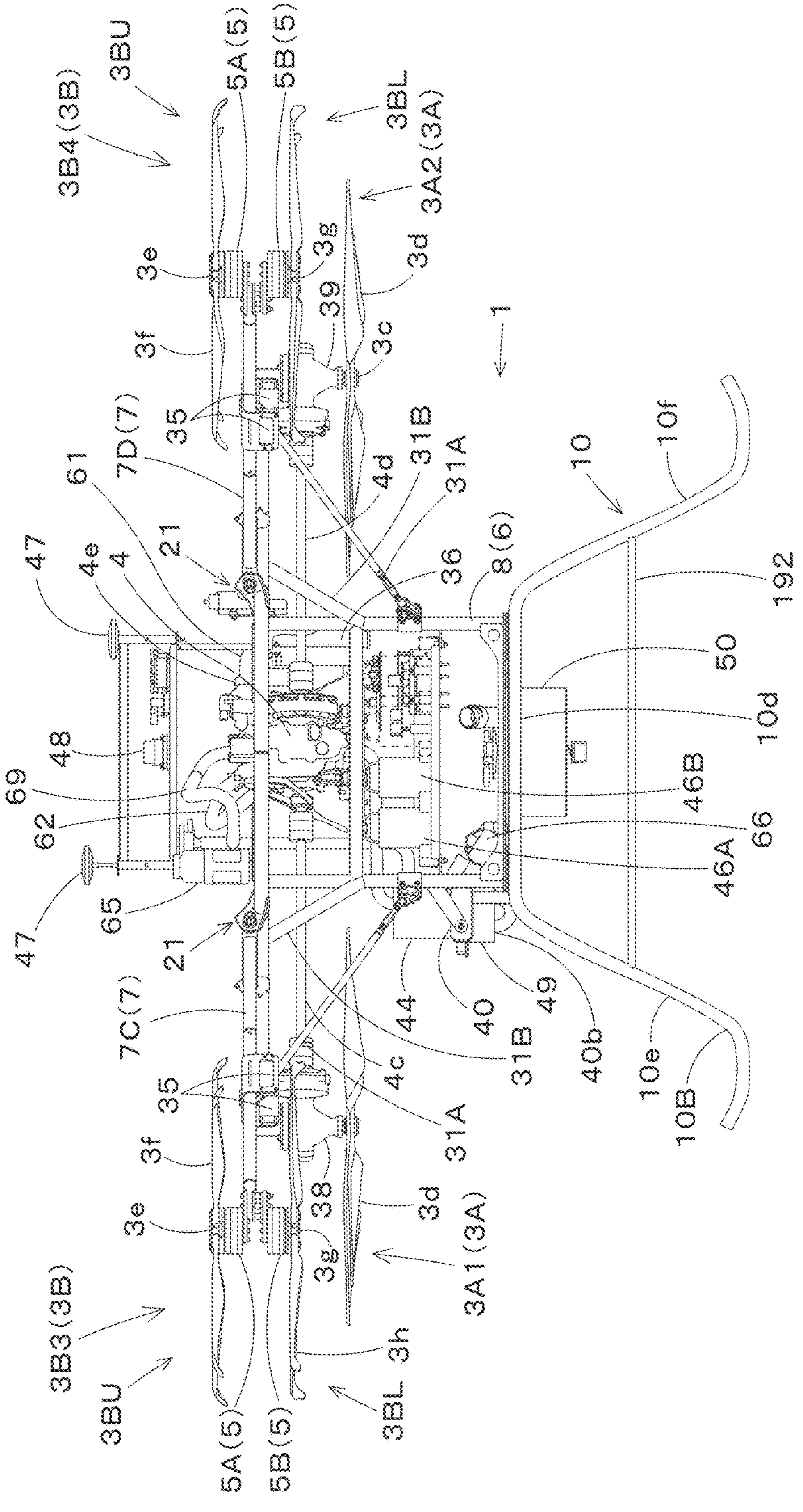
FIG. 41 is a rear view of a flying apparatus according to the second example embodiment of the present invention.
Figure 42:
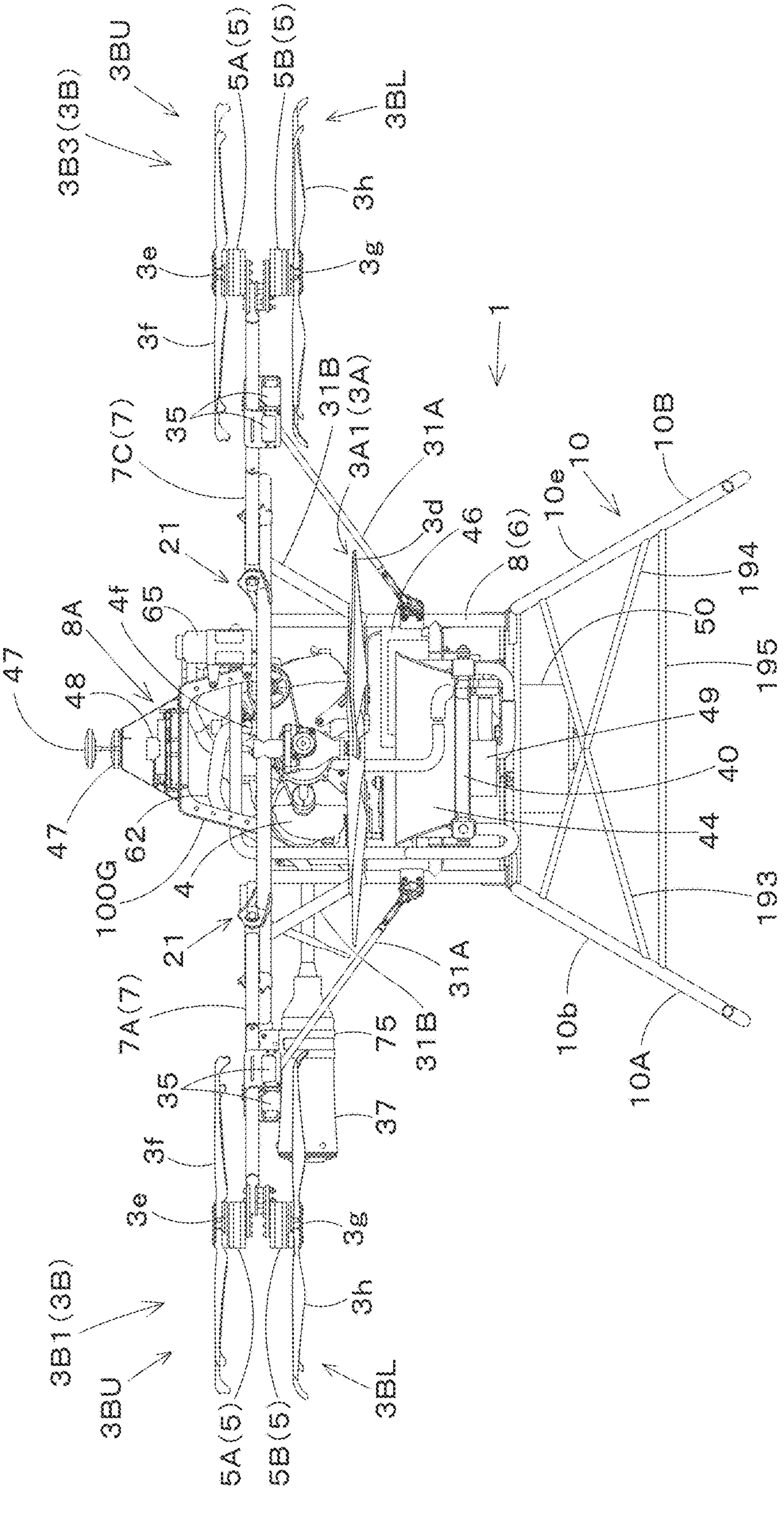
FIG. 42 is a left side view of a flying apparatus according to the second example embodiment of the present invention.
Figure 43:
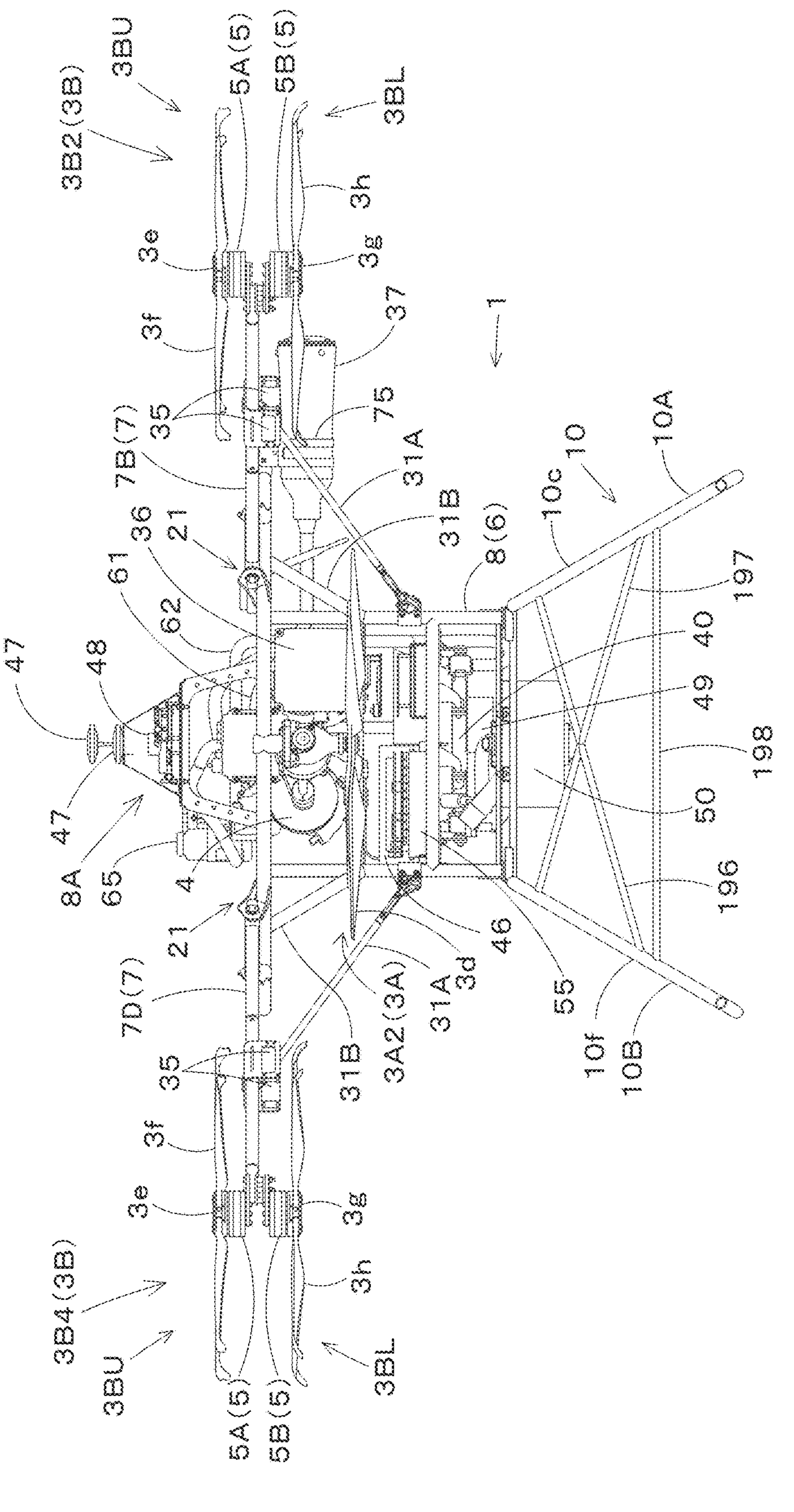
FIG. 43 is a right side view of a flying apparatus according to the second example embodiment of the present invention.

As shown in FIGS. 40, 41 and 42, an air intake 4*e* of the engine 4 faces sideward, and an exhaust port 4*f* of the engine 4 faces upward. An air cleaner 36 is connected to the air intake 4*e* via a first connecting pipe 61. A muffler 37 is connected to the exhaust port 4*f* via a second connecting pipe 62. As shown in FIGS. 38, 40, 43 and/or the like, the air cleaner 36 extends vertically (lengthwise in the up-down direction) in (inside) the framed main body 8.

As shown in FIGS. 38, 42, 43 and/or the like, the muffler 37 extends horizontally (lengthwise in the horizontal direction) to project to an exterior of the framed main body 8. As shown in FIGS. 42 and 43, the muffler 37 is attached to the framed main body 8 via an attaching member 75. The attaching member 75 is attached to a later-mentioned fourth horizontal frame member 100A4 of an upper-section frame 100C (see FIG. 47). Thus, with the muffler 37 projecting to the exterior of the framed main body 8, it is possible to prevent heat of exhaust gas ejected from the muffler 37 from affecting pieces of equipment provided inside the framed main body 8.

As shown in FIGS. 40, 41, 42 and 43, the rotors 3 overlap the engine 4 when viewed in the up-down direction. Specifically, the main rotors 3A overlaps the engine 4 when viewed in the up-down direction. Also, the sub-rotors 3B overlap the engine 4 when viewed in the up-down direction. Thus, it is possible to stabilize a posture of the flying apparatus 1 during flight because the center of gravity of the main body assembly 6 with the heavyweight engine 4 provided thereon or therein is substantially as high as the rotors 3.

As shown in FIG. 38, in a planar view, the first output shaft 4*c* extends between front and rear frame members (a first projecting frame member 9A1 and a second projecting frame member 9A2 as later mentioned (see FIG. 47)) defining the first projecting frame 9A. In a planar view, the second output shaft 4*d* extends between front and rear frame members (a third projecting frame member 9B1 and a fourth projecting frame member 9B2 later mentioned (see FIG. 47)) defining the second projecting frame 9B. Accordingly, it is difficult to approach the first output shaft 4*c* and the second output shaft 4*d* from above because of the presence of the first projecting frame 9A and of the second projecting frame 9B. Thus, in situations such as before takeoff or after landing, anyone can be safely prevented from contacting the first output shaft 4*c* and/or second output shaft 4*d* when rotating with his/her hand, clothing and/or the like.

Figure 51:
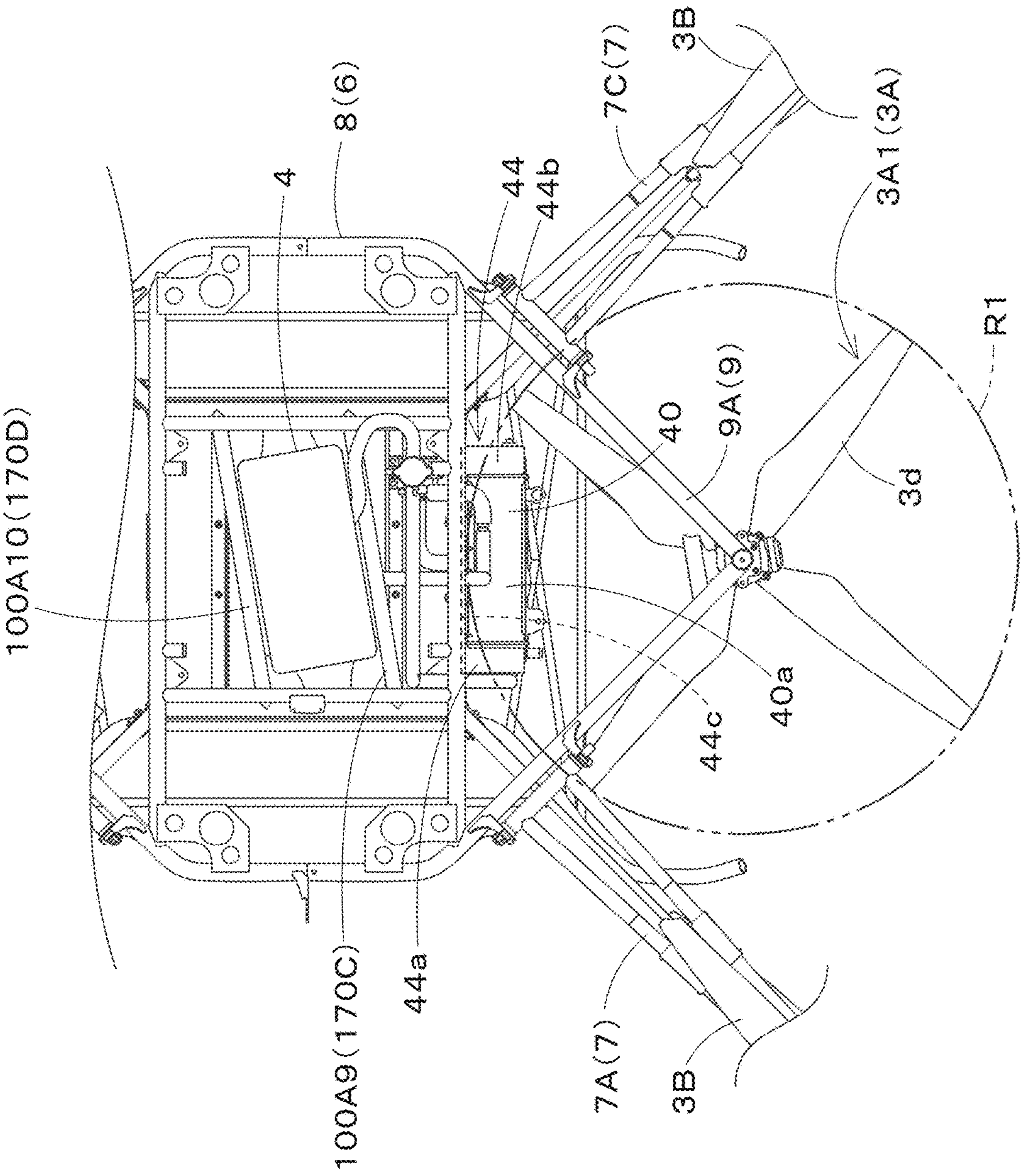
FIG. 51 is a top view of a main rotor and a cooler (radiator) of a flying apparatus according to the second example embodiment illustrating a positional relationship between the main rotor and the cooler.

As shown in FIG. 38, there is a single radiator (cooler) 40 in the second example embodiment. The single radiator 40 is provided below one of the two main rotors 3 (first main rotor 3A1). As shown in FIG. 51, in a planar view, the radiator 40 overlaps the rotation path R1 of the blades 3*d* of the first main rotor 3A1. In a planar view, a baffle 44 overlaps the rotation path R1 of the blades 3*d* of the first main rotor 3A1.

As shown in FIGS. 40, 41 and 42, a radiator fan 49 is provided below the radiator 40. The radiator fan 49 generates downward flow of air passing through the radiator 40. Thus, it is possible to efficiently cool the radiator 40 with both the flow of air generated by the rotation of the blades 3*d* of the first main rotor 3A1 and the flow of air generated by rotation of the radiator fan 49.

Figure 53:
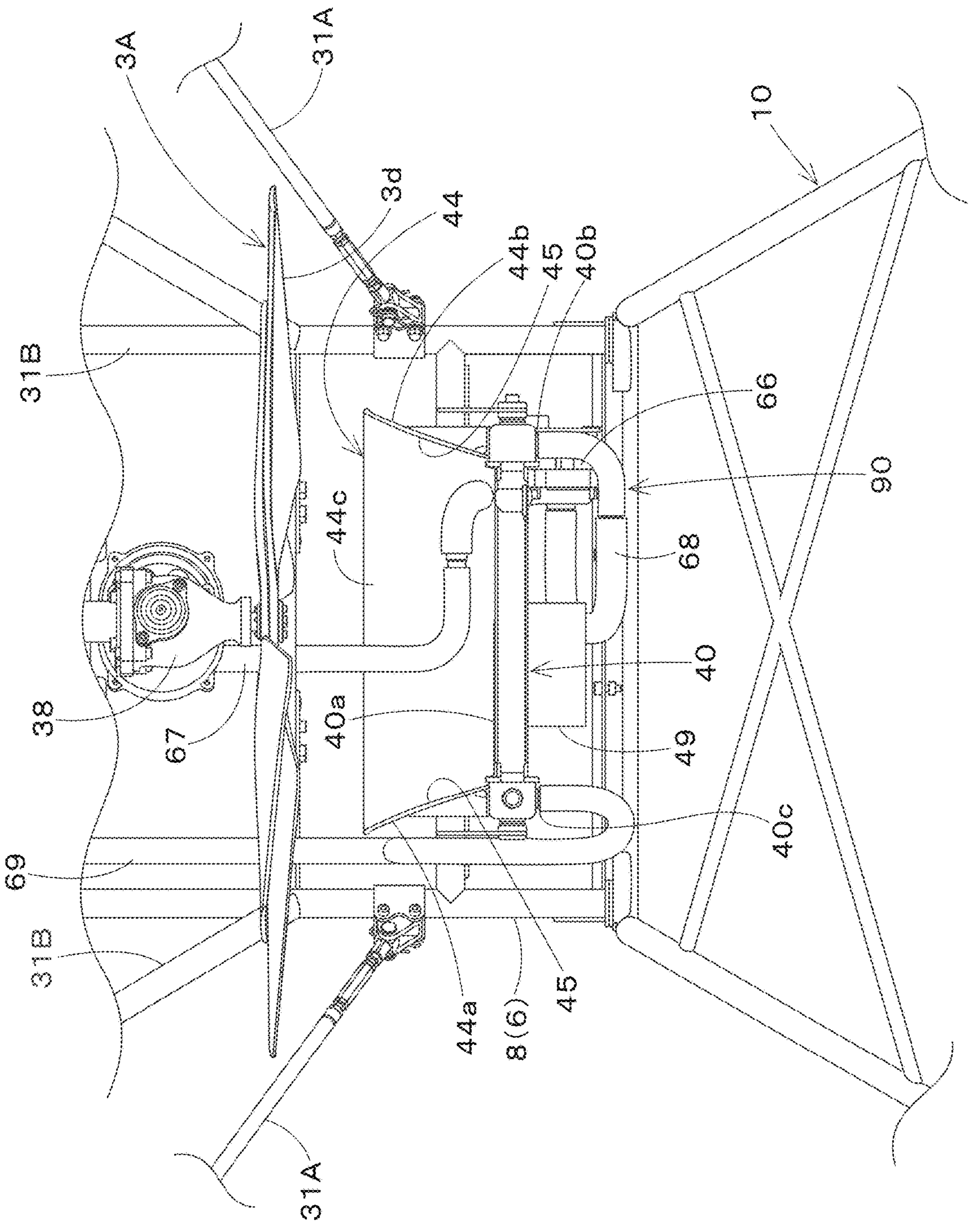
FIG. 53 is an enlarged left side view of a flying apparatus according to the first example embodiment.

As shown in FIG. 53, the baffle 44 includes a first plate 44*a*, a second plate 44*b*, and a third plate 44*c*. The baffle 44 includes an expansion portion 45 gradually expanding upward with a space between the first plate 44*a* and the second plate 44*b*. The space between an upper end of the first plate 44*a* and an upper end of the second plate 44*b* is larger than a width (distance in the front-rear direction) of the radiator 40. The space between a lower end of the first plate 44*a* and a lower end of the second plate 44*b* is substantially the same as a width (distance in the front-rear direction) of a radiating surface 40*a* of the radiator 40.

As shown in FIGS. 40, 41 and 42, an upper end of the baffle 44 is located lower than the blades 3*d* of the main rotors 3A. Thus, it is possible to guide the downward flows of air generated by the rotations of the blades 3*d* of the main rotors 3A downward via the baffle 44, and it is also possible to guide a portion of the flow of air from the upper side of the baffle 44 to the inside of the framed main body 8 and to cool the pieces of equipment provided therein.

Figure 52:
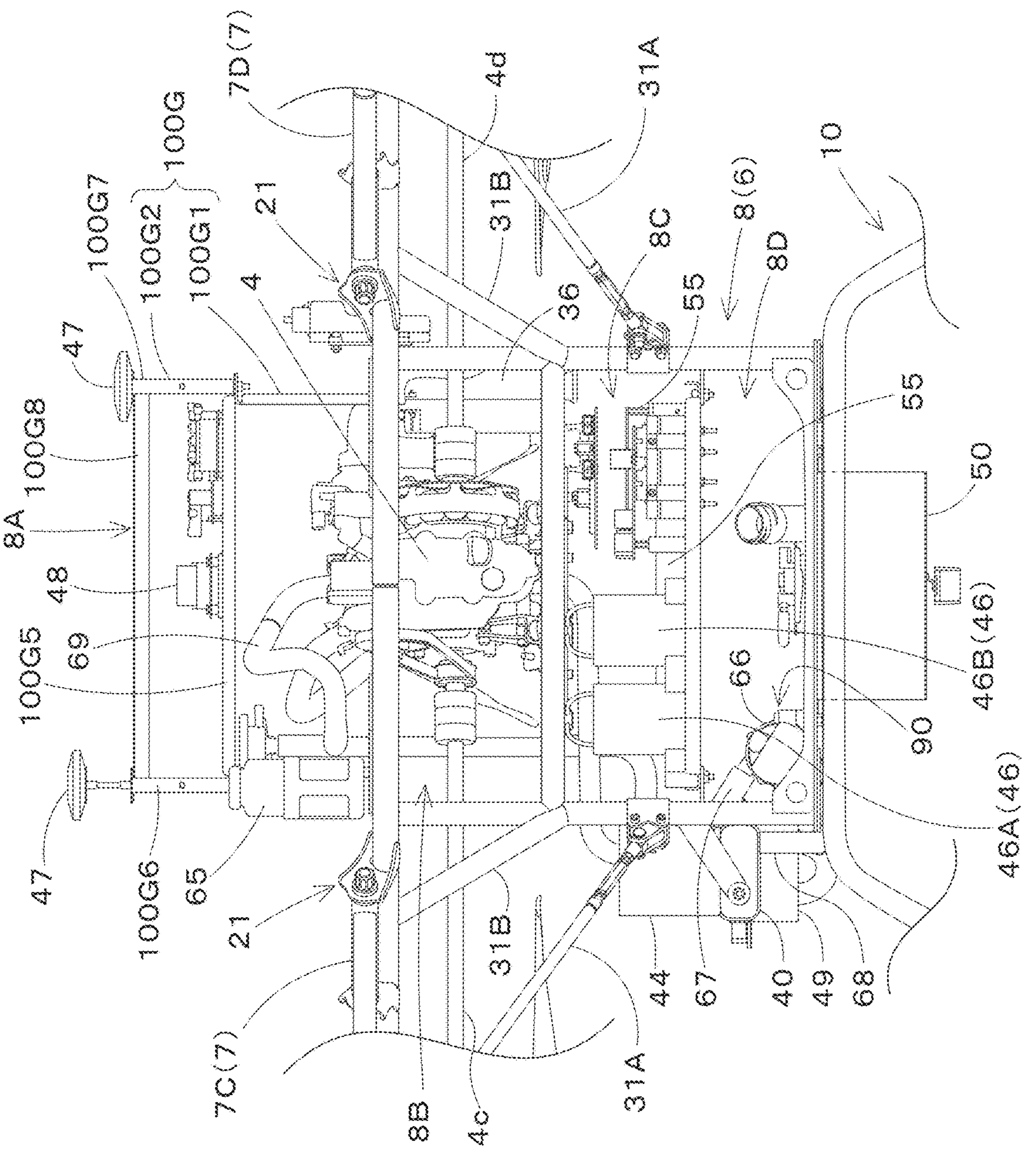
FIG. 52 is an enlarged rear view of a flying apparatus according to the second example embodiment.

As shown in FIGS. 40, 41 and 52, a first battery 46A and a second battery 46B are located lower than the engine 4. The first battery 46A and the second battery 46B are aligned in a left-right direction. The first battery 46A, the second battery 46B and the controller 55 are aligned in the left-right direction.

As shown in FIG. 47, the main body assembly 6 includes a plurality of frame members 100. In the first example embodiment, the main body assembly 6 is formed by the plurality of frame members 100 connected together via couplings 200. However, in the second example embodiment, the main body assembly 6 is formed by the plurality of frame members 100 joined together by welding. The framed main body 8 of the main body assembly 6 includes a plurality of linear frame members 100 assembled in a three-dimensional shape (substantially rectangular parallelepiped shape). The frame members 100 include cylindrical pipes.

The frame members 100 defining the framed main body 8 include horizontal frame members 100A each extending in a horizontal direction, and vertical frame members 100B each extending in an up-down direction. The horizontal frame members 100A include first to fourteenth horizontal frame members 100A1 to 100A14. The horizontal frame members 100A define an upper-section frame 100C, a first middle-section frame 100D, a second middle-section frame 100E, and a lower-section frame 100F. The upper-section frame 100C, the first middle-section frame 100D, the second middle-section frame 100E, and the lower-section frame 100F are aligned in this order in the direction from an upper portion to a lower portion of the framed main body 8.

The upper section 8B of the framed main body 8 is provided between the upper-section frame 100C and the first middle-section frame 100D. The engine 4 and/or the like is or are provided in the upper section 8B. The middle section 8C of the framed main body 8 is provided between the first middle-section frame 100D and the second middle-section frame 100E. The one or more batteries 46, the controller 55 and/or the like is or are provided in the middle section 8C. The lower section 8D of the framed main body 8 is provided between the second middle-section frame 100E and the lower-section frame 100F. The fuel tank 50, the pump 66 and/or the like is or are provided in the lower section 8D.

As shown in FIGS. 52 and 53, in the second example embodiment, similar to the first example embodiment, the flying apparatus 1 includes a cooling system 90 to water-cool the driver (engine) 4. The cooling system 90 includes a pump 66 and a cooler (radiator) 40. Similar to the first example embodiment, the pump 66 is configured to circulate coolant between the engine 4 and the radiator 40. The pump 66 is provided in a lower portion of the main body assembly 6 (lower portion of the framed main body 8). The pump 66 is located lower than the engine 4, and the pump 66 is located lower than the radiator 40.

The cooling system 90 includes connecting pipes including a first pipe 67 connecting a delivery port of the pump 66 and the engine 4, a second pipe 68 connecting a suction port of the pump 66 and the radiator 40, and a third pipe 69 connecting the engine 4 and the radiator 40. A lower end of the pump 66 is located at a position lower than the engine 4, the radiator 40 and the connecting pipes.

As shown in FIG. 52, the fuel tank 50 is located lower than the pump 66. The fuel tank 50 projects downward from the lower section 8D. That is, a lower portion of the fuel tank 50 projects downward from the framed main body 8. Thus, it is possible to extend the fuel tank 50 downward and to increase a capacity thereof.

The upper-section frame 100C includes the first horizontal frame member 100A1, a second horizontal frame member 100A2, a third horizontal frame member 100A3, a fourth horizontal frame member 100A4, a fifth horizontal frame member 100A5, and a sixth horizontal frame member 100A6. The first horizontal frame member 100A1 extends in the front-rear direction at a left portion of the framed main body 8. The second horizontal frame member 100A2 extends in the front-rear direction at a right portion of the framed main body 8.

The third horizontal frame member 100A3 extends in the left-right direction at a front portion of the framed main body 8. The fourth horizontal frame member 100A4 extends in the left-right direction at a rear portion of the framed main body 8. The third horizontal frame member 100A3 is provided forward of a later-described seventh horizontal frame member 100A7. The fourth horizontal frame member 100A4 is provided forward of the later-described sixth horizontal frame member 100A6.

The fifth horizontal frame member 100A5 extends in the left-right direction, and connects an intermediate portion in the front-rear direction of the first horizontal frame member 100A1 and an intermediate portion in the front-rear direction of the second horizontal frame member 100A2 to each other. The sixth horizontal frame member 100A6 extends in the left-right direction and rearward of the fifth horizontal frame member 100A5, and connects the intermediate portion in the front-rear direction of the first horizontal frame member 100A1 and the intermediate portion in the front-rear direction of the second horizontal frame member 100A2 to each other.

The first middle-section frame 100D includes the seventh horizontal frame member 100A7, an eighth horizontal frame member 100A8, a ninth horizontal frame member 100A9 and a tenth horizontal frame member 100A10. The seventh horizontal frame member 100A7 extends in the left-right direction below the fifth horizontal frame member 100A5. The eighth horizontal frame member 100A8 extends in the left-right direction below the sixth frame member 106.

The ninth horizontal frame member 100A9 extends in an oblique direction rightwardly rearward at the left portion of the framed main body 8. The tenth horizontal frame member 100A10 extends in an oblique direction rightwardly rearward at the right portion of the framed main body 8. The ninth horizontal frame member 100A9 and the tenth horizontal frame member 100A10 are parallel or substantially parallel to each other.

A front-end of the ninth horizontal frame member 100A9 is connected to the seventh horizontal frame member 100A7. A rear-end of the ninth horizontal frame member 100A9 is connected to the eighth horizontal frame member 100A8. A front-end of the tenth horizontal frame member 100A10 is connected to the seventh horizontal frame member 100A7. A rear portion of the tenth horizontal frame member 100A10 is connected to the eight horizontal frame member 100A8.

The second middle-section frame 100E includes an eleventh horizontal frame member 100A11 and a twelfth horizontal frame member 100A12. The eleventh horizontal frame member 100A11 extend in the front-rear direction below the first horizontal frame member 100A1. The twelfth horizontal frame member 100A12 extends in the front-rear direction below the second horizontal frame member 100A2.

The lower-section frame 100F includes a thirteenth horizontal frame member 100A13 and a fourteenth horizontal frame member 100A14. The thirteenth horizontal frame member 100A13 extends to the left-right direction below the seventh horizontal frame member 100A7. The fourteenth horizontal frame member 100A14 extends to the left-right direction below the eighth frame member 108. The thirteenth horizontal frame member 100A13 and the fourteenth horizontal frame member 100A14 are plate-shaped members.

The vertical frame members 100B include first to fourth vertical frame members 100B1 to 100B4. The first vertical frame member 100B1 extends in the up-down direction at a front-left portion of the framed main body 8. A second vertical frame member 100B2 extends in the up-down direction at a front-right portion of the framed main body 8. A third vertical frame member 100B3 extends in the up-down direction at a rear-left portion of the framed main body 8. The fourth vertical frame member 100B4 extends in the up-down direction at a rear-right portion of the framed main body 8.

An upper end of the first vertical frame member 100B1 is connected to the first horizontal frame member 100A1. A lower end of the first vertical frame member 100B1 is connected to a left portion of the thirteenth horizontal frame member 100A13. An upper end of the second vertical frame member 100B2 is connected to the second horizontal frame member 100A2. A lower end of the second vertical frame member 100B2 is connected to a right portion of the thirteenth horizontal frame member 100A13.

An upper end of the third vertical frame member 100B3 is connected to the first horizontal frame member 100A1 rearward of the first vertical frame member 100B1. A lower end of the third vertical frame member 100B3 is connected to a left portion of the fourteenth horizontal frame member 100A14. An upper end of the fourth vertical frame member 100B4 is connected to the second horizontal frame member 100A2 rearward of the second vertical frame member 100B2. A lower end of the fourth vertical frame member 100B4 is connected to a right portion of the fourteenth horizontal frame member 100A14.

A left end of the seventh horizontal frame member 100A7 is connected to an intermediate portion in the up-down direction of the first vertical frame member 100B1. A right end of the seventh horizontal frame member 100A7 is connected to an intermediate portion in the up-down direction of the second vertical frame member 100B2. A left end of the eighth horizontal frame member 100A8 is connected to an intermediate portion in the up-down direction of the third vertical frame member 100B3. A right end of the eighth horizontal frame member 100A8 is connected to an intermediate portion in the up-down direction of the fourth vertical frame member 100B4.

A front end of the eleventh horizontal frame member 100A11 is connected to the intermediate portion in the up-down direction of the first vertical frame member 100B1. A rear end of the eleventh horizontal frame member 100A11 is connected to the intermediate portion in the up-down direction of the third vertical frame member 100B3. A front end of the twelfth horizontal frame member 100A12 is connected to the intermediate portion in the up-down direction of the second vertical frame member 100B2. A rear end of the twelfth horizontal frame member 100A12 is connected to the intermediate portion in the up-down direction of the fourth vertical frame member 100B4.

A joint 130 is provided on an intermediate portion in the up-down direction of each of the first vertical frame member

100B1, the second vertical frame member 100B2, the third vertical frame member 100B3 and the fourth vertical member 100B4. The joint 130 is a portion to be connected to the first end 31*a* (see FIG. 45) of the connector 31 (first support 31A) connecting the main body assembly 6 and the arm 7. The first end 31*a* of the connector 31 (first support 31A) is connected to each of the four vertical frame members (first vertical frame member 100B1, second vertical frame member 100B2, third vertical frame member 100B3 and fourth vertical frame member 100B4) of the framed main body 8 via the joint 130.

As shown in FIGS. 47 and 52, a top portion frame 100G is provided in a top portion of the framed main body 8. The top portion frame 100G projects upward from the upper-section frame 100C. An upper portion of the top portion frame 100G includes a top-section 8A of the framed main body 8 with position detectors 47 provided thereon or therein.

As shown in FIGS. 47 and 52, the top portion frame 100G includes a lower frame 100G1 and an upper frame 100G2. The lower frame 100G1 projects upward from the upper-section frame 100C. The upper frame 100G2 projects upward from the lower frame 100G1. That is, the top portion frame 100G includes two sections, i.e., an upper-section and a lower-section.

The lower frame 100G1 includes a first lower frame member 100G3, a second lower frame member 100G4 and a connection plate 100G5. The first lower frame member 100G3 and the second lower frame member 100G4 form an arch shape. The first lower frame member 100G3 is attached to the first horizontal frame member 100A1. The second lower frame member 100G4 is attached to the second horizontal frame member 100A2. The connection plate 100G5 connects an upper portion of the first lower frame member 100G3 and an upper portion of the second lower frame member 100G4 to each other.

The upper frame 100G2 is connected to the lower frame 100G1. The upper frame 100G2 includes a first upper frame member 100G6, a second upper frame member 100G7 and a coupling member 100G8. The first upper frame member 100G6 and the second upper frame member 100G7 form an arch shape. The first upper frame member 100G6 is attached to an upper portion of the first lower frame member 100G3. The second upper frame member 100G7 is attached to an upper portion of the second lower frame 100G4. The coupling member 100G8 connects an upper portion of the first upper frame member 100G6 and an upper portion of the second upper frame member 100G7 to each other.

As shown in FIG. 52, the position detectors 47 are attached to the upper portion of the upper frame 100G2. The position detectors 47 are attached to the first upper frame member 100G6 and the second upper frame member 100G7. A flight controller 48 is attached to an upper portion of the lower frame 100G1. The flight controller 48 is attached to the connection plate 100G5. A reservoir tank 65 is attached to a side portion of the lower frame 100G1. The reservoir tank 65 is attached to the second lower frame member 100G4.

As shown in FIG. 47, the projecting frame 9 is integrally formed with the framed main body 8. In the first example embodiment, the projecting frame 9 is connected to the framed main body 8 via couplings 200. On the contrary, in the second example embodiment, the projecting frame 9 is integrally formed with the framed main body 8 without using couplings 200.

The first projecting frame 9A includes a first projecting frame member 9A1 and a second projecting frame member 9A2. The first projecting frame member 9A1 is integrally formed with the third horizontal frame member 100A3, and extends leftwardly rearward from a left-end of the third horizontal frame member 100A3. The second projecting frame member 9A2 is integrally formed with the fourth horizontal frame member 100A4, and extends leftwardly forward from a left-end of the fourth horizontal frame member 100A4 to a front-left side.

The first projecting frame member 9A1 and the second projecting frame member 9A2 extend to approach each other in directions thereof away from the framed main body 8. A left-end of the first projecting frame member 9A1 and a left-end of the second projecting frame member 9A2 are joined to each other via a first connector 145. The first main rotor 3A1 is attached to the first connector 145 (see FIG. 39).

The second projecting frame 9B includes a third projecting frame member 9B1 and a fourth projecting frame member 9B2. The third projecting frame member 9B1 is integrally formed with the third horizontal frame member 100A3, and extends rightwardly rearward from a right-end of the third horizontal frame member 100A3. The fourth projecting frame member 9B2 is integrally formed with the fourth horizontal frame member 100A4, and extends rightwardly forward from a right-end of the fourth horizontal frame member 100A4.

The third projecting frame member 9B1 and the fourth projecting frame member 9B2 extend to approach each other in directions thereof away from the framed main body 8. A right-end of the third projecting frame member 9B1 and a right-end of the fourth projecting frame member 9B2 are joined to each other via a second connector 146. The second main rotor 3A2 is attached to the second connector 146 (see FIG. 39).

A single frame member defines the first projecting frame member 9A1, the third horizontal frame member 100A3 and the third projecting frame member 9B1. Another single frame member defines the second projecting frame member 9A2, the fourth horizontal frame member 100A4 and the fourth projecting frame member 9B2. The single frame member defining the first projecting frame member 9A1, the third horizontal frame member 100A3 and the third projecting frame member 9B1, and the single frame member defining the second projecting frame member 9A2 and the fourth horizontal frame member 100A4 are connected to each other via the first connector 145 and the second connector 146.

A pivot shaft 22 to which a proximal end of the first arm 7A is connected is attached to the first projecting frame member 9A1 via corresponding shaft support portions 24. A pivot shaft 22 to which a proximal end of the third arm 7C is connected is attached to the second projecting frame member 9A2 via corresponding shaft support portions 24. A pivot shaft 22 to which a proximal end of the second arm 7B is connected is attached to the fourth projecting frame member 9B2 via corresponding shaft support portions 24. A pivot shaft 22 to which a proximal end of the fourth arm 7D is connected is attached to the fourth projecting frame member 9B2 via corresponding shaft support portions 24.

An intermediate portion in the up-down direction of the first vertical frame member 100B1 and the first projecting frame member 9A1 are joined to each other via a first oblique member 9C1. An intermediate portion in the up-down direction of the third vertical frame member 100B3 and the second projecting frame member 9A2 are joined to each other via a second oblique member 9C2. An intermediate portion in the up-down direction of the second vertical frame member 100B2 and the third projecting frame member 9B1 are joined to each other via a third oblique member 9C3. An intermediate portion in the up-down direction of the fourth vertical frame member 100B4 and the fourth projecting frame member 9B2 are joined to each other via a fourth oblique member 9C4.

The first to fourth oblique members 9C1 to 9C4 are second supports 31B to support the arm 7 such that the second supports 31B are located on the same side of the respective pivoting portions 22 as the main body assembly 6 (see FIGS. 40 to 43). In the first example embodiment, the second supports 31B directly support the respective arms 7. On the contrary, in the second example embodiment, the second supports 31B (first oblique member 9C1 to fourth oblique member 9C4) indirectly support the respective arms 7 via the projecting frames 9.

As shown in FIGS. 38 to 43, one or more skids 10 include a front skid 10A and a rear skid 10B. As shown in FIG. 40, the front skid 10A include a front upper portion **10*a* extending in the left-right direction, a front-left portion 10*b* extending downward from a left end of the front upper portion 10*a*, and a front-right portion 10*c* extending downward from a right end of the front upper portion 10*a*. The front upper portion 10*a* is connected to the thirteenth horizontal frame member 100A13 of the framed main body 8 (see FIG. 47**).

As shown in FIG. 41, the rear skid 10B includes a rear-upper portion **10*d* extending in the left-right direction, a rear-left portion 10*e* extending downward from a left-end of the rear-upper portion 10*d*, and a rear-right portion 10*f* extending downward from a right end of the rear-upper portion 10*d*. The rear-upper portion 10*d* is connected to the fourteenth horizontal frame member 100A14 of the framed main body 8 (see FIG. 47**).

The front skid 10A include a front connection member 191 to connect the front-left portion **10*b* and the front-right portion 10*c*. The rear skid 10B include a rear connection member 192 to connect the rear-left portion 10*e* and the rear-right portion 10*f*** to each other.

As shown in FIG. 42, the front-left portion **10*b* of the front skid 10A and the rear-left portion 10*e* of the rear skid 10B are connected to each other via a first left coupling member 193, a second left coupling member 194 and a third left coupling member 195. The first left coupling member 193 and the second left coupling member 194 intersect each other at intermediate portions thereof. The first left coupling member 193 connects a lower portion of the front-left portion 10*b* and an upper portion of the rear-left portion 10*e* to each other. The second left coupling member 194 connects an upper portion of the front-left portion 10*b* and a lower portion of the rear-left portion 10*e* to each other. The third left coupling member 195 connects a lower portion of the front-left portion 10*b* and a lower portion of the rear-left portion 10*e*** to each other.

As shown in FIG. 43, the front-right portion **10*c* of the front skid 10A and the rear-right portion 10*f* of the rear skid 10B are connected via a first right coupling member 196, a second right coupling member 197 and a third right coupling member 198. The first right coupling member 196 and the second right coupling member 197 intersect each other at intermediate portions thereof. The first right coupling member 196 connects an upper portion of the front-right portion 10*c* and a lower portion of the rear-right portion 10*f* to each other. The second right coupling member 197 connects a lower portion of the front-right portion 10*c* and an upper portion of the rear-right portion 10*f* to each other. The third right coupling member 198 connects a lower portion of the front-right portion 10*c* and a lower portion of the rear-right portion 10*f*** to each other.

Figure 54:
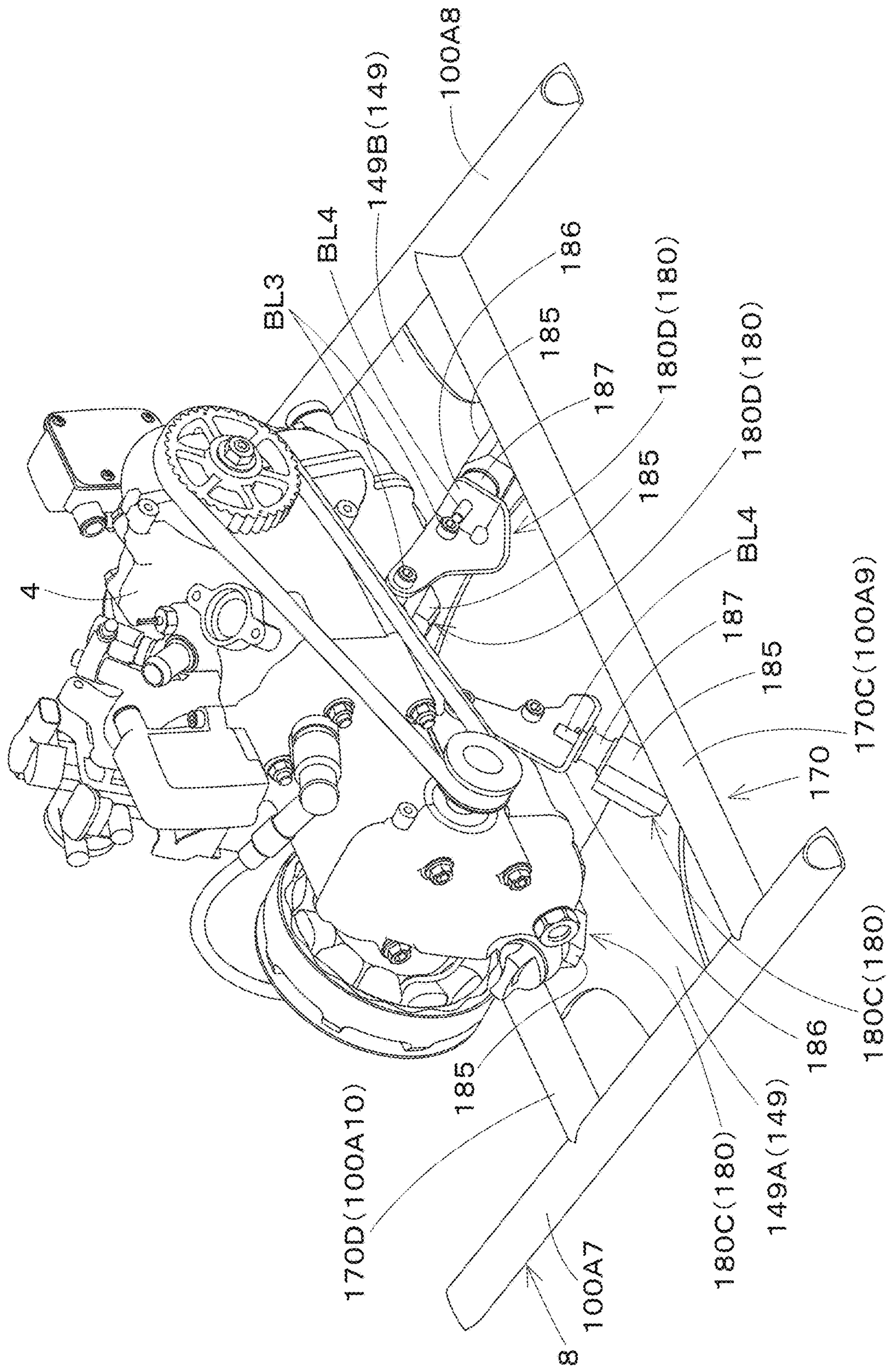
FIG. 54 is a perspective view illustrating an engine-support structure of a flying apparatus according to the second example embodiment.

As shown in FIG. 54, the engine 4 is supported by engine mounts 180 attached to some of the pipes 170 that define the framed main body 8. As previously described, the frame members 100 are made of the pipes 170. The pipes 170 include ones with the engine mounts 180 attached thereto that are a third pipe 170C and a fourth pipe 170D provided below the engine 4. The third pipe 170C is the ninth horizontal frame member 100A9 (see FIG. 47), and the fourth pipe 170D is the tenth horizontal frame member 100A10 (see FIG. 47).

As shown in FIG. 44, in a planar view, the third pipe 170C and the fourth pipe 170D extend obliquely relative to a line L5 connecting a center of the first rotor (first main rotor) 3A1 and a center of the second rotor (second main rotor) 3A2. Specifically, in a planar view, the third pipe 170C and the fourth pipe 170D extend to intersect with the line L5. The third pipe 170C and the fourth pipe 170D intersect the line L5 at non-right angles.

In the first example embodiment, the axial direction(s) of the pipes (first pipe 170A and second pipe 170B) with the engine mounts 180 attached thereto is (are) parallel to the direction(s) in which the first output shaft **4*c* and the second output shaft 4*d* extend (see FIG. 14). In the second example embodiment, the axial direction(s) of the pipes (third pipe 170C and fourth pipe 170D) with the engine mounts 180 attached thereto is (are) perpendicular to the direction(s) in which the first output shaft 4*c* and the second output shaft 4*d*** extend.

As shown in FIG. 54, the engine mounts 180 are attached to the corresponding pipes 170 via connection plates 149 located below the engine 4. The connection plates 149 include a first connection plate 149A and a second connection plate 149B. The first connection plate 149A and the second connection plate 149B are spaced in the axial direction(s) of the third pipe 170C and the fourth pipe 170D. The first connection plate 149A connects the seventh horizontal frame member 100A7, the third pipe 170C (ninth horizontal frame member 100A9) and the fourth pipe 170D (tenth horizontal frame member 100A10). The second connection plate 149B connects the eighth horizontal frame member 100A8, the third pipe 170C (ninth horizontal frame member 100A9) and the fourth pipe 170D (tenth horizontal frame member 100A10).

As shown in FIG. 54, the engine mounts 180 include third engine mounts 180C attached to the first connection plate 149A, and fourth engine mounts 180D attached to the second connection plate 149B.

The engine 4 is supported by the framed main body 8 via the third engine mounts 180C and the fourth engine mounts 180D. The third engine mounts 180C support a front portion of the engine 4. The front portion of the engine 4 is supported by a pair of the third engine mounts 180C. The pair of third engine mounts 180C are spaced from each other in the left-right direction. The fourth engine mounts 180D support a rear portion of the engine 4. The rear portion of the engine 4 is supported by a pair of the fourth engine mounts 180D. The pair of fourth engine mounts 180D are spaced from each other in the left-right direction.

The following describes a configuration of the engine mount 180 based on FIG. 54. The engine mounts 180 each include a base member 185, a support bracket 186 and elastic bodies 187. The base member 185 is fixed via welding and/or the like to the connection plate 149. The support bracket 186 is attached to the engine 4 by one or more fasteners such as bolts BL3 and/or the like. The elastic bodies 187 are provided between the base member 185 and the support bracket 186. The elastic bodies 187, the base member 185 and the support bracket 186 are connected to each other via a bolt BL4 and/or the like.

As previously described, the support bracket 186 connected to the engine 4 and the base member 185 fixed to the connection plate 149 are connected to each other via the elastic bodies 187, so that the engine 4 is supported by the connection plates 149 via the engine mounts 180. Since the connection plates 149 are connected to the pipes (third pipe 170C and fourth pipe 170D and/or the like), the engine 4 is supported by the pipes (third pipe 170C and fourth pipe 170D and/or the like) via the engine mounts 180.

The previously described configurations are configurations of flying apparatuses 1 according to example embodiments (first example embodiment and second example embodiment) of the present invention. The flying apparatuses 1 of the previously described example embodiments (first and second example embodiment) are each configured to drive the main rotors 3A via the engine 4 and drive the sub-rotors 3B via the motors 5, but may be configured to drive the main rotors 3A and the sub-rotors 3B via one or mor motors 5. In such a case, it is possible to provide the flying apparatus 1 including the one or more motors 5 and not including the engine 4. In such a case, electric power stored in one or more batteries 46 is used to drive the one or more motors 5, and the main rotors 3A and the sub-rotors 3B are driven via power supplied from the one or more motors 5.

If a flying apparatus 1 includes such a motor or motors 5 but does not include the engine 4, a cooler (radiator) 40 is configured to water-cool the one or more batteries 46 (to cool a coolant for cooling the one or more batteries 46). In such a case, a pump 66 is configured to circulate coolant between an inner portion (or surroundings) of the one or more batteries 46 and the cooler (radiator) 40. Thus, the pump 66, the cooler (radiator) 40 and the inner portion (or outer vicinity) of the one or more batteries 46 are connected via pipes to circulate the coolant.

In each of the flying apparatuses 1 of the previously described example embodiments (first and second example embodiments), the cooler (radiator) 40 may be configured to water-cool the one or more batteries 46 in addition to the engine 4. In such a case, the pump 66 is configured to circulate the coolant between the engine 4 and the cooler (radiator) 40, and between the inner portion (or surroundings) of the one or more batteries 46 and the cooler 40. Thus, the pump 66, the cooler (radiator) 40 and the engine 4 are connected together via corresponding pipes to circulate the coolant, and the pump 66, the cooler (radiator) 40 and the inner portion(s) (or surroundings) of the one or more batteries 46 are connected together via corresponding pipes to circulate the coolant.

The following simply summarize main configurations and effects of the flying apparatus 1 related to the previously mentioned example embodiments. Firstly, main configurations and effects related to the layout structure of the rotors 3 are as follows.

A flying apparatus 1 includes an airframe 2, and a plurality of rotors 3 attached to the airframe 2. The plurality of rotors 3 include at least one main rotor 3A to generate lifting power to float the airframe 2 and at least one sub-rotor 3B to control a posture of the airframe 2. In a planar view, the at least one main rotor 3A is located on the same side of the at least one sub-motor 3B as a center of the airframe 2.

According to this configuration, since the main rotor 3A to generate lifting power to float the airframe 2 is, in a planar view, located closer to the center of the airframe 2 than the sub-rotor 3B to control the posture of the airframe 2, it is possible to efficiently and distributively cause the main rotor 3A to perform the function to float the airframe 2, and the sub-rotor 3B to perform the function to control the posture of the airframe 2. Thus, it is possible to smoothly float the airframe 2 and to control a posture thereof.

In a planar view, a plurality of the sub-rotors 3B are provided along a periphery of the airframe 2, and the main rotor 3A is provided on an inner side (airframe-inward) of a circle CL1 connecting centers of the plurality of sub-rotors 3B.

According to this configuration, since the main rotor 3A is provided at positions on the inner side of the plurality of sub-rotors 3B, it is possible to efficiently cause the lifting power generated by the main rotor 3A to act on the airframe 2 in the flying apparatus 1 including the plurality of sub-rotors 3B.

In a planar view, a plurality of the main rotors 3A are provided in the periphery of the airframe 2, and the sub-rotors 3B are located on an outer side of a circle CL2 connecting centers of the plurality of main rotors 3A.

According to this configuration, since the sub-rotors 3B are provided at positions on an outer side of the plurality of main rotors 3A, it is possible to steadily perform posture control via the sub-rotors 3B in the flying apparatus 1 including the plurality of main rotors 3A.

The airframe 2 includes a main body assembly 6 and a plurality of arms 7 extending radially away from the main body assembly 6, the sub-rotors 3B are respectively attached to the plurality of arms 7 and the main rotor 3A is located between the arms 7 which are adjacent to each other.

According to this configuration, since it is possible to cause downward flows of air (downwash) generated by the main rotors 3A to pass through between the arms 7 adjacent to each other, it is possible to efficiently acquire the lifting power necessary for the airframe 2 to float.

The flying apparatus 1 includes an engine 4 and a motor 5. The main rotor 3A is rotated via the driving force supplied from the engine 4, and the sub-rotor 3B is rotate via the driving force supplied from the motor 5.

According to this configuration, since it is possible to cause the main rotor 3A to rotate via a large driving force supplied from the engine 4, it is possible to acquire a large lifting power to cause the airframe 2 to float. By causing the sub-rotor 3B to rotate via the driving force supplied from the motor 5, it is possible to easily control the number of rotations and/or the like of the sub-rotor 3B.

The sub-rotors 3B include a first rotor 3BU and a second rotor 3BL overlapping each other when viewed in an up-down direction.

According to this configuration, since it is possible to cause the power generated by rotations of the sub-rotors 3B to increase via the first rotor 3BU and the second rotor 3BL, it is possible to increase performance of the posture control of the airframe 2. It is possible to compactly provide the first rotor 3BU and the second rotor 3BL in a planar view.

The main rotor 3A includes a rotating shaft 3*c* and a blade 3*f* attached to a lower portion of the rotating shaft 3*c*.

According to this configuration, it is possible to efficiently guide downward flows of air generated by rotation of the blade 3*d* of the main rotor 3A.

The first rotor 3BU includes a first rotating shaft 3*e* and a first blade 3*f* attached to the first rotating shaft 3*e*, and the second rotor 3BL includes a second rotating shaft 3*g* and a second blade 3*h* attached to the second rotating shaft 3*g*. The first blade 3*f* is attached to an upper portion of the first rotating shaft 3*e*, and the second blade 3*h* is attached to a lower portion of the second rotating shaft 3*g*.

According to this configuration, it is possible to compactly provide the first rotor 3BU and the second rotor 3BL close to each other in the up-down direction while reliably avoiding interferences of the first blades 3*f* and the second blades 3*h*.

The flying apparatus 1 includes a first motor 5A to supply a driving force to the first rotor 3BU, a second motor 5B to supply a driving force to the second rotor 3BL, and a controller 55 configured or programmed to individually change the number of rotations of the first motor 5A and the number of rotations of the second motor 5B.

According to this configuration, since it is possible to individually change the number of rotations of the first motor 5A and the number of rotations of the second motor 5B, it becomes possible to smoothly and precisely perform posture control of the airframe 2.

The main rotor 3A includes a rotating shaft 3*c* and a blade 3*d* attached to the rotating shaft 3*c*, and the sub-rotor 3B includes a rotating shaft 3*e*, 3*g* and a blade 3*f*, 3*h* attached to the rotating shaft 3*e*, 3*g*. A thrust per rotation of the blade 3*d* of the main rotor 3A is stronger than a thrust per rotation of the blade 3*f*, 3*d* of the sub-rotor 3B.

According to this configuration, it is possible to acquire a well-balanced optimum thrust for both the main rotor 3A which needs a strong thrust to cause the airframe 2 to float, and the sub-rotor 3B which does not need a strong thrust to cause the airframe 2 to float.

The first rotor 3BU is located higher than the main rotor 3A, and the second rotor 3BL is located lower than the first rotor 3BU and higher than the main rotor 3A.

According to this configuration, since the main rotor 3A is located lower than the first rotor 3BU and the second rotor 3BL, it possible to reduce an influence of downward flows of air (downwash) generated by the rotations of the main rotors 3A onto the sub-rotor 3B. Since the first rotor 3BU and the second rotor 3BL are located higher than the main rotor 3A, it is possible to steadily perform posture control of the airframe 2.

A distance between the main rotor 3A and the second rotor 3BL in the up-down direction is shorter than a distance between the first rotor 3BU and the second rotor BL in the up-down direction.

According to this configuration, since it is possible to provide the main rotor 3A and the sub-rotor 3B close to each other in the up-down direction, it is possible to compactly provide the rotors 3 in the up-down direction.

The first rotor 3BU is provided above the arm 7, and the second rotor 3BL is provided below the arm 7.

According to this configuration, the first rotor 3BU and the second rotor 3B1 are distributed above and below the arm 7, thus it is possible to equalize a force caused by the rotations of the first rotor 3BU and the second rotor 3BL and applied downward to the arm 7 with a force caused by the rotations of the first rotor 3BU and the second rotor 3BL and applied upward to the arm 7.

Secondly, main configurations and effects related to support structure of rotor(s) 3 are as follows.

A flying apparatus 1 includes an airframe 2, and a plurality of rotors 3 attached to the airframe 2. The airframe 2 includes a main body assembly 6 and an arm 7 extending from the main body assembly 6. The plurality of rotors 3 include a main rotor 3A attached to the main body assembly 6 and a sub-rotor 3B attached to the arm 7.

According to this configuration, since the plurality of rotors 3 include the main rotor 3A attached to the main body assembly 6 and the sub-rotor 3B attached to the arm 7, it is possible to cause the main rotor 3A and the sub-rotor 3B to effectively perform their respective functions different from each other. Specifically, it is possible to cause the main body assembly 6 to float via the rotation of the main rotor 3A, and to perform the posture modification of the airframe 2 via the rotation of the sub-rotor 3B.

The main body assembly 6 includes a framed main body 8 with a driver to drive the main rotor 3A mounted thereon or therein, and a projecting frame 9 projecting in a direction away from the framed main body 8 in a planar view. The main rotor 3A is attached to the projecting frame 9.

According to this configuration, since the main rotor 3A is attached to the projecting frame 9 projecting from the main body assembly 6, it is possible for the lifting power generated by the rotation of the main rotor 3A to be less easily influenced by the main body assembly 6.

The projecting frame 9 includes, at a distal end thereof in a projecting direction, a corner 9*a* with the main rotor 3A attached thereto.

According to this configuration, it is possible to restrict the projecting frame 9 from affecting the lifting power generated by the rotation of the main rotor 3A.

The projecting frame 9 extends in the direction away from the framed main body 8 and includes a plurality of frame members 100 defining a corner 9*a* therebetween by approaching each other in projecting directions thereof. The main rotor 3A is attached to the corner 9*a* defined by the plurality of frame members 100.

According to this configuration, since the main rotor 3A is attached to the corner 9*a* defined by the plurality of frame members 100, it is possible to cause the downward flow of air generated by the rotation of the main rotor 3A to pass through a gap between the plurality of frame members 100. Thus, it is possible to restrict the projecting frame from affecting the lifting power generated by the rotations of the main rotors 3A.

In a planar view, a plurality of the arms 7 extend radially from the main body assembly 6, and the corner 9*a* of the projecting frame 9 is located between each pair of the arms 7 adjacent to each other.

According to this configuration, it is possible to restrict the arms 7 from affecting the lifting power generated by the rotation of the main rotor 3A.

A rotation path R1 of a blade 3*d* of the main rotor 3A overlaps the main body assembly 6 when viewed in the up-down direction.

According to this configuration, it is possible to expose a portion of the main body assembly 6 to the downward flow of air generated by the rotation of the blade 3*d* of the main rotor 3A, and to use the downward flow of air to cool one or more pieces of equipment provided in or on the main body assembly 6.

The rotation path R1 of the blade 3*d* of the main rotor 3A overlaps the main body assembly 6 and the arm 7 when viewed in the up-down direction.

According to this configuration, it is possible to cause the lifting power generated by the rotation of the blade 3*d* of the main rotor 3A to act on the main body assembly 6 and the arm 7 in a well-balanced manner.

Thirdly, major components and effects related to support structure of arm(s) 7 are as follows.

A flying apparatus 1 includes a main body assembly 6, an arm 7 extending from the main body assembly 6, and a rotor 3 attached to the arm 7, wherein the arm 7 includes a plurality of rods 12 extending in juxtaposition with each other, and the rotor 3 is supported by the plurality of rods 12.

According to this configuration, since it is possible to improve the rigidity of the arm 7, it is possible to prevent the arm 7 from deforming even when a load is applied to the arm 7. It is possible for an airflow to circulate between the juxtaposed rods 12, so it is possible to reduce an air resistance applied on the arm 7 during flight.

The plurality of rods 12 are juxtaposed in a horizontal direction.

According to this configuration, it is possible to increase the strength of the arm 7 against a force acting in a horizontal direction.

The arm 7 is attached at a proximal end 7*a* thereof to the main body assembly 6, and is provided with the rotor 3 attached to the distal end 7*b* thereof. An interval between the plurality of rods 12 reduces in a direction from the proximal end 7*a* of the arm 7 toward the distal end 7*b* of the arm 7.

According to this configuration, it is possible to improve the strength of the proximal end 7*a* which is a portion of the arm 7 attached to the main body assembly 6. It is possible to restrict the arm 7 from affecting an airflow generated by rotation of the rotor 3.

The flying apparatus 1 includes a connector 31 to connect the main body assembly 6 to the arm 7. The connector 31 extends obliquely upward from the main body assembly 6 and is connected to an intermediate portion of the arm 7.

According to this configuration, since the intermediate portion of the arm 7 is connected to the main body assembly 6 by the connector 31, the arm 7 is supported from below by the connector 31. Thus, it is possible to improve the strength of the arm 7 against a force applied from above.

The connector 31 includes a first end 31*a* connected to the main body assembly 6 and a second end 31*b* connected to the intermediate portion of the arm 7. The second end 31*b* and the arm 7 are connected to each other via a bracket 32. The bracket 32 overlaps the rotor 3 when viewed in an up-down direction.

According to this configuration, it is possible to support the arm 7 via the connector 31 overlapping the rotor 3 when viewed in the up-down direction. Thus, it is possible for the connector 31 to receive a load generated by the driving of the rotor 3 and acting on the arm 7.

The connector 31 extends between the plurality of rods 12 in a planar view.

According to this configuration, it is possible for the connector 31 to support the arm 7 at a position between the plurality of rods 12.

The arm 7 is rotatable between a first position in which the arm 7 extends horizontally, and a second position in which the arm 7 extends upward or downward.

According to this configuration, since the flying apparatus 1 can be made more compact by rotating the arm 7 to the second position, it is possible to improve a convenience of a storage and/or a transport of the flying apparatus 1.

The flying apparatus 1 includes a skid 10 attached to a lower portion of the main body assembly 6. The arm 7 extends downward when in the second position.

According to this configuration, since the arm 7 extends downward toward the skid 10 when the arm 7 is in the second position, a height of the flying apparatus 1 can be made smaller compared to when the arm 7 extends upward.

Fourthly, major components and effects related to layout structure of electrical component(s) 35 are as follows.

A flying apparatus 1 includes a main body assembly 6, at least one arm 7 extending from the main body assembly 6, at least one rotor 3 attached to the at least one arm 7, and at least one electrical component 35 to drive the at least one rotor 3. The at least one electrical component 35 is attached to the at least one arm 7.

According to this configuration, since the at least one electrical component 35 to drive the at least one rotor 3 is attached to the at least one arm 7, it is possible to reduce a size and a weight of the main body assembly 6. It is possible to reduce a length of wire(s) connecting the at least one electrical component 35 and the at least one motor 5.

The flying apparatus 1 includes at least one motor 5 to supply a driving force to drive the at least one rotor 3. The at least one electrical component 35 includes at least one inverter to control electric power supplied to the at least one motor 5.

According to this configuration, since the at least one inverter 35 can be provided close to the at least one motor 5, it is possible to reduce the length of wire(s) connecting the at least one inverter 35 and the at least one motor 5.

A plurality of the rotors 3 include a first rotor 3BU and a second rotor 3BL overlap each other when viewed in an up-down direction. A plurality of the motors 5 include a first motor 5A to supply a driving force to the first rotor 3BU and a second motor 5B to supply a driving force to the second rotor 3BL. A plurality of the inverters 35 include a first inverter 35A to control electric power supplied to the first motor 5A and a second inverter 35B to control electric power supplied to the second motor 5B.

According to this configuration, it is possible to individually control the electric power supplied to the first motor 5A and the second motor 5B via two inverters (first inverter 35A and second inverter 35B). Thus, it becomes possibles to individually control the rotations of the first rotor 3BU and the second rotor 3BL.

The at least one rotor (sub-rotor 3B) includes a rotating shaft 3*e*, 3*g*, and a blade 3*f*, 3*h* attached to the rotating shaft 3*e*, 3*g*. The blade 3*f*, 3*h* overlaps the at least one electrical component 35 when viewed in the up-down direction.

According to the configuration, it is possible to cool the at least one electrical component 35 via the downward flow of air generated by the rotation of the blade 3*f*, 3*h*. Thus, it becomes possible to cool the at least one electrical component 35 without requiring any extra cooling device.

The flying apparatus 1 includes a connector 31 to connect an intermediate portion of the at least one arm 7 to the main body assembly 6. The connector 31 extends between the first inverter 35A and the second inverter 35B.

According to this configuration, since it is possible to support the at least one arm 7 via the connector 31 located between the first inverter 35A and the second inverter 35B, it is possible to steadily support the at least one arm 7 to which the one or more inverters 35 are attached.

The connector 31 includes a first end 31*a* connected to the main body assembly 6 and a second end 31*b* connected to the intermediate portion of the at least one arm 7. The second end 31*b* and the at least one arm 7 are connected to each other via a bracket 32. The at least one electrical component 35 overlaps the bracket 32 when viewed in a longitudinal direction of the at least one arm 7.

According to this configuration, since the at least one electrical component 35 is located in a vicinity of a junction between the arm 7 and the connector 31, it is possible to provide the at least one electrical component 35 on a portion of the at least one arm 7 strengthened by the connection thereof with the connector 31.

The connector 31 includes a first end 31*a* connected to the main body assembly 6 and a second end 31*b* connected to an intermediate portion of the at least one arm 7. The second end 31*b* and the arm 7 are connected to each other via a bracket 32. The at least one electrical component 35 is located on the same side of the bracket 32 as the main body assembly 6 in the longitudinal direction of the at least one arm 7.

According to this configuration, since the at least one electrical component 35 is located between the second end 31*b* of the connector 31 and the main body assembly 6, it is possible to attach the electrical component 35 to a portion where the at least one arm 7 is supported at both ends thereof.

The at least one rotor (sub-rotor 3B) includes a rotating shaft 3*e*, 3*g*, and a blade 3*f*, 3*h* attached to the rotating shaft 3*e*, 3*g*. The blade 3*f*, 3*h* overlaps the bracket 32 when viewed in an up-down direction.

According to this configuration, since it is possible to expose the bracket 32 to the downward flow of air generated by the rotation of the blade 3*f*, 3*h*, it is possible to cool the bracket 32 and the electrical component 35 by attaching the at least one electrical component 35 at a position to overlap the bracket 32.

The at least one arm 7 is attached to the main body assembly 6 to be rotatable upward or downward relative to the main body assembly 6, and the at least one electrical component 35 is located on the same side of a rotation axis of the at least one arm 7 as a distal end of the at least one arm 7.

According to this configuration, since it is possible to cause the at least one electrical component 35 to rotate together with the at least one arm 7, it is possible to prevent the rotation of the at least one arm 7 from applying a load onto the wire(s) and/or the like connecting the at least one electrical component 35 and the at least one motor 5.

Fifthly, major components and effects related to a folding structure of arm(s) 7 are as follows.

A flying apparatus 1 includes a main body assembly 6, an arm 7 extending in a direction away from the main body assembly 6 in a planar view, and a rotor 3 attached to the arm 7. The arm 7 is rotatable downward from a predetermined position in which the arm 7 is to be when the flying apparatus 1 flies.

According to this configuration, since the arm 7 is rotatable downward from the predetermined position in which the arm 7 is to be when the flying apparatus 1 flies, it is possible to fold the arm 7 downward and make the flying apparatus 1 more compact to be more easily transportable.

The flying apparatus 1 includes a pivoting portion 21 to support the arm 7 to be rotatable downward relative to the main body assembly 6. The pivoting portion 21 includes a switching mechanism 25 switchable between a first state in which the arm 7 is allowed to rotate relative to the main body assembly 6, and a second state in which the arm 7 is not allowed to rotate relative to the main body assembly 6.

According to this configuration, it is possible to, when the flying apparatus is in use, reliably prevent the arm 7 from unintendedly rotating, and it is also possible to, when the flying apparatus is not in use, rotate the arm 7 to make the flying apparatus 1 more compact.

The flying apparatus 1 includes a stopper 30 to stop the arm 7 from rotating upward from the predetermined position.

According to this configuration, since upward rotation of the arm 7 from the predetermined position is prevented, it is possible to surely appropriately locate the arm 7 at the predetermined position in the case where the arm 7 is rotated upward to the predetermined position when the flying apparatus 1 is in use.

The arm 7 includes a first section 71 fixed to the main body assembly 6, and a second section 72 rotatable relative to the first section 71 and provided with the rotor 3 attached thereto.

According to this configuration, it is possible to reduce a length of a rotatable portion of the arm 7 compared to when an entirety of the arm 7 is rotatable relative to the main body assembly 6. Thus, it is possible to reduce a load applied to the arm 7 when the arm 7 is rotated, and to effectively prevent the arm 7 from being damaged.

The first section 71 includes a plurality of rods 12 juxtaposed in the horizontal direction.

According to this configuration, it is possible to improve a strength of the first section 71 of the arm 7 against a force applied in the horizontal direction. It is possible for an airflow to circulate between the juxtaposed rods 12, so it is possible to reduce an air resistance against the arm 7 when the flying apparatus 1 flies.

The flying apparatus 1 includes a stopper 30 to stop the arm 7 from rotating upward from the predetermined position. The stopper 30 includes a plate between the first section 71 and the second section 72. The plurality of rods 12 are connected to the plate 30.

According to this configuration, with the plurality of rods 12 connected to the plate 30, it is possible to improve a strength of the plate 30 located between the first section 71 and the second section 72.

The flying apparatus 1 includes supports 31 connected to the main body assembly 6 and supporting the arm 7 from below. The supports 31 include a first support 31A to support the arm 7 at a position on the same side of the pivoting portion 21 as the rotor 3, and a second support 31B to support the arm 7 at a position on the same side of the pivoting portion 21 as the main body assembly 6.

According to this configuration, since the arm 7 is supported by the supports 31 at both the position on the same side of the pivoting portion 21 as the rotor 3 than the pivoting portion 21 and the position on the same side of the pivoting portion 21 as the main body assembly 6, it is possible to firmly support the arm 7 from below. Thus, it is possible to effectively prevent pitching motion of the arm 7.

The flying apparatus 1 includes a stopper 30 to stop the arm 7 from rotating upward from the predetermined position. The arm 7 includes a first section 71 fixed to the main body assembly 6, and a second section 72 rotatable relative to the first section 71 and provided with the rotor 3 attached thereto. The stopper 30 includes a plate between the first section 71 and the second section 72. The second support 31B is connected to the plate 30.

According to this configuration, with the plate defining the stopper 30 provided between the first section 71 and the second section 72, it is possible to reliably prevent, via the stopper 30, excessive upward rotation of the second section 72. Since the second support 31B is connected to the plate 30, it is possible to improve the strength of the plate 30.

The flying apparatus 1 includes a skid 10 attached to a lower portion of the main body assembly 6, and a distal end of the arm 7 is located higher than a lower end of the skid 10 when the arm 7 is rotated downward.

According to this configuration, it is possible to prevent the distal end of the arm 7 from entering into contact with the ground when the arm 7 is rotated downward.

Sixthly, main configurations and effects related to output shaft(s) of engine 4 are as follows.

A flying apparatus 1 includes a main body assembly 6, a plurality of arms 7 extending from the main body assembly 6 in a planar view, a plurality of rotors 3 respectively attached to the plurality of arms 7, and an engine 4 to supply a driving force to the plurality of rotors 3. In a planar view, the plurality of rotors 3 include a first-side rotor 3A1 provided on a first side of the engine 4 and a second-side rotor 3A2 provided on a second side of the engine 4 opposite the first side. The engine 4 includes a first output shaft 4*c* to supply a driving force to the first-side rotor 3A1 and a second output shaft 4*d* to supply a driving force to the second-side rotor 3A2.

According to this configuration, since the engine 4 includes the first output shaft 4*c* to supply a driving force to the first-side rotor 3A1 and the second output shaft 4*d* to supply a driving force to the second-side rotor 3A2, it is possible to distributively transmit rotations generated by the engine 4 to the plurality of rotors 3 and to simplify a rotation transmission pathway.

In a planar view, the first output shaft 4*c* and the second output shaft 4*d* extend obliquely relative to a line L5 connecting a center of the first-side rotor 3A1 to a center of the second-side rotor 3A2.

According to this configuration, even when a direction in which the first output shaft 4*c* extends and a direction in which the second output shaft 4*d* extends are not on a common straight line, it is possible to reliably connect the first output shaft 4*c* and the second output shaft 4*d* to the first-side rotor 3A1 and the second-side rotor 3A2.

In a planar view, the main body assembly 6 includes a framed main body 8 to enclose the engine 4. The framed main body 8 includes a first frame member 101 provided on the first side of the engine 4 and a second frame member 102 provided on the second side of the engine 4. The first output shaft 4*c* extends, in a planar view, obliquely relative to the first frame member 101. The second output shaft 4*d* extends, in a planar view, obliquely relative to the second frame member 102.

According to this configuration, since it is possible to provide the engine 4 obliquely relative to the framed main body 8, it is possible to reduce a size of the framed main body 8.

A direction in which the first output shaft 4*c* extends and a direction in which the second output shaft 4*d* extends are not on a common straight line and are parallel or substantially parallel to each other.

According to this configuration, when the first output shaft 4*c* and the second output shaft 4*d* extend away from the engine in opposite directions, it is possible to extend the first output shaft 4*c* and the second output shaft 4*d* toward the first-side rotor 3A1 and the second-side rotor 3A2.

The engine 4 includes an engine main body 4*a* from which the first output shaft 4*c* and the second output shaft 4*d* project. The engine main body 4*a* is provided obliquely relative to the framed main body 8.

According to this configuration, since it is possible to contain the engine main body 4*a* in the framed main body 8 even when the engine main body 4*a* has an elongated shape in one direction, it is possible to reduce the size of the framed main body 8 in which the engine 4 is mounted.

The engine 4 includes an air intake 4*e* facing upward.

According to this configuration, since it is possible to cause an intake pipe (first connecting pipe 61) connected to the air intake 4*e* of the engine 4 to extend above the engine 4, it becomes possible to reduce a size of the flying apparatus 1 in a planar view.

The engine 4 includes an exhaust port 4*f* facing upward.

According to this configuration, since it is possible to cause an exhaust pipe (second connecting pipe 62) connected to the exhaust port 4*f* of the engine 4 to extend above the engine 4, it is possible to reduce the size of the flying apparatus 1 in a planar view.

Seventhly, main configurations and effects related to a configuration of main body assembly 6 are as follows.

A flying apparatus 1 includes a main body assembly 6, an arm 7 extending from the main body assembly 6, and a rotor 3 attached to the arm 7. The main body assembly 6 includes a plurality of linear frame members 100, and one or more couplings 200 to connect the frame members 100 together.

According to this configuration, since the main body assembly 6 includes the plurality of linear frame members 100, and the one or more couplings 200 to connect the frame members 100 together, it is easy to modify a shape of the main body assembly 6 according to the type, the size and/or the like of pieces of equipment provided therein. It is possible to reduce a weight of the main body assembly 6. With increase of breathability of the main body assembly 6, it is possible to prevent overheating of various pieces of equipment provided in the main body assembly 6.

The arm 7 includes a linear rod 12 connected to a frame member 100 via a coupling 200.

According to this configuration, it is possible to reliably connect the arm 7 and the main body assembly 6, and to easily perform connection and/or detachment thereof.

The arm 7 includes a plurality of rods 12 juxtaposed in the horizontal direction and respectively connected to the frame member 100 via respective couplings 200.

According to this configuration, it is possible to increase a strength of the arm 7 against a force in the horizontal direction, and to increase a connection strength of the arm 7 and the main body assembly 6.

The flying apparatus includes an engine 4 to supply a driving force to the rotor 3. The main body assembly 6 includes the framed main body 8 with the engine 4 provided thereon or therein. The framed main body 8 includes a plurality of linear frame members 100 assembled together by one or more couplings 200 into a three-dimensional shape.

According to this configuration, it becomes possible to easily modify a shape or a size of the framed main body 8 according to a shape or a size of the engine 4.

The main body assembly 6 includes a projecting frame 9 projecting from the framed main body 8 and provided with another rotor 3 attached thereto different from the rotor 3 attached to the arm 7. The projecting frame 9 includes the plurality of linear frame members 100. The frame members 100 of the projecting frame 9 are connected, via one or more couplings 200, to the frame members 100 defining the framed main body 8.

According to this configuration, it is possible to reduce a weight of the projecting frame 9 with a rotor 3 attached thereto different from the rotor 3 attached to the arm 7, and to easily and reliably connect the projecting frame 9 to the framed main body 8.

The arm 7 includes a plurality of linear rods 12 which are connected, via the couplings 200, to the frame members 100 defining the projecting frame 9.

According to this configuration, it is possible to easily and reliably connect the rods 12 of the arm 7 and the projecting frame 9 via the one or more couplings 200.

The flying apparatus 1 includes an skid 10 attached to a lower portion of the main body assembly 6. The skid 10 includes a plurality of linear frame members 100. One or more couplings 200 connect the frame members 100 together.

According to this configuration, it is possible to easily form the skid 10 with a shape or a size to match a shape or a weight of the main body assembly 6.

The coupling 200 includes a plurality of connection ports 200*a*. End portions of the frame members 100 are respectively inserted into the plurality of connection ports 200*a*. When an inner diameter of the connection port 200*a* is a diameter D and a length of a portion of the frame member 100 inserted into the connection port 200*a* is an insertion length L, satisfy a formula: $D/10 \leq L$.

According to this configuration, it is possible to reliably connect the couplings 200 and the frame members 100, and to provide a connection portion of each of the couplings 200 to the frame members 100 with a high strength.

The frame members 100 include cylindrical pipes 170.

According to this configuration, since the frame members 100 are light and include cylindrical pipes 170 shaped to be strong against external forces, it is possible to configure the main body assembly 6 with a high strength and a light weight.

The frame members 100 are made of magnesium alloy.

According to this configuration, since the frame members 100 are made of the material having high-strength and light-weight, it is possible to make the main body assembly 6 having a high-strength and a light-weight.

Eighthly, main configurations and effects related to a cooler 40 are as follows.

A flying apparatus 1 includes an airframe 2, a rotor (main rotor 3A) attached to the airframe 2, a driver 4 to drive the rotor (main rotor 3A), and a cooler 40 to water-cool the driver 4. The cooler 40 is provided below a blade 3*d* of the rotor (main rotor 3A).

According to this configuration, it is possible to expose the cooler 40 to the downward flow of air generated by driving the rotor (main rotor 3A). Thus, it is possible to efficiently cool the cooler 40.

The driver includes an engine 4, and the cooler 40 includes a radiator 40. The radiator 40 is provided below the blade 3*d* of the rotor (main rotor 3A).

According to this configuration, it is possible to expose the radiator 40 to the downward flow of air generated by driving the rotor 3. Thus, it is possible to efficiently cool the radiator 40.

The cooler 40 overlaps a rotation path R1 of the blade 3*d* in a planar view.

According to this configuration, it is possible to reliably expose the cooler 40 to the downward flow of air generated by rotation of the blade 3*d* of the rotor 3. Thus, it is possible to greatly efficiently cool the cooler 40.

The flying apparatus 1 includes a baffle 44 to guide, toward the radiator 40, a downward flow of air generated by rotation of the blade 3*d*.

According to this configuration, since it is possible to guide the downward flow of air generated by the rotations of the blade 3*d* toward the cooler 40 via the baffle 44, it is possible to reliably expose the cooler 40 to the flow of air.

The baffle 44 overlaps a rotation path R1 of the blade 3*d* in a planar view.

According to this configuration, it is possible to reliably guide the downward flow of air generated by the rotation of the blade 3*d* to the baffle 44.

An upper end of the baffle 44 is located higher than the blades 3*d*.

According to this configuration, it is possible to efficiently direct most of the downward flow of air generated by the rotation of the blade 3*d* downward via the baffle 44.

An upper end of the baffle 44 is located below the blade 3*d*.

According to this configuration, it is possible to direct the downward flow of air generated by the rotation of the blade 3*d* downward via the baffle 44, and it is possible to guide a portion of the flow of air from the upper side of the baffle 44 toward the driver 4 and/or the like to cool the driver 4 and/or the like.

The airframe 2 includes a main body assembly 6 with the driver 4 mounted thereon or therein, and the cooler 40 is provided on a side of the main body assembly 6.

According to this configuration, since the cooler 40 is provided on the side of the main body assembly 6, it is possible to efficiently perform heat-dissipation from the cooler 40 without being obstructed by the main body assembly 6.

A radiating surface 40*a* of the cooler 40 faces upward. The baffle 44 is provided above the radiating surface 40*a*.

According to this configuration, since it is possible to expose the radiating surface 40*a* of the cooler 40 to the flow of air guided by the baffle 44, it is possible to efficiently cool the radiating surface 40*a*.

The baffle 44 includes a first plate 44*a* and a second plate 44*b* facing each other while being spaced from each other, and a third plate 44*c* connecting the first plate 44*a* and the second plate 44*b* to each other.

According to this configuration, it is possible to smoothly guide the downward flow of air along the space surrounded by the first plate 44*a*, the second plate 44*b* and the third plate 44*c* of the baffle 44.

The baffle 44 includes an expansion portion 45 that gradually increases a width of a space between the first plate 44*a* and the second plate 44*b* in an upward direction.

According to this configuration, it is possible to reliably take in the downward flow of air generated by the rotation of the blade 3*d* from the wide upper end of the baffle 44 to the space between the first plate 44*a* and the second plate 44*b* and guide the flow of air toward the cooler 40.

In a planar view, the cooler 40 is provided between a center of the rotor 3 and the third plate 44*c*.

According to this configuration, it is possible to guide the downward flow of air generated by the rotation of the rotor 3 along a surface of the third plate 44*c* toward the cooler 40.

Ninthly, main configurations and effects related to battery or batteries 46 are as follows.

A flying apparatus 1 includes an airframe 2, one or more rotors 3 attached to the airframe 2, an engine 4 to supply a driving force to rotate at least one of the one or more rotors 3, a motor 5 to supply a driving force to rotate at least one of the one or more rotors 3, and batteries 46 to store electric power to be supplied to the motor 5. The batteries 46 are respectively provided on first and second sides of the engine 4 opposite each other in a planar view.

According to this configuration, since the batteries 46 are respectively provided on the first and second sides of the engine 4 opposite each other in a planar view, it is possible to easily acquire a space to provide the batteries 46 even in case of an upsizing of the batteries 46.

The batteries 46 include a first battery 46A provided at the first side of the engine 4 and a second battery 46B provided at the second side of the engine 4. The first battery 46A and the second battery 46B are located at the same height in the airframe 2.

According to this configuration, since a weight balance of the airframe 2 is greatly improved, it is possible to cause the flying apparatus 1 to fly steadily.

The engine 4 includes an engine main body 4*a* and an oil pan 4*b* provided below the engine main body 4*a*. The batteries 46 are respectively provided on first and second sides of the oil pan 4*b* opposite each other.

According to this configuration, with the batteries 46 respectively provided on the first and second sides of the oil pan 4*b* opposite each other, it is possible to adjust a weight balance of the flying apparatus 1 at a height of a lower portion of the engine 4 via the two batteries 46.

The one or more rotors 3, the batteries 46 and the engine 4 are aligned in the horizontal direction.

According to this configuration, since the one or more rotors 3 are provided at a height where the weight of the batteries 46 and the weight of the engine 4 are located, it is possible to cause a lifting power from the rotations of the one or more rotors 3 to act on a height of a portion with a large weight. Thus, it is possible to cause the flying apparatus 1 to fly steadily.

The one or more rotors 3 include a first-side rotor 3A1 provided on the first side of the engine 4 and a second-side rotor 3A2 provided on the second side of the engine 4. The first-side rotor 3A1, the first battery 46A, the engine 4, the second battery 46B and the second-side rotor 3A2 are aligned in this order in a horizontal direction.

According to this configuration, since the first battery 46A, the second battery 46B and the engine 4 are provided in a well-balanced manner between the first-side rotor 3A1 and the second-side rotor 3A2, it is possible to cause the flying apparatus 1 to fly steadily.

The flying apparatus 1 includes a radiator 40 to cool a coolant to cool the engine 4. At least one of the batteries 46 is provided on a side of the radiator 40.

According to this configuration, since it is possible to make one or more coolant pipes connected to the radiator 40 pass close to the at least one of the batteries 46, it is possible to prevent the batteries 46 from overheating.

The radiator 40 and the at least one of the batteries 46 are offset from each other in the up-down direction.

According to this configuration, it is possible to prevent heat emitted from the at least one of the batteries 46 from propagating to the radiator 40.

The flying apparatus 1 includes a baffle 44 to guide downward flow of air generated by rotation of at least one of the one or more rotors 3 to flow toward the radiator 40. The baffle 44 is juxtaposed with the at least one of the batteries 46 in a horizontal direction.

According to this configuration, it is possible to cool the at least one of the batteries 46 via the flow of air flowing along the baffle 44.

Tenthly, main configurations and effects related to layout structure of rotor(s) 3 and equipment are as follows.

A flying apparatus 1 includes an airframe 2, one or more rotors 3 attached to the airframe 2, and an engine 4 to supply a driving force to rotate at least one of the one or more rotors 3. At least one of the one or more rotors 3 overlaps the engine 4 when viewed in an up-down direction.

According to this configuration, since the at least one rotor 3 overlaps the heavyweight engine 4 when viewed in the up-down direction, it is possible to improve a balance of the flying apparatus 1 during flight.

The airframe 2 includes a main body assembly 6 and an arm 7 extending from the main body assembly 6. The one or more rotors 3 include a main rotor 3A attached to the main body assembly 6 and a sub-rotor 3B attached to the arm 7. The main rotor 3A and the sub-rotor 3B overlap the engine 4 when viewed in the up-down direction.

According to this configuration, since the main rotor 3A and the sub-rotor 3B overlap the heavyweight engine 4 when viewed in the up-down direction, it is possible to improve the balance of the flying apparatus 1 during flight.

The flying apparatus 1 includes a position detector 47 to measure a position of the airframe 2. The main body assembly 6 includes a framed main body 8 with the engine 4 mounted thereon or therein. The position detector 47 is provided at a top-section 8A of the framed main body 8. The engine 4 is provided at an upper section 8B of the framed main body 8 below the position detector 47.

According to this configuration, it is possible to satisfactorily perform positioning of the airframe 2 via the position detector 47 without being obstructed by the large engine 4.

The flying apparatus 1 includes a motor 5 to supply a driving force to rotate at least one of the one or more rotors 3, and a battery 46 to store electric power to be supplied to the motor 5. The battery 46 is provided at a middle section 8C of the framed main body 8.

According to this configuration, with the battery 46 provided at the middle section 8C of the framed main body 8, it is possible to control a weight balance of the flying apparatus 1 in the up-down direction of the framed main body 8.

The flying apparatus 1 includes a fuel tank 50 to store fuel to be supplied to the engine 4. The fuel tank 50 is provided at a lower section 8D of the framed main body 8.

According to this configuration, with the fuel tank 50 provided at the lower section 8D of the framed main body 8, it is possible to expand the fuel tank 50 downward according to the required amount of fuel. It is possible to limit a change in the weight balance of the airframe 2 due to a fluctuation of a quantity of fuel inside the fuel tank 50.

The flying apparatus 1 includes a controller 55 configured or programmed to control driving of the engine 4 and driving of the motor. The controller 55 is provided at the middle section 8C of the framed main body 8.

According to this configuration, with the controller 55 provided at the middle section 8C of the framed main body 8, it is possible to make connections of the controller 55 and the pieces of equipment provided above or below the controller 55 via wiring and/or the like at a short distance(s).

At least a portion of the fuel tank 50 is peripherally enclosed with a casing 51.

According to this configuration, since it is possible to protect the fuel tank 50 and its surrounds with the casing 51, it is possible to prevent the fuel tank 50 from being subjected to or damaged by an external force from the surroundings thereof.

The fuel tank 50 includes a lower portion 50*a* which has a form of a truncated cone with a diameter decreasing downward. The casing 51 surrounds the lower portion 50*a* of the fuel tank 50.

According to this configuration, it is possible to cover and protect the lower portion 50*a* of the fuel tank 50 without increasing the size of the casing 51. With the lower portion 50*a* of the fuel tank 50 having the form of a truncated cone, it is possible to smoothly suck fuel from the fuel tank 50 even when the airframe 2 tilts when the flying apparatus 1 is in-flight.

The casing 51 includes a fuse box to contain a fuse.

According to this configuration, it is possible to provide the fuse box containing a fuse a function to protect the fuel tank 50.

Eleventhly, main configurations and effects related to the support structure of the rotors 3 are as follows.

A flying apparatus 1 includes an airframe 2, and a plurality of rotors 3 attached to the airframe 2. The plurality of rotors 3 include a main rotor 3A and a sub-rotor 3B. The airframe 2 includes at least one first support 9 with the main rotor 3A attached to a distal end thereof and at least one second support 7 with the sub-rotor 3B attached to a distal end thereof. A width W1 of a proximal end of the at least one first support 9 is larger than a width W2 of a proximal end of the least one second support 7.

According to this configuration, since the width W1 of the proximal end of the first support 9 to support the main rotor 3A is larger than the width W2 of the proximal end of the second support 7 to support the sub-rotor 3B, it is possible to make a strength of supporting the main rotor 3A greater than a strength of supporting the sub-rotors 3B.

The proximal end 7*a* of the at least one second support 7 is connected to the first support 9.

According to this configuration, with the first support 9 and the second support 7 being integrally connected, it is possible to improve a rigidity of the first support 9 and of the second support 7.

Proximal ends 7*a* of a plurality of the second supports 7 are connected to one of the at least one support 9.

According to this configuration, with two second supports 7 integrally connected to one first support 9, it is possible to greatly improve the rigidity of the first support 9 and of the second supports 7.

The airframe 2 includes a main body assembly 6 and an arm 7 extended from the main body assembly 6. The main body assembly 6 includes a framed main body 8 provided thereon or therein with a driver to drive the main rotors 3A, and a projecting frame 9 projecting from the framed main body 8 and provided with the main rotor 3A attached thereto. The first support 9 includes the projecting frame 9, and the second support 7 includes the arm 7.

According to this configuration, with the projecting frame 9 and the arm 7 integrally connected, it is possible to improve the rigidity of the projecting frame 9 and the arm 7.

A length L1 of the first support 9 between the proximal end 9*b* and the distal end (corner 9*a*) thereof is shorter than a length L2 of the second support 7 between the proximal end 7*a* and a distal end 7*b* thereof.

According to this configuration, it is possible to give the first support 9 supporting the main rotor 3A a configuration with a high rigidity to reduce deformation thereof by external forces compared to the second support 7 to support the sub-rotor 3B.

Twelfthly, other main configurations and effects related to support structure of rotors 3 are as follows.

A flying apparatus 1 includes an airframe 2, and a plurality of rotors 3 attached to the airframe 2. The plurality of rotors 3 include a main rotor 3A and a sub-rotor 3B. The airframe 2 includes a main body assembly 6, and at least one arm 7 extending from the main body assembly 6 and provided with the sub-rotor 3B attached to a distal end thereof. The main body assembly 6 includes a framed main body 8 provided thereon or therein with a driver to drive the main rotor 3A, and at least one projecting frame 9 projecting from the framed main body 8 and provided with the main rotor 3A attached thereto. A proximal end of the at least one arm 7 is connected to the at least one projecting frame 9 of the main body assembly 6.

According to this configuration, since it is possible to attach the main rotor 3A to the projecting frame 9 and to attach the sub-rotor 3B to the arm 7 connected to the projecting frame 9, it is possible to provide the different types of rotors (main rotor 3A and sub-rotor 3B) at appropriate positions corresponding to respective functions thereof. Specifically, by attaching the main rotor 3A to the projecting frame 9 which is a portion of the main body assembly 6, it is possible to provide the main rotor 3A at a position where sufficient lifting power can be applied to the main body assembly 6 and without obstructing the pieces of equipment mounted in the main body assembly 6. By attaching the sub-rotor 3B to the arm 7, it is possible to provide the sub-rotor 3B at a position where the sub-rotor 3B can reliably perform a function to modify a posture of the airframe 2.

The at least one projecting frame 9 includes a plurality of frame members 100 that extend in a projecting direction away from the framed main body 8 and define a corner 9*a* therebetween by approaching each other in the projecting direction. The main rotor 3A is attached to the corner 9*a*. The at least one arm 7 is connected to a portion of the at least one projecting frame 9 between a proximal end 9*b* of the at least one projecting frame 9 and the corner 9*a*.

According to this configuration, with the arm 7 connected to the portion between the proximal end 9*b* of the projecting frame 9 and the corner 9*a*, it is possible to reinforce the projecting frame 9 via the arm 7.

The at least one arm 7 is connected to the portion of the at least one projecting frame 9 between the proximal end 9*b* of the at least one projecting frame 9 and the corner 9*a* at a position closer to the proximal end 9*b* of the at least one projecting frame 9 than to the corner 9*a*.

According to this configuration, it is possible to reduce a load applied on the projecting frame 9 to which the arm 7 is connected.

Proximal ends 7*a* of a plurality of the arms 7 are connected to the at least one projecting frame 9 or one of a plurality of the projecting frames 9.

According to this configuration, since it is possible to reinforce the at least one projecting frame 9 or the one of the projecting frames 9 via the plurality of arms 7, a reinforcement effect is improved.

A length L1 of the at least one projecting frame 9 between a proximal end and a distal end thereof is shorter than a length L2 of the at least one arm 7 between the proximal end and the distal end thereof.

According to this configuration, it is possible to make the projecting frame 9 with a main rotor 3A attached thereon stronger than the arm 7 on which the sub-rotor 3B is supported.

Thirteenthly, main configurations and effects related to support structure of engine 4 are as follows.

A flying apparatus 1 includes an airframe 2, at least one rotor 3 attached to the airframe 2, and an engine 4 to supply a driving force to rotate the at least one rotor 3. The airframe 2 includes a framed main body 8 including a plurality of pipes 170. The engine 4 is supported by at least one engine mount 180 attached to at least one of the pipes 170.

According to this configuration, it is possible to reliably support, via the at least one engine mount 180, the heavyweight engine 4 to the framed main body 8 including the assembled pipes 170.

A position of the at least one engine mount 180 is adjustable along an axial direction of the at least one of the pipes 170.

According to this configuration, it is possible to adjust an attaching position of the engine 4 to the framed main body 8 along the axial direction of the at least one of the pipes 170.

The at least one engine mount 180 is attached to the at least one of the pipes 170 provided on at least one side of the engine 4. The engine 4 is suspended from the at least one of the pipes 170 provided on the at least one side of the engine 4 and is supported by the framed main body 8 via the at least one engine mount 180.

According to this configuration, since it is possible to cause the at least one of the pipes 170 at the upper portion of the framed main body 8 to support the engine 4 via the engine mount 180, it is possible to use another or others of the pipes 170 at the lower portion of the framed main body 8 to support other pieces of equipment located below the engine 4.

The engine 4 includes an engine main body 4*a* and an oil pan 4*b* provided below the engine main body 4*a*. The oil pan 4*b* is suspended together with the engine main body 4*a* from the at least one of the pipes 170.

According to this configuration, it is possible to support the engine 4 to the framed main body 8 without necessitating members to support the oil pan 4*b*.

The framed main body 8 includes a first pipe 170A provided on a first side of the engine 4 and a second pipe 170B provided on a second side of the engine 4 opposite the first side. The at least one engine mount 180 includes a first engine mount 180A attached to the first pipe 170A, and a second engine mount 180B attached to the second pipe 170B. The engine 4 is supported by the first engine mount 180A and the second engine mount 180B.

According to this configuration, it is possible to steadily support the engine 4 from the opposite first and second sides thereof via the first engine mount 180A and the second engine mount 180B.

The at least one rotor 3 include a first-side rotor 3A1 provided on the first side of the engine 4 and a second-side rotor 3A2 provided on the second side of the engine 4 in a planar view. The engine 4 includes a first output shaft 4*c* to supply a driving force to the first-side rotor 3A1 and a second output shaft 4*d* to supply a driving force to the second-side rotor 3A2. The first pipe 170A and the second pipe 170B extend parallel or substantially parallel to the first output shaft 4*c* and the second output shaft 4*d* in a planar view.

According to this configuration, it is possible to adjust a position of the engine 4 along the first pipe 170A and the second pipe 170B without modifying the directions in which the first output shaft 4*c* and the second output shaft 4*d* extend.

A flying apparatus 1 includes a main body assembly 6, an arm 7 extending from the main body assembly 6, a rotor 3 (sub-rotor 3B) attached to the arm 7, a driver (engine) 4 to drive the rotor 3, and a cooling system 90 to water-cool the driver 4. The cooling system 90 includes a cooler 40 to cool a coolant supplied to the driver 4, and a pump 66 to circulate the coolant between the cooler 40 and the driver 4. The pump 66 is provided at a lower portion of the main body assembly 6.

According to this configuration, by including the cooling system 90 to water-cool the driver 4, it is possible to water-cool the driver 4 driving the rotors 3. Since the pump 66 to circulate the coolant is provided at the lower portion of the main body assembly 6, it is possible to smoothly perform circulation of the coolant even when the posture of the flying apparatus 1 tilts during flight. Especially, it is possible to smoothly perform the recovery circulation of the coolant to the pump 66. In the case where air in included in the coolant, since the air moves upward, it is possible to prevent air from entering the pump 66.

The pump 66 is located lower than the cooler 40.

According to this configuration, it is possible to smoothly perform the recovery circulation of the coolant from the cooler 40 to the pump 66.

The cooler 40 includes one or more radiators 40. The pump 66 is located lower than the one or more radiators 40.

According to this configuration, it is possible to smoothly perform the recovery circulation of the coolant from the one or more radiators 40 to the pump 66.

The driver 4 includes an engine 4. The cooler 40 cools a coolant supplied to the engine 4.

According to this configuration, it is possible to efficiently cool the engine 4 with the coolant by the cooling system 90.

The cooler 40 is located lower than the engine 4.

According to this configuration, it is possible to smoothly perform the recovery circulation of the coolant from the engine 4 to the cooler 40.

The cooling system 90 includes connecting pipes including a first pipe 67 to connect a delivery port of the pump 66 and the engine 4, a second pipe 68 to connect a suction port of the pump 66 and the cooler 40, and a third pipe 69 to connect the engine 4 and the cooler 40. A lower end of the pump 66 is located lower than the engine 4, the cooler 40 and the connecting pipes.

According to this configuration, since the pump 66 is located at the lowest point of the cooling system 90, it is possible to smoothly perform the recovery circulation of the coolant to the pump 66 even when the posture of the flying apparatus 1 tilts during flight.

The one or more radiators 40 include a first radiator 40A and a second radiator 40B arranged in a horizontal direction. The pump 66 is provided between the first radiator 40A and the second radiator 40B in the horizontal direction.

According to this configuration, it is possible to smoothly cause the coolant to flow evenly between one pump 66 and two radiators (first radiator 40A and second radiator 40B).

The cooling system 90 includes the connecting pipes including the first pipe 67 connecting a delivery port of the pump 66 and the engine 4, the second pipe 68 connecting a suction port of the pump 66 and the cooler 40, and the third pipe 69 connecting the engine 4 and the cooler 40. The second pipe 68 diverges at an intermediate portion thereof into two branch pipes 68A and 68B. Of the branch pipes, one branch pipe 68A is connected to the first radiator 40A and another branch pipe 68B is connected to the second radiator 40B.

According to this configuration, it is possible to efficiently cool the engine 4 via one cooling system 90 and by using two radiators (first radiator 40A and second radiator 40B).

The flying apparatus 1 includes a fuel tank 50 to store fuel to be supplied to the engine 4. The fuel tank 50 includes the lower portion 50*a* which has a form of a truncated cone with a diameter decreasing downward. At least a portion of the cooling system 90 overlaps the fuel tank 50 in a planar view, and overlaps the lower portion 50*a* of the fuel tank 50 when viewed in the up-down direction.

According to this configuration, since it is possible to provide at least a portion of the cooling system 90 in a vicinity of the truncated cone-shaped lower portion 50*a* of the fuel tank 50, it is possible to reduce a space necessary for the fuel tank 50 and the cooling system 90, and it becomes possible to reduce a size of the flying apparatus 1.

An engine 4 includes one or more pistons (first piston 81 and second piston 82), one or more crank shafts configured to rotate according to reciprocating motions of the one or more pistons (first crank shaft 83 and second crank shaft 84), an engine block 400 to accommodate the one or more pistons and the one or more crank shafts, and an oil pan 4*b* provided below the engine block 400. Ther engine block 400 includes a width-directional first-side portion and a width-directional second-side portion opposite each other in a width direction thereof, and the oil pan 4*b* is provided only on the width-directional first-side portion between the width-directional first-side portion and the width-directional second-side portion of the engine block 400.

According to this configuration, since the oil pan 4*b* is provided only on the width-directional first-side portion of the engine block 400, a bottom of the engine block 400 defined by the width-directional second-side portion of the engine block 400 is higher than that defined by the width-directional first-side portion of the engine block 400. Thus, since a space S2 is created below the width-directional second-side portion of the engine block 400 where the bottom thereof is higher, it is possible to make effective use of the space S2. For example, in an apparatus in which the engine 4 is used, it is possible to provide pieces of equipment to drive the apparatus in the space S2.

The one or more pistons include a first piston 81 and a second piston 82 opposite each other. The one or more crank shafts include a first crank shaft 83 configured to rotate according to reciprocating motion of the first piston 81 and a second crank shaft 84 configured to rotate according to reciprocating motion of the second piston 82.

According to this configuration, in an apparatus with an opposed-piston engine used as the engine 4, it is possible to make effective use of the space S2 created below the opposed-piston engine.

The first crank shaft 83 and the second crank shaft 84 are parallel or substantially parallel to each other and spaced from each other in the width direction. The oil pan 4*b* is provided closer to the first crank shaft 83 than to the second crank shaft.

According to this configuration, it is possible to save a space below a side of the second crank shaft 84 of the engine 4 to provide other pieces of equipment therein.

The engine block 400 includes an oblique portion 401 in which an inner lower surface 402 is lowered in the width direction from the width-directional second-side portion to the width-directional first-side portion.

According to this configuration, it is possible to cause oil (lubrication oil) on a lower surface of the width-directional second-side portion of the engine block 400 to flow along the inner lower surface 402 of the oblique portion 401 to the width-directional first-side portion of the engine block 400, and to cause the oil to flow down to an inner portion of the oil pan 4*b*.

The engine block 400 is configured by assembling a plurality of blocks (first block 400A, second block 400B, third block 400C). The oil pan 4*b* is provided below one (first block 400A) of the plurality of blocks. The oblique portion 401 is provided at a lower portion of another (second block 400B) of the plurality of blocks adjacent to the one of the plurality of blocks.

According to this configuration, since the oil flows from the block (second block 400B) including the oblique portion 401 to the block (first block 400A) with the oil pan 4*b* provided below thereof, it is possible to reliably guide the oil to the oil pan 4*b*.

The oblique portion 401 is provided at one of opposite-side portions of the engine block in a depth direction which is perpendicular to the width direction of the engine block 400.

According to this configuration, it is possible to collect the oil on the lower surface of the engine block 400 and to make the oil flow to one-side portion in the depth direction of the engine block 400. Since it is possible to reduce the size of the oblique portion 401 compared to when the oblique portion is provided across an entire length in the depth direction, it is possible to reduce a size of the engine 4.

The oblique portion 401 has a cross-sectional U-shape.

According to this configuration, it is possible to make the oil collected in the inner portion of the oblique portion flow rapidly and surely toward the oil pan 4*b*. Since it is possible to reduce the size of the oblique portion 401, it is possible to reduce the size of the engine 4.

A flying apparatus 1 includes a main body assembly 6, an arm 7 extending from the main body assembly 6, a rotor 3 attached to the arm 7, and an engine 4 to supply a driving force to the rotor 3. The engine 4 includes the engine provided with the oil pan 4*b* only on the width-directional first-side portion between the width-directional first-side portion and the width-directional second-side portion of the engine block 400 opposite each other in the width direction of the engine block 400.

According to this configuration, since it is possible to provide one or more pieces of equipment such as an electrical component in the space S2 created below the second-side portion in the width direction of the engine 4, it becomes possible to make the flying apparatus 1 more compact.

The flying apparatus 1 includes an electrical component 300 mounted on or in the main body assembly 6. The electrical component 300 is provided below the engine 4 and close to the width-directional second-side portion of the engine block 400 and overlaps the oil pan 4*b* when viewed in an up-down direction.

According to this configuration, it is possible to provide the electrical component 300 in a space formed below the width-directional second-side portion of the engine block 400 (on which the oil pan 4*b* is not provided). Thus, it is possible to compactly provide the electrical component 300 and the engine 4 close to each other in the flying apparatus 1. Accordingly, it is possible to reduce the size of the flying apparatus 1.

The flying apparatus 1 includes a motor 5 to supply a driving force to the rotor 3, and a battery 46 to store the electric power to be supplied to the motor 5. The electrical component 300 includes a battery controller configured or programmed to control the battery 46.

According to this configuration, it is possible to compactly provide the engine 4 and the battery controller 300 to control the battery 46 close to each other in the flying apparatus 1.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine comprising:

at least a first and second piston;

a first and second crank shaft, the first crank shaft configured to rotate according to reciprocating motions of the first piston, and the second crank shaft configured to rotate according to reciprocating motions of the second piston;

an engine block to accommodate the first and second pistons and the first and second crank shaft; and an oil pan provided below the engine block; wherein the engine block includes a width-directional first-side portion housing the first piston and first crank shaft, and a width-directional second-side portion housing the second piston and second crank shaft, the first-side portion and second side-portion opposite each other in a width direction thereof;

wherein the oil pan is provided only on the width-directional first-side portion of the engine block, and wherein the width-directional second-side portion of the engine block includes an oblique portion in which an inner lower surface is angled downwardly in the width direction from the width-directional second-side portion to the width-directional first-side portion, such that the inner lower surface is configured to direct a flow of lubrication oil from the second-side portion to the oil pan.

2. The engine according to claim 1, wherein the first crank shaft and the second crank shaft are parallel or substantially parallel to each other and spaced from each other in the width direction; and the oil pan is provided at or adjacent to the first crank shaft.

3. The engine according to claim 1, wherein the engine block includes a plurality of blocks;

the oil pan is provided below one of the plurality of blocks; and the oblique portion is provided at a lower portion of another of the plurality of blocks adjacent to the one of the plurality of blocks.

4. The engine according to claim 1, wherein the oblique portion is provided at one of opposite-side portions of the engine block in a depth direction which is perpendicular or substantially perpendicular to the width direction of the engine block.

5. The engine according to claim 1, wherein the oblique portion has a cross-sectional U-shape.

6. A flying apparatus comprising:

a main body assembly;

an arm extending from the main body assembly;

a rotor attached to the arm; and the engine according to claim 1 to supply a driving force to the rotor.

7. The flying apparatus according to claim 6, further comprising:

an electrical component mounted on or in the main body assembly; wherein the electrical component is provided below the engine and at or adjacent to the width-directional second-side portion of the engine block and overlaps the oil pan when viewed in an up-down direction.

8. The flying apparatus according to claim 7, further comprising:

a motor to supply a driving force to the rotor; and a battery to store electric power to be supplied to the motor; wherein the electrical component includes a battery controller configured or programmed to the battery.

* * * * *